US012573905B2

(12) United States Patent
Sugishima et al.

(10) Patent No.: US 12,573,905 B2
(45) Date of Patent: Mar. 10, 2026

(54) STATOR, ROTATING ELECTRICAL MACHINE, PRODUCTION METHOD OF STATOR, AND PRODUCTION METHOD OF ROTATING ELECTRICAL MACHINE

(71) Applicant: DENSO CORPORATION, Kariya (JP)

(72) Inventors: Kazushi Sugishima, Kariya (JP); Yasufumi Fujii, Kariya (JP); Seiichi Murakami, Kariya (JP); Daichi Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 18/220,622

(22) Filed: Jul. 11, 2023

(65) Prior Publication Data

US 2023/0396114 A1      Dec. 7, 2023

Related U.S. Application Data

(63) Continuation of application No. PCT/JP2022/000780, filed on Jan. 12, 2022.

(30) Foreign Application Priority Data

Feb. 5, 2021      (JP) ................................. 2021-017755

(51) Int. Cl.
$H02K\ 3/28$ (2006.01)
$H02K\ 1/14$ (2006.01)
(52) U.S. Cl.
CPC ............... $H02K\ 3/28$ (2013.01); $H02K\ 1/148$ (2013.01)
(58) Field of Classification Search
CPC .. H02K 1/148; H02K 15/095; H02K 2203/06; H02K 3/28
See application file for complete search history.

(56) References Cited

U.S. PATENT DOCUMENTS

| | | |
|---|---|---|
| 2004/0222715 A1 | 11/2004 | Yamamura et al. |
| 2005/0229383 A1 | 10/2005 | Yamamura et al. |

(Continued)

FOREIGN PATENT DOCUMENTS

| | | |
|---|---|---|
| JP | 4444639 B2 | 3/2010 |
| JP | 4490248 B2 | 6/2010 |
| JP | 2013-201820 A | 10/2013 |

*Primary Examiner* — Christopher M Koehler
*Assistant Examiner* — Ethan Nguyen Vo
(74) *Attorney, Agent, or Firm* — OLIFF PLC

(57)      ABSTRACT

A core includes a plurality of core segments each of which has a tooth around which wire is wounded in the form of a coil. The core segments are designed to have the coils in a concentrated winding form and also in a m-series-connected-coil and n-parallel-connected-coil delta configuration where m is a natural number more than or equal to two, and n is a natural number or in a k-series-connected-coil and n-parallel-connected-coil delta configuration where k is an even number, and n is a natural number. The coils include U-phase coils working for a U-phase, W-phase coils working for a W-phase, and V-phase coils working for a V-phase. The U-phase coils, the W-phase coils, and the V-phase coils are arranged alternately in a first circumferential direction of the core. The winding also includes a plurality of power input wires and a plurality of coil-to-coil connecting wires. Each of the power input wires connects between a trailing end of one of the coils for a first phase that is one of the U-phase, the W-phase, and the V-phase and a leading end of one of the coils for a second phase that is one of the U-phase, the W-phase, and the V-phase and different from the first phase. At least one of the power input wires connects ends of the wire together.

31 Claims, 38 Drawing Sheets

(56) References Cited

U.S. PATENT DOCUMENTS

| | | | |
|---|---|---|---|
| 2022/0149696 A1* | 5/2022 | Kalb | ..................... H02K 7/1166 |
| 2022/0181922 A1* | 6/2022 | He | ........................... H02K 3/28 |
| 2023/0307978 A1* | 9/2023 | Li | ......................... H02K 21/20 |

* cited by examiner

STATOR, ROTATING ELECTRICAL MACHINE, PRODUCTION METHOD OF STATOR, AND PRODUCTION METHOD OF ROTATING ELECTRICAL MACHINE

TECHNICAL FIELD

This disclosure relates generally to a stator, a rotating electrical machine, a production method of a stator, and a production method of a rotating electrical machine.

BACKGROUND ART

In general, a measure used in a rotating electrical machine designed as a brushless motor in order to enhance an output of the brushless motor with a reduced size thereof is implemented by increasing a space factor of a winding of the brushless motor. Conventional techniques for increasing the space factor are taught in, for example, Patent Literatures 1 and 2.

PRIOR ART DOCUMENT

Patent Literature

Patent literature 1: Japanese Patent No. 4444639
Patent literature 2: Japanese Patent No. 4490248

SUMMARY OF THE INVENTION

Problem to be Solved by the Invention

There is, however, a risk that when a core of the brushless motor is shaped into an annular form after wires are wound around the teeth, wires connecting between coils (which will also be referred to as coil-to-coil connecting wires) or terminal wires of a winding which lead to a circuit substrate may be intricately tangled, which results in deformation or loosening of the coils or the coil-to-coil connecting wires or the terminal wires being tightly pressed against each other causing damage to insulating layers thereof. In order to alleviate such problems, complicated special tools or special facilities are needed, which, however, results in an increase in production cost of the brushless motor.

Usually, it is very difficult to automate a process in which the terminal wires of the winding are shaped or connected to the circuit substrate after the core is shaped into an annular form because the coil-to-coil connecting wires or the terminals wires leading to the circuit substrate are intricately tangled. For this reason, there has been proposed to use bus bars including terminals to connect the terminal wires to the circuit substrate, which facilitates the shaping of the terminal wires without making the winding by a continuous conductor. Such a proposal, however, will result in complicated structures of the bus bars or an increase in parts of the brushless motor, thus leading to an increase in production cost of the brushless motor.

This disclosure was made in view of the above problems. It is an object to provide a rotating electrical machine which is capable of increasing a space factor of a winding to enhance an output therefrom and is enabled to be produced at low cost and high quality.

Means for Solving the Problem

In order to achieve the above object, a stator in a first mode of this disclosure comprises: (a) a core which includes a plurality of core segments each of which is equipped with a tooth; and (b) a winding which includes a plurality of coils wound around the teeth of the core segments in a concentrated winding form, the coils being in a m-series-connected-coil and n-parallel-connected-coil delta configuration where m is a natural number more than or equal to two, and n is a natural number or in a k-series-connected-coil and n-parallel-connected-coil delta configuration where k is an even number, and n is a natural number. The coils include U-phase coils working for a U-phase, W-phase coils working for a W-phase, and V-phase coils working for a V-phase. The U-phase coils, the W-phase coils, and the V-phase coils are arranged alternately in a first circumferential direction of the core. The winding also includes a plurality of power input wires and a plurality of coil-to-coil connecting wires. Each of the power input wires connects between a trailing end of one of the coils for a first phase that is one of the U-phase, the W-phase, and the V-phase and a leading end of one of the coils for a second phase that is one of the U-phase, the W-phase, and the V-phase and different from the first phase. The coil-to-coil connecting wires include first direction-oriented connecting wires and second direction-oriented connecting wires. Each of the first direction-oriented connecting wires connects between a trailing end of one of the coils for a third phase that is one of the U-phase, the W-phase, and the V-phase and a leading end of one of the coils 78 for the third phase which is arranged away from the one of the coils in the first circumferential direction. Each of the second directing connecting wires connects between a trailing end of one of the coils for a fourth phase that is one of the U-phase, the W-phase, and the V-phase and a leading end of one of the coils for the fourth phase which is arranged away from the former one of the coils for the fourth phase in a second circumferential direction of the core which is opposite the first circumferential direction. At least one of the power input wires has a joint between ends of the winding.

In order to achieve the above object, a rotating electrical machine in the second mode of this disclosure comprises the above-described stator and a plurality of wire-connecting terminals each of which connects with two or more of the power input wires.

In order to achieve the above object, a rotating electrical machine in the third mode of this disclosure comprises the above-described stator and a plurality of wire-connecting terminals each of which connects with a respective one of the power input wires.

In order to achieve the above object, a rotating electrical machine in the fourth mode of this disclosure comprises the above-described stator and a circuit substrate to which the power input wires connect directly.

In order to achieve the above object, a production method of a stator in the fifth mode of this disclosure which includes a core and a winding. The core includes a plurality of core segments each of which is equipped with a tooth. The winding includes a plurality of coils wound around the teeth of the core segments in a concentrated winding form, the coils being in a m-series-connected-coil and n-parallel-connected-coil delta configuration where m is a natural number more than or equal to two, and n is a natural number or in a k-series-connected-coil and n-parallel-connected-coil delta configuration where k is an even number, and n is a natural number. The coils include U-phase coils working for a U-phase, W-phase coils working for a W-phase, and V-phase coils working for a V-phase, the U-phase coils. The W-phase coils, and the V-phase coils are arranged alternately in a first circumferential direction of the core. The production method comprises winding wire around the teeth to form the coil. In the winding of the wire, a plurality of power input wires are formed each of which connects between a leading end of one of the coils of a first one of the U-phase, the W-phase, and the V-phase and a trailing end of one of the coils of a second one of the U-phase, the W-phase, and the V-phase. A plurality of first direction-oriented connecting wires are formed each of which connects between a leading end of one of the coils of one of the U-phase, the W-phase, and the V-phase and a trailing end of one of the coils of the same phase which is arranged away from a first former one of the coils in the first circumferential direction of the core. At least one second direction-oriented wire is formed which connects between a trailing end of one of the coils of one of the U-phase, the W-phase, and the V-phase and a leading end of one of the coils of the same phase which is arranged away from a second former one of the coils in a second circumferential direction. At least one of the power input wires joints ends of the winding together to complete said delta configuration.

In order to achieve the above object, a production method of a stator in the sixth mode of this disclosure in which a stator is produced in the above stator production method, and each of the power input wires is connected to two or more wire-connecting terminals.

In order to achieve the above object, a production method of a stator in the seventh mode of this disclosure in which a stator is produced in the above stator production method, and each of the power input wires is connected to a respective one of wire-connecting terminals.

In order to achieve the above object, a production method of a stator in the eighth mode of this disclosure in which a stator is produced in the above stator production method, and each of the power input wires is connected directly to a circuit substrate.

Beneficial Effects of the Invention

This disclosure provides a rotating electrical machine which is high in space factor of a winding to enhance an output therefrom and enabled to be produced at low costs.

4

Figure 9A:
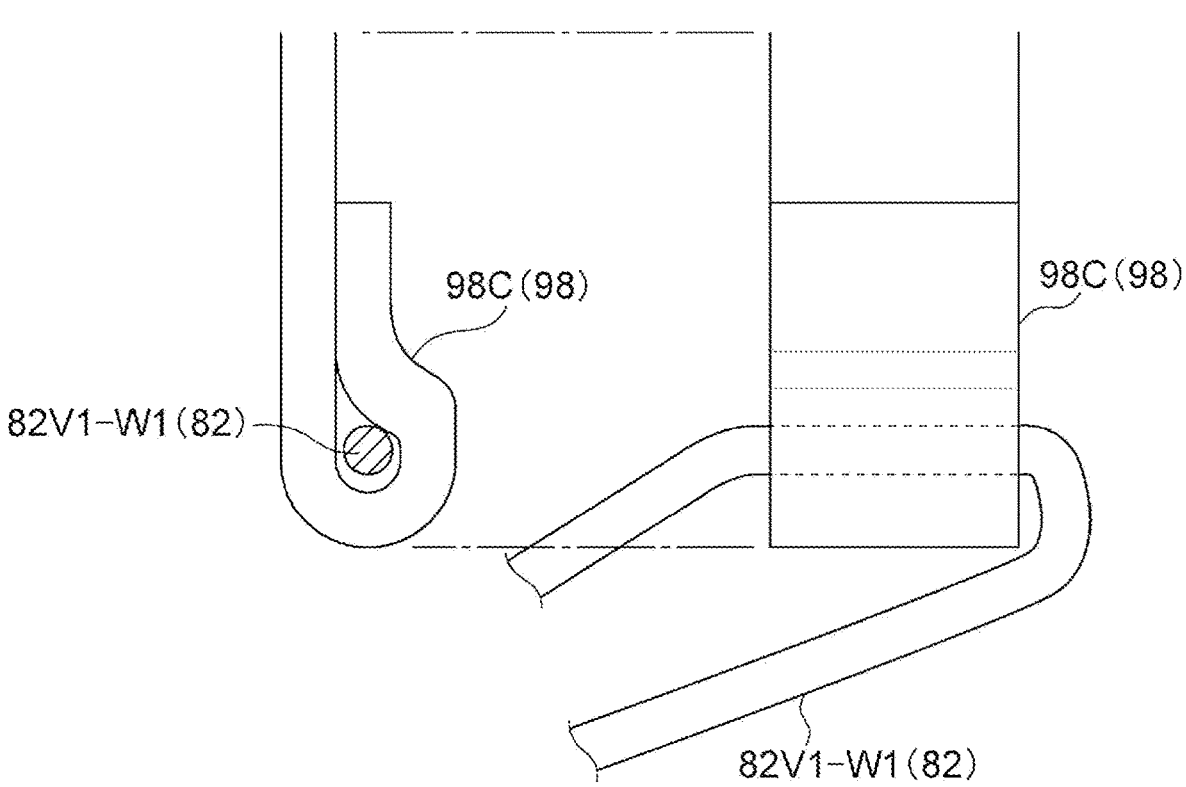

FIG. 9A is a two-view drawing which illustrates an example of joints of power input wires achieved in a wire connection process in the first embodiment.

Figure 9B:
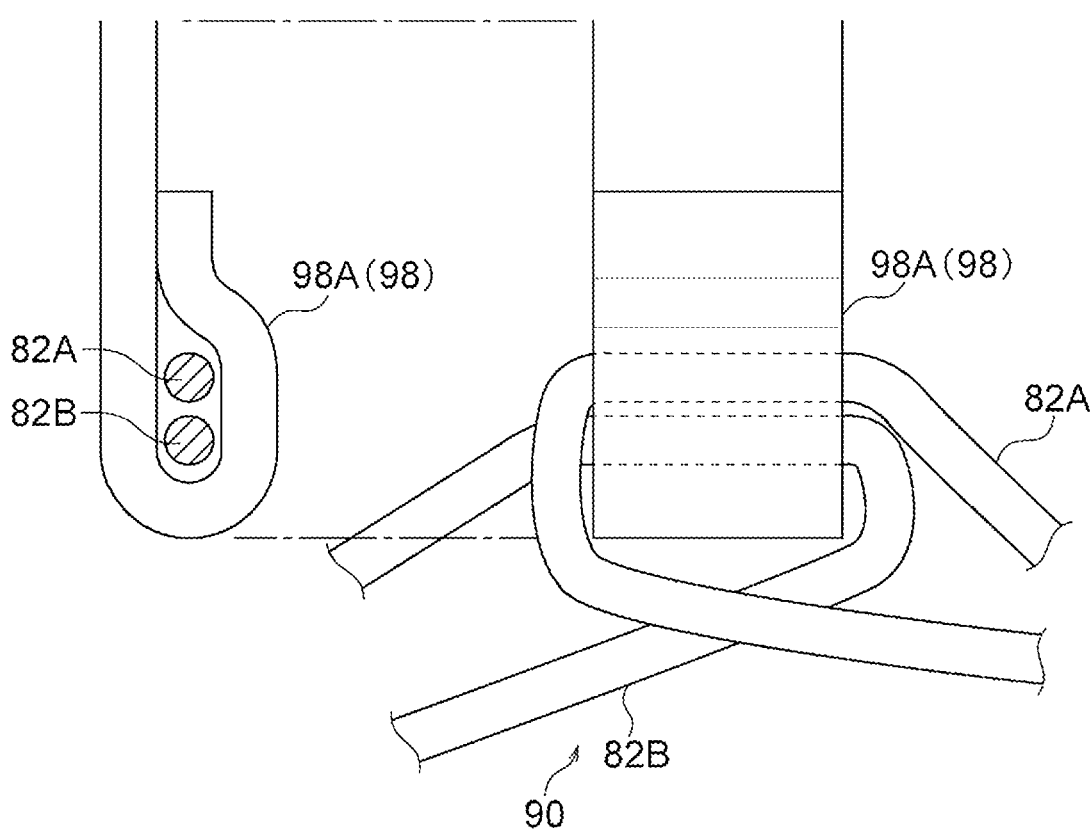

FIG. 9B is a two-view drawing which illustrates an example of a joint of ends of a winding achieved using fusing techniques in a wire connection process in the first embodiment.

Figure 10:
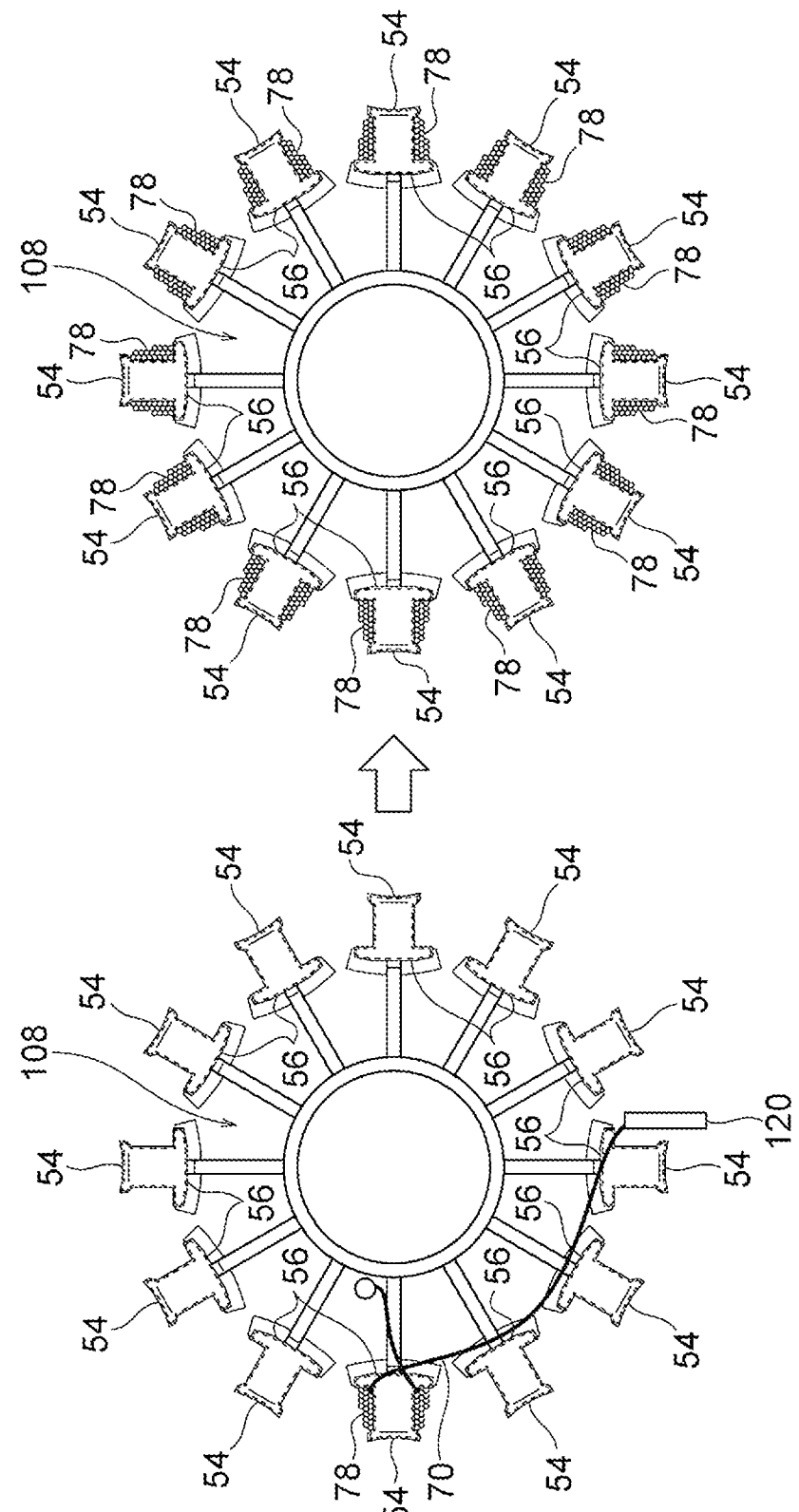

FIG. 10 is a view which demonstrates a modification of a wire winding process in the first embodiment to wind wire in a core.

Figure 11:
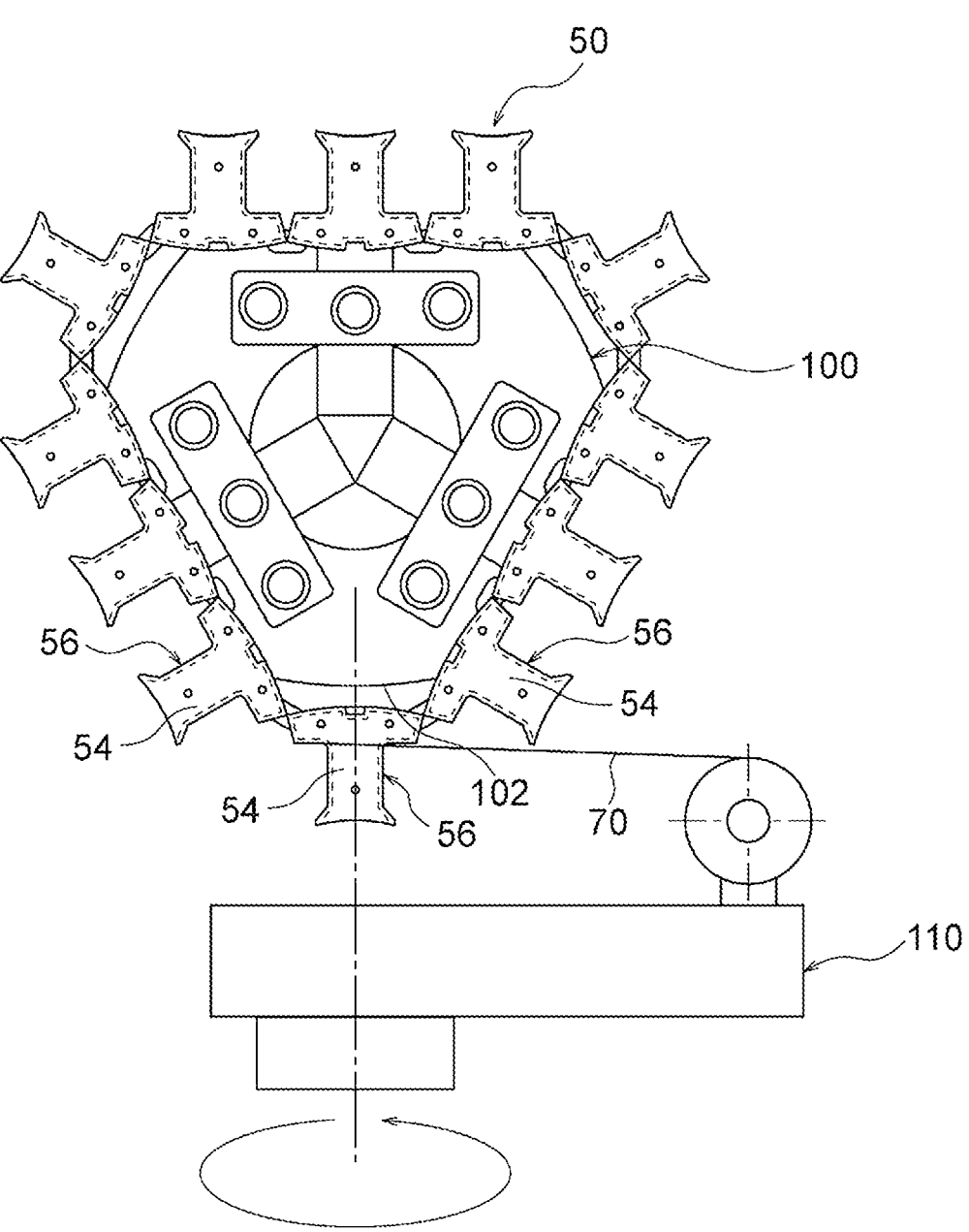

FIG. 11 is a view which demonstrates a core setting process in a modification of a production method of a rotating electrical machine in the first embodiment.

Figure 12:
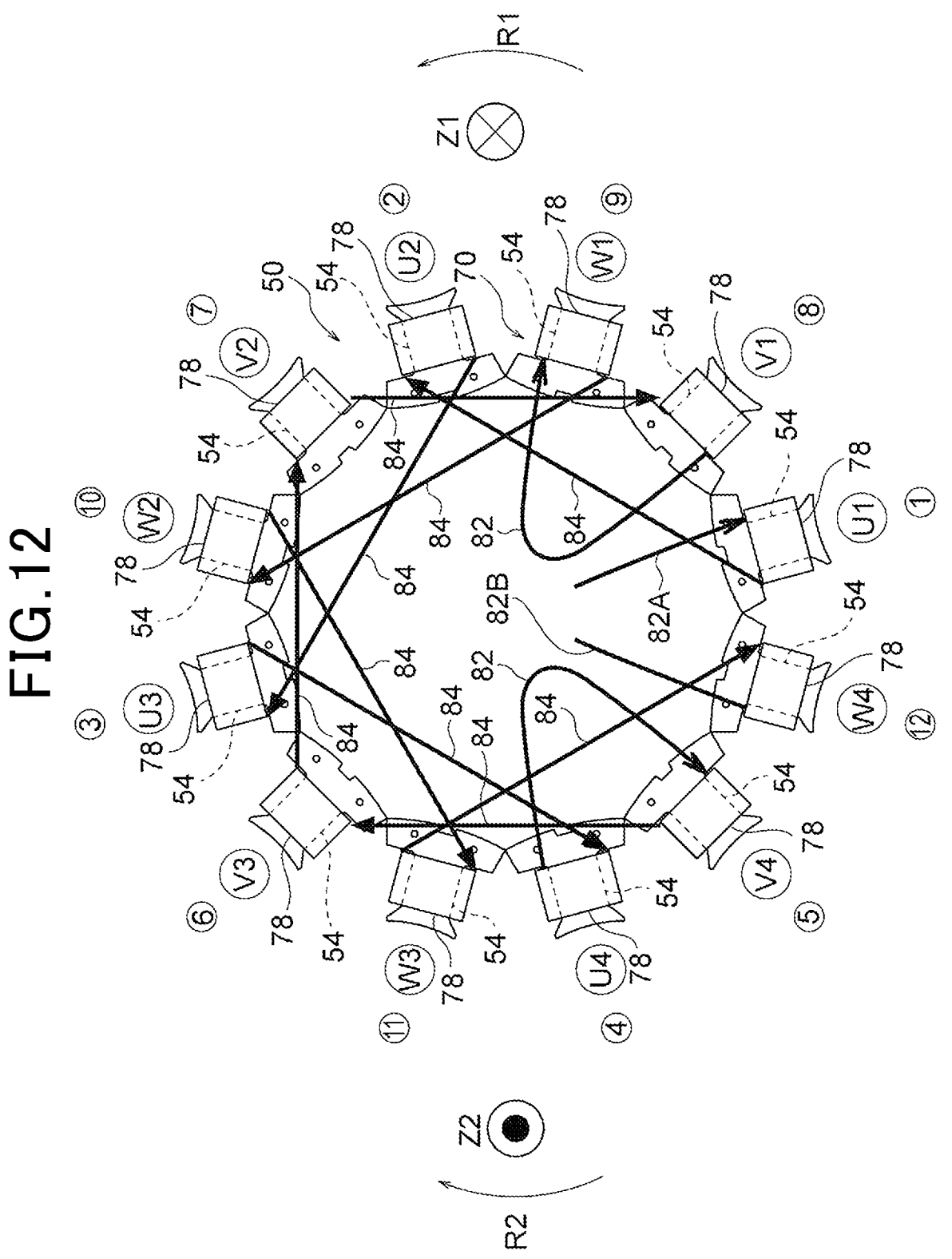

FIG. 12 is a view which demonstrates a core, as having turned inside out to change the orientation thereby by 180°, in a modification of a production method of a rotating electrical machine in the first embodiment.

Figure 13:
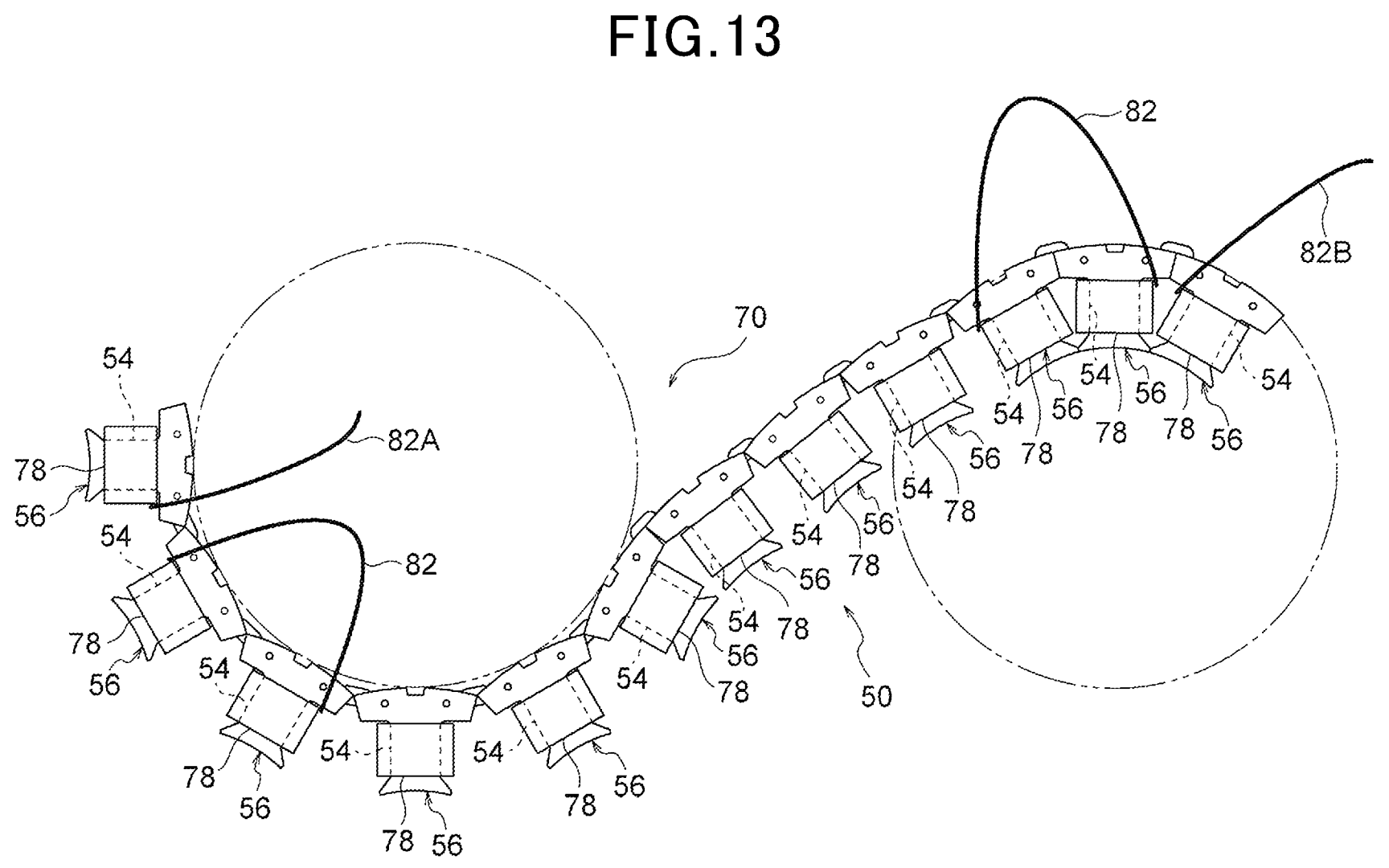

FIG. 13 is a view which demonstrates a core, as having turned inside out to change the orientation thereby by 180°, in a production method of a rotating electrical machine in the first embodiment.

Figure 14:
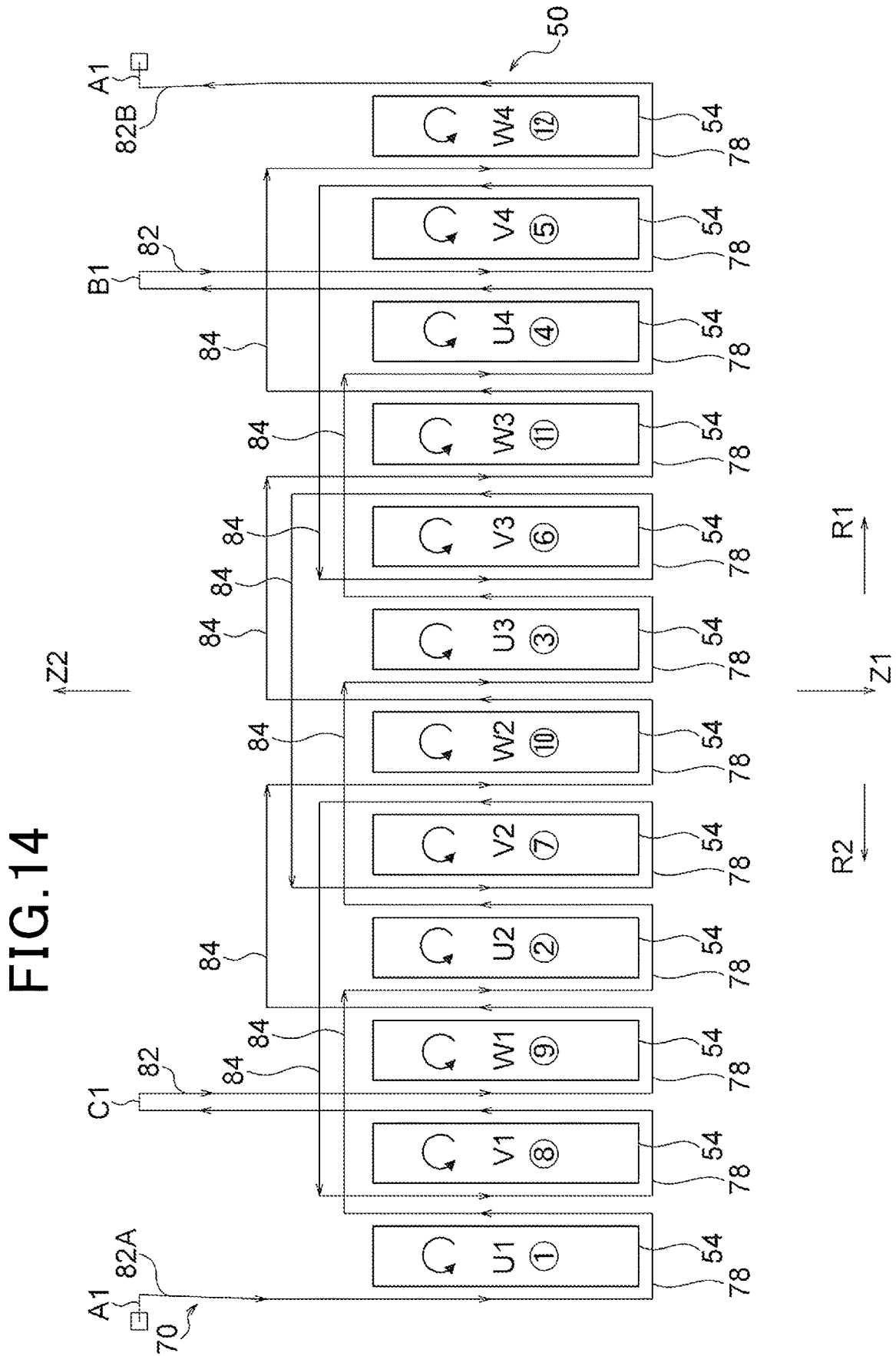

FIG. 14 is a diagram of a wire winding process in the second embodiment.

Figure 15:
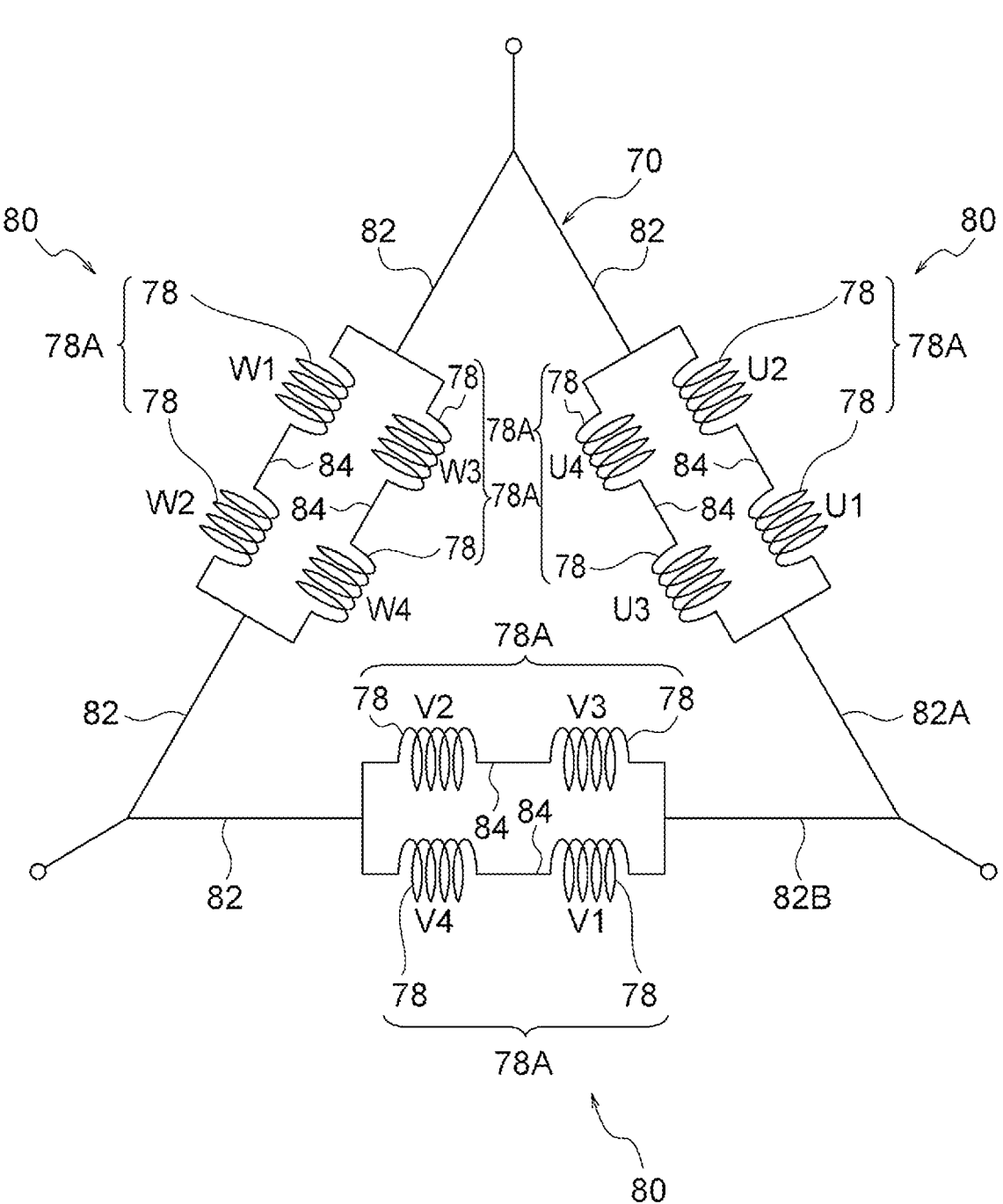

FIG. 15 is an illustration which shows the layout of wire connections of a winding of a stator in the third embodiment.

Figure 16:
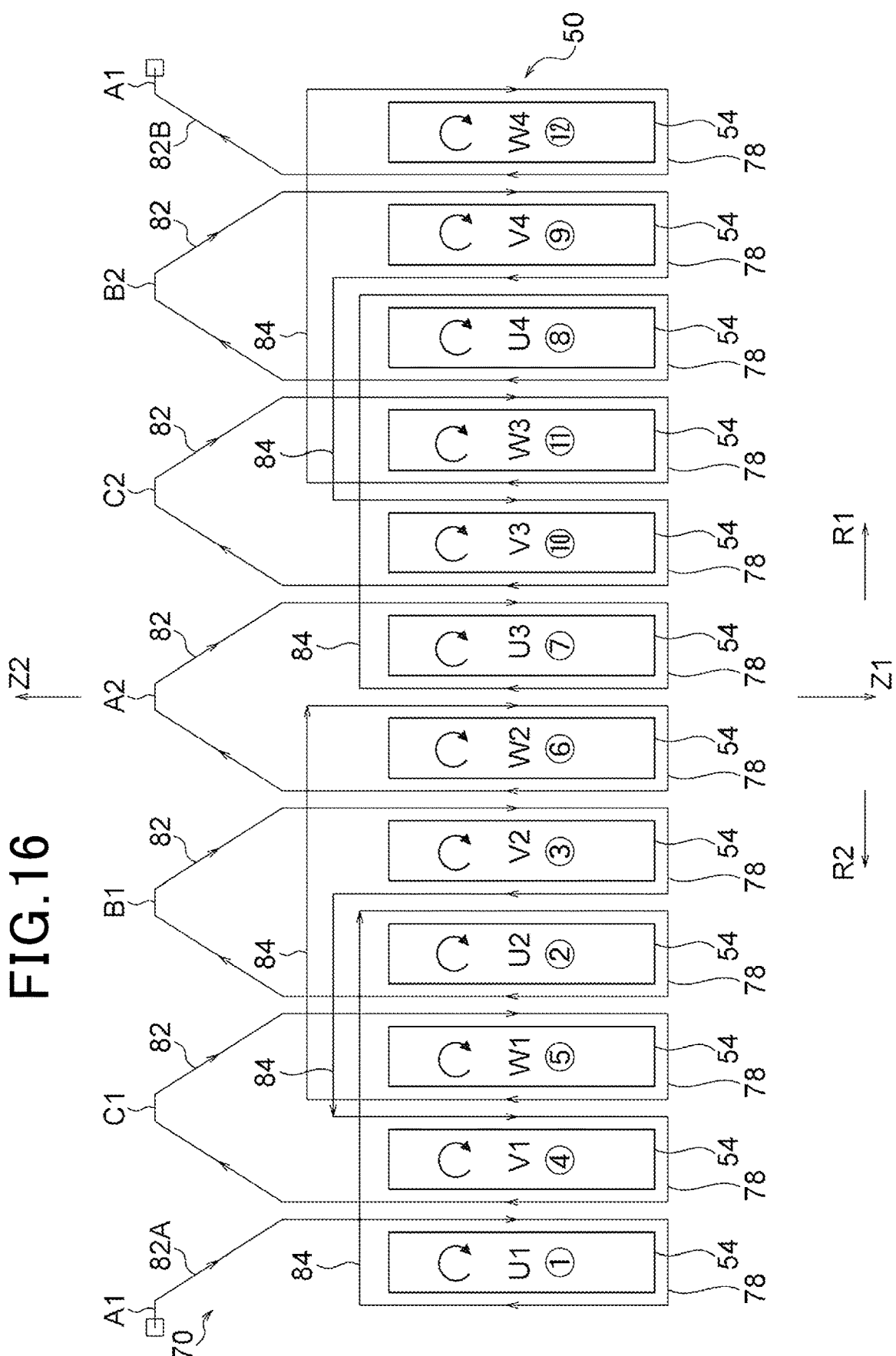

FIG. 16 is a diagram of a wire winding process in the third embodiment.

Figure 17:
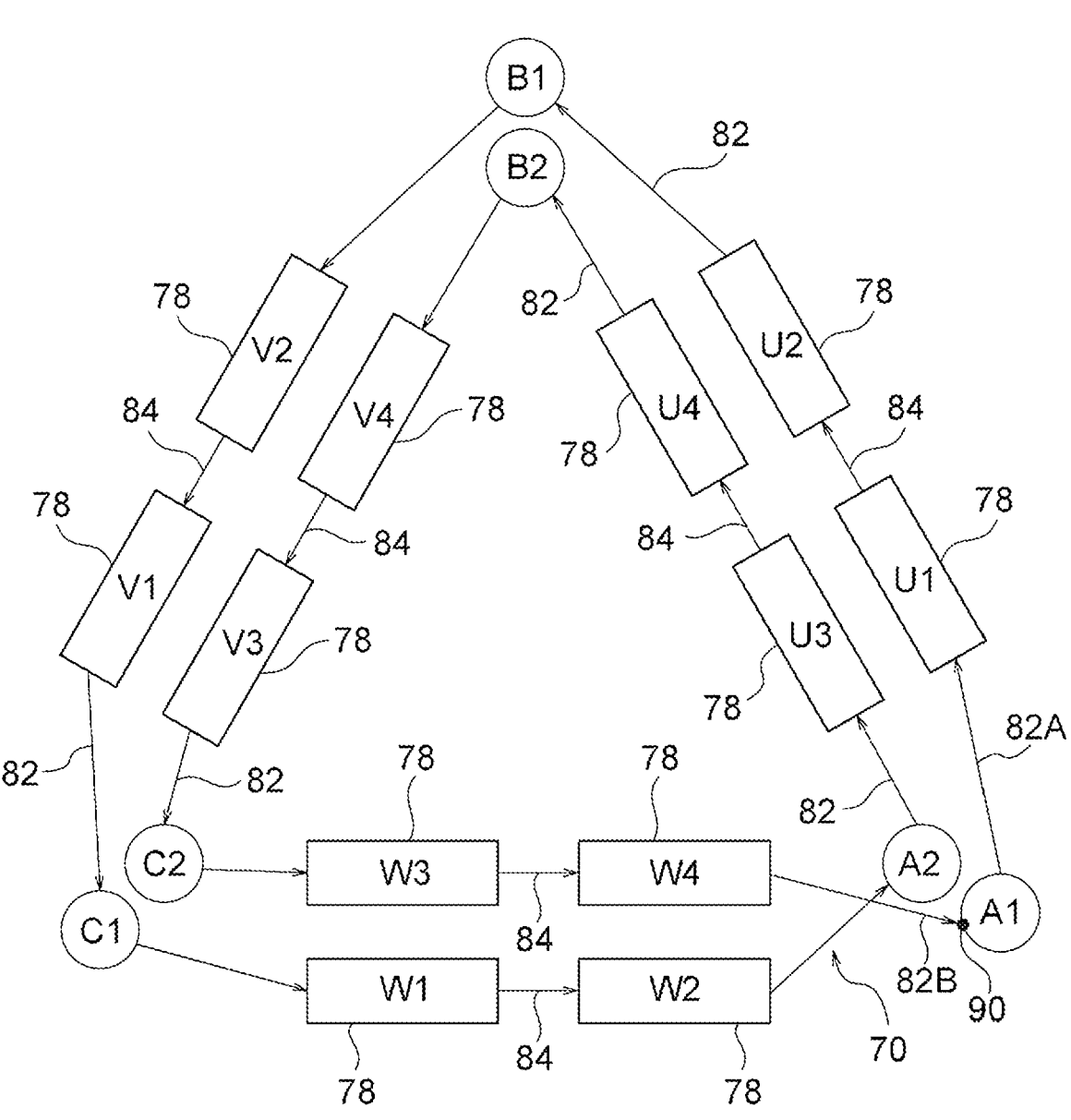

FIG. 17 is a view which demonstrates the layout of connections of coils achieved in a wire winding process in the third embodiment.

Figure 18:
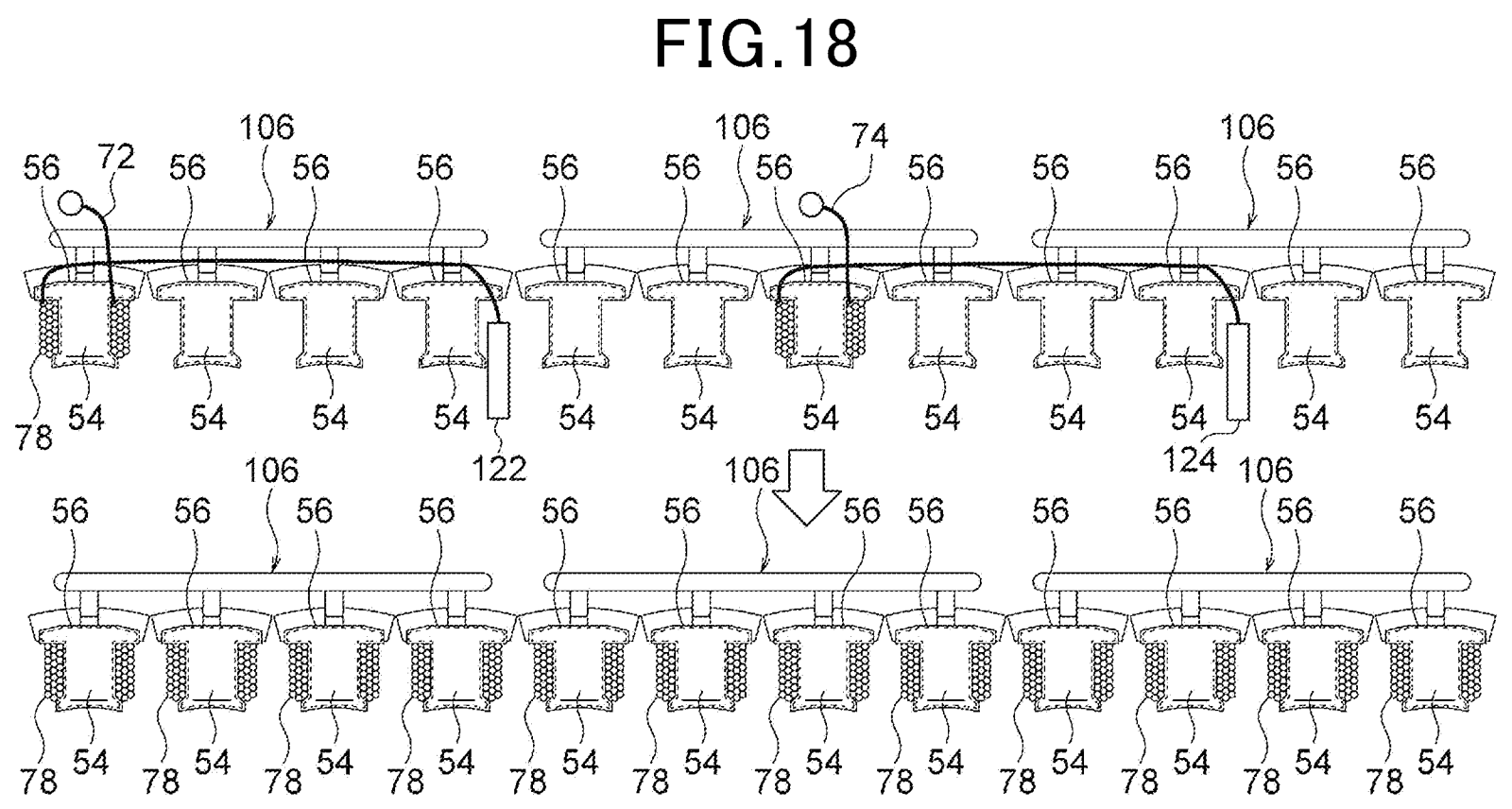

FIG. 18 is a view which shows steps of a wire winding process to wind wire in a core in the fourth embodiment.

Figure 19:
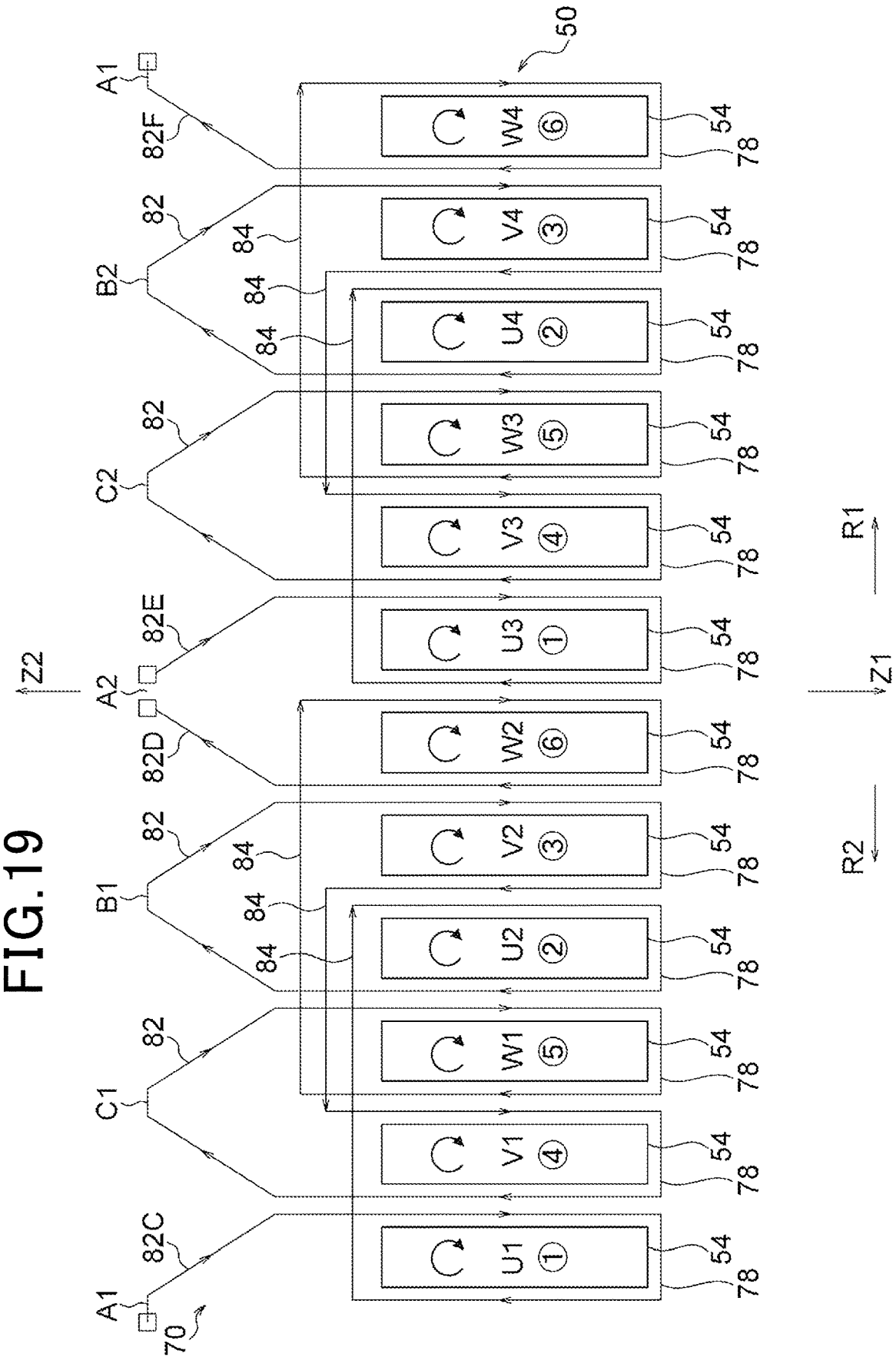

FIG. 19 is a diagram of a wire winding process in the fourth embodiment.

Figure 20:
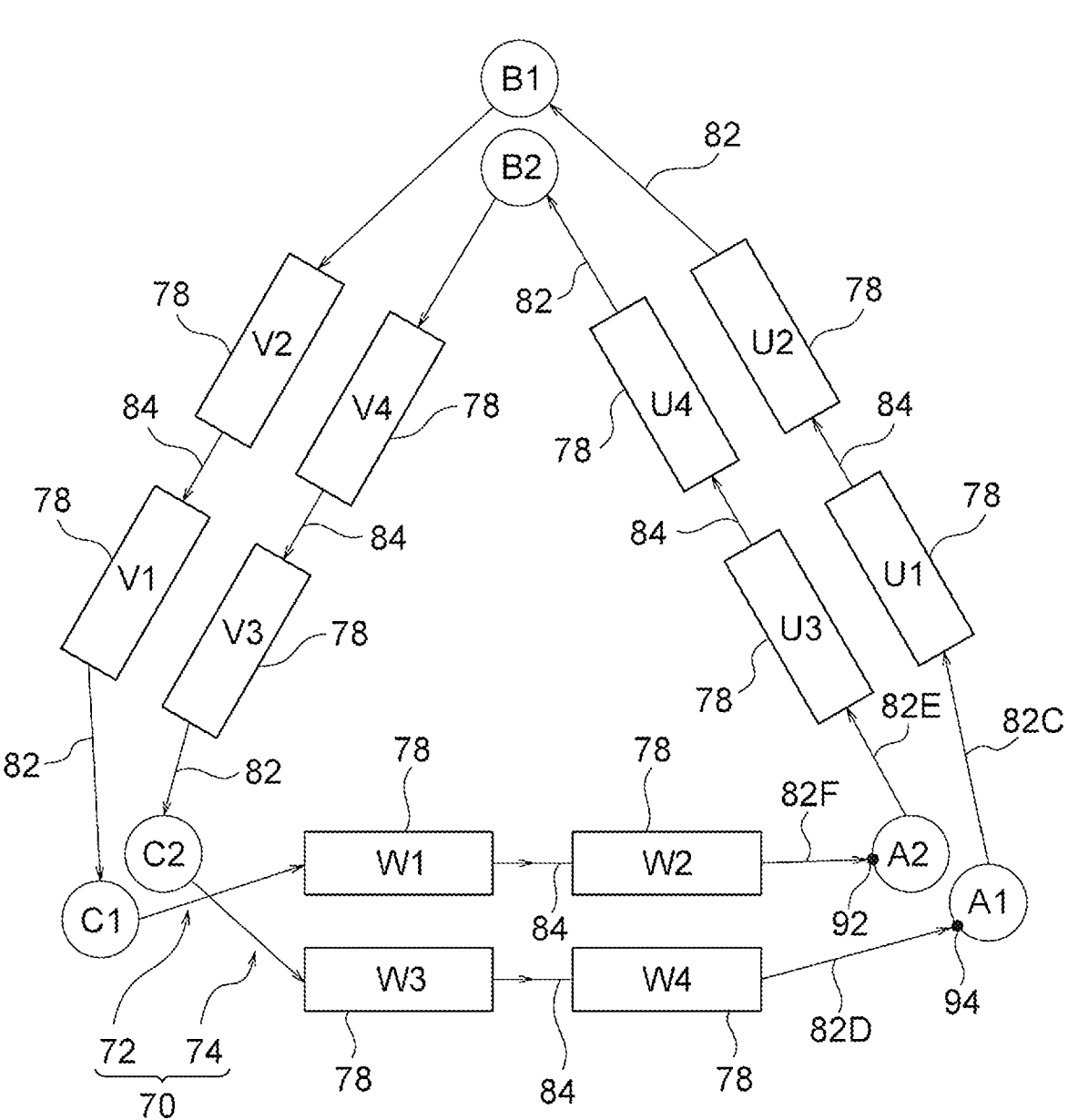

FIG. 20 is a view which demonstrates the layout of connections of coils achieved in a wire winding process in the fourth embodiment.

Figure 21:
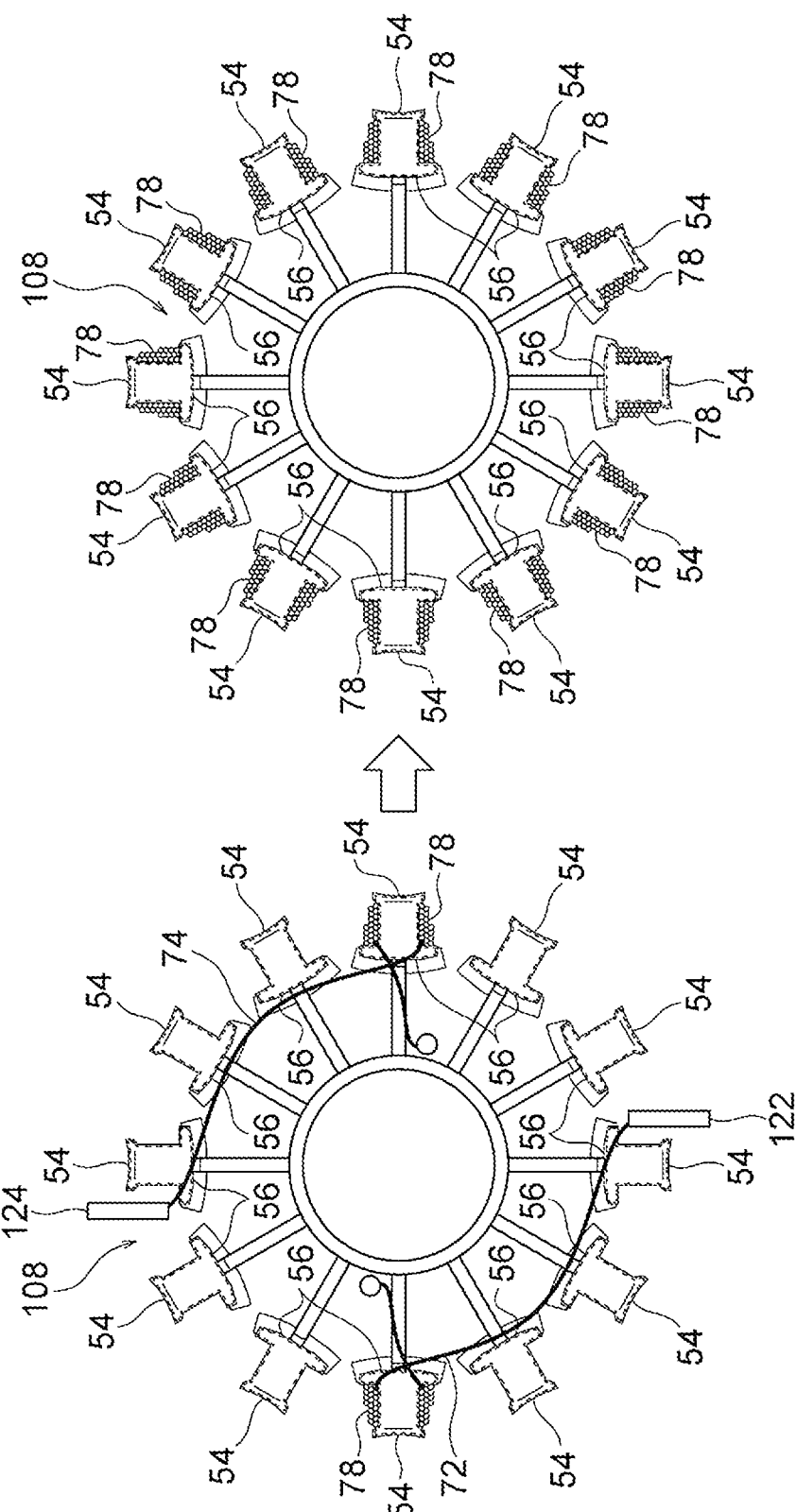

FIG. 21 is a view which demonstrates a core setting process in a modification of a production method of a rotating electrical machine in the fourth embodiment.

Figure 22:
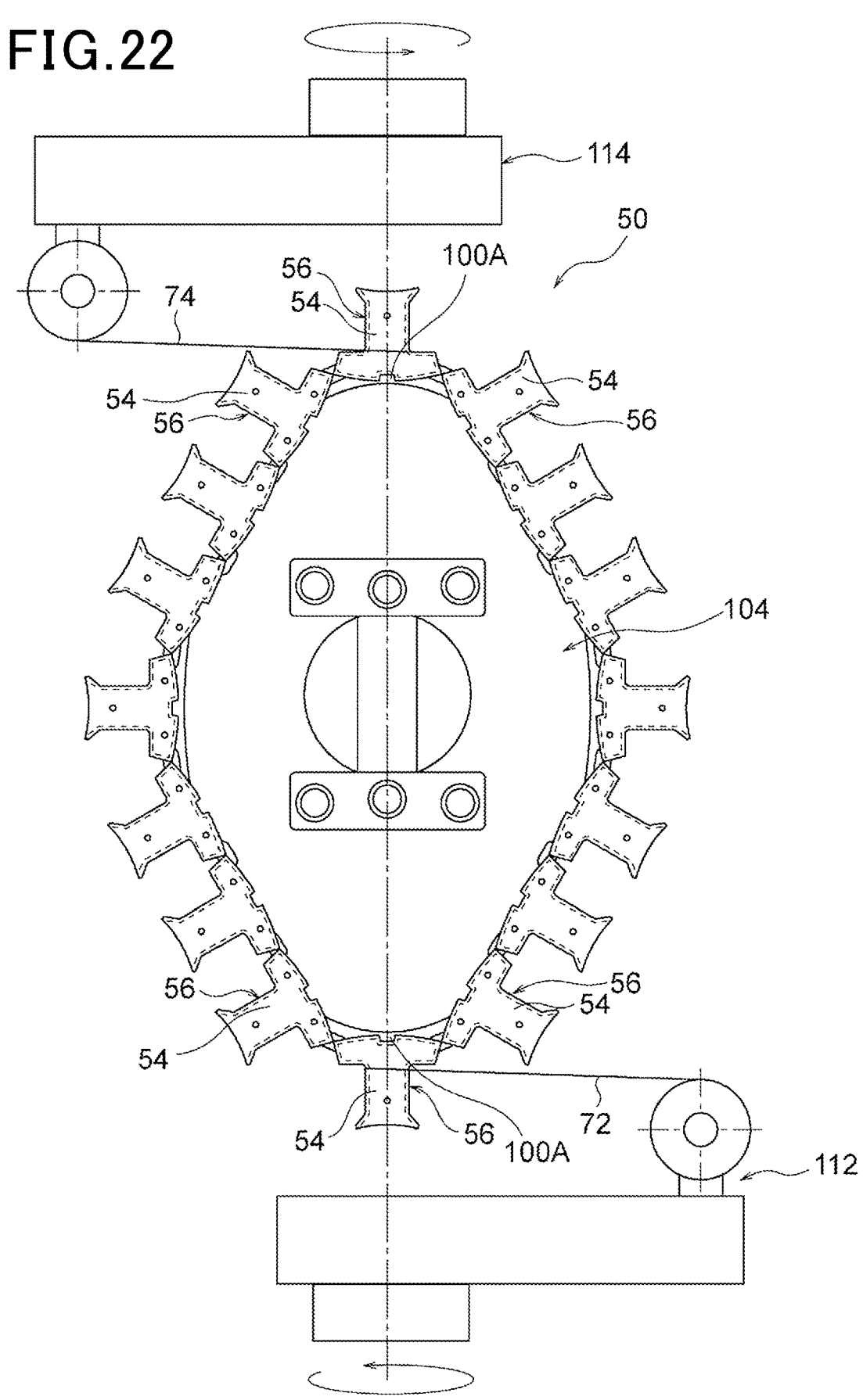

FIG. 22 is a view which demonstrates a core setting process in a second modification of a production method of a rotating electrical machine in the first embodiment.

Figure 23:
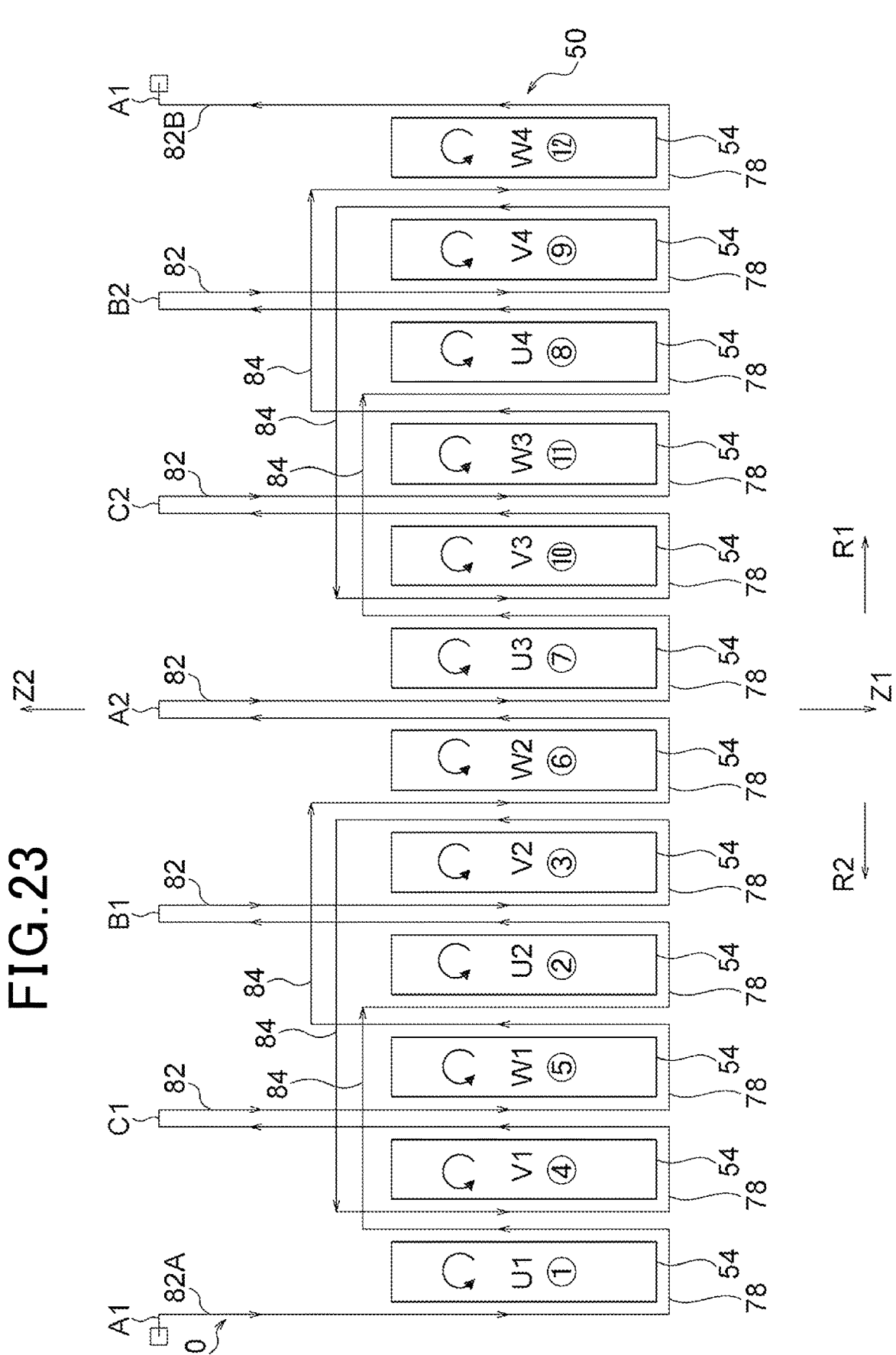

FIG. 23 is a diagram of a wire winding process in the fifth embodiment.

Figure 24:
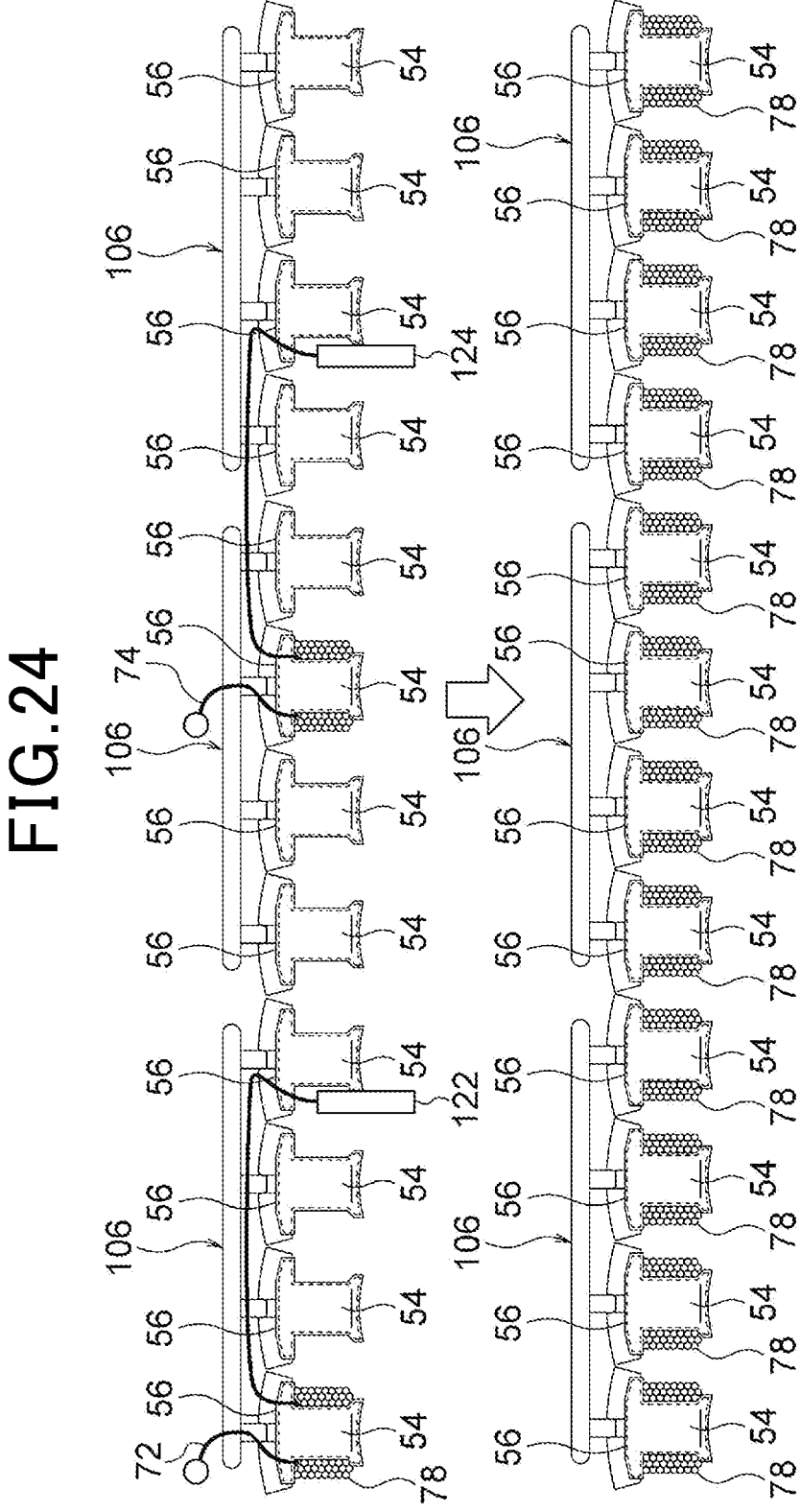

FIG. 24 is a view which demonstrates a sequence of steps of a wire winding process to wind wire in a core in the sixth embodiment.

Figure 25:
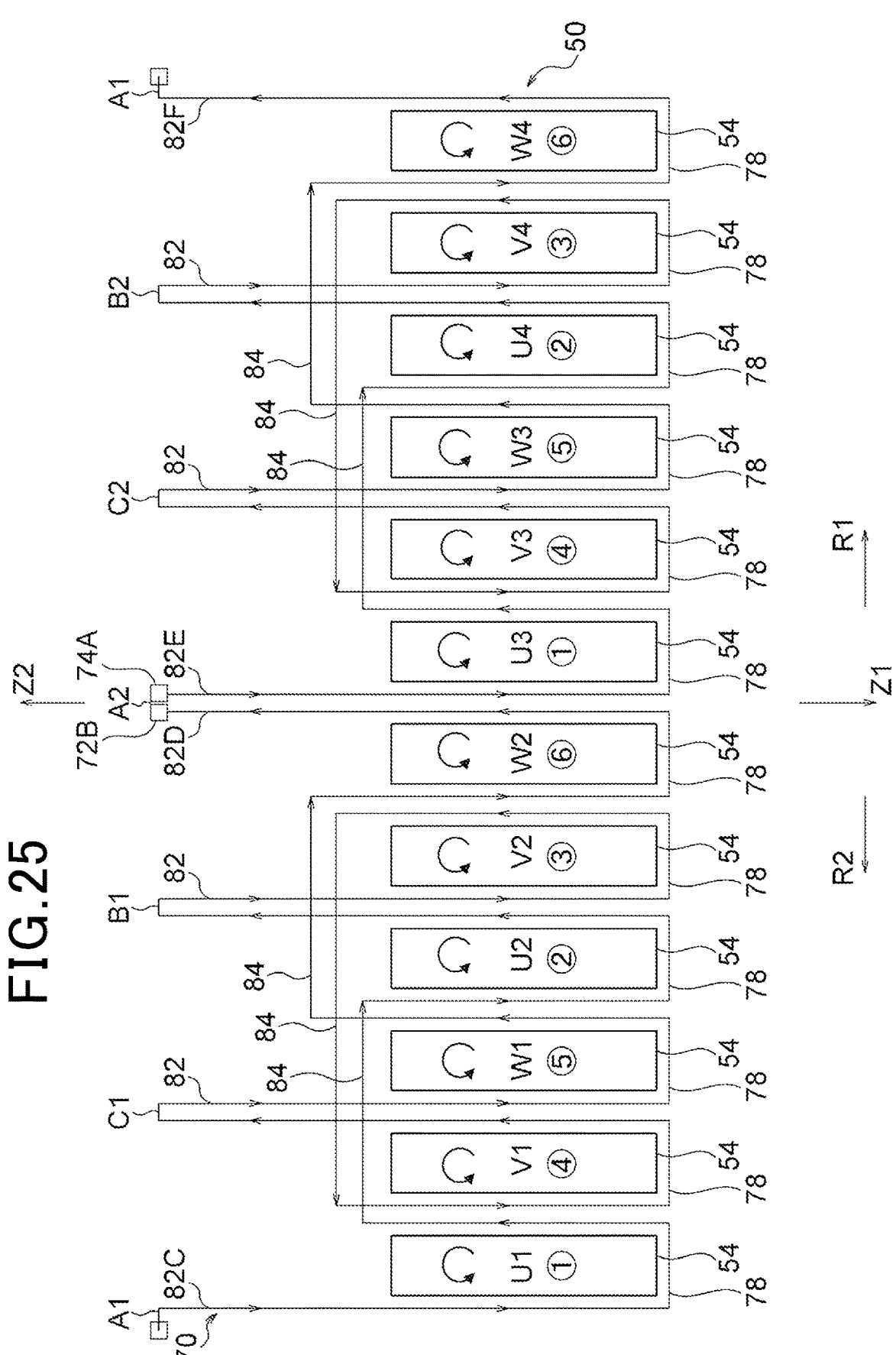

FIG. 25 is a diagram of a wire winding process in the sixth embodiment.

Figure 26:
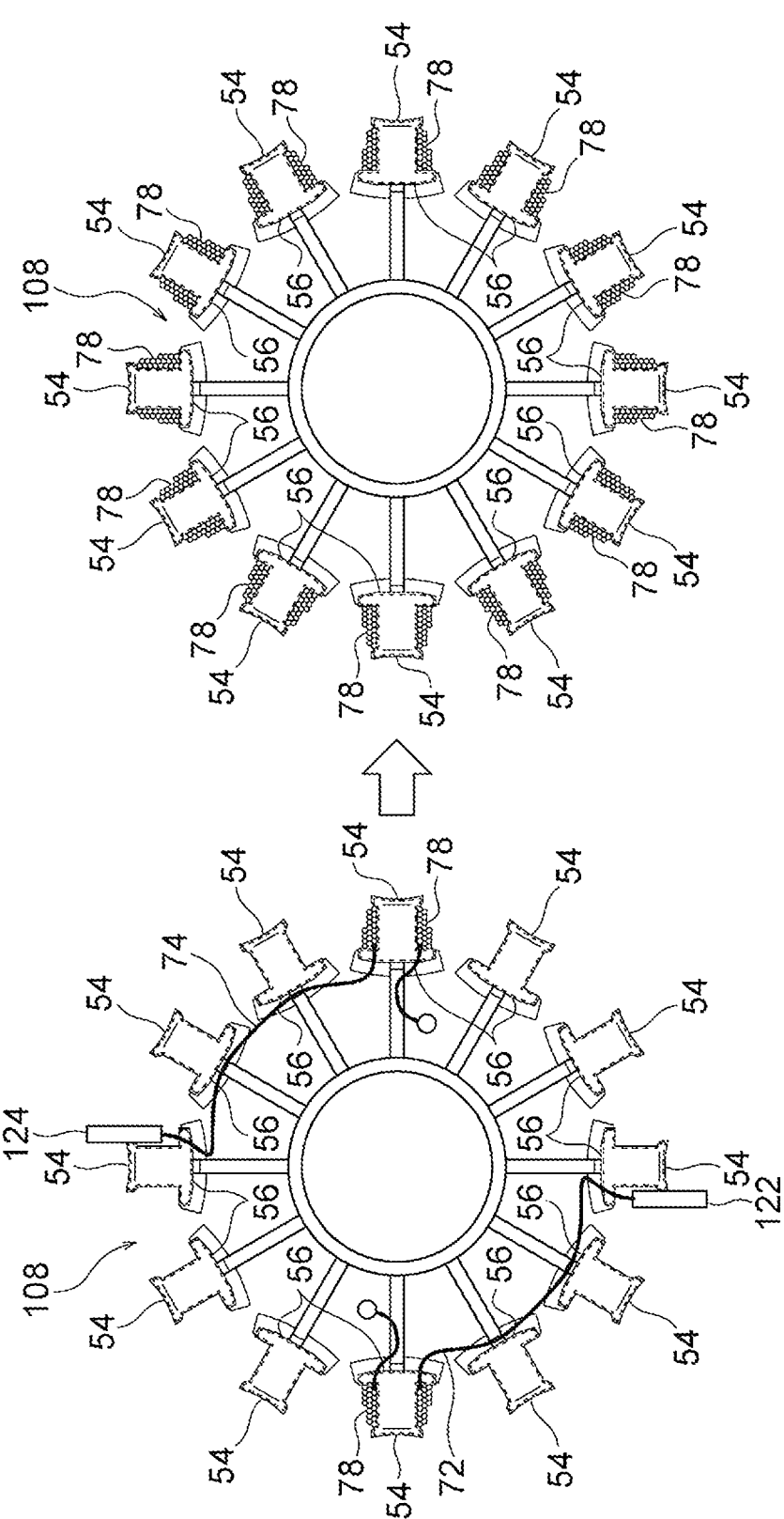

FIG. 26 is a view which demonstrates a core setting process in a modification of a production method of a rotating electrical machine in the sixth embodiment.

Figure 27:
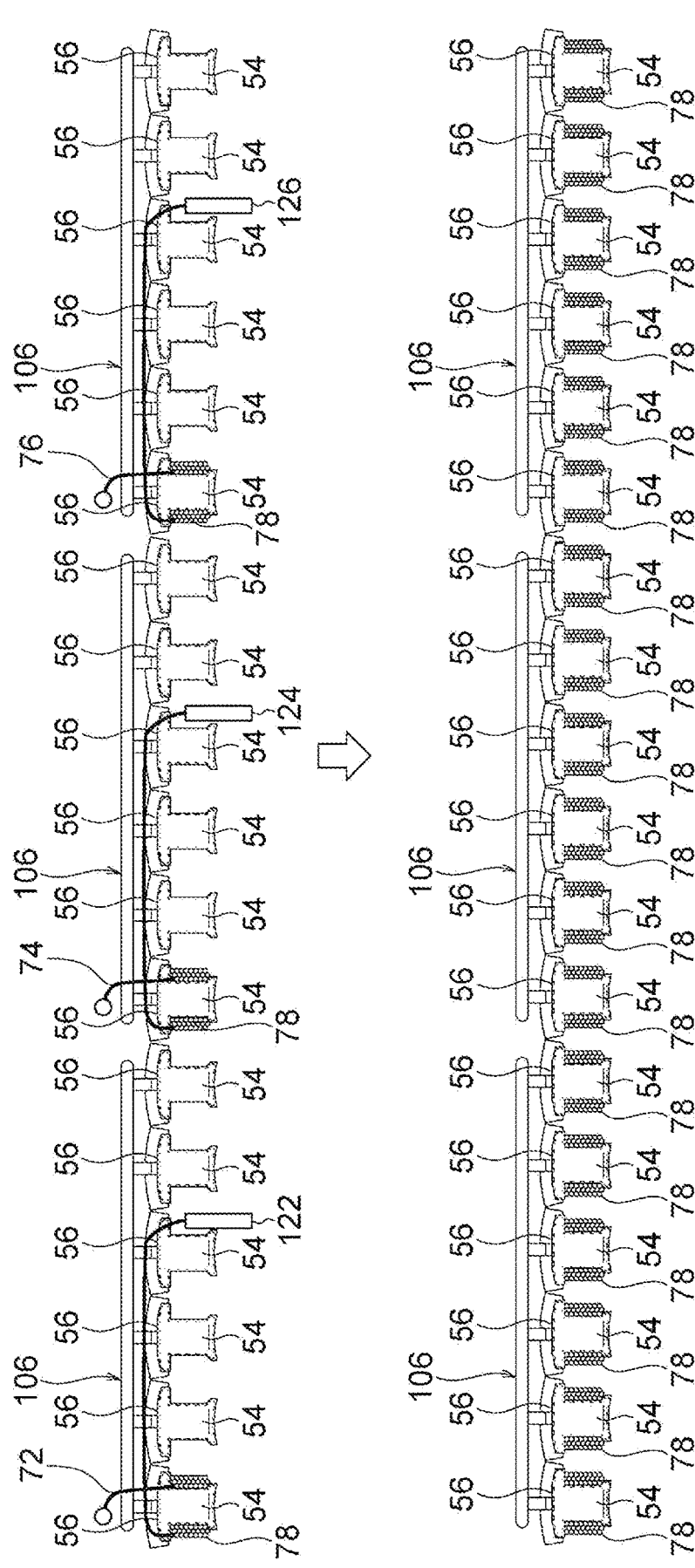

FIG. 27 is a view which demonstrates a core setting process in a production method of a rotating electrical machine in the seventh embodiment.

Figure 28:
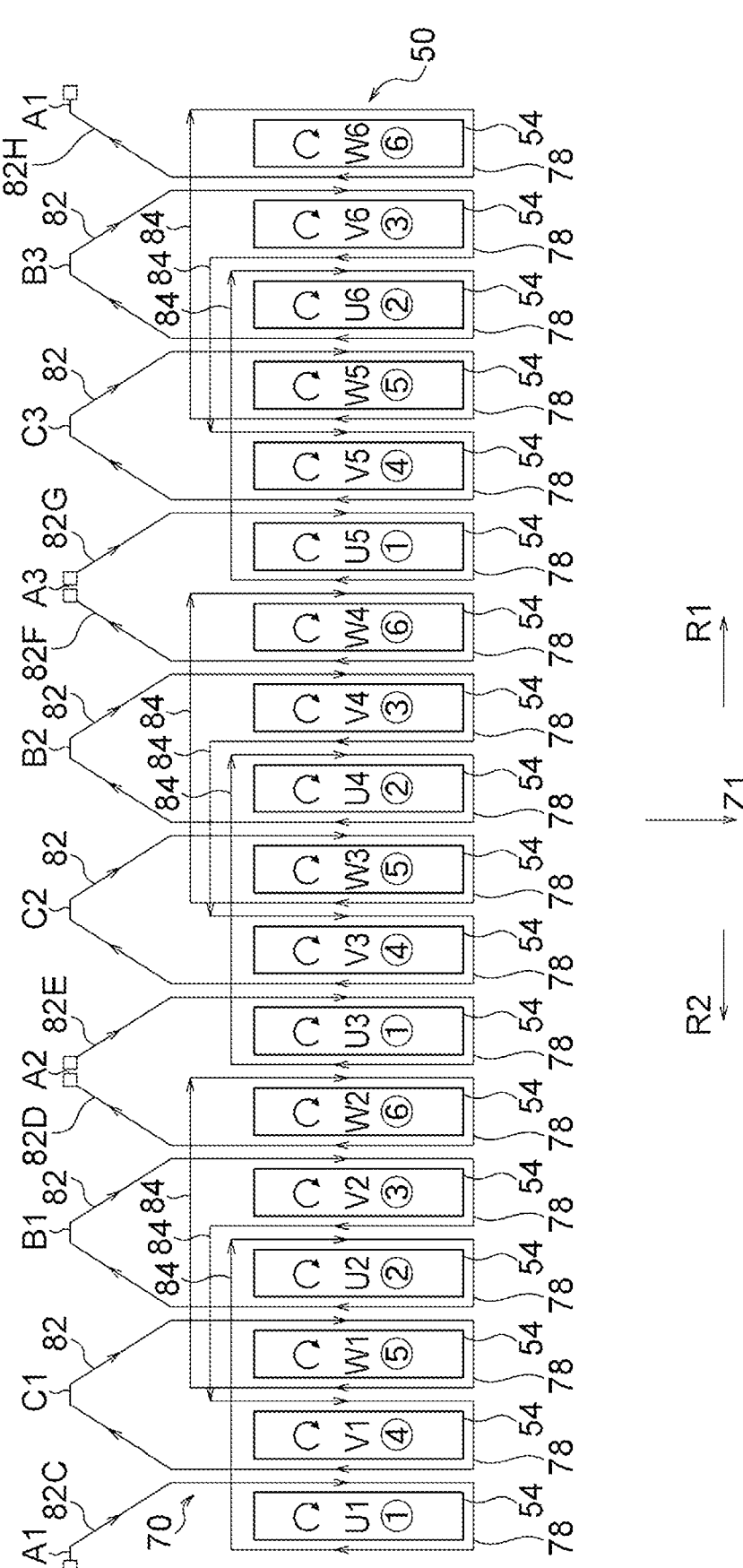

FIG. 28 is a diagram of a wire winding process in the seventh embodiment.

Figure 29:
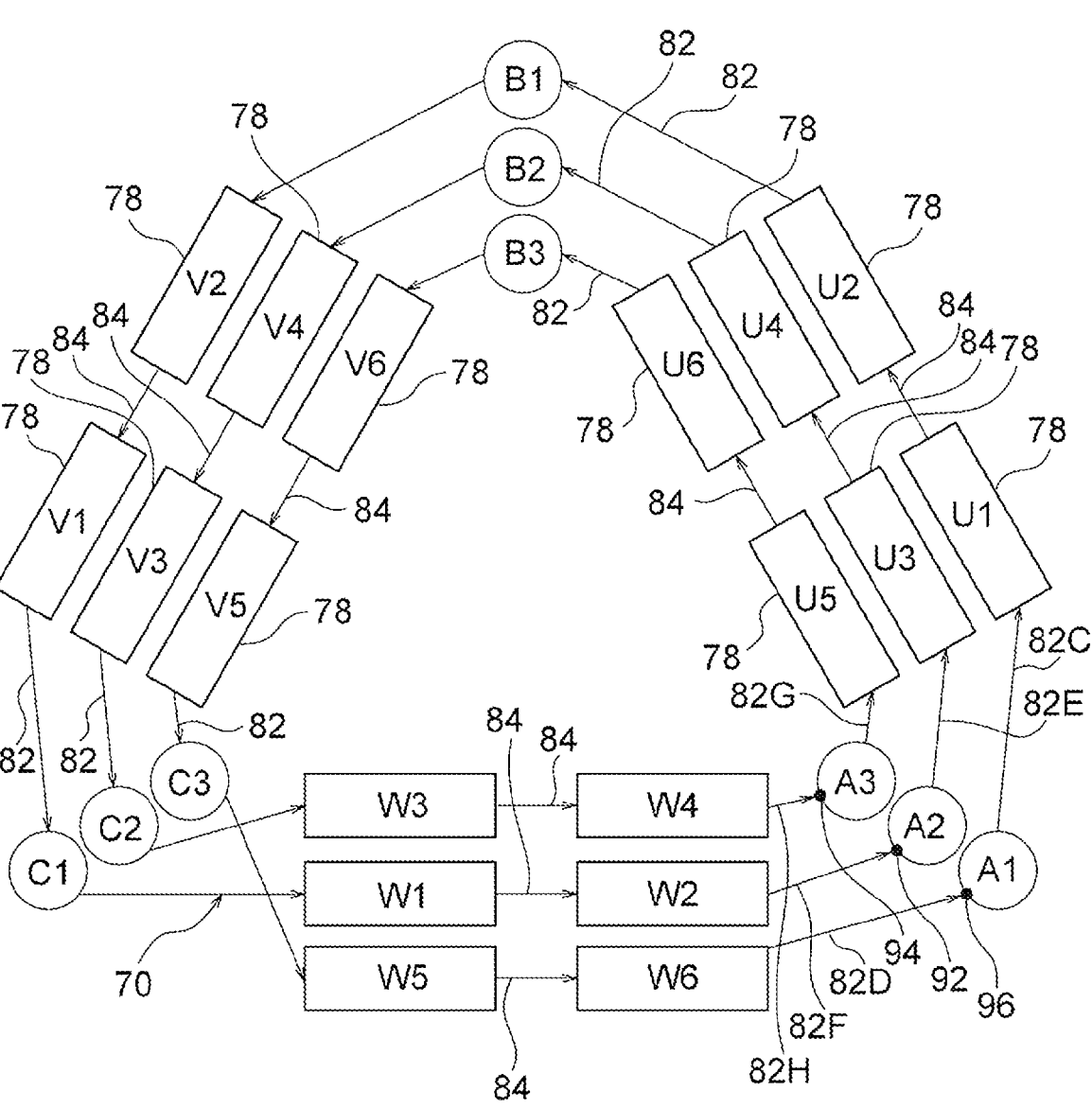

FIG. 29 is a view which demonstrates the layout of connections of coils achieved in a wire winding process in the seventh embodiment.

Figure 30:
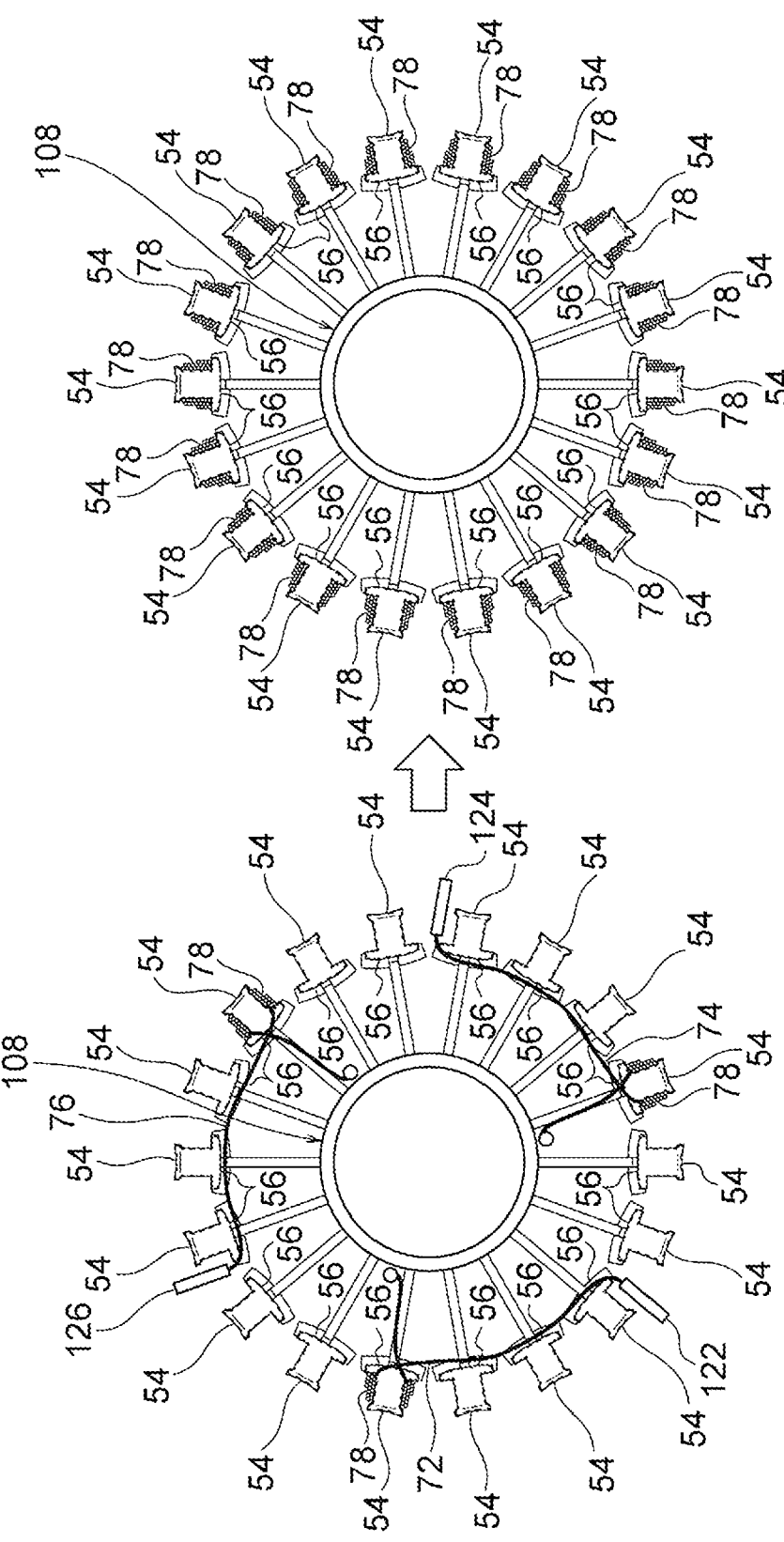

FIG. 30 is a view which demonstrates a core setting process in a modification of a production method of a rotating electrical machine in the seventh embodiment.

Figure 31:
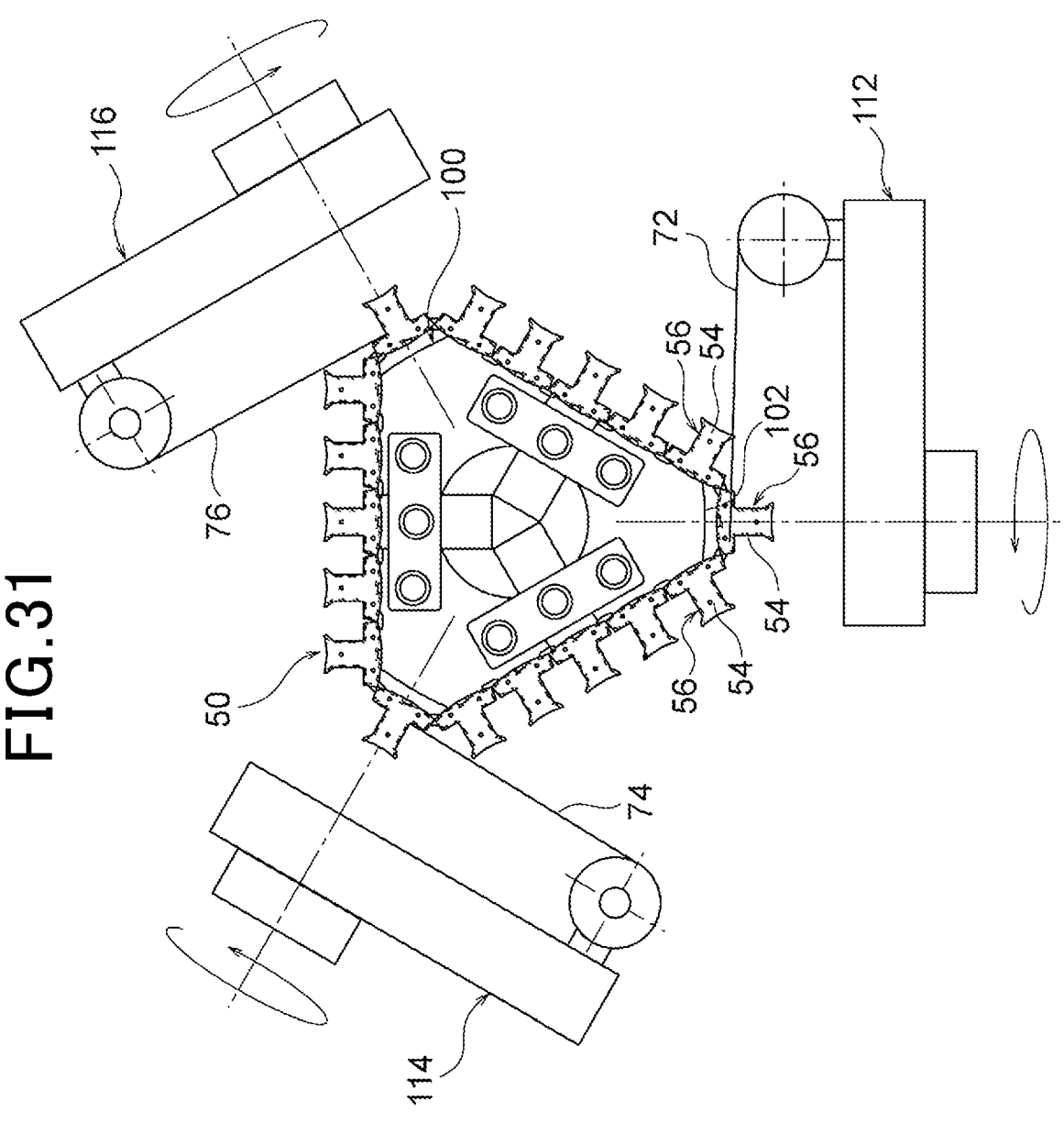

FIG. 31 is a view which demonstrates a core setting process in a second modification of a production method of a rotating electrical machine in the fourth embodiment.

Figure 32:
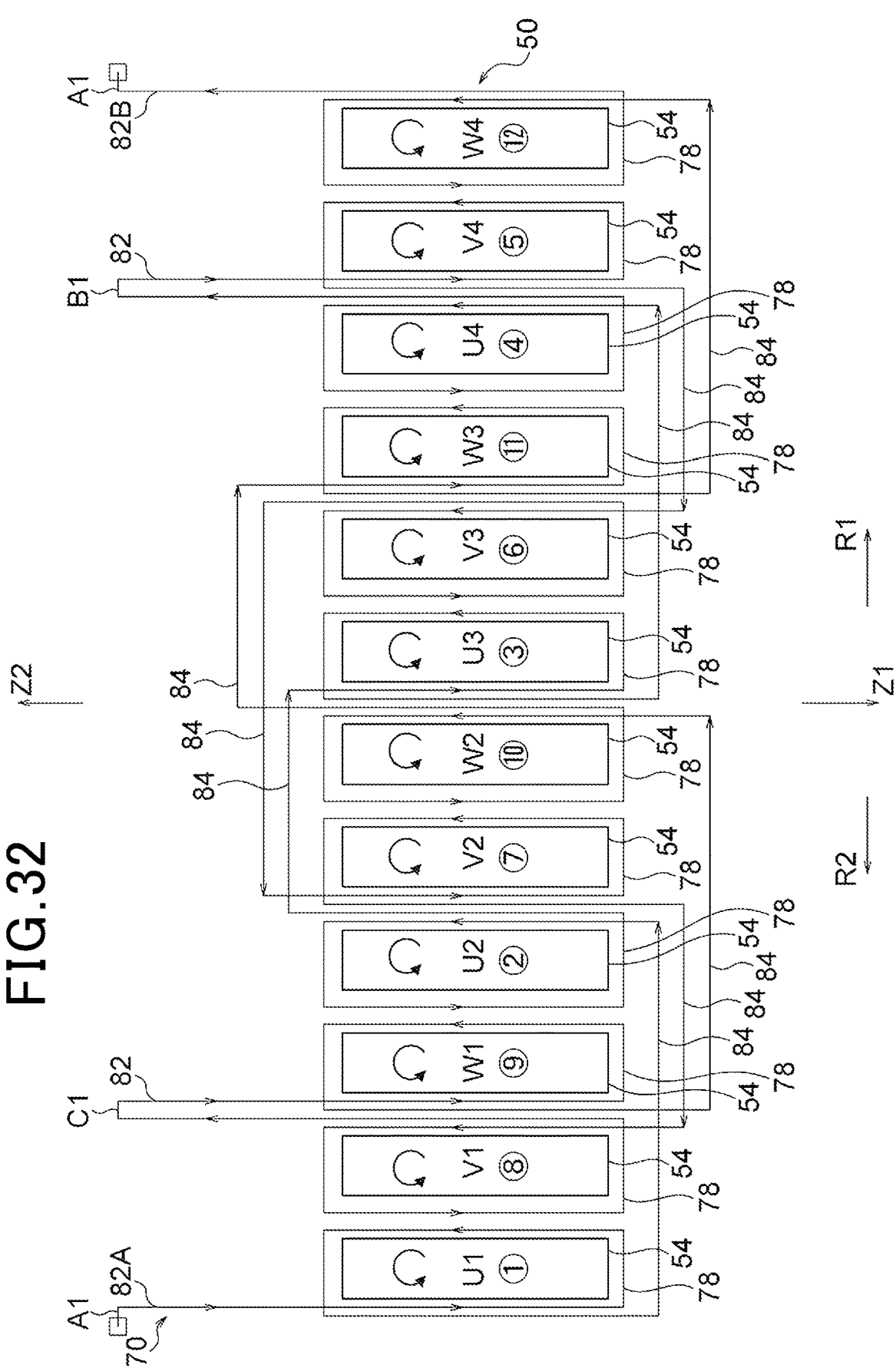

FIG. 32 is a diagram of a wire winding process in the eighth embodiment.

Figure 33:
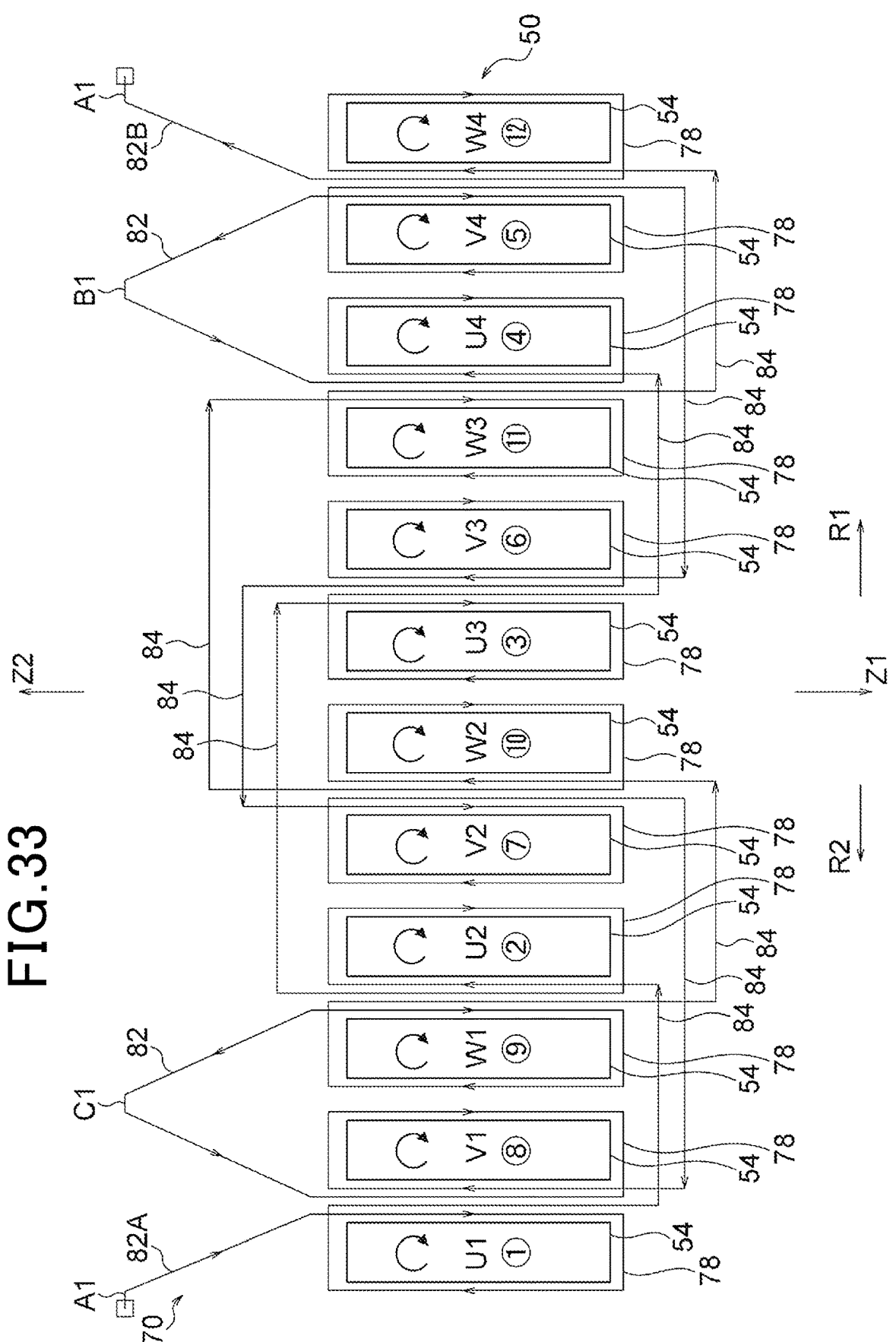

FIG. 33 is a diagram of a wire winding process in the ninth embodiment.

Figure 34:
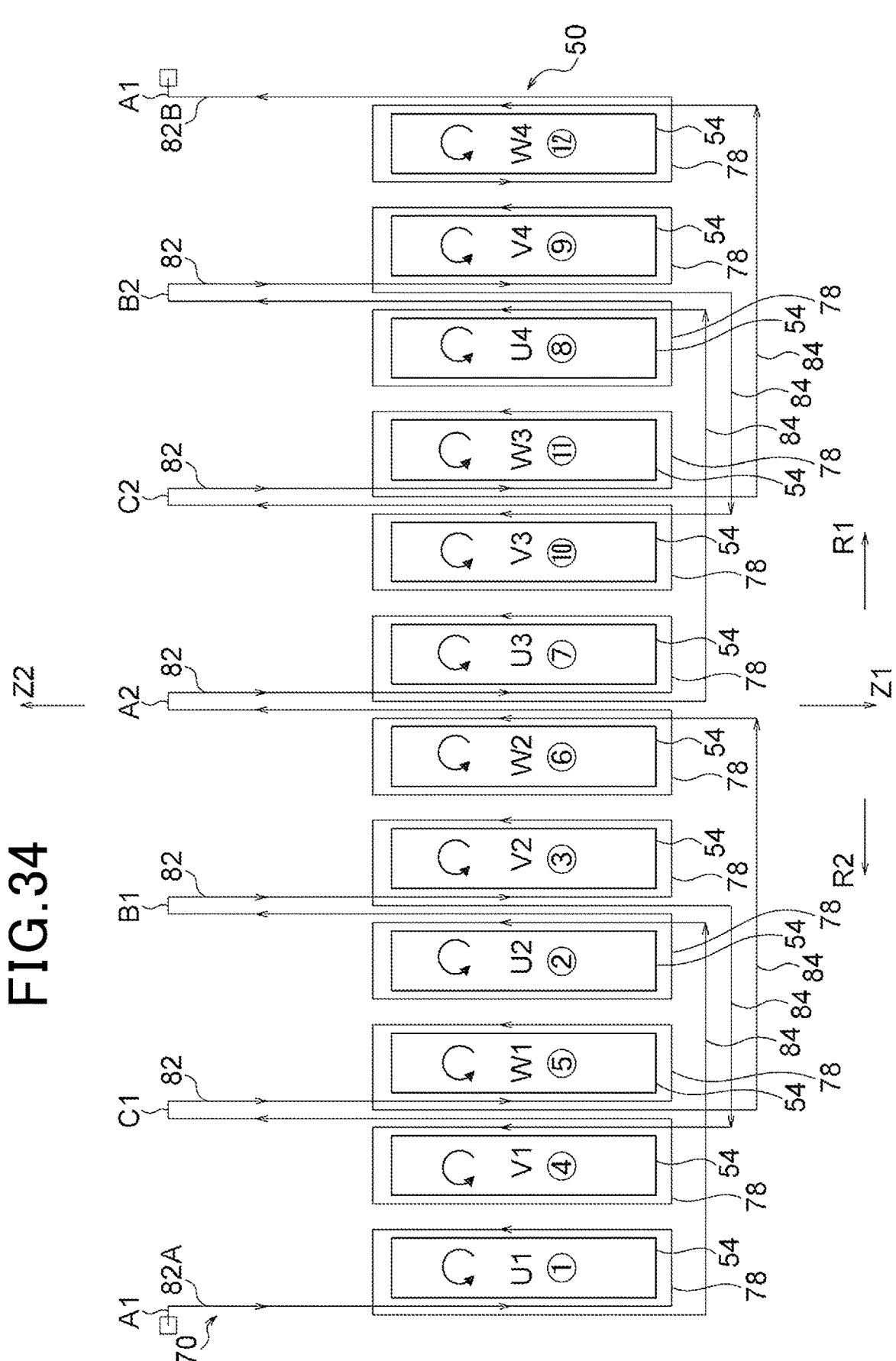

FIG. 34 is a diagram of a wire winding process in the tenth embodiment.

Figure 35:
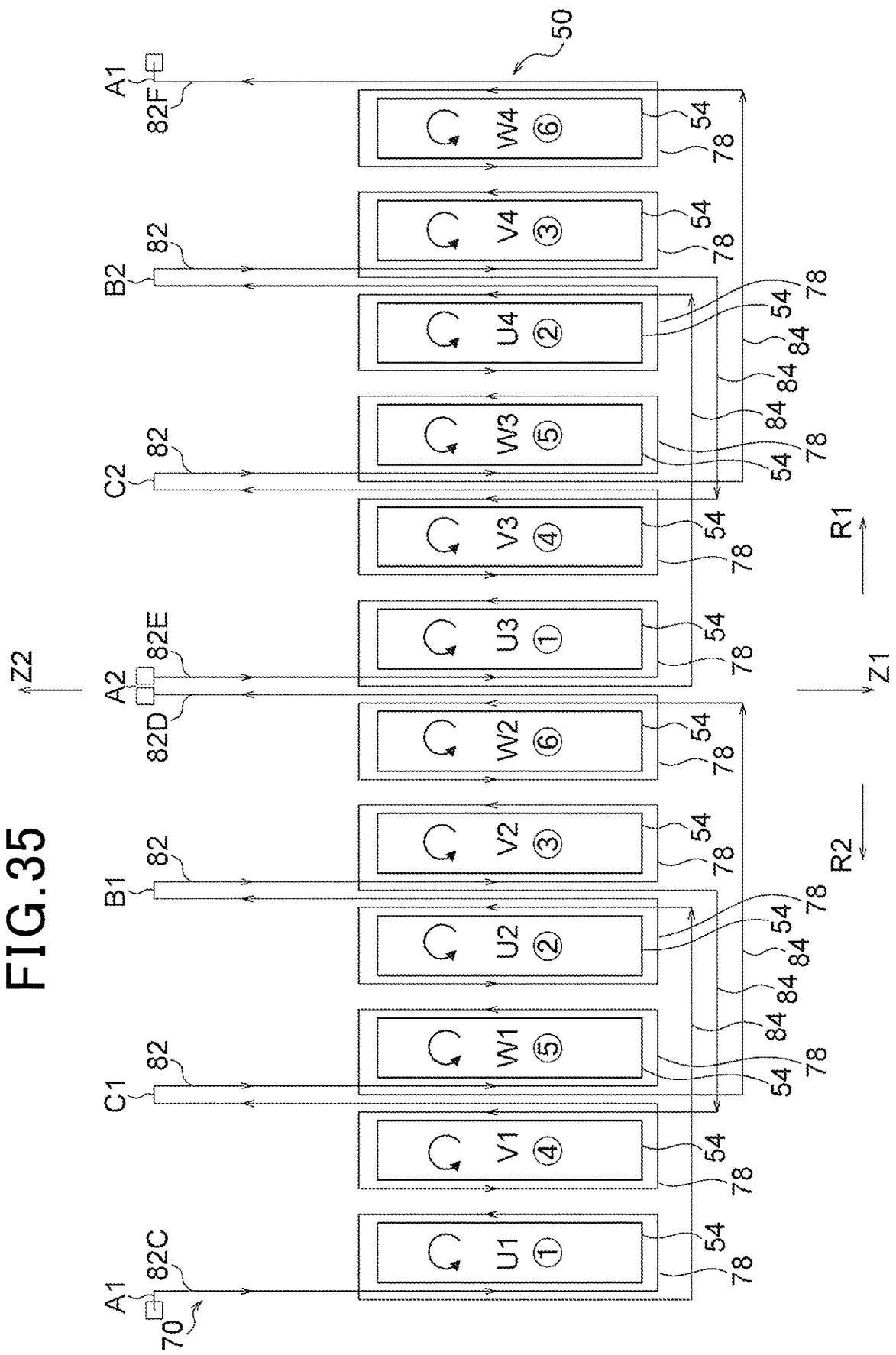

FIG. 35 is a diagram of a wire winding process in the eleventh embodiment.

Figure 36:
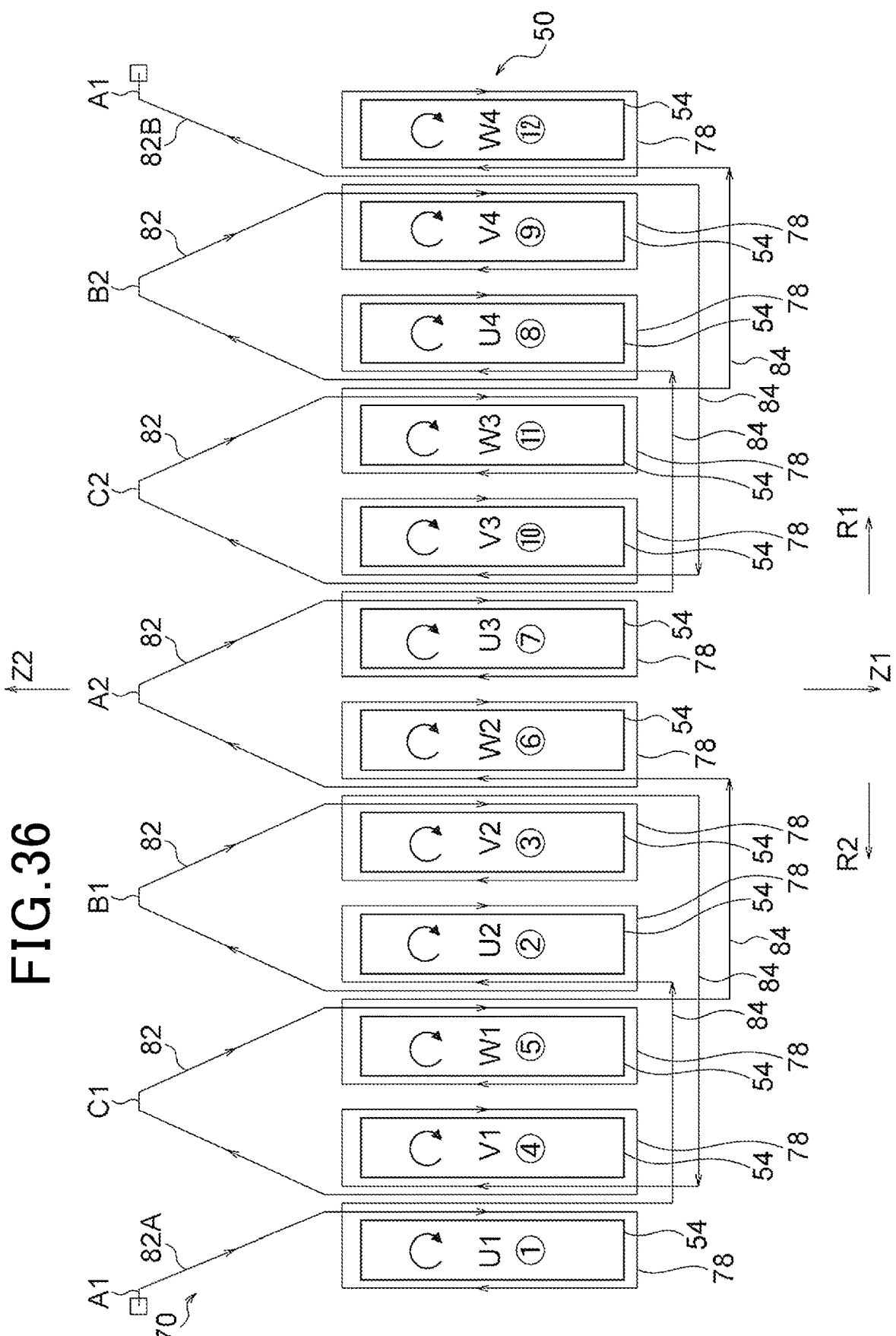

FIG. 36 is a diagram of a wire winding process in the twelfth embodiment.

Figure 37:
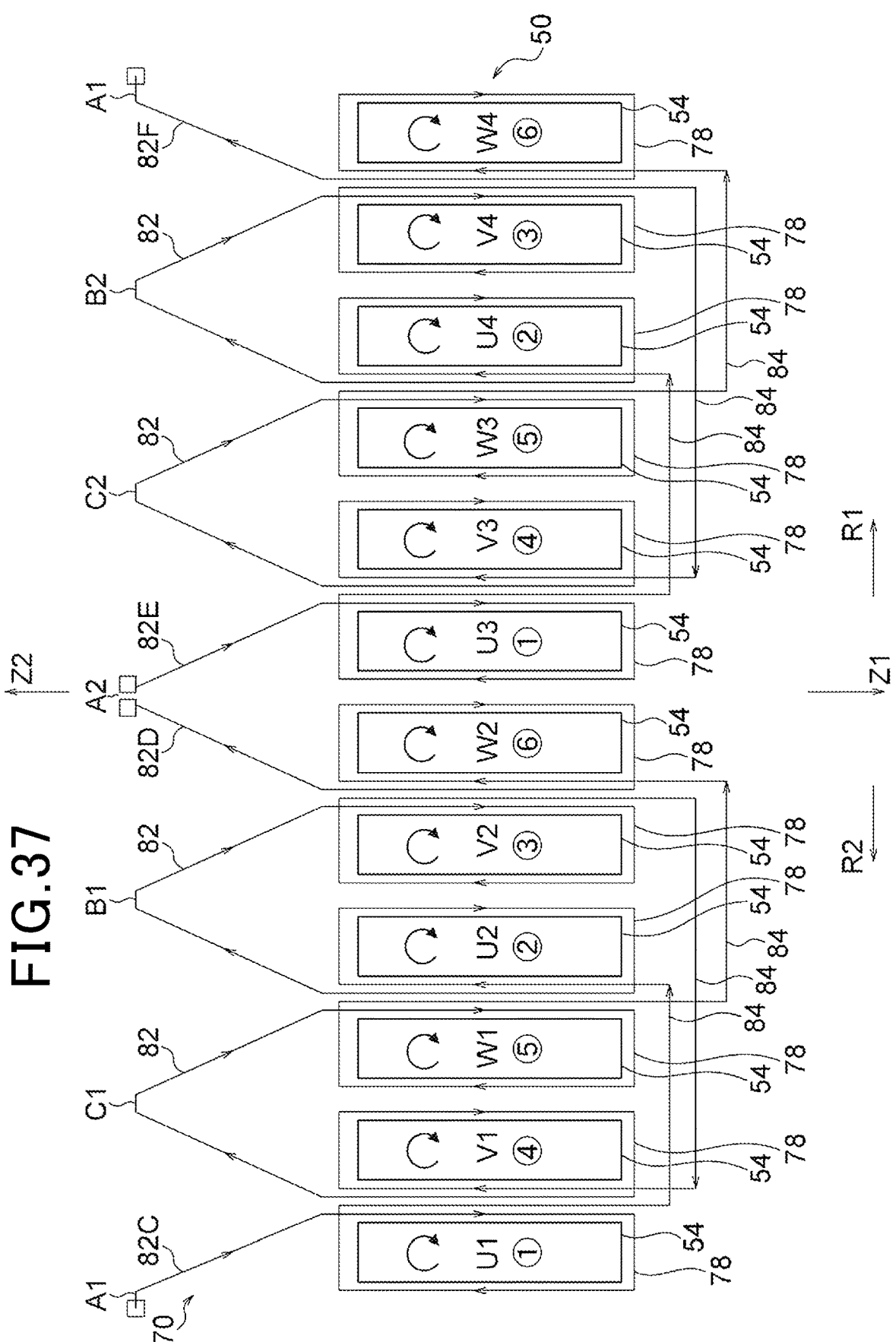

FIG. 37 is a diagram of a wire winding process in the thirteenth embodiment.

MODES FOR CARRYING OUT THE INVENTION

Outline of Structure of Rotating Electrical Machine

An outline of structure of the rotating electrical machine 10 according to an embodiment will first be described below.

Figure 1:
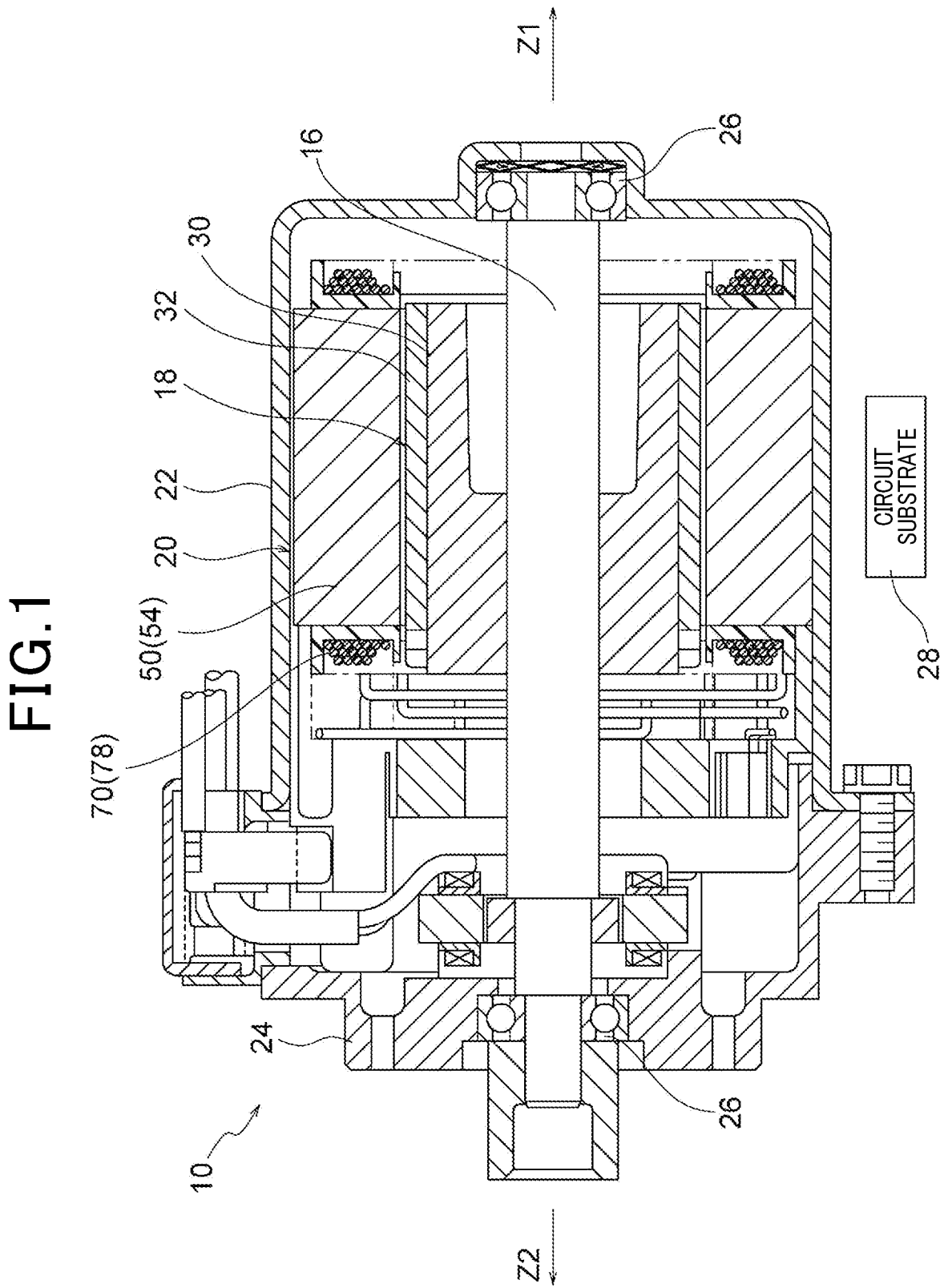
FIG. 1 is longitudinal sectional view which shows a rotating electrical machine according to an embodiment of this disclosure.

FIG. 1 is a longitudinal sectional view which illustrates the rotating electrical machine 10 according to an embodiment of this disclosure. The rotating electrical machine 10 shown in FIG. 1 is designed as an inner rotor brushless motor. An arrow Z1 in the drawing represents a second axial side (i.e., back side) of the rotating electrical machine 10, while an arrow Z2 represents a first axial side (i.e., front side) of the rotating electrical machine 10. The rotating electrical machine 10 includes the motor shaft 16, the rotor 18, the stator 20, the motor housing 22, and the front housing 24.

The rotor 18 includes the rotor body 30 and the rotor magnets 32. The rotor body 30 has the motor shaft 16 firmly retained in an axial core thereof. The motor shaft 16 extending in an axial direction of the rotating electrical machine 10.

The motor housing 22 is of a cylindrical shape with a bottom on the second axial side Z1. The front housing 24 is arranged on the first axial side Z2 of the motor housing 22. Each of the motor housing 22 and the front housing 24 has the bearing 26 mounted therein. The motor shaft 16 is retained by the bearings 26 to be rotatable.

The stator 20 is of a hollow cylindrical shape. The stator 20 is secured to an inner peripheral surface of the motor housing 22. The stator 20 includes the core 50, the resinous insulators 62 covering the core bodies 60, as will be described later, and the winding 70. The core 50 is equipped with the radially extending teeth 54. The winding 70 includes a plurality of coils 78 which are wound around the teeth 54. The rotor 18 is arranged inside the stator 20 to be rotatable.

The winding 70 is connected to the circuit substrate 28. The circuit substrate 28 may be disposed either inside or outside the rotating electrical machine 10. The circuit substrate 28 may be formed integrally with the rotating electrical machine 10 or alternatively be made as a single member discrete from the rotating electrical machine 10. The circuit substrate 28 has mounted thereon an electronic circuit working to selectively energize or de-energize each of the coils 78. The winding 70 is electrically connected through a terminal or directly to the circuit substrate 28.

In the rotating electrical machine 10, the coils 78 are switched between the energized state and the de-energized state by the circuit substrate 28, thereby producing a rotating magnetic field in the stator 20. The rotating magnetic field generates attraction and repulsion between itself and magnets of the rotor 18 to turn the rotor 18.

Details of the Stator 20

Subsequently, the stator 20 will be described in detail.

Figure 2:
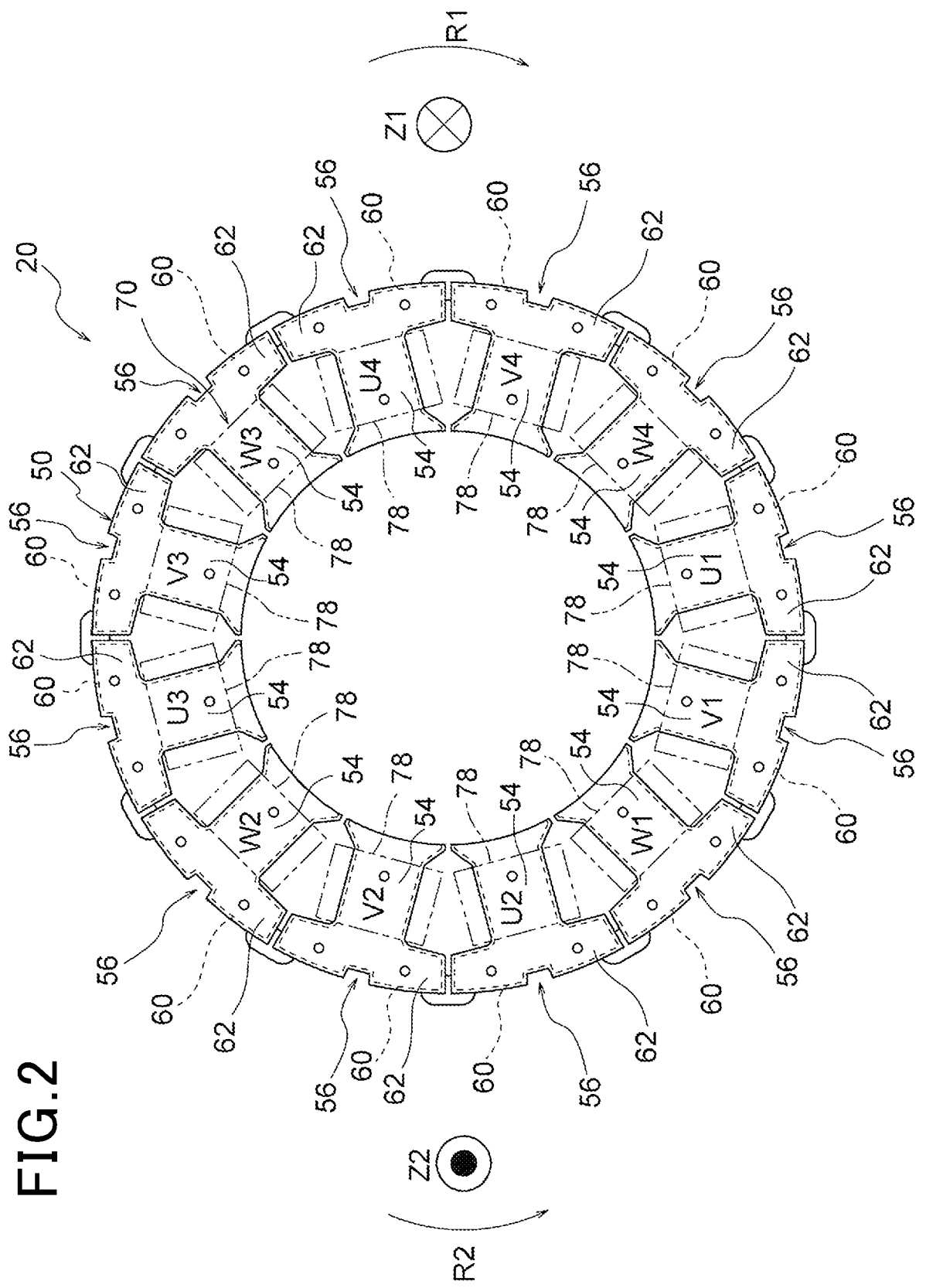
FIG. 2 is a plan view which illustrates a stator shown in FIG. 1.

FIG. 2 is a plan view of the stator 20 shown in FIG. 1. In FIG. 2, an arrow R1 indicates a first circumferential direction of the stator 20, as viewed in the front side (i.e., side Z2) of the rotating electrical machine 10. An arrow R2 indicates a second circumferential direction of the stator 20, as viewed in the front side (i.e., side Z2) of the rotating electrical machine 10. The core 50, as illustrated in FIG. 2, includes a plurality of core segments 56 and a plurality of hinges 58 which joint a respective adjacent two of the core segments 56. Each of the core segments 56 includes the core body 60 covered with the insulator 62. The hinges 58 are formed, for example, on the insulators 62.

Each of the core segments 56 has the tooth 54. The teeth 54 extend radially in an inward direction of the core 50. The number of teeth 54 is twelve in this embodiment.

Each of the coils 78 is wound around a respective one of the teeth 54 in a concentrated winding form. The coils 78 are as many as the teeth 54. Specifically, the number of the coils 78 or the teeth 54 is twelve. The coils 78 include U-phase coils U1 to U4 defining a U-phase winding, V-phase coils V1 to V4 defining a V-phase winding, and W-phase coils W1 to W4 defining a W-phase winding. The U-phase coils U1 to U4, the V-phase coils V1 to V4, and the W-phase coils W1 to W4 are aligned in the first circumferential direction R1 of the core 50. In other words, the coils 78 is made up of four units each of which includes the four coils 78 forming one of the phase windings.

Layout of Wire Connections of Winding

Figure 3:
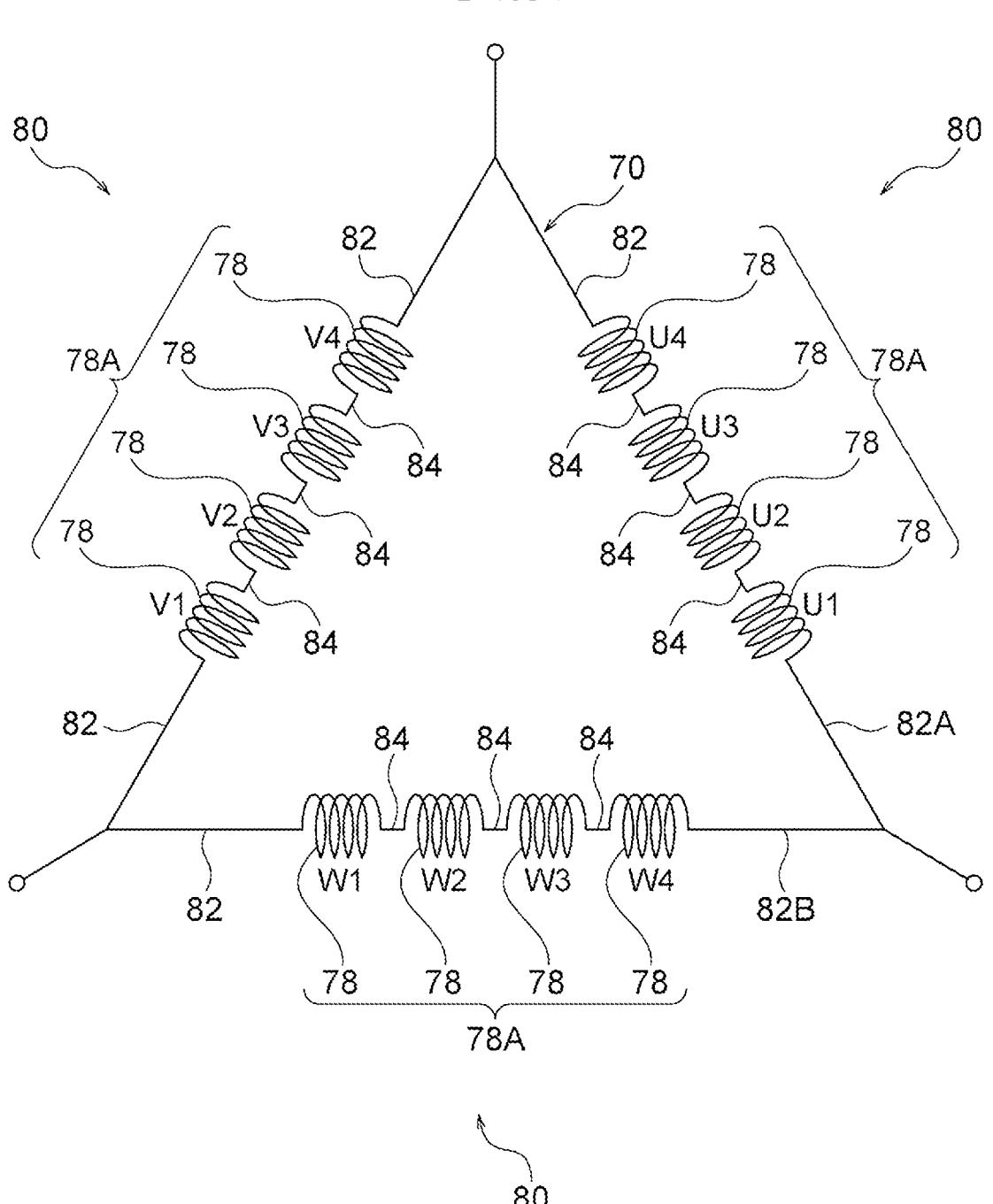
FIG. 3 is an illustration of the layout of connections of wires of the stator in FIG. 2.

FIG. 3 illustrates wire connections of the winding 70 of the stator 20. In this embodiment, the winding 70 is, as can be seen in FIG. 3, in the form of delta connection and includes m-series-connected and n-parallel-connected coils 78 for each phase or alternatively k-series-connected and n-parallel-connected coils 78 for each phase where m is a natural number of two or more, n is a natural number, and k is an even number of two or more.

The winding 70, as illustrated in FIG. 3, includes a plurality of power input wires 82 and a plurality of coil-to-coil connecting wires 84.

Each of the power input wires 82 connects between a trailing end of one (which will also be referred to as a first coil) of the coils 78 for one (which will also be referred to as a first phase) of the three phases and a leading end of one (which will also be referred to as a second coil) of the coils 78 for another (which will also be referred to as a second phase) of the three phases. The second coil 78 is arranged away from the first coil 78 in the first circumferential direction R1 of the core 50.

The coil-to-coil connecting wires 84 includes first direction-oriented connecting wires and second direction-oriented connecting wires. Each of the first direction-oriented connecting wires connects between the trailing end of one (which will also be referred to as a third coil) of the coils 78 of one of the three phases and the leading end of one (which will also be referred to as a fourth coil) of the coils 78 of the same phase as the third coil 78. The fourth coil 78 is arranged away from the third coil 78 in the first circumferential direction R1 of the core 50. Each of the second directing connecting wires connects between the trailing end of one (which will also be referred to as a fifth coil) of the coils 78 of one of the three phases and the leading end of one (which will also be referred to as a sixth coil) of the coils 78 of the same phase as the fifth coil 78. The sixth coil 78 is arranged away from the fifth coil 78 in the second circumferential direction R2 of the core 50.

The connections of the coils 78 in the delta configuration will be described below in detail. The coils 78 of each phase are connected together using the coil-to-coil connecting wires 84 to form the coil array 78A which will also be referred to as the coil group 80. The three coil groups 80 of the coils 78 are connected using the power input wires 82 in the delta (i.e., triangular) configuration.

Production Method of Rotating Electrical Machine in the First Embodiment

First, a production method of the rotating electrical machine 10 in the first embodiment of this disclosure will be described below.

The rotating electrical machine 10 fabricated by the production method in the first embodiment is designed to have the coils 78 which are delta-connected together in the m-series-connected-coil and n-parallel-connected-coil delta configuration where m is a natural number of two or more, specifically, in a four-series-connected-coil delta configuration. In other words, in the rotating electrical machine 10, m is four, n is one, the number of slots is twelve, the number of the teeth 54 is twelve, and the number of coils 78 is twelve.

The layout of the connections of the coils 8 in the four-series-connected-coil delta configuration will be described below in detail. Each phase winding is formed by the four coils 78 connected in series with each other in the form of the coil array 78A. Each of the three coil arrays 78A is also defined as the coil group 80 made up of the four coils 78. The three coil groups 80 are connected in the delta (i.e., triangular) configuration.

The production method of the rotating electrical machine 10 in the first embodiment includes a core setting process, a wire winding process, a winding shaping process, a wire connection process, and a fabrication process. The core setting process, the wire winding process, and the winding shaping process are involved in a production method of the stator 20 in the embodiment. Such processes will be described below in detail.

Core Setting Process

Figure 4:
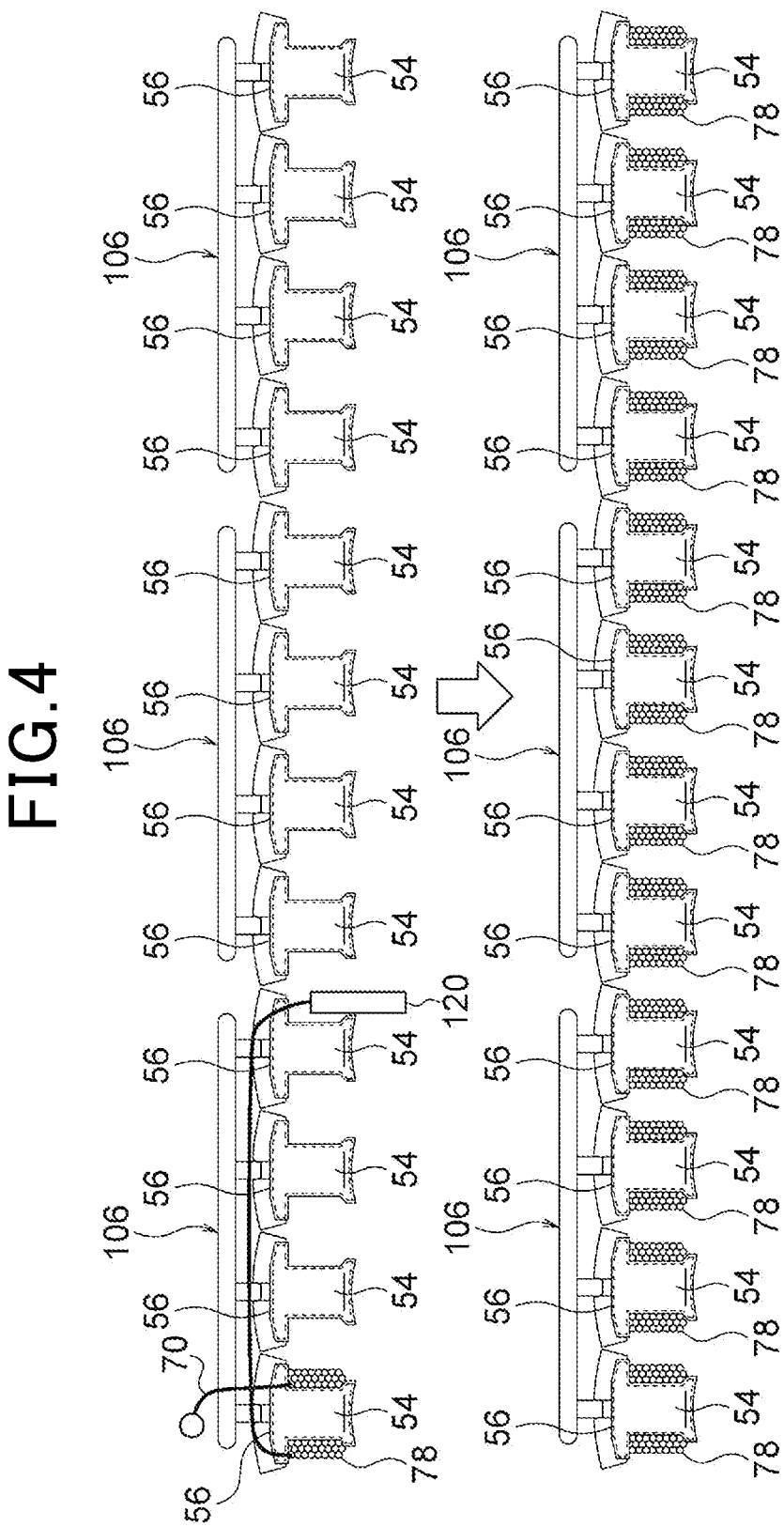
FIG. 4 is an illustration demonstrating a core setting process of a production method of a rotating electrical machine according to the first embodiment of this disclosure.

FIG. 4 represents the core setting process in the first embodiment. The core segments 56 are retained by the temporary joining runners 106 formed integrally with the insulators 62. Each of the temporary joining runners 106 includes bars which extend from surfaces of the core segments 56 which face away from the teeth 54 and are jointed together using a long linear bar. This places the teeth 54 of the core segments 56 to have front ends aligned linearly with each other.

The production method in the first embodiment uses, for example, a single nozzle 120. The nozzle 120 is arranged to face the core segment 56 located on an end of a selected one of the temporary joining runners 106. In winding the wire of the winding 70 in sequence around the teeth 54, the nozzle 120 is, as described later in detail, moved in sequence to face the teeth 54 attached to the temporary joining runners 106.

Wire Winding Process

Figure 5:
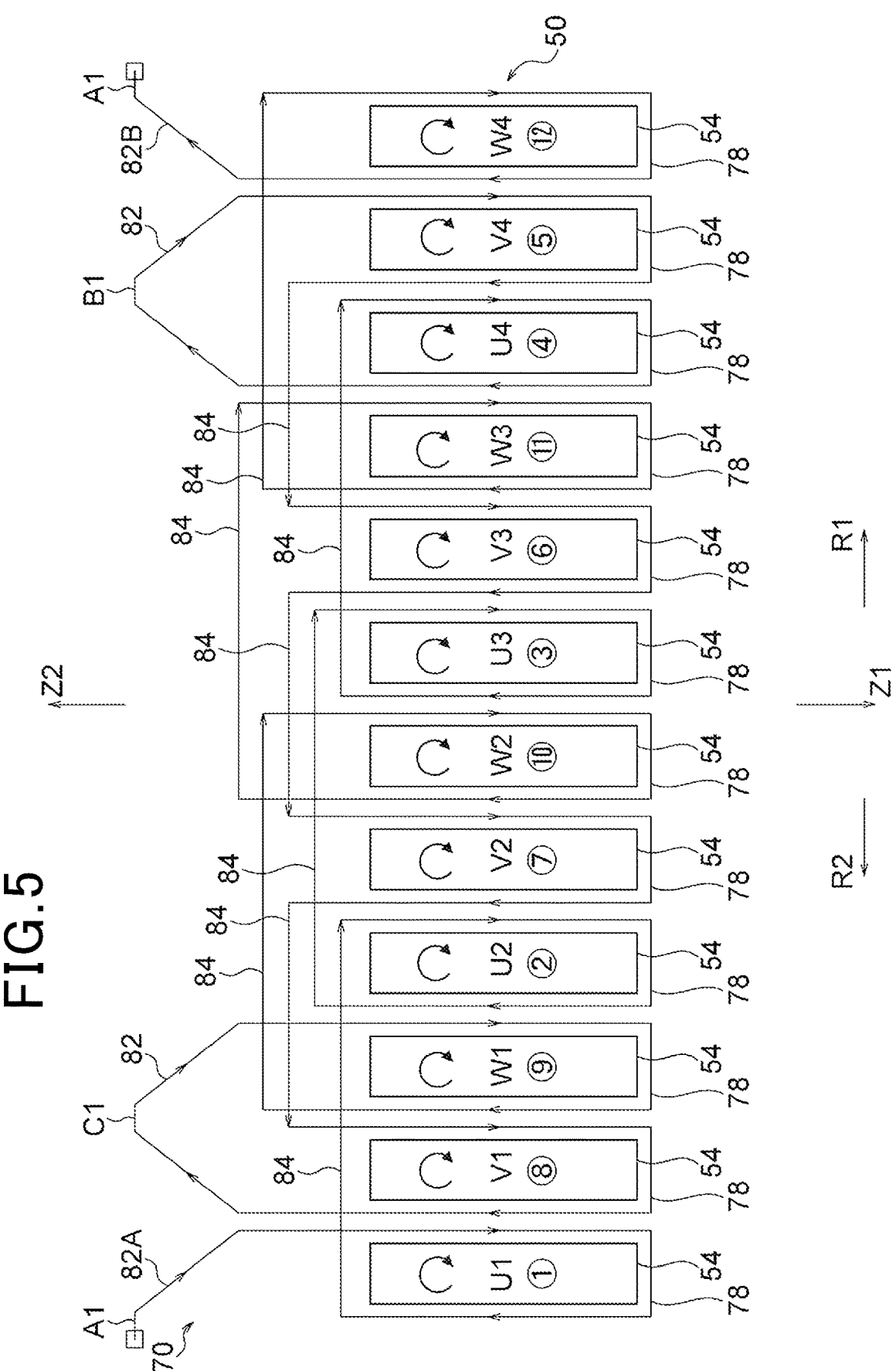
FIG. 5 is a diaphragm which demonstrates a wire winding process in the first embodiment.

The wire winding process in the first embodiment, as can be seen in FIG. 4, uses the single nozzle 120 to wind the wire of the winding 70 in sequence around the teeth 54 in a single nozzle manner. FIG. 5 is a diagram which shows a sequence of steps of the wire winding process in the first embodiment.

In the following discussion about each process of the production method, the twelve teeth 54 which are arranged adjacent each other in the first circumferential direction R1 of the core 50 will be referred to as below in relation with symbols U1 to W1 used in the drawings.

1) the first tooth 54U1
2) the second tooth 54V1
3) the third tooth 54W1

4) the fourth tooth 54U2
5) the fifth tooth 54V2
6) the sixth tooth 54W2
7) the seventh tooth 54U3
8) the eighth tooth 54V3
9) the ninth tooth 54W3
10) the tenth tooth 54U4
11) the eleventh tooth 54V4
12) the twelfth tooth 54W4

The twelve coils 78 wound around the first tooth 54U1 to the twelfth tooth 54W4 will also be referred to as below.

1) the first coil 78U1
2) the second coil 78V1
3) the third coil 78W1
4) the fourth coil 78U2
5) the fifth coil 78V2
6) the sixth coil 78W2
7) the seventh coil 78U3
8) the eighth coil 78V3
9) the ninth coil 78W3
10) the tenth coil 78U4
11) the eleventh coil 78V4
12) the twelfth coil 78W4

The winding 70 also includes the three power input wires 83 each of which connects the coils 78 of different phases together. The power input wires 82 include the first connecting section C1, the second connecting section B1, and the third connecting section A1 which will be referred to in the wire connection process described later. In the following discussion on each process of the production method, the power input wires 83 which are arranged away from each other in the first circumferential direction R1 of the core 50 will be referred to as below in relation to symbols U1 to W1 used in the drawings.

1) The first power input wire 82V1-W1
2) The second power input wire 82U4-V4
3) The third power input wire 82W4-U1

The winding 70 includes the nine coil-to-coil connecting wires 84 each of which connects the adjacent coils 78 of the same phase together. In the following discussion on each process of the production method, the coil-to-coil connecting wires 84 which are arranged away from each other in the first circumferential direction R1 of the core 50 will be referred to as below in relation to symbols U1 to W4.

1) the first coil-to-coil connecting wire 84U1-U2
2) the second coil-to-coil connecting wire 84V2-V1
3) the third coil-to-coil connecting wire 84W1-W2
4) the fourth coil-to-coil connecting wire 84U2-U3
5) the fifth coil-to-coil connecting wire 84V3-V2
6) the sixth coil-to-coil connecting wire 84W2-W3
7) the seventh coil-to-coil connecting wire 84U3-U4
8) the eighth coil-to-coil connecting wire 84V4-V3
9) the ninth coil-to-coil connecting wire 84W3-W4

The first coil-to-coil connecting wire 84U1-U2, the third coil-to-coil connecting wire 84W1-W2, the fourth coil-to-coil connecting wire 84U2-U3, the sixth coil-to-coil connecting wire 84W2-W3, the seventh coil-to-coil connecting wire 84U3-U4, and the ninth coil-to-coil connecting wire 84W3-W4 of the coil-to-coil connecting wires 84 correspond to the first direction-oriented connecting wires discussed above.

The wire winding process in the first embodiment includes a sequence of first to twelfth steps to a wind wire to form the winding 70. In the drawings, numbers 1 to 12 within circles denote the order of formation of the coils 78.

First Step

In the first step, the wire of the winding 70 is wound from the first axial side Z2 of the core 50 around the first tooth 54U1 in a clockwise direction, as viewed in the axial direction of the first tooth 54U1, to form the first coil 78U1 with an integral number of turns. After completion of the first coil 78U1, the wire is directed or led to the first axial side Z2 of the core 50.

Afterwards, the wire of the winding 70 is extended toward the fourth coil 78U2 in the first circumferential direction R1 on the first axial side Z2 to form the first coil-to-coil connecting wire 84U1-U2.

Second Step

In the second step, the wire of the winding 70 is wound from the first axial side Z2 of the core 50 around the fourth tooth 54U2 in the clockwise direction, as viewed in the axial direction of the fourth tooth 54U2, to form the fourth coil 78U2 with an integral number of turns. After completion of the fourth coil 78U2, the wire is directed or led to the first axial side Z2 of the core 50.

Afterwards, the wire of the winding 70 is extended toward the seventh coil 78U3 in the first circumferential direction R1 on the first axial side Z2 to form the fourth coil-to-coil connecting wire 84U2-U3.

Third Step

In the third step, the wire of the winding 70 is wound from the first axial side Z2 of the core 50 around the seventh tooth 54U3 in the clockwise direction, as viewed in the axial direction of the seventh tooth 54U3, to form the seventh coil 78U3 with an integral number of turns. After completion of the seventh coil 78U3, the wire is directed or led to the first axial side Z2 of the core 50.

Afterwards, the wire of the winding 70 is extended toward the tenth coil 78U4 in the first circumferential direction R1 on the first axial side Z2 to form the seventh coil-to-coil connecting wire 84U3-U4.

Fourth Step

In the fourth step, the wire of the winding 70 is wound from the first axial side Z2 of the core 50 around the tenth tooth 54U4 in the clockwise direction, as viewed in the axial direction of the tenth tooth 54U4, to form the tenth coil 78U4 with an integral number of turns. After completion of the tenth coil 78U4, the wire is directed or led to the first axial side Z2 of the core 50.

Afterwards, the wire of the winding 70 is extended toward the eleventh coil 78V4 in the first circumferential direction R1 on the first axial side Z2 to form the second power input wire 82U4-V4. The second power input wire 82U4-V4 is, thus, made of the wire continuing from the tenth coil 78U4.

Fifth Step

In the fifth step, the wire of the winding 70 is wound from the first axial side Z2 of the core 50 around the eleventh tooth 54V4 in the clockwise direction, as viewed in the axial direction of the eleventh tooth 54V4, to form the eleventh coil 78V4 with an integral number of turns. After completion of the eleventh coil 78V4, the wire is directed or led to the first axial side Z2 of the core 50.

Afterwards, the wire of the winding 70 is extended toward the eighth coil 78V3 in the second circumferential direction R2 on the first axial side Z2 to form the eighth coil-to-coil connecting wire 84V4-V3.

Sixth Step

In the sixth step, the wire of the winding 70 is wound from the first axial side Z2 of the core 50 around the eighth tooth 54V3 in the clockwise direction, as viewed in the axial direction of the eighth tooth 54V3, to form the eighth coil

78V3 with an integral number of turns. After completion of the eighth coil 78V3, the wire is directed or led to the first axial side Z2 of the core 50.

Afterwards, the wire of the winding 70 is extended toward the fifth coil 78V2 in the second circumferential direction R2 on the first axial side Z2 to form the fifth coil-to-coil connecting wire 84V3-V2.

Seventh Step

In the seventh step, the wire of the winding 70 is wound from the first axial side Z2 of the core 50 around the fifth tooth 54V2 in the clockwise direction, as viewed in the axial direction of the fifth tooth 54V2, to form the fifth coil 78V2 with an integral number of turns. After completion of the fifth coil 78V2, the wire is directed or led to the first axial side Z2 of the core 50.

Afterwards, the wire of the winding 70 is extended toward the second coil 78V1 in the second circumferential direction R2 on the first axial side Z2 to form the second coil-to-coil connecting wire 84V2-V1.

Eighth Step

In the eighth step, the wire of the winding 70 is wound from the first axial side Z2 of the core 50 around the second tooth 54V1 in the clockwise direction, as viewed in the axial direction of the second tooth 54V1, to form the second coil 78V1 with an integral number of turns. After completion of the second coil 78V1, the wire is directed or led to the first axial side Z2 of the core 50.

Afterwards, the wire of the winding 70 is extended toward the third coil 78W1 in the first circumferential direction R1 on the first axial side Z2 to form the first power input wire 82V1-W1. The first power input wire 82V1-W1 is, thus, made of the wire continuing from the second coil 78V1.

Ninth Step

In the ninth step, the wire of the winding 70 is wound from the first axial side Z2 of the core 50 around the third tooth 54W1 in the clockwise direction, as viewed in the axial direction of the third tooth 54W1, to form the third coil 78W1 with an integral number of turns. After completion of the third coil 78W1, the wire is directed or led to the first axial side Z2 of the core 50.

Afterwards, the wire of the winding 70 is extended toward the sixth coil 78W2 in the first circumferential direction R1 on the first axial side Z2 to form the third coil-to-coil connecting wire 84W1-W2.

Tenth Step

In the tenth step, the wire of the winding 70 is wound from the first axial side Z2 of the core 50 around the sixth tooth 54W2 in the clockwise direction, as viewed in the axial direction of the sixth tooth 54W2, to form the sixth coil 78W2 with an integral number of turns. After completion of the sixth coil 78W2, the wire is directed or led to the first axial side Z2 of the core 50.

Afterwards, the wire of the winding 70 is extended toward the ninth coil 78W3 in the first circumferential direction R1 on the first axial side Z2 to form the sixth coil-to-coil connecting wire 84W2-W3.

Eleventh Step

In the eleventh step, the wire of the winding 70 is wound from the first axial side Z2 of the core 50 around the ninth tooth 54W3 in the clockwise direction, as viewed in the axial direction of the ninth tooth 54W3, to form the ninth coil 78W3 with an integral number of turns. After completion of the ninth coil 78W3, the wire is directed or led to the first axial side Z2 of the core 50.

Afterwards, the wire of the winding 70 is extended toward the twelfth coil 78W4 in the first circumferential direction R1 on the first axial side Z2 to form the ninth coil-to-coil connecting wire 84W3-W4.

Twelfth Step

In the twelfth step, the wire of the winding 70 is wound from the first axial side Z2 of the core 50 around the twelfth tooth 54W4 in the clockwise direction, as viewed in the axial direction of the twelfth tooth 54W4, to form the twelfth coil 78W4 with an integral number of turns. After completion of the twelfth coil 78W4, the wire is directed or led to the first axial side Z2 of the core 50.

Afterwards, the wire of the winding 70 is extended toward the leading end 82A of the winding 70 in the first circumferential direction R1 on the first axial side Z2 of the core 50, after which the third power input wire 82W4-U1 is formed in the wire connection process which will be described later in detail.

TABLE 1

| STEP | CONTENTS | Wire extracting direction (axial direction) | Wiring direction (circumferential direction) |
|---|---|---|---|
| 1 | Form 1$^{st}$ coil U1 | | |
| | Create 1$^{st}$ coil-to-coil connecting wire U1-U2 | 1$^{st}$ direction | 1$^{st}$ direction |
| 2 | Form 4$^{th}$ coil U2 | | |
| | Create 4$^{th}$ coil-to-coil connecting wire U2-U3 | 1$^{st}$ direction | 1$^{st}$ direction |
| 3 | Form 7$^{th}$ coil U3 | | |
| | Create 7$^{th}$ coil-to-coil connecting wire U3-U4 | 1$^{st}$ direction | 1$^{st}$ direction |
| 4 | Form 10$^{th}$ coil U4 | | |
| | Create 2$^{nd}$ power input wire U4-V4 | 1$^{st}$ direction | 1$^{st}$ direction |
| 5 | Form 11$^{th}$ coil V4 | | |
| | Create 8$^{th}$ coil-to-coil connecting wire V4-V3 | 1$^{st}$ direction | 2$^{nd}$ direction |
| 6 | Form 8$^{th}$ coil V3 | | |
| | Create 5$^{th}$ coil-to-coil connecting wire V3-V2 | 1$^{st}$ direction | 2$^{nd}$ direction |
| 7 | Form 5$^{th}$ coil V2 | | |
| | Create 2$^{nd}$ coil-to-coil connecting wire V2-V1 | 1$^{st}$ direction | 2$^{nd}$ direction |
| 8 | Form 2$^{nd}$ coil V1 | | |
| | Create 1$^{st}$ power input wire V1-W1 | 1$^{st}$ direction | 1$^{st}$ direction |
| 9 | Form 3$^{rd}$ coil W1 | | |
| | Create 3$^{rd}$ coil-to-coil connecting wire W1-W2 | 1$^{st}$ direction | 1$^{st}$ direction |
| 10 | Form 6$^{th}$ coil W2 | | |
| | Create 6$^{th}$ coil-to-coil connecting wire W2-W3 | 1$^{st}$ direction | 1$^{st}$ direction |
| 11 | Form 9$^{th}$ coil W3 | | |
| | Create 9$^{th}$ coil-to-coil connecting wire W3-W4 | 1$^{st}$ direction | 1$^{st}$ direction |
| 12 | Form 12$^{th}$ coil W4 | | |
| | Create 3$^{rd}$ power input wire W4-U1 | 1$^{st}$ direction | 1$^{st}$ direction |
| | Joining ends of leading and trailing ends of wire to complete 3$^{rd}$ power input wire W4-U1 | | |

Figure 6:
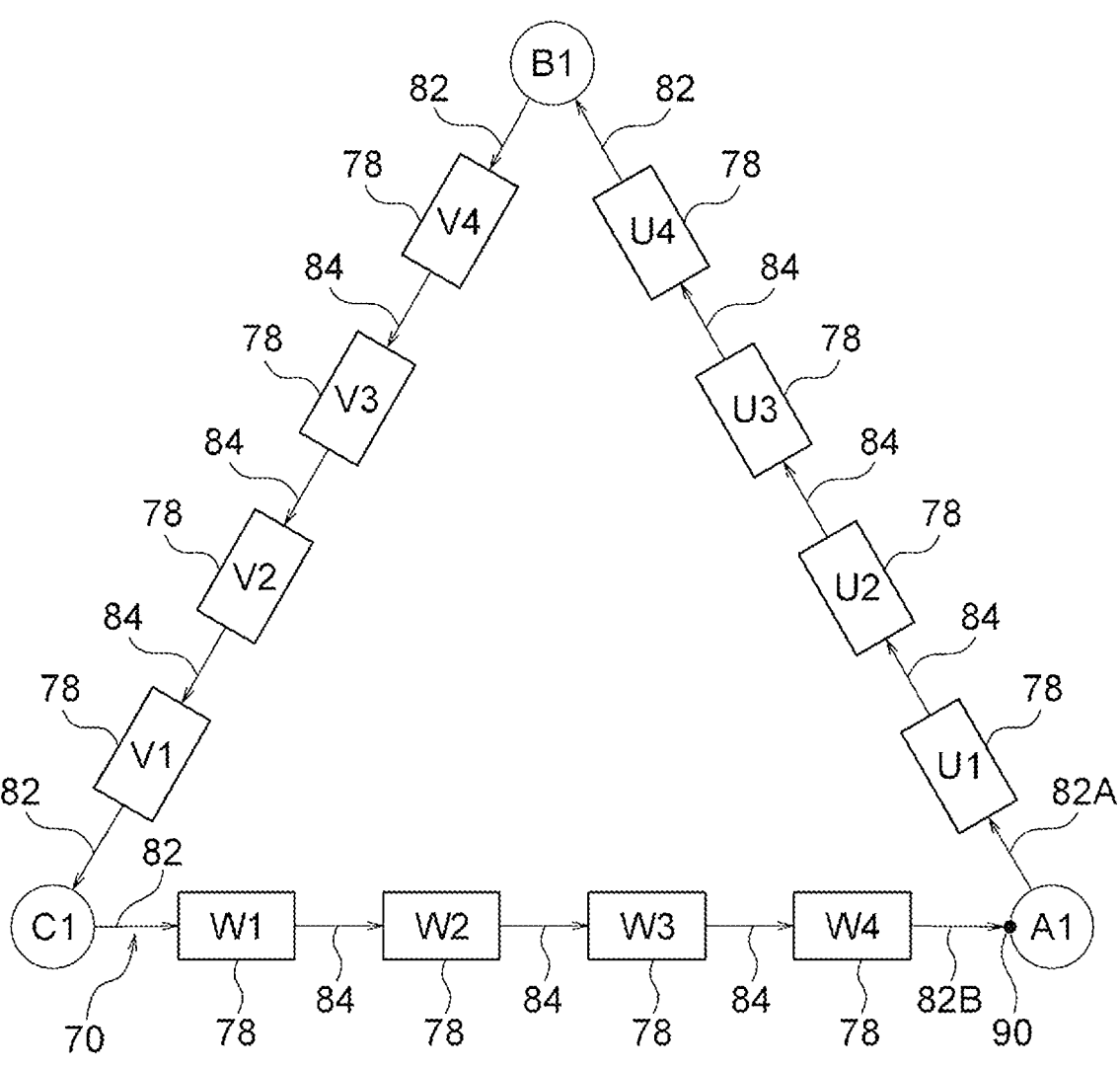
FIG. 6 is an illustration of the layout of coils connected in a wire winding process in the first embodiment.

In the first embodiment, the winding 70 is produced in the four-series-connected-coil delta configuration in the way described above. FIG. 6 illustrates the layout of the coils 78 connected together in the wire winding process in the first embodiment. The wire of the winding 70 is, as illustrated in FIG. 4, wound around the core 50 in the wire winding process in the first embodiment.

The first power input wire 82V1-W1, as clearly illustrated in FIGS. 5 and 6, connects between the trailing end of the second coil 78V1 and the leading end of the third coil 78W1. The second power input wire 82U4-V4 connects between the trailing end of the tenth coil 78U4 and the leading end of the eleventh coil 78V4. The third power input wire 82W4-U1 connects between the trailing end of the twelfth coil 78W4 and the leading end of the first coil 78U1 in the wire connection process, as will be described later in detail.

The first power input wire 82V1-W1, the second power input wire 82U4-V4, and the third power input wire 82W4-U1, as can be seen in FIG. 5, extend continuously. The first power input wire 82V1-W1, the second power input wire 82U4-V4, and the third power input wire 82W4-U1 are also arranged on the first axial side Z2 of the core 50. The third power input wire 82W4-U1 is shaped to have the joint 90 joining between the leading end 82A and the trailing end 82B of the winding 70 in the wire connection process which will be described later in detail.

The first coil-to-coil connecting wire 84U1-U2, as can be seen in FIGS. 5 and 6, connects between the trailing end of the first coil 78U1 and the leading end of the fourth coil 78U2. The second coil-to-coil connecting wire 84V2-V1 connects between the trailing end of the fifth coil 78V2 and the leading end of the second coil 78V1. The third coil-to-coil connecting wire 84W1-W2 connects between the trailing end of the third coil 78W1 and the leading end of the sixth coil 78W2. The fourth coil-to-coil connecting wire 84U2-U3 connects between the trailing end of the fourth coil 78U2 and the leading end of the seventh coil 78U3. The fifth coil-to-coil connecting wire 84V3-V2 connects between the trailing end of the eighth coil 78V3 and the leading end of the fifth coil 78V2. The sixth coil-to-coil connecting wire 84W2-W3 connects between the trailing end of the sixth coil 78W2 and the leading end of the ninth coil 78W3. The seventh coil-to-coil connecting wire 84U3-U4 connects between the trailing end of the seventh coil 78U3 and the leading end of the tenth coil 78U4. The eighth coil-to-coil connecting wire 84V4-V3 connects between the trailing end of the eleventh coil 78V4 and the leading end of the eighth coil 78V3. The ninth coil-to-coil connecting wire 84W3-W4 connects between the trailing end of the ninth coil 78W3 and the leading end of the twelfth coil 78W4.

Figure 7:
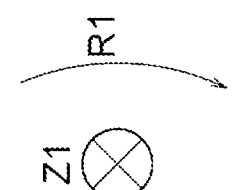
FIG. 7 is an illustration which demonstrates shaping of power input wires in a winding shaping process in the first embodiment.

The first coil-to-coil connecting wire 84U1-U2, the second coil-to-coil connecting wire 84V2-V1, the third coil-to-coil connecting wire 84W1-W2, the fourth coil-to-coil connecting wire 84U2-U3, the fifth coil-to-coil connecting wire 84V3-V2, the sixth coil-to-coil connecting wire 84W2-W3, the seventh coil-to-coil connecting wire 84U3-U4, the eighth coil-to-coil connecting wire 84V4-V3, and the ninth coil-to-coil connecting wire 84W3-W4 are, as clearly illustrated in FIG. 7, arranged on the first axial side Z2 of the core 50.

In the wire winding process in the first embodiment, of the coils 78, the U-phase coils U1 to U4 and the W-phase coils W1 to W4 are each formed by turns of the wire made by the nozzle 120 moving in the first circumferential direction R1 of the core 50, while the V-phase coils V1 to V4 are each formed by turns of the wire made by the nozzle 120 moving in the second circumferential direction R2 of the core 50.

After completion of the wire winding process, each of the core segments 56 is cut away from a corresponding one of the temporary joining runners 106. Further, the teeth 54 are bent inwardly into an annular shape and joined together.

Winding Shaping Process

Figure 8:
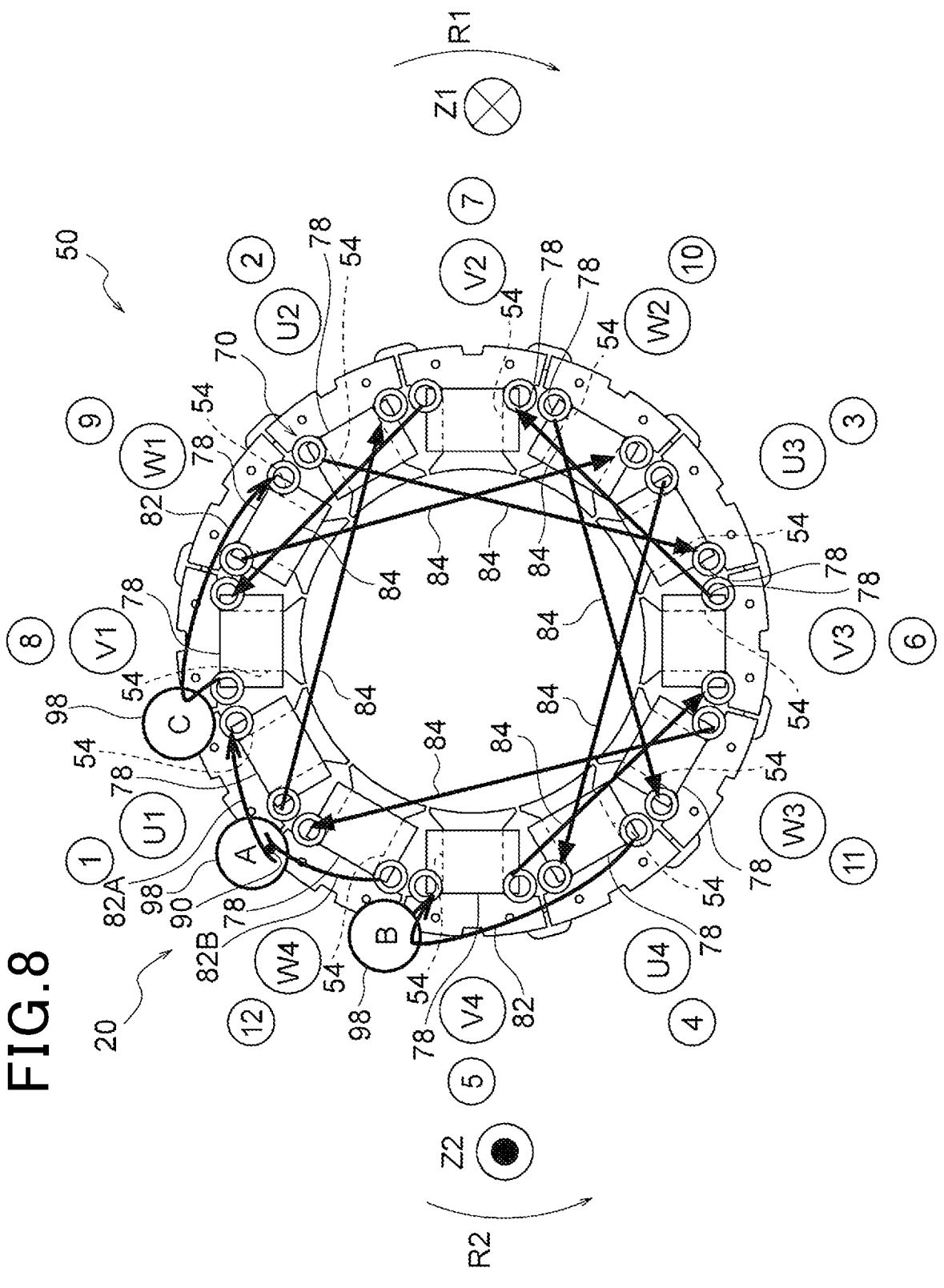
FIG. 8 is an illustration which demonstrates power input wires shaped by a winding shaping process in the first embodiment.

FIG. 7 illustrates how to shape the first power input wire 82V1-W1, the second power input wire 82U4-V4, and leading end and the trailing end of the winding 70 in the winding shaping process in the first embodiment. FIG. 8 illustrates the first power input wire 82V1-W1, the second power input wire 82U4-V4, and the leading end and the trailing end of the winding 70 after shaped in the winding shaping process in the first embodiment.

The winding shaping process is, as demonstrated in FIG. 7, executed, as an example, in a condition where the plurality of wire-connecting terminals 98 have already been fabricated in or on the core 50. The number of the wire-connecting terminals 98 is equal to those of the first power input wire 82V1-W1, the second power input wire 82U4-V4, and the third power input wire 82W4-U1 and, for instance, three. The wire-connecting terminals 98 are formed, for example, on electrical terminals connecting with the circuit substrate 28 (see FIG. 1). FIGS. 7 and 8 schematically illustrate the wire-connecting terminals 98. Similarly, FIGS. 7 and 8 also schematically illustrate the first power input wire 82V1-W1, the second power input wire 82U4-V4, and the leading and trailing end of the winding 70.

Symbols A to C, as labeled in the drawings used in the following discussion on each process of the production method, represent the wire-connecting terminals 98. Specifically, "A" denotes the third wire-connecting terminal 98A. "B" denotes the second wire-connecting terminal 98B. "C" denotes the first wire-connecting terminal 98C. In the illustrated example, the first wire-connecting terminal 98C is disposed between the first coil 78U1 and the second coil 78V1. The second wire-connecting terminal 98B is disposed between the eleventh coil 78V4 and the twelfth coil 78W4. The third wire-connecting terminal 98A is disposed between the first coil 78U1 and the twelfth coil 78W4.

In the winding shaping process, the first power input wire 82V1-W1 is, as illustrated in FIG. 7, shaped by moving the first connecting section C1 of the first power input wire 82V1-W1 toward the first wire-connecting terminal 98C. The first wire-connecting terminal 98C is, for example, in the shape of a hook. The first connecting section C1 engages the first wire-connecting terminal 98C.

Similarly, the second power input wire 82U4-V4 is shaped by moving the second connecting section B1 of the second power input wire 82U4-V4 toward the second wire-connecting terminal 98B. The second wire-connecting terminal 98B is, for example, in the shape of a hook. The second connecting section B1 engages the second wire-connecting terminal 98B.

Similarly, the third power input wire 82W4-U1, as formed in the wire connection process described later in detail, is shaped by moving the third connecting section A1 of the third power input wire 82W4-U1 toward the third wire-connecting terminal 98A. The third wire-connecting terminal 98A is, for example, in the shape of a hook. The third connecting section A1 engages the third wire-connecting terminal 98A.

Wire Connection Process

In the wire connection process, the first wire-connecting terminal 98C and the first connecting section C1 are joined together using, for example, fusing techniques. Similarly, the second wire-connecting terminal 98B and the second connecting section B1 are joined together using, for example, fusing techniques. The third wire-connecting terminal 98A and the third connecting section A1 are joined together using, for example, fusing techniques. In this way in the wire connection process, the first power input wire 82V1-W1 and the second power input wire 82U4-V4 are joined to the first wire-connecting terminal 98C and the second wire-connecting terminal 98B, respectively. Additionally, the leading end 82A and the trailing end 82B of the winding 70 are joined to the third wire-connecting terminal 98A.

FIG. 9A is a two-view drawing which illustrates, as an example, the first wire-connecting terminal 98C and the first connecting section C1 which are joined using fusing techniques. The first connecting section C1 of the first power input wire 82V1-W1 is fitted in the first wire-connecting terminal 98C. The first power input wire 82V1-W1 is then joined to the first wire-connecting terminal 98C by the fusing. Similarly, the second power input wire 82U4-V4 is joined to the second wire-connecting terminal 98B.

FIG. 9B is a two-view drawing which illustrates, as an example, the third wire-connecting terminal 98A joined to the leading end 82A and the trailing end 82B of the winding 70 by the fusing. Specifically, the leading end 82A and the trailing end 82B of the winding 70 are fitted in the third wire-connecting terminal 98A and then joined together by the fusing to form the joint 90. This completes the third power input wire 82W4-U1 and also achieves the electrical connection of the third power input wire 82W4-U1 to the third wire-connecting terminal 98A.

Fabrication Process

In the fabrication process, a plurality of parts making the rotating electrical machine 10 illustrated in FIG. 1, that is, the motor shaft 16, the rotor 18, the stator 20, the motor housing 22, and the front housing 24 are assembled together.

In the production method in the first embodiment, the rotating electrical machine 10 illustrated in FIG. 1 is produced in the above way.

Structure of Winding

The stator 20 of the rotating electrical machine 10 fabricated in the above way, as can be seen in FIG. 8 has the teeth 54 extending inwardly in the radial direction of the core 50. The stator 20 is equipped with the winding 70 made in the four-series-connected-coil delta configuration. The winding 70 includes the plurality of coils 78 wound around the teeth 54 in the form of a concentrated winding.

The plurality of coils 78 are broken down into three groups: U-phase coils 78 working for a U-phase, V-phase coils 78 working for a V-phase, and W-phase coils 78 working for a W-phase which are arranged alternately and repeatedly in the first circumferential direction R1 of the core 50.

The winding 70, as described above, includes the plurality of power input wires 82 and the plurality of coil-to-coil connecting wires 84. The power input wires 82 and the coil-to-coil connecting wires 84 are arranged on the first axial side Z2 of the core 50.

Each of the power input wires 82 connects between the trailing end of one of the coils 78 of a first one of the phases and a leading end of one of the coils 78 of a second one of the phases which is located adjacent or away from the one of the coils 78 of the first phase in the first circumferential direction R1 of the core 50. Each of the coil-to-coil connecting wires 84 is used as one of the first direction-oriented connecting wire and the second direction-oriented connecting wire. Each of the first direction-oriented wires is used to connect between the trailing end of one of the coils 78 of one of the phases and the leading end of one of the coils 78 of the same phase which is arranged adjacent to the former one of the coils 78 in the second circumferential direction R2 of the core 50. Each of the second direction-oriented wires is used to connect between the trailing end of one of the coils 78 of one of the phases and the leading end of one of the coils 78 of the same phase which is arranged adjacent to the former one of the coils 78 of the same phase in the first circumferential direction R1.

Each of the power input wires 82 extends outside the core segments 56 over an adjacent two of the teeth 54 disposed between. Each of the first direction-oriented connecting wires extends outside the core segments 56 over 2×2 of the teeth 54 disposed therebetween. Each of the second direction-oriented connecting wires extends outside the core segments 56 over an adjacent two of the teeth 54 disposed therebetween.

The winding 70 is made of a single continuous wire. One(s) of the power input wires 82 has the joint 90 connecting the ends of the winding 70 together. Each of the power input wires 82 connects with one of the wire-connecting terminals 98.

Operation and Beneficial Advantages

The operation and beneficial advantages of the first embodiment will be described below.

In the wire winding process in the first embodiment, the nozzle 120 is, as can be seen in FIG. 5, moved in the first circumferential direction R1 to wind the wire around the teeth 54 for two of the U-phase, the V-phase, and the W-phase, while the nozzle 120 is moved in the second circumferential direction R2 to wind the wire around the teeth 54 for a remaining one of the U-phase, the V-phase, and the W-phase. This completes all the coils 78. This winding way enables the winding 70 to be made by winding a single continuous wire around the teeth 54, thereby improving the productivity of the winding 70.

The sequence in which the wire of the winding 70 is wound around the teeth 54 and the layout of the wire of the winding 70 are, as can be seen in FIG. 5, designed to have the power input wires 82 each of which connects between the trailing end of one of the coils 78 of a first one of the phases and the leading end of one of the coils 78 of a second one of the phases different from the first one and which is made of a single continuous wire other than the third power input wire 82W4-U1. This minimizes a risk that the coil-to-coil connecting wires 84 disposed between the coils 78 or the power input wire 82 may be intricately tangled when the core 50 is shaped to be annular after the wire winding process is made on the teeth 54, thereby avoiding deformation or loosening of the coils 78 or tight press of the coil-to-coil connecting wires 84 or the power input wires 82 against one another to cause to insulating layers thereof. This eliminates the need for complicated special tools or special facilities, thus resulting in a decrease in total production cost of the rotating electrical machine 10.

The structure in this embodiment is, as can be seen in FIGS. 7 and 8, also capable of reducing a risk that the coil-to-coil connecting wires 84 disposed between the coils 78 or the power input wire 82 may be intricately tangled when the power input wires 82 are shaped or the power input wires 82 are joined to the wire-connecting terminals 98. This eliminates the need for complicated special tools or special facilities used in joining the power input wires 82 to the circuit substrate 28 (see FIG. 1) or facilitating the shaping of the power input wires 82, thus resulting in a decrease in total production cost of the rotating electrical machine 10.

The first embodiment is, as apparent from the above discussion, capable of producing the rotating electrical machine 10 (see FIG. 1) at a decreased cost and high quality which is designed to have an increased space factor of the winding 70 which enables the size of the rotating electrical machine 10 to be reduced or output power therefrom to be enhanced.

Particularly, the rotating electrical machine 10 is designed in the form of an inner-rotor brushless motor in which the teeth 54 extend radially inward. The structure in the first embodiment is capable of reducing the size of the inner-rotor brushless motor, enhancing output power therefrom, producing it at low cost.

The power input wires 82 are disposed on the first axial side Z2 of the core 50. The coil-to-coil connecting wires 84 are also arranged on the first axial side Z2 of the core 50. This enables the volume of space in the rotating electrical machine 10 on the second axial side Z1 to be reduced.

Each of the power input wires 82 extends outside the core segments 56 over an adjacent two of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Each of the coil-to-coil connecting wires 84 connects between a first one of the teeth 54 and a second one of the teeth 54 which is located over the two teeth 54 or 2×2 teeth 54 away from the first one. This also provides a sufficient interval between the ends of each of the coil-to-coil connecting wires 84 in addition to that between the ends of each of the power input wires 82, thereby decreasing a risk of intricate tangling of the coil-to-coil connecting wires 84 or the power input wires 82.

The winding 70 is, as described above, made of a single continuous wire. This enables the wire to be wound around the plurality of teeth 54 to form the winding 70 using the single nozzle 120, thereby permitting a winding device containing the nozzle 120 to have a simplified structure and thus reducing a total production cost of the rotating electrical machine 10.

Modifications

Modifications of the first embodiment will be described below.

The stator 20 in the first embodiment is designed, as an example, to have the coils 78 which are in the m-series-connected-coil and n-parallel-connected-coil delta configuration where m is a natural number of two or more, specifically, in a four-series-connected-coil and one-parallel-connected-coil delta configuration, but however, the production method of the stator 20 in the first embodiment may be used with all types of three-phase brushless motor in which each of the number of the slots formed in the core 50, the number of the teeth 54, and the number of the coils 78 is six or more that is a multiple of three. For instance, the number of the slots, the number of the teeth 54, and the number of the coils 78 may be selected to be 6 (i.e., m=2 and n=1), 9 (i.e., m=3 and n=1), 12 (i.e., m=4, and n=1), 15 (i.e., m=5 and n=1), 18 (i.e., m=6 and n=1), 21 (i.e., m=7 and n=1), 24 (i.e., m=8 and n=1), 27 (i.e., m=9 and n=1), 30 (i.e., m=10 and n=1), 33 (i.e., m=11 and n=1), or 36 (i.e., m=12 and n=1).

The winding device according to this embodiment does not necessarily need to use a single nozzle, but may alternatively be designed to be of a single flyer type.

The winding shaping process is, as described above, executed, as illustrated in FIG. 7, after the wire-connecting terminals 98 are attached to the core 50, but may alternatively be initiated before the wire-connecting terminals 98 are fabricated on the core 50. In this case, the wire connection process is designed to install the wire-connecting terminals 98 on the core 50, after which the power input wires 82 are joined to the wire-connecting terminals 98.

The stator 20 is of an inner-rotor type in which the teeth 54 extend radially inward in the core 50, but may alternatively be designed to be of an outer-rotor type in which the teeth 54 extend radially outward from the core 50.

The temporary joining runners 106 may alternatively be, as illustrated in FIG. 10, modified to have the following structures. Specifically, instead of the temporary joining runners 106, the temporary joining runners 108 are used. The temporary joining runners 108 include bars which extend from surfaces of the core segments 56 which face away from the teeth 54 and are joined together using an annular bar. The core segments 56 are, as clearly illustrated in FIG. 10 arranged to have outer ends which are arrayed in an annular shape on an outer circumference of the core 50. The winding 70 is made by executing the wire winding process and moving the nozzle 120 from a first one of the core segments 56 toward a second one of the core segments 56 which is arranged adjacent to the first one in the circumferential direction of the temporary joining runners 108 to wind the wire in the core 50.

After the wire of the winding 70 is wound in the core 50, the teeth 54 are turned inside out to orient the outer ends radially inside the core 50.

Subsequently, the rotating electrical machine 10 is completed in the above-described way following the winding shaping process.

This modification needs not necessarily be of a single nozzle type, but may alternatively be designed, as illustrated in FIG. 11, to use the flyer 110 instead of the nozzle 120. The flyer 110 is moved to wind the wire in the core 50 to complete the winding 70.

The jig 100 which is, as shown in FIG. 11, of a substantially triangular shape may be used instead of the temporary joining runners 106. The single flyer 110 may be used instead of the nozzle 120. In this modification, the core segments 56 are joined together in an annular shape with the outer ends of the teeth 54 located on an outer circumferential side of the core 50. The winding 70 is completed by executing the wire winding process and moving the flayer 110 from a first one of the core segments 56 to a second one of the core segments 56 which is arranged away from the first one in the circumferential direction of the core 50 to wind the wire in the core 50.

In the above case, after completion of the wire winding process, the core 50 is, as can be seen in FIG. 13, turned inside out to change the orientation of the teeth 54 by 180°. Specifically, the core 50 is turned to extend the teeth 54 in the shape of a train and then curve them, as illustrated in FIG. 13, to change the state in FIG. 12 where the teeth 54 joined together in an annular shape have the outer ends facing outwardly of the core 50 to the state in FIG. 13 where the teeth 54 have the outer ends facing inwardly of the core 50, thereby completing the core 50 in state illustrated in FIG. 7.

After the core 50 is turned in the above away, the rotating electrical machine 10 (see FIG. 1) is fabricated in the above-described processes following the winding shaping process.

In the wire winding process in the first embodiment, of the U-phase coils U1 to U4, the V-phase coils V1 to V4, and the W-phase coils W1 to W4, the V-phase coils V1 to V4 are fabricated by moving the nozzle 120 in the second circumferential direction R2 of the core 50, but however, the U-phase coils U1 to U4 or the W-phase coils W1 to W4 may alternatively be fabricated by moving the nozzle 120 in the second circumferential direction R2 of the core 50. This enables a continuous wire to be wound around the teeth 54 to form the winding 70, thereby improving the productivity of the rotating electrical machine 10.

Production Method of Rotating Electrical Machine in the Second Embodiment

The production method of the rotating electrical machine 10 according to the second embodiment will be described below.

The production method of the rotating electrical machine 10 in the second embodiment is identical in the core setting process with that in the first embodiment, but different in wire winding process from that in the first embodiment.

Wire Winding Process

The wire winding process in the second embodiment uses, as an example, the single nozzle 120 to wind a single continuous wire around the teeth 54 to form the winding 70. FIG. 14 is a diagram which represents the wire winding process in the second embodiment. Table 2 shows an operation schedule showing a sequence of wire-winding steps in the wire winding process in the second embodiment.

In the wire winding process in the second embodiment, the wire of the winding 70 is wound in a sequence of first to twelfth steps discussed below. In the drawings, numbers 1 to 12 within circles denote the order of formation of the coils 78.

First Step

In the first step, the wire of the winding 70 is wound from the first axial side Z2 of the core 50 around the first tooth 54U1 in a counterclockwise direction, as viewed in the axial direction of the first tooth 54U1, to form the first coil 78U1 with an integral number of turns. After completion of the first coil 78U1, the wire is directed or led to the first axial side Z2 of the core 50.

Afterwards, the wire of the winding 70 is extended toward the fourth coil 78U2 in the first circumferential direction R1 on the first axial side Z2 to form the first coil-to-coil connecting wire 84U1-U2.

Second Step

In the second step, the wire of the winding 70 is wound from the first axial side Z2 of the core 50 around the fourth tooth 54U2 in the counterclockwise direction, as viewed in the axial direction of the fourth tooth 54U2, to form the fourth coil 78U2 with an integral number of turns. After completion of the fourth coil 78U2, the wire is directed or led to the first axial side Z2 of the core 50.

Afterwards, the wire of the winding 70 is extended toward the seventh coil 78U3 in the first circumferential direction R1 on the first axial side Z2 to form the fourth coil-to-coil connecting wire 84U2-U3.

Third Step

In the third step, the wire of the winding 70 is wound from the first axial side Z2 of the core 50 around the seventh tooth 54U3 in the counterclockwise direction, as viewed in the axial direction of the seventh tooth 54U3, to form the seventh coil 78U3 with an integral number of turns. After completion of the seventh coil 78U3, the wire is directed or led to the first axial side Z2 of the core 50.

Afterwards, the wire of the winding 70 is extended toward the tenth coil 78U4 in the first circumferential direction R1 on the first axial side Z2 to form the seventh coil-to-coil connecting wire 84U3-U4.

Fourth Step

In the fourth step, the wire of the winding 70 is wound from the first axial side Z2 of the core 50 around the tenth tooth 54U4 in the counterclockwise direction, as viewed in the axial direction of the tenth tooth 54U4, to form the tenth coil 78U4 with an integral number of turns. After completion of the tenth coil 78U4, the wire is directed or led to the first axial side Z2 of the core 50.

Afterwards, the wire of the winding 70 is returned from the first axial side Z2 of the core 50 to between the tenth tooth 54U4 and the eleventh tooth 54V4. The second power input wire 82U4-V4 is, thus, made of the wire continuing from the tenth coil 78U4.

Fifth Step

In the fifth step, the wire of the winding 70 is wound from the first axial side Z2 of the core 50 around the eleventh tooth 54V4 in the counterclockwise direction, as viewed in the axial direction of the eleventh tooth 54V4, to form the eleventh coil 78V4 with an integral number of turns. After completion of the eleventh coil 78V4, the wire is directed or led to the first axial side Z2 of the core 50.

Afterwards, the wire of the winding 70 is extended toward the eighth coil 78V3 in the second circumferential direction R2 on the first axial side Z2 to form the eighth coil-to-coil connecting wire 84V4-V3.

Sixth Step

In the sixth step, the wire of the winding 70 is wound from the first axial side Z2 of the core 50 around the eighth tooth 54V3 in the counterclockwise direction, as viewed in the axial direction of the eighth tooth 54V3, to form the eighth coil 78V3 with an integral number of turns. After completion of the eighth coil 78V3, the wire is directed or led to the first axial side Z2 of the core 50.

Afterwards, the wire of the winding 70 is extended toward the fifth coil 78V2 in the second circumferential direction R2 on the first axial side Z2 to form the fifth coil-to-coil connecting wire 84V3-V2.

Seventh Step

In the seventh step, the wire of the winding 70 is wound from the first axial side Z2 of the core 50 around the fifth tooth 54V2 in the counterclockwise direction, as viewed in the axial direction of the fifth tooth 54V2, to form the fifth coil 78V2 with an integral number of turns. After completion of the fifth coil 78V2, the wire is directed or led to the first axial side Z2 of the core 50.

Afterwards, the wire of the winding 70 is extended toward the second coil 78V1 in the second circumferential direction R2 on the first axial side Z2 to form the second coil-to-coil connecting wire 84V2-V1.

Eighth Step

In the eighth step, the wire of the winding 70 is wound from the first axial side Z2 of the core 50 around the second tooth 54V1 in the counterclockwise direction, as viewed in the axial direction of the second tooth 54V1, to form the second coil 78V1 with an integral number of turns. After completion of the second coil 78V1, the wire is directed or led to the first axial side Z2 of the core 50.

Afterwards, the wire of the winding 70 is returned from the first axial side Z2 of the core 50 to between the second tooth 54V1 and the third tooth 54W1 and then extended over the third tooth 54W1. The first power input wire 82V1-W1 is, thus, made of the wire continuing from the second coil 78V1.

Ninth Step

In the ninth step, the wire of the winding 70 is wound from the first axial side Z2 of the core 50 around the third tooth 54W1 in the counterclockwise direction, as viewed in the axial direction of the third tooth 54W1, to form the third coil 78W1 with an integral number of turns. After completion of the third coil 78W1, the wire is directed or led to the first axial side Z2 of the core 50.

Afterwards, the wire of the winding 70 is extended toward the sixth coil 78W2 in the first circumferential direction R1 on the first axial side Z2 to form the third coil-to-coil connecting wire 84W1-W2.

Tenth Step

In the tenth step, the wire of the winding 70 is wound from the first axial side Z2 of the core 50 around the sixth tooth 54W2 in the counterclockwise direction, as viewed in the axial direction of the sixth tooth 54W2, to form the sixth coil 78W2 with an integral number of turns. After completion of the sixth coil 78W2, the wire is directed or led to the first axial side Z2 of the core 50.

Afterwards, the wire of the winding 70 is extended toward the ninth coil 78W3 in the first circumferential direction R1 on the first axial side Z2 to form the sixth coil-to-coil connecting wire 84W2-W3.

Eleventh Step

In the eleventh step, the wire of the winding 70 is wound from the first axial side Z2 of the core 50 around the ninth tooth 54W3 in the counterclockwise direction, as viewed in the axial direction of the ninth tooth 54W3, to form the ninth coil 78W3 with an integral number of turns. After completion of the ninth coil 78W3, the wire is directed or led to the first axial side Z2 of the core 50.

Afterwards, the wire of the winding 70 is extended toward the twelfth coil 78W4 in the first circumferential direction R1 on the first axial side Z2 to form the ninth coil-to-coil connecting wire 84W3-W4.

Twelfth Step

In the twelfth step, the wire of the winding 70 is wound from the first axial side Z2 of the core 50 around the twelfth tooth 54W4 in the counterclockwise direction, as viewed in the axial direction of the twelfth tooth 54W4, to form the twelfth coil 78W4 with an integral number of turns. After completion of the twelfth coil 78W4, the wire is directed or led to the first axial side Z2 of the core 50.

Afterwards, the wire of the winding 70 is extended toward the leading end 82A of the winding 70 in the first circumferential direction R1 on the first axial side Z2 of the core 50, after which the third power input wire 82W4-U1 is formed in the wire connection process.

TABLE 2

| STEP | CONTENTS | Wire extracting direction (axial direction) | Wiring direction (circumferential direction) |
|---|---|---|---|
| 1 | Form 1$^{st}$ coil U1 Create 1$^{st}$ coil-to-coil connecting wire U1-U2 | 1$^{st}$ direction | 1$^{st}$ direction |
| 2 | Form 4$^{th}$ coil U2 Create 4$^{th}$ coil-to-coil connecting wire U2-U3 | 1$^{st}$ direction | 1$^{st}$ direction |
| 3 | Form 7$^{th}$ coil U3 Create 7$^{th}$ coil-to-coil connecting wire U3-U4 | 1$^{st}$ direction | 1$^{st}$ direction |
| 4 | Form 10$^{th}$ coil U4 Create 2$^{nd}$ power input wire U4-V4 | 1$^{st}$ direction | 1$^{st}$ direction |
| 5 | Form 11$^{th}$ coil V4 Create 8$^{th}$ coil-to-coil connecting wire V4-V3 | 1$^{st}$ direction | 2$^{nd}$ direction |
| 6 | Form 8$^{th}$ coil V3 Create 5$^{th}$ coil-to-coil connecting wire V3-V2 | 1$^{st}$ direction | 2$^{nd}$ direction |
| 7 | Form 5$^{th}$ coil V2 Create 2$^{nd}$ coil-to-coil connecting wire V2-V1 | 1$^{st}$ direction | 2$^{nd}$ direction |

TABLE 2-continued

| STEP | CONTENTS | Wire extracting direction (axial direction) | Wiring direction (circumferential direction) |
|---|---|---|---|
| 8 | Form $2^{nd}$ coil V1 | | |
| | Create $1^{st}$ power input wire V1-W1 | $1^{st}$ direction | $1^{st}$ direction |
| 9 | Form $3^{rd}$ coil W1 | | |
| | Create $3^{rd}$ coil-to-coil connecting wire W1-W2 | $1^{st}$ direction | $1^{st}$ direction |
| 10 | Form $6^{th}$ coil W2 | | |
| | Create $6^{th}$ coil-to-coil connecting wire W2-W3 | $1^{st}$ direction | $1^{st}$ direction |
| 11 | Form $9^{th}$ coil W3 | | |
| | Create $9^{th}$ coil-to-coil connecting wire W3-W4 | $1^{st}$ direction | $1^{st}$ direction |
| 12 | Form $12^{th}$ coil W4 | | |
| | Create $3^{rd}$ power input wire W4-U1 | $1^{st}$ direction | $1^{st}$ direction |
| | Joining ends of leading and trailing ends of wire to complete $3^{rd}$ power input wire W4-U1 | | |

In the second embodiment, the winding 70 is produced in the four-series-connected-coil delta configuration in the way described above. The wire winding process in the second embodiment is capable of achieving the same layout of connections of the coils 78 as in the first embodiment.

Each of the power input wires 82 is extended from a clearance between an adjacent two of the teeth 54. Each of the first direction-oriented connecting wires extends outside the core segments 56 over two of the teeth 54 disposed therebetween. Each of the second direction-oriented connecting wires extends outside the core segments 56 over 2×2 of the teeth 54.

The first power input wire 82V1-W1, the second power input wire 82U4-V4, and the third power input wire 82W4-U1 are arranged on the first axial side Z2 of the core 50. The third power input wire 82W4-U1 is equipped with the joint 90 which achieves a joint between the leading end 82A and the trailing end 82B of the winding 70.

The first coil-to-coil connecting wire 84U1-U2, the second coil-to-coil connecting wire 84V2-V1, the third coil-to-coil connecting wire 84W1-W2, the fourth coil-to-coil connecting wire 84U2-U3, the fifth coil-to-coil connecting wire 84V3-V2, the sixth coil-to-coil connecting wire 84W2-W3, the seventh coil-to-coil connecting wire 84U3-U4, the eighth coil-to-coil connecting wire 84V4-V3, and the ninth coil-to-coil connecting wire 84W3-W4 are arranged on the first axial side Z2 of the core 50.

In the wire winding process in the second embodiment, of the coils 78, the U-phase coils U1 to U4 and the W-phase coils W1 to W4 are each formed by turns of the wire made by the nozzle 120 moving in the first circumferential direction R1 of the core 50, while the V-phase coils V1 to V4 are each formed by turns of the wire made by the nozzle 120 moving in the second circumferential direction R2 of the core 50.

After completion of the wire winding process, each of the core segments 56 is cut away from a corresponding one of the temporary joining runners 106. Further, the teeth 54 are bent inwardly into an annular shape and joined together. Winding Shaping Process, Wire Connection Process, and Fabrication Process The winding shaping process, the wire connection process, and the fabrication process in the second embodiment are identical with those in the first embodiment. The rotating electrical machine 10 (see FIG. 1) is fabricated in the above-described production method in the second embodiment.

Operation and Beneficial Advantages

The operation and beneficial advantages of the second embodiment will be described below.

In the wire winding process in the second embodiment, the nozzle 120 is, as can be seen in FIG. 14, moved in the first circumferential direction R1 to wind the wire around the teeth 54 for two of the U-phase, the V-phase, and the W-phase, while the nozzle 120 is moved in the second circumferential direction R2 to wind the wire around the teeth 54 for a remaining one of the U-phase, the V-phase, and the W-phase. This completes all the coils 78. This winding way enables the winding 70 to be made by winding a single continuous wire around the teeth 54, thereby improving the productivity of the winding 70.

The power input wires 82 are arranged on the first axial side Z2 of the core 50. The coil-to-coil connecting wires 84 are also arranged on the first axial side Z2 of the core 50. This enables the volume of space in the rotating electrical machine 10 on the second axial side Z1 to be minimized.

Particularly, the rotating electrical machine 10 is designed in the form of an inner-rotor brushless motor in which the teeth 54 extend radially inward. The structure in the second embodiment is capable of reducing the size of the inner-rotor brushless motor, enhancing output power therefrom, producing it at low cost.

Each of the power input wires 82 is, as described above, extended from a clearance between an adjacent two of the teeth 54. This results in an increased interval between the ends of an adjacent two of the coil-to-coil connecting wires 84 and also results in a decreased interval between the ends of each of the power input wires 82, thereby minimizing a risk of intricate tangling of the coil-to-coil connecting wires 84 or the power input wires 82.

Each of the coil-to-coil connecting wires 84 extends outside the core segments 56 over two or 2×2 of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

The winding 70 is, as described above, made of a single continuous wire. This enables the wire to be wound around the plurality of teeth 54 to form the winding 70 using the single nozzle 120, thereby permitting a winding device containing the nozzle 120 to have a simplified structure and thus reducing a total production cost of the rotating electrical machine 10.

Modifications

Modifications of the second embodiment will be described below.

The stator 20 in the second embodiment is designed, as an example, to have the coils 78 which are in the m-series-connected-coil and n-parallel-connected-coil delta configuration where m is a natural number of two or more, specifically, in a four-series-connected-coil and one-parallel-connected-coil delta configuration, but however, the production method of the stator 20 in the second embodiment may be used with all types of three-phase brushless motor in which each of the number of the slots formed in the core 50, the number of the teeth 54, and the number of the coils 78 is six or more that is a multiple of three. For instance, the number of the slots, the number of the teeth 54, and the number of the coils 78 may be selected to be 6 (i.e., m=2 and n=1), 9 (i.e., m=3 and n=1), 12 (i.e., m=4 and n=1), 15 (i.e., m=5 and n=1), 18 (i.e., m=6 and n=1), 21 (i.e., m=7 and n=1), 24 (i.e., m=8 and n=1), 27 (i.e., m=9 and n=1), 30 (i.e., m=10 and n=1), 33 (i.e., m=11 and n=1), or 36 (i.e., m=12 and n=1).

The structure or production method in the second embodiment may be modified in the same manner as that in the first embodiment.

In the wire winding process in the second embodiment, of the U-phase coils U1 to U4, the V-phase coils V1 to V4, and the W-phase coils W1 to W4, the V-phase coils V1 to V4 are fabricated by moving the nozzle 120 in the second circumferential direction R2 of the core 50, but however, the U-phase coils U1 to U4 or the W-phase coils W1 to W4 may alternatively be fabricated by moving the nozzle 120 in the second circumferential direction R2 of the core 50. This also enables a continuous wire to be wound around the teeth 54 to form the winding 70, thereby improving the productivity of the rotating electrical machine 10.

Production Method of Rotating Electrical Machine in the Third Embodiment

Next, the production method of the rotating electrical machine 10 according to the third embodiment will be described below.

The production method of the rotating electrical machine 10 in the third embodiment is identical in the core setting process with that in the first embodiment, but different from the first embodiment as described below.

Layout of Wire Connections of Winding

FIG. 15 is a view which illustrates the layout of wire connections of the winding 70 of the stator 20 in the third embodiment. The production method of the rotating electrical machine 10 in the third embodiment is, as illustrated in FIG. 15, designed to produce the winding 70 equipped with the coils 78 which are delta-connected together in the m-series-connected-coil and n-parallel-connected-coil delta configuration where m is a natural number of two or more, and n is a natural number, specifically, in a two-series-connected-coil and two-parallel connected-coil delta configuration. In other words, in the rotating electrical machine 10 fabricated by the production method in the third embodiment, m is two, n is two, the number of slots is twelve, the number of the teeth 54 is twelve, and the number of coils 78 is twelve.

The layout of the connections of the coils 78 in a two-series-connected-coil and two-parallel-connected-coil delta configuration will be described below in detail. The four coils 78 for each phase are broken down into two coil arrays 78A, i.e., two (n=2) series-connected-coil assemblies each of which includes series-connected two (m=2) of the coils 78 and which are connected in parallel to each other. The three coil groups 80 each of which includes the two coil arrays 78A are connected in a delta (i.e., triangular) configuration.

Wire Winding Process

Like in the first embodiment, the wire winding process in the third embodiment uses, as an example, the single nozzle 120 (see FIG. 4) to wind a single continuous wire around the teeth 54 to form the winding 70. FIG. 16 is a diagram which represents the wire winding process in the third embodiment. Table 3 shows an operation schedule showing a sequence of wire-winding steps in the wire winding process in the third embodiment.

The winding 70 includes six power input wires 82 each of which is used to achieve a connection between two of the coils 78 of phases different from each other. The power input wires 82 include the first connecting section C1 to the sixth connecting section A2 used in connecting with the coils 78 in the wire connection process which will be described later in detail. In the following discussion about each process of the production method, the six power input wires 82 will be referred to as below, respectively, in the first circumferential direction R1 of the core 50.

1) the first power input wire 82V1-W1
   2) the second power input wire 82U2-V2
   3) the third power input wire 82W2-U3
   4) the fourth power input wire 82V3-W3
   5) the fifth power input wire 82U4-V4
   6) the sixth power input wire 82W4-U1

The winding 70 includes six coil-to-coil connecting wires 84 each of which connects the adjacent coils 78 of the same phase together. In the following discussion on each process of the production method, the coil-to-coil connecting wires 84 which are arranged away from each other in the first circumferential direction R1 of the core 50 will be referred to as below in relation to symbols U1 to W4.

1) the first coil-to-coil connecting wire 84U1-U2
   2) the second coil-to-coil connecting wire 84V2-V1
   3) the third coil-to-coil connecting wire 84W1-W2
   4) the fourth coil-to-coil connecting wire 84U3-U4
   5) the fifth coil-to-coil connecting wire 84V4-V3
   6) the sixth coil-to-coil connecting wire 84W3-W4

Of the coil-to-coil connecting wires 84, the first coil-to-coil connecting wire 84U1-U2, the third coil-to-coil connecting wire 84W1-W2, the fourth coil-to-coil connecting wire 84U3-U4, and the sixth coil-to-coil connecting wire 84W3-W4 correspond to the first direction-oriented connecting wires, while the second coil-to-coil connecting wire 84V2-V1 and the fifth coil-to-coil connecting wire 84V4-V3 correspond to the second direction-oriented connecting wires.

In the wire winding process in the third embodiment, the wire of the winding 70 is wound in a sequence of first to twelfth steps discussed below. In the drawings, numbers 1 to 12 within circles denote the order of formation of the coils 78.

First Step

In the first step, the wire of the winding 70 is wound from the first axial side Z2 of the core 50 around the first tooth 54U1 in a clockwise direction, as viewed in the axial direction of the first tooth 54U1, to form the first coil 78U1 with an integral number of turns.

Afterwards, the wire of the winding 70 is extended toward the fourth coil 78U2 in the first circumferential direction R1 on the first axial side Z2 to form the first coil-to-coil connecting wire 84U1-U2.

Second Step

In the second step, the wire of the winding 70 is wound from the first axial side Z2 of the core 50 around the fourth tooth 54U2 in the clockwise direction, as viewed in the axial direction of the fourth tooth 54U2, to form the fourth coil 78U2 with an integral number of turns. After completion of the fourth coil 78U2, the wire is directed or led to the first axial side Z2 of the core 50.

Afterwards, the wire of the winding 70 is extended toward the fifth coil 78V2 in the first circumferential direction R1 on the first axial side Z2 to form the second power input wire 82U2-V2. The second power input wire 82U2-V2 is, therefore, made of a continuous wire.

Third Step

In the third step, the wire of the winding 70 is wound from the first axial side Z2 of the core 50 around the fifth tooth 54V2 in the clockwise direction, as viewed in the axial direction of the fifth tooth 54V2, to form the fifth coil 78V2 with an integral number of turns.

Afterwards, the wire of the winding 70 is extended toward the second coil 78V1 in the second circumferential direction R2 on the first axial side Z2 to form the second coil-to-coil connecting wire 84V2-V1.

Fourth Step

In the fourth step, the wire of the winding 70 is wound from the first axial side Z2 of the core 50 around the second tooth 54V1 in the clockwise direction, as viewed in the axial direction of the second tooth 54V1, to form the second coil 78V1 with an integral number of turns.

Afterwards, the wire of the winding 70 is extended toward the third coil 78W1 in the first circumferential direction R1 on the first axial side Z2 to form the first power input wire 82V1-W1.

Fifth Step

In the fifth step, the wire of the winding 70 is wound from the first axial side Z2 of the core 50 around the third tooth 54W1 in the clockwise direction, as viewed in the axial direction of the third tooth 54W1, to form the third coil 78W1 with an integral number of turns.

Afterwards, the wire of the winding 70 is extended toward the sixth coil 78W2 in the first circumferential direction R1 on the first axial side Z2 to form the third coil-to-coil connecting wire 84W1-W2.

Sixth Step

In the sixth step, the wire of the winding 70 is wound from the first axial side Z2 of the core 50 around the sixth tooth 54W2 in the clockwise direction, as viewed in the axial direction of the sixth tooth 54W2, to form the sixth coil 78W2 with an integral number of turns. After completion of the sixth coil 78W2, the wire is lead to the first axial side Z2 of the core 50.

Afterwards, the wire of the winding 70 is extended toward the seventh coil 78U3 in the first circumferential direction R1 on the first axial side Z2 to form the third power input wire 83W2-U3. The third power input wire 83W2-U3 is, therefore, made of a continuous wire.

Seventh Step

In the seventh step, the wire of the winding 70 is wound from the first axial side Z2 of the core 50 around the seventh tooth 54U3 in the clockwise direction, as viewed in the axial direction of the seventh tooth 54U3, to form the seventh coil 78U3 with an integral number of turns.

Afterwards, the wire of the winding 70 is extended toward the tenth coil 78U4 in the first circumferential direction R1 on the first axial side Z2 to form the fourth coil-to-coil connecting wire 84U3-U4.

Eighth Step

In the eighth step, the wire of the winding 70 is wound from the first axial side Z2 of the core 50 around the tenth tooth 54U4 in the clockwise direction, as viewed in the axial direction of the tenth tooth 54U4, to form the tenth coil 78U4 with an integral number of turns. After completion of the tenth coil 78U4, the wire is lead to the first axial side Z2 of the core 50.

Afterwards, the wire of the winding 70 is extended toward the eleventh coil 78V4 in the first circumferential direction R1 on the first axial side Z2 to form the fifth power input wire 82U4-V4. The fifth power input wire 82U4-V4 is, therefore, made of wire continuing from the tenth coil 78U4.

Ninth Step

In the ninth step, the wire of the winding 70 is wound from the first axial side Z2 of the core 50 around the eleventh tooth 54V4 in the clockwise direction, as viewed in the axial direction of the eleventh tooth 54V4, to form the eleventh coil 78V4 with an integral number of turns.

Afterwards, the wire of the winding 70 is extended toward the eighth coil 78V3 in the second circumferential direction R2 on the first axial side Z2 to form the fifth coil-to-coil connecting wire 84V4-V3.

Tenth Step

In the tenth step, the wire of the winding 70 is wound from the first axial side Z2 of the core 50 around the eighth tooth 54V3 in the clockwise direction, as viewed in the axial direction of the eighth tooth 54V3, to form the eighth coil 78V3 with an integral number of turns. After completion of the eighth coil 78V3, the wire is led to the first axial side Z2 of the core 50.

Afterwards, the wire of the winding 70 is extended toward the ninth coil 78W3 in the first circumferential direction R1 on the first axial side Z2 to form the fourth power input wire 82V3-W3.

Eleventh Step

In the eleventh step, the wire of the winding 70 is wound from the first axial side Z2 of the core 50 around the ninth tooth 54W3 in the clockwise direction, as viewed in the axial direction of the ninth tooth 54W3, to form the ninth coil 78W3 with an integral number of turns.

Afterwards, the Wire of the Winding 70 is Extended Toward the Twelfth coil 78W4 in the first circumferential direction R1 on the first axial side Z2 to form the sixth coil-to-coil connecting wire 84W3-W4.

Twelfth Step

In the twelfth step, the wire of the winding 70 is wound from the first axial side Z2 of the core 50 around the twelfth tooth 54W4 in the clockwise direction, as viewed in the axial direction of the twelfth tooth 54W4, to form the twelfth coil 78W4 with an integral number of turns.

Afterwards, the wire of the winding 70 is extended toward the leading end 82A of the winding 70 in the first circumferential direction R1 on the first axial side Z2 of the core 50 to form the joint 90 in the wire connection process, as will be described later in detail, thereby making the sixth power input wire 82W4-U1.

TABLE 3

| STEP | CONTENTS | Wire extracting direction (axial direction) | Wiring direction (circumferential direction) |
|------|----------|---------------------------------------------|-----------------------------------------------|
| 1 | Form $1^{st}$ coil U1 | | |
| | Create $1^{st}$ coil-to-coil connecting wire U1-U2 | $1^{st}$ direction | $1^{st}$ direction |
| 2 | Form $4^{th}$ coil U2 | | |
| | Create $4^{th}$ coil-to-coil connecting wire U2-V2 | $1^{st}$ direction | $1^{st}$ direction |
| 3 | Form $5^{th}$ coil V2 | | |
| | Create $2^{nd}$ coil-to-coil connecting wire V2-V1 | $1^{st}$ direction | $2^{nd}$ direction |
| 4 | Form $2^{nd}$ coil V1 | | |
| | Create $1^{st}$ power input wire V1-W1 | $1^{st}$ direction | $1^{st}$ direction |
| 5 | Form $3^{rd}$ coil W1 | | |
| | Create $3^{rd}$ coil-to-coil connecting wire W1-W2 | $1^{st}$ direction | $2^{nd}$ direction |
| 6 | Form $6^{th}$ coil W2 | | |
| | Create $3^{rd}$ coil-to-coil connecting wire W2-U3 | $1^{st}$ direction | $2^{nd}$ direction |
| 7 | Form $7^{th}$ coil U3 | | |
| | Create $4^{th}$ coil-to-coil connecting wire U3-U4 | $1^{st}$ direction | $2^{nd}$ direction |

TABLE 3-continued

| STEP | CONTENTS | Wire extracting direction (axial direction) | Wiring direction (circumferential direction) |
|------|----------|------------|------------|
| 8 | Form $10^{th}$ coil U4 Create $5^{th}$ power input wire U4-V4 | $1^{st}$ direction | $1^{st}$ direction |
| 9 | Form $11^{th}$ coil V4 Create $5^{th}$ coil-to-coil connecting wire V4-V3 | $1^{st}$ direction | $2^{nd}$ direction |
| 10 | Form $8^{th}$ coil V3 Create $4^{th}$ coil-to-coil connecting wire V3-W3 | $1^{st}$ direction | $1^{st}$ direction |
| 11 | Form $9^{th}$ coil W3 Create $6^{th}$ coil-to-coil connecting wire W3-W4 | $1^{st}$ direction | $1^{st}$ direction |
| 12 | Form $12^{th}$ coil W4 Create $6^{th}$ power input wire W4-U1 Joining ends of leading and trailing ends of wire to complete $3^{rd}$ power input wire W4-U1 | $1^{st}$ direction | $1^{st}$ direction |

In the third embodiment, the winding 70 is produced in the two-series-connected-coil and two-parallel-connected-coil delta configuration in the way described above.

The first power input wire 82V1-W1, as can be seen in FIGS. 16 and 17, connects between the trailing end of the second coil 78V1 and the leading end of the third coil 78W 1. The second power input wire 82U2-V2 connects between the trailing end of the fourth coil 78U2 and the leading end of the fifth coil 78V2. The third power input wire 82W2-U3 connects between the trailing end of the sixth coil 78W2 and the leading end of the seventh coil 78U3. The fourth power input wire 82V3-W3 connects between the trailing end of the eighth coil 78V3 and the leading end of the ninth coil 78W3. The fifth power input wire 82U4-V4 connects between the trailing end of the tenth coil 78U4 and the leading end of the eleventh coil 78V4. The sixth power input wire 82W4-U1 achieves connection between the trailing end of the twelfth coil 78W4 and the leading end of the first coil 78U1 in the wire connection process, as will be described later in detail.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are made of a continuous wire. The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The sixth power input wire 82W4-U1 is equipped with the joint 90 which achieves joint between the leading end 82A and the trailing end 82B of the winding 70 in the wire connection process which will be described later in detail.

The first coil-to-coil connecting wire 84U1-U2 connects between the trailing end of the first coil 78U1 and the leading end of the fourth coil 78U2. The second coil-to-coil connecting wire 84V2-V1 connects between the trailing end of the fifth coil 78V2 and the leading end of the second coil 78V1. The third coil-to-coil connecting wire 84W1-W2 connects between the trailing end of the third coil 78W1 and the leading end of the sixth coil 78W2. The fourth coil-to-coil connecting wire 84U3-U4 connects between the trailing end of the seventh coil 78U3 and the leading end of the tenth coil 78U4. The fifth coil-to-coil connecting wire 84V4-V3 connects between the trailing end of the eleventh coil 78V4 and the leading end of the eighth coil 78V3. The sixth coil-to-coil connecting wire 84W3-W4 connects between the trailing end of the ninth coil 78W3 and the leading end of the twelfth coil 78W4.

The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the first axial side Z2 of the core 50.

In the wire winding process in the third embodiment, of the coils 78, the U-phase coils U1 to U4 and the W-phase coils W1 to W4 are made by moving the nozzle 120 in the first circumferential direction R1 of the core 50, while the V-phase coils V1 to V4 are made by moving the nozzle 120 in the second circumferential direction R2 of the core 50.

After completion of the wire winding process, the core segments 56 are cut away from the temporary joining runners 106 and then joined together in an annular shape with the teeth 54 facing radially inwardly.

Winding Shaping Process

The wire-connecting terminals 98 in the third embodiment, unlike the first embodiment, includes the first wire-connecting terminal 98C, the second wire-connecting terminal 98B, the third wire-connecting terminal 98A, the fourth wire-connecting terminal 98C2, the fifth wire-connecting terminal 98B2, and the sixth wire-connecting terminal 98A2. The first wire-connecting terminal 98C is arranged between the second coil 78V1 and the third coil 78W1. The second wire-connecting terminal 98B is arranged between the fourth coil 78U2 and the fifth coil 78V2. The third wire-connecting terminal 98A is arranged between the sixth coil 78W2 and the seventh coil 78U3. The fourth wire-connecting terminal 98C2 is disposed between the eighth coil 78V3 and the ninth coil 78W3. The fifth wire-connecting terminal 98B2 is arranged between the tenth coil 78U4 and the eleventh coil 78V4. The sixth wire-connecting terminal 98A2 is arranged between the first coil 78U1 and the twelfth coil 78W4.

In the winding shaping process, the first power input wire 82V1-W1 is shaped, like in the first embodiment, by moving the first connecting section C1 of the first power input wire 82V1-W1 toward the first wire-connecting terminal 98C. The first wire-connecting terminal 98C is, for example, in the shape of a hook. The first connecting section C1 engages the first wire-connecting terminal 98C.

Similarly, the second power input wire 82U2-V2 is shaped by moving the second connecting section B1 of the second power input wire 82U2-V2 toward the second wire-connecting terminal 98B. The second wire-connecting terminal 98B is, for example, in the shape of a hook. The second connecting section B1 engages the second wire-connecting terminal 98B.

Similarly, the third power input wire 82W2-U3 is shaped by moving the third connecting section A2 of the third power input wire 82W2-U3 toward the third wire-connecting terminal 98A. The third wire-connecting terminal 98A is, for example, in the shape of a hook. The third connecting section A1 engages the third wire-connecting terminal 98A.

Similarly, the fourth power input wire 82V3-W3 is shaped by moving the fourth connecting section C2 of the fourth power input wire 82V3-W3 toward the fourth wire-connecting terminal 98C2. The fourth wire-connecting terminal 98C2 is, for example, in the shape of a hook. The fourth connecting section C2 engages the fourth wire-connecting terminal 98C2.

Similarly, the fifth power input wire 82U4-V4 is shaped by moving the fifth connecting section B2 of the fifth power input wire 82U4-V4 toward the fifth wire-connecting terminal 98B2. The fifth wire-connecting terminal 98B2 is, for example, in the shape of a hook. The fifth connecting section B2 engages the fifth wire-connecting terminal 98B2.

Similarly, the sixth power input wire 82W4-U1 is shaped in the wire connection process, as will be described later in detail, by moving the sixth connecting section A1 of the sixth power input wire 82W4-U1 toward the sixth wire-connecting terminal 98A2. The sixth wire-connecting terminal 98A2 is, for example, in the shape of a hook. The sixth connecting section A2 engages the sixth wire-connecting terminal 98A2.

Wire Connection Process

In the wire connection process, the first wire-connecting terminal 98C and the first connecting section C1 are joined together using, for example, fusing techniques. Similarly, the second wire-connecting terminal 98B and the second connecting section B1 are joined together using fusing techniques. The third wire-connecting terminal 98A and the third connecting section A1 are joined together using fusing techniques. The fourth wire-connecting terminal 98C2 and the fourth connecting section C2 are joined together using fusing techniques. The fifth wire-connecting terminal 98B2 and the fifth connecting section B2 are joined together using fusing techniques. The sixth wire-connecting terminal 98A2 and the sixth connecting section A2 are joined together using fusing techniques. In this way, the first power input wire 82V1-W1 to the fifth power input wire 82U4-V4 are joined to the first wire-connecting terminal 98C to the fifth wire-connecting terminal 98B2, respectively, in the wire connection process. The leading end 82A and the winding 70 ⊘ the trailing end 82B of the winding 70 are joined to the sixth wire-connecting terminal 98A2.

The first connecting section C1 of the first power input wire 82V1-W1, like in the first embodiment, engages first wire-connecting terminal 98C. The first power input wire 82V1-W1 is joined to the first wire-connecting terminal 98C using fusing techniques. In the same way, each of the second power input wire 82U2-V2 to the fifth power input wire 82U4-V4 is joined to a corresponding one of the wire-connecting terminals 98.

Like in the first embodiment, the leading end 82A and the trailing end 82B of the winding 70 are fitted in the sixth wire-connecting terminal 98A2 and then joined together by fusing techniques to form the joint 90. This completes the sixth power input wire 82W4-U1 and also achieves the electrical connection of the sixth power input wire 82W4-U1 to the sixth wire-connecting terminal 98A2.

Fabrication Process

The fabrication process in the third embodiment is substantially identical with that in the first embodiment. The rotating electrical machine 10 (see FIG. 1) in the third embodiment is, therefore, fabricated in the above-described production method.

Structure of Winding

Each of the power input wires 82 extends outside the core segments 56 over an adjacent two of the teeth 54 disposed therebetween. Each of the first direction-oriented connecting wires extends outside the core segments 56 over 2×2 of the teeth 54 disposed therebetween. Each of the second direction-oriented connecting wires extends outside the core segments 56 over an adjacent two of the teeth 54 disposed therebetween.

The winding 70 is made of a single continuous wire. One(s) of the power input wires 82 has the joint 90 connecting the ends of the winding 70 together. Each of the power input wires 82 connects with one of the wire-connecting terminals 98.

Operation and Beneficial Advantages

Portions of the structure and the production method in the third embodiment which are identical with those in the first embodiment offer substantially the same beneficial advantages as those in the first embodiment.

In the wire winding process in the third embodiment, the nozzle 120 is, as can be seen in FIG. 16, moved in the first circumferential direction R1 to wind the wire around the teeth 54 for two of the U-phase, the V-phase, and the W-phase, while the nozzle 120 is moved in the second circumferential direction R2 to wind the wire around the teeth 54 for a remaining one of the U-phase, the V-phase, and the W-phase. This completes all the coils 78. This winding way enables the winding 70 to be made by winding a continuous wire around the teeth 54, thereby improving the productivity of the winding 70.

The power input wires 82 are arranged on the first axial side Z2 of the core 50. The coil-to-coil connecting wires 84 are also arranged on the first axial side Z2 of the core 50. This enables the volume of space in the rotating electrical machine 10 on the second axial side Z1 to be minimized.

Particularly, the rotating electrical machine 10 is designed in the form of an inner-rotor brushless motor in which the teeth 54 extend radially inward. The structure in the third embodiment is capable of reducing the size of the inner-rotor brushless motor, enhancing output power therefrom, producing it at low cost.

Each of the power input wires 82, as described above, extends over an interval in which there are an adjacent two of the teeth 54. This results in increased intervals between the ends of each of the power input wires 82 and between the ends of each of the coil-to-coil connecting wires 84, thereby minimizing a risk of intricate tangling of the coil-to-coil connecting wires 84 or the power input wires 82.

Each of the coil-to-coil connecting wires 84 extends outside the core segments 56 over an adjacent two or 2×2 of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Modifications

Modifications of the third embodiment will be described below.

The winding shaping process is, as described above, executed after the wire-connecting terminals 98 are attached to the core 50, but may alternatively be initiated before the wire-connecting terminals 98 are fabricated on the core 50. In this case, the wire connection process is designed to install the wire-connecting terminals 98 on the core 50, after which the power input wires 82 are joined to the wire-connecting terminals 98.

The stator 20 is of an inner-rotor type in which the teeth 54 extend radially inward in the core 50, but may alternatively be designed to be of an outer-rotor type in which the teeth 54 extend radially outward from the core 50.

The stator 20 in the third embodiment is designed, as an example, to have the coils 78 which are in the m-series-connected-coil and n-parallel-connected-coil delta configuration where m is a natural number of two or more, and n is a natural number, specifically, in a two-series-connected-coil and two-parallel-connected-coil delta configuration, but however, the production method of the stator 20 in the third embodiment may be used with all types of three-phase brushless motor in which each of the number of the slots formed in the core 50, the number of the teeth 54, and the number of the coils 78 is twelve or more that is a multiple of six. For instance, the number of the slots, the number of the teeth 54, and the number of the coils 78 may be selected to be 12 (i.e., m=2 and n=2), 18 (i.e., m=2 and n=3 or m=3 and n=2), 24 (i.e., m=4 and n=2 or m=2 and n=4), 30 (i.e., m=2 and n=5 or m=5 and n=2), 36 (i.e., m=2 and n=6, m=3 and n=4, m=4 and n=3, or m=6 and n=2) . . . .

The plurality of wire-connecting terminals 98 in the third embodiment are, unlike the first embodiment, designed to include the first wire-connecting terminal 98C to the sixth wire-connecting terminal 98A2, but however, may alternatively, like in the first embodiment, include the first wire-connecting terminal 98C to the third wire-connecting terminal 98A. In this case, the fourth connecting section C2 to the sixth connecting section A2 are joined to the first wire-connecting terminal 98C to the third wire-connecting terminal 98A, respectively, along with the first connecting section C1 to the third connecting section A1.

The structure or production method in the third embodiment may be modified in the same manner as that in the first embodiment.

In the wire winding process in the third embodiment, of the U-phase coils U1 to U4, the V-phase coils V1 to V4, and the W-phase coils W1 to W4, only the V-phase coils V1 to V4 are fabricated by moving the nozzle 120 in the second circumferential direction R2 of the core 50, but however, the U-phase coils U1 to U4 or the W-phase coils W1 to W4 may alternatively be fabricated by moving the nozzle 120 in the second circumferential direction R2 of the core 50. This also enables a continuous wire to be wound around the teeth 54 to form the winding 70, thereby improving the productivity of the rotating electrical machine 10.

Production Method of Rotating Electrical Machine in the Fourth Embodiment

The production method of the rotating electrical machine 10 in the fourth embodiment will be described below.

The production method of the rotating electrical machine 10 in the fourth embodiment is different in the wire winding process from that in the third embodiment in the following way.

Core Setting Process

FIG. 18 is a view which illustrates the core setting process in the fourth embodiment. The core setting process in the fourth embodiment is, as can be seen in FIG. 18, designed to have the core segments 56 retained by the temporary joining runners 106 formed integrally with the insulators 62. Each of the temporary joining runners 106 includes bars which extend from the surfaces of the core segments 56 which face away from the teeth 54 and are joined together using a long linear bar. The core segments 56 are arranged to have the teeth 54 whose outer ends are arrayed linearly in connection with the temporary joining runners 106.

The fourth embodiment uses two nozzles 120: the first nozzle 122 and the second nozzle 124. The first nozzle 122 is arranged to face one of the core segments 56 which is disposed on the end of one of the temporary joining runners 106. The winding of wire around the teeth 54 is, as described later in detail, achieved by moving the first nozzle 122 to sequentially face the teeth 54 secured to the temporary joining runners 106.

The second nozzle 124 is arranged to face one of the core segments 56 which is located at an interval equivalent to half the total number of the core segments 56 away from one of the core segments 56 which is arranged on the end of the one of the temporary joining runners 106. Similar to the first nozzle 122, the winding of wire around the teeth 54 is, as described later in detail, achieved by moving the second nozzle 124 to sequentially face the teeth 54 secured to the temporary joining runners 106.

Wire Winding Process

The wire winding process in the fourth embodiment, as can be seen in FIG. 18, uses the first nozzle 122 and the second nozzle 124 to wind two continuous wires: the first wire 72 and the second wire 74 sequentially around the teeth 54 in a double nozzle manner. FIG. 19 is a diagram which demonstrates the wire winding process in the fourth embodiment. Table 4 shows an operation schedule showing a sequence of wire-winding steps in the wire winding process in the fourth embodiment.

In the wire winding process, the first wire 72 and the second wire 74 are wound around the teeth 54 in a sequence of first to sixth steps. In the drawings, numbers 1 to 6 with circles denote the order of formation of the coils 78.

First Step-1

In the first step, the first nozzle 122 (see FIG. 18) is used to wind the first wire 72 from the first axial side Z2 of the core 50 around the first tooth 54U1 in a clockwise direction, as viewed in the axial direction of the first tooth 54U1, to form the first coil 78U1 with an integral number of turns.

Afterwards, the first wire 72 is extended toward the fourth coil 78U2 in the first circumferential direction R1 on the first axial side Z2 to form the first coil-to-coil connecting wire 84U1-U2.

First Step-2

Similarly, in the first step, the second nozzle 124 (see FIG. 18) is used to wind the second wire 74 from the first axial side Z2 of the core 50 around the seventh tooth 54U3 in the clockwise direction, as viewed in the axial direction of the seventh tooth 54U3, to form the seventh coil 78U3 with an integral number of turns.

Afterwards, the second wire 74 is extended toward the tenth coil 78U4 in the first circumferential direction R1 on the first axial side Z2 to form the fourth coil-to-coil connecting wire 84U3-U4.

Second Step-1

In the second step, the first nozzle 122 (see FIG. 18) is used to wind the first wire 72 from the first axial side Z2 of the core 50 around the fourth tooth 54U2 in the clockwise direction, as viewed in the axial direction of the fourth tooth 54U2, to form the fourth coil 78U2 with an integral number of turns. After completion of the fourth coil 78U2, the first wire 72 is directed or led to the first axial side Z2 of the core 50.

Afterwards, the first wire 72 is extended toward the fifth coil 78V2 in the first circumferential direction R1 on the first axial side Z2 to form the second power input wire 82U2-V2. The second power input wire 82U2-V2 is, therefore, made of the first wire 72 continuing from the fourth coil 78U2.

Second Step-2

Similarly, in the second step, the second nozzle 124 (see FIG. 18) is used to wind the second wire 74 from the first axial side Z2 of the core 50 around the tenth tooth 54U4 in the clockwise direction, as viewed in the axial direction of the tenth tooth 54U4, to form the tenth coil 78U4 with an integral number of turns. After completion of the tenth coil 78U4, the second wire 74 is directed or led to the first axial side Z2 of the core 50.

Afterwards, the second wire 74 is extended toward the eleventh coil 78V4 in the first circumferential direction R1 on the first axial side Z2 to form the fifth power input wire 82U4-V4. The fifth power input wire 82U4-V4 is, therefore, made of the second wire 74 continuing from the tenth coil 78U4.

Third Step-1

In the third step, the first nozzle 122 (see FIG. 18) is used to wind the first wire 72 from the first axial side Z2 of the core 50 around the fifth tooth 54V2 in the clockwise direction, as viewed in the axial direction of the fifth tooth 54V2, to form the fifth coil 78V2 with an integral number of turns.

Afterwards, the first wire 72 is extended toward the second coil 78V1 in the second circumferential direction R2 on the first axial side Z2 to form the second coil-to-coil connecting wire 84V2-V1.

Third Step-2

Similarly, in the third step, the second nozzle 124 (see FIG. 18) is used to wind the second wire 74 from the first axial side Z2 of the core 50 around the eleventh tooth 54V4 in the clockwise direction, as viewed in the axial direction of the tenth tooth 54U4, to form the eleventh coil 78V4 with an integral number of turns.

Afterwards, the second wire 74 is extended toward the eighth coil 78V3 in the second circumferential direction R2 on the first axial side Z2 to form the fifth coil-to-coil connecting wire 84V4-V3.

Fourth Step-1

In the fourth step, the first nozzle 122 (see FIG. 18) is used to wind the first wire 72 from the first axial side Z2 of the core 50 around the second tooth 54V1 in the clockwise direction, as viewed in the axial direction of the second tooth 54V1, to form the second coil 78V1 with an integral number of turns. After completion of the second coil 78V1, the first wire 72 is directed or led to the first axial side Z2 of the core 50.

Afterwards, the first wire 72 is extended toward the third coil 78W1 in the first circumferential direction R1 on the first axial side Z2 to form the first power input wire 82V1-W1. The first power input wire 82V1-W1 is, therefore, made of the first wire 72 continuing from the second coil 78V1.

Fourth Step-2

Similarly, in the fourth step, the second nozzle 124 (see FIG. 18) is used to wind the second wire 74 from the first axial side Z2 of the core 50 around the eighth tooth 54V3 in the clockwise direction, as viewed in the axial direction of the eighth tooth 54V3, to form the eighth coil 78V3 with an integral number of turns. After completion of the eighth coil 78V3, the second wire 74 is directed or led to the first axial side Z2 of the core 50.

Afterwards, the second wire 74 is extended toward the ninth coil 78W3 in the first circumferential direction R1 on the first axial side Z2 to form the fourth power input wire 82V3-W3. The fourth power input wire 82V3-W3 is, therefore, made of the second wire 74 continuing from the eighth coil 78V3.

Fifth Step-1

In the fifth step, the first nozzle 122 (see FIG. 18) is used to wind the first wire 72 from the first axial side Z2 of the core 50 around the third tooth 54W1 in the clockwise direction, as viewed in the axial direction of the third tooth 54W1, to form the third coil 78W1 with an integral number of turns.

Afterwards, the first wire 72 is extended toward the sixth coil 78W2 in the first circumferential direction R1 on the first axial side Z2 to form the third coil-to-coil connecting wire 84W1-W2.

Fifth Step-2

Similarly, in the fifth step, the second nozzle 124 (see FIG. 18) is used to wind the second wire 74 from the first axial side Z2 of the core 50 around the ninth tooth 54W3 in the clockwise direction, as viewed in the axial direction of the ninth tooth 54W3, to form the ninth coil 78W3 with an integral number of turns.

Afterwards, the second wire 74 is extended toward the twelfth coil 78W4 in the first circumferential direction R1 on the first axial side Z2 to form the sixth coil-to-coil connecting wire 84W3-W4.

Sixth Step-1

In the sixth step, the first nozzle 122 (see FIG. 18) is used to wind the first wire 72 from the first axial side Z2 of the core 50 around the sixth tooth 54W2 in the clockwise direction, as viewed in the axial direction of the sixth tooth 54W2, to form the sixth coil 78W2 with an integral number of turns. After completion of the sixth coil 78W2, the first wire 72 is directed or led to the first axial side Z2 of the core 50.

Afterwards, the first wire 72 is extended toward the leading end 82E of the second wire 74 in the first circumferential direction R1 on the first axial side Z2. The first joint 92 is then formed in the wire connection process, as will be described later in detail, to complete the third power input wire 82W2-U3.

Sixth Step-2

Similarly, in the sixth step, the second nozzle 124 (see FIG. 18) is used to wind the second wire 74 from the first axial side Z2 of the core 50 around the twelfth tooth 54W4 in the clockwise direction, as viewed in the axial direction of the twelfth tooth 54W4, to form the twelfth coil 78W4 with an integral number of turns. After completion of the twelfth coil 78W4, the second wire 74 is directed or led to the first axial side Z2 of the core 50.

Afterwards, the second wire 74 is extended toward the leading end 82C of the first wire 72 in the first circumferential direction R1 on the first axial side Z2. The second joint 94 is then formed in the wire connection process, as will be described later in detail, to complete the sixth power input wire 82W4-U1.

The first joint 92 and the second joint 94 are completed, as described above, thereby creating a single continuous wire using the first wire 72 and the second wire 74 to finish the winding 70.

TABLE 4

| STEP | CONTENTS | | Wire extracting direction (axial direction) | Wiring direction (circumferential direction) |
|---|---|---|---|---|
| 1 | Form 1$^{st}$ coil U1 Create 1$^{st}$ coil-to-coil connecting wire U1-U2 | Form 7$^{th}$ coil U3 Create 4$^{th}$ coil-to-coil connecting wire U3-U4 | 1$^{st}$ direction | 1$^{st}$ direction |

TABLE 4-continued

| STEP | CONTENTS | | Wire extracting direction (axial direction) | Wiring direction (circumferential direction) |
|------|----------|--|---------------------------------------------|----------------------------------------------|
| 2 | Form 4$^{th}$ coil U2<br>Create 2$^{nd}$ power input wire U2-V2 | Form 10$^{th}$ coil U4<br>Create 5$^{th}$ power input wire U4-V4 | 1$^{st}$ direction | 1$^{st}$ direction |
| 3 | Form 5$^{th}$ coil V2<br>Create 2$^{nd}$ coil-to-coil connecting wire V2-V1 | Form 11$^{th}$ coil V4<br>Create 5$^{th}$ coil-to-coil connecting wire V4-V3 | 1$^{st}$ direction | 2$^{nd}$ direction |
| 4 | Form 2$^{nd}$ coil V1<br>Create 1$^{st}$ power input wire V1-W1 | Form 8$^{th}$ coil V3<br>Create 4$^{th}$ power input wire V3-W3 | 1$^{st}$ direction | 1$^{st}$ direction |
| 5 | Form 3$^{rd}$ coil W1<br>Create 3$^{rd}$ coil-to-coil connecting wire W1-W2 | Form 9$^{th}$ coil W3<br>Create 6$^{th}$ coil-to-coil connecting wire W3-W4 | 1$^{st}$ direction | 1$^{st}$ direction |
| 6 | Form 6$^{th}$ coil W2<br>Create 3$^{rd}$ power input wire W2-U3<br>Joining leading end of 2$^{nd}$ wire and trailing end of 1$^{st}$ wire to complete 3$^{rd}$ power input wire W2-U3 | Form 12$^{th}$ coil W4<br>Create 6$^{th}$ power input wire W4-U1<br>Joining leading end of 1$^{st}$ wire and trailing end of 2$^{nd}$ wire to complete 6$^{th}$ power input wire W4-U1 | 1$^{st}$ direction | 1$^{st}$ direction |

In the fourth embodiment, the winding 70 is produced in the two-series-connected-coil and two-parallel-connected-coil delta configuration in the way described above. FIG. 20 illustrates the layout of connections of the coils 78 achieved in the wire winding process in the fourth embodiment. The wire winding process in the fourth embodiment creates substantially the same layout of connections of the coils 78 as in the third embodiment except for use of the first joint 92 and the second joint 94.

Structure of Winding

Each of the power input wires 82 extends outside the core segments 56 over an adjacent two of the teeth 54 disposed therebetween. Each of the first direction-oriented connecting wires extends outside the core segments 56 over 2×2 teeth 54 disposed therebetween. Each of the second direction-oriented connecting wires extends outside the core segments 56 over an adjacent two of the teeth 54 disposed therebetween.

Each of the first wire 72 and the second wire 74 is made of a single continuous wire. One of the power input wires 82 is equipped with a joint between the trailing end 82F of the second wire 74 and the leading end 82C of the first wire 72. One of the power input wires 82 is equipped with a joint between the trailing end 82D of the first wire 72 and the leading end 82E of the second wire 74. Each of the power input wires 82 connects with a corresponding one of the wire-connecting terminals 98.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The sixth power input wire 82W4-U1 includes a joint between the leading end 82A and the trailing end 82B of the winding 70.

The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the first axial side Z2 of the core 50.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are made of a continuous wire. The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The third power input wire 82W2-U3 includes the first joint 92 which connects between the trailing end 82D of the first wire 72 and the leading end 82E of the second wire 74. The sixth power input wire 82W4-U1 includes the second joint 94 which connects between the trailing end 82F of the second wire 74 and the leading end 82C of the first wire 72.

In the wire winding process in the fourth embodiment, of the coils 78, the U-phase coils U1 to U4 and W-phase coils W1 to W4 are fabricated by moving the first nozzle 122 and the second nozzle 124 in the first circumferential direction R1 of the core 50, while the V-phase coils V1 to V4 are fabricated by moving the first nozzle 122 and the second nozzle 124 in the second circumferential direction R2 of the core 50.

After completion of the wire winding process, the core segments 56 are cut from the temporary joining runners 106 and then connected together in an annular shape with the teeth 54 facing radially inward.

Winding Shaping Process

In the fourth embodiment, the wire-connecting terminals 98, like in the third embodiment, include the first wire-connecting terminal 98C, the second wire-connecting terminal 98B, the third wire-connecting terminal 98A, the fourth wire-connecting terminal 98C2, the fifth wire-connecting terminal 98B2, and the sixth wire-connecting terminal 98A2.

The winding shaping process, like in the third embodiment, works to move the first connecting section C1 of the first power input wire 82V1-W1 toward the first wire-connecting terminal 98C to complete the configuration of the first power input wire 82V1-W1. The first wire-connecting terminal 98C is, for example, in the shape of a hook. The first connecting section C1 engages the first wire-connecting terminal 98C.

Similarly, the winding shaping process works to move the second connecting section B1 of the second power input wire 82U2-V2 toward the second wire-connecting terminal 98B to complete the configuration of the second power input wire 82U2-V2. The second wire-connecting terminal 98B is, for example, in the shape of a hook. The second connecting section B1 engages the second wire-connecting terminal 98B.

Similarly, the third connecting section A2 of the third power input wire 82W2-U3 is moved toward the third wire-connecting terminal 98A to complete the configuration of the third power input wire 82W2-U3 in the wire connection process which will be described later in detail. The third wire-connecting terminal 98A is, for example, in the shape of a hook. The third connecting section A1 engages the third wire-connecting terminal 98A.

Similarly, the fourth power input wire 82V3-W3 is shaped or completed by moving the fourth connecting section C2 of the fourth power input wire 82V3-W3 toward the fourth wire-connecting terminal 98C2. The fourth wire-connecting terminal 98C2 is, for example, in the shape of a hook. The fourth connecting section C2 engages the fourth wire-connecting terminal 98C2.

Similarly, the fifth power input wire 82U4-V4 is shaped by moving the fifth connecting section B2 of the fifth power input wire 82U4-V4 toward the fifth wire-connecting terminal 98B2. The fifth wire-connecting terminal 98B2 is, for example, in the shape of a hook. The fifth connecting section B2 engages the fifth wire-connecting terminal 98B2.

Similarly, the wire connection process, as will be described later in detail, works to move the sixth connecting section A1 of the sixth power input wire 82W4-U1 toward the sixth wire-connecting terminal 98A2 to complete the configuration of the sixth power input wire 82W4-U1. The sixth wire-connecting terminal 98A2 is, for example, in the shape of a hook. The sixth connecting section A2 engages the sixth wire-connecting terminal 98A2.

Wire Connection Process

In the wire connection process, the first wire-connecting terminal 98C and the first connecting section C1 are joined together using, for example, fusing techniques. Similarly, the second wire-connecting terminal 98B and the second connecting section B1 are joined together using fusing techniques. The third wire-connecting terminal 98A and the third connecting section A1 are joined together using fusing techniques. The fourth wire-connecting terminal 98C2 and the fourth connecting section C2 are joined together using fusing techniques. The fifth wire-connecting terminal 98B2 and the fifth connecting section B2 are joined together using fusing techniques. The sixth wire-connecting terminal 98A2 and the sixth connecting section A2 are joined together using fusing techniques. In this way, the wire connection process works to join the first power input wire 82V1-W1, the second power input wire 82U2-V2, the fourth power input wire 82V3-W3, and the fifth power input wire 82U4-V4 to the first wire-connecting terminal 98C, the second wire-connecting terminal 98B, the fourth wire-connecting terminal 98C2, and the fifth wire-connecting terminal 98B2, respectively. The leading end 82E of the second wire 74 and the trailing end 82D of the first wire 72 are joined to the third wire-connecting terminal 98A. The leading end 82C of the first wire 72 and the trailing end 82F of the second wire 74 are joined to the sixth wire-connecting terminal 98A2.

The first connecting section C1 of the first power input wire 82V1-W1 engages the first wire-connecting terminal 98C. The first power input wire 82V1-W1 is joined to the first wire-connecting terminal 98C using fusing techniques. Similarly, the second power input wire 82U2-V2, the fourth power input wire 82V3-W3, and the fifth power input wire 82U4-V4 are joined to the second wire-connecting terminal 98B, the fourth wire-connecting terminal 98C2, and the fifth wire-connecting terminal 98B2 using fusing techniques.

The leading end 82E of the second wire 74 and the trailing end 82D of the first wire 72 engage the third wire-connecting terminal 98A and are joined together using fusing techniques. This completes the third power input wire 82W2-U3 and also achieve joint of the third power input wire 82W2-U3 to the third wire-connecting terminal 98A.

The leading end 82C of the first wire 72 and the trailing end 82F of the second wire 74 engage the sixth wire-connecting terminal 98A2 and are joined together using fusing techniques. This completes the sixth power input wire 82W4-U1 and also achieve joint of the sixth power input wire 82W4-U1 to the sixth wire-connecting terminal 98A2.

Fabrication Process

The fabrication process in the fourth embodiment is identical with that in the first embodiment. The rotating electrical machine 10 in the fourth embodiment is fabricated in the way described above. The arrangements of the rotating electrical machine 10 are identical with those in the third embodiment except for use of the first joint 92 and the second joint 94 instead of the joint 90 (see FIG. 17).

Operation and Beneficial Advantages

Portions of the structure and the production method in the fourth embodiment which are identical with those in the third embodiment offer substantially the same beneficial advantages as those in the third embodiment.

In the wire winding process in the fourth embodiment, the first nozzle 122 and the second nozzle 124 are, as can be seen in FIG. 19, moved in the first circumferential direction R1 to wind the wire around the teeth 54 for two of the U-phase, the V-phase, and the W-phase, while the first nozzle 122 and the second nozzle 124 are moved in the second circumferential direction R2 to wind the wire around the teeth 54 for a remaining one of the U-phase, the V-phase, and the W-phase. This completes all the coils 78. This winding way enables the winding 70 to be made by winding a continuous wire made up of the first wire 72 and the second wire 74 around the teeth 54, thereby improving the productivity of the winding 70.

Particularly, the rotating electrical machine 10 is designed in the form of an inner-rotor brushless motor in which the teeth 54 extend radially inward. The structure in the fourth embodiment is capable of reducing the size of the inner-rotor brushless motor, enhancing output power therefrom, producing it at low cost.

The power input wires 82 are arranged on the first axial side Z2 of the core 50. The coil-to-coil connecting wires 84 are also arranged on the first axial side Z2 of the core 50. This enables the volume of space in the rotating electrical machine 10 on the second axial side Z1 to be minimized.

Each of the power input wires 82, as described above, extends across an interval in which there are an adjacent two of the teeth 54. This results in sufficient intervals between the ends of each of the power input wires 82 and between the ends of each of the coil-to-coil connecting wires 84, thereby minimizing a risk of intricate tangling of the coil-to-coil connecting wires 84 or the power input wires 82.

Each of the coil-to-coil connecting wires 84 extends outside the core segments 56 over an adjacent two 2×2 of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

The fourth embodiment is, as described above, designed to use two nozzles: the first nozzle 122 and the second nozzle 124 to wind two continuous wires: the first wire 72 and the second wire 74 around the teeth 54 in the double-nozzle manner. This results in a decreased degree of work-load on the wire winding process that is half that required to wind a single continuous wire around the teeth 54 using the single nozzle 120 (see FIG. 4) in the third embodiment. This reduces a total production cost of the rotating electrical machine 10.

Modifications

Modifications of the fourth embodiment will be described below.

The stator 20 in the fourth embodiment is designed, as an example, to have the coils 78 which are in the m-series-connected-coil and n-parallel-connected-coil delta configu-ration where m is a natural number of two or more, specifi-cally, in a two-series-connected-coil and two-parallel-connected-coil delta configuration, but however, the production method of the stator 20 in the fourth embodiment may be used with all types of three-phase brushless motor in which n is a multiple of two, and each of the number of the slots formed in the core 50, the number of the teeth 54, and the number of the coils 78 is twelve or more that is a multiple of six. For instance, the number of the slots, the number of the teeth 54, and the number of the coils 78 may be selected to be 12 (i.e., m=2 and n=2), 18 (i.e., m=3 and n=2), 24 (i.e., m=4 and n=2 or m=2 and n=4), 30 (i.e., m=5 and n=2), 36 (i.e., m=2 and n=6, m=3 and n=4, or m=6 and n=2), . . . .

The winding device in this embodiment may alternatively designed as a double-flyer system instead of the double-nozzle system.

The temporary joining runners 108 illustrated in FIG. 21 may be used. The temporary joining runners 108 include bars which extend from the surfaces of the core segments 56 which face away from the teeth 54 and are joined together using an annular bar. The core segments 56 are, therefore, arranged in an annular shape to have outer ends of the teeth 54 which face the outer periphery of the core 50. The winding of the first wire 72 around the core segments 56 in the wire winding process is achieved by sequentially moving the first nozzle 122 from a first one of the core segments 56 to a second one of the core segments 56 which is arranged away from the first one in the first circumferential direction R1 of the annular assembly of the temporary joining runners 108. The winding of the second wire 74 around the core segments 56 in the wire winding process is achieved by sequentially moving the second nozzle 124 from a third one of the core segments 56 which is arranged at an interval of 180° away from the first core segment 56 to a fourth one of the core segments 56 which is located away from the third core segment 56 in the first circumferential direction R1 of the annular assembly of the temporary joining runners 108.

After the wire of the winding 70 is wound in the core 50, the teeth 54 are, like in the first embodiment, turned inside out to orient the outer ends radially inside the core 50.

This modification needs not necessarily be of a double-nozzle type, but may alternatively be designed to use the first flyer 112 and the second flyer 114 instead of the first nozzle 122 and the second nozzle 124. The first flyer 112 and the second flyer 114 are moved to wind the wire in the core 50 to complete the winding 70.

The jig 104 which is, as shown in FIG. 22, of a substan-tially oval shape may be used instead of the temporary joining runners 106. A double-flyer system may be used which is equipped with the first flyer 112 and the second flyer 114 instead of the first nozzle 122 and the second nozzle 124. The core segments 56 are joined together and arrayed in an annular shape with outer ends of the teeth 54 facing the outer periphery of the core 50. The winding of the first wire 72 around the core segments 56 of the core 50 in the wire winding process is achieved by moving the first flyer 112 in a circumferential direction of the jig 104 from a first one of the core segments 56 which is located at an end of a length of the jig 104. The winding of the second wire 74 around the core segments 56 of the core 50 is achieved by moving the second flyer 114 in the circumferential direction of the jig 104 from a second one of the core segments 56 which is located at the other end of the length of the jig 104.

In the above case, like in the modification of the first embodiment, after completion of the wire winding process, the core 50 is, as can be seen in FIG. 12, turned inside out to change the orientation of the teeth 54 by 180°. Specifi-cally, the core 50 is turned to extend the teeth 54 in the shape of a train and then curve them to change the state in FIG. 12 where the teeth 54 joined together in an annular shape have the outer ends facing outwardly of the core 50 to the state in FIG. 13 where the teeth 54 have the outer ends facing inwardly of the core 50, thereby completing the core 50 in state illustrated in FIG. 7.

The plurality of wire-connecting terminals 98 in the fourth embodiment are, unlike the first embodiment, designed to include the first wire-connecting terminal 98C to the sixth wire-connecting terminal 98A2, but however, may alternatively, like in the first embodiment, include the first wire-connecting terminal 98C to the third wire-connecting terminal 98A. In this case, the fourth connecting section C2 to the sixth connecting section A2 are joined to the first wire-connecting terminal 98C to the third wire-connecting terminal 98A, respectively, along with the first connecting section C1 to the third connecting section A1.

The structure or production method in the fourth embodi-ment may be modified in the same manner as that in the third embodiment.

In the wire winding process in the fourth embodiment, of the U-phase coils U1 to U4, the V-phase coils V1 to V4, and the W-phase coils W1 to W4, only the V-phase coils V1 to V4 are fabricated by moving the first nozzle 122 and the second nozzle 124 in the second circumferential direction R2 of the core 50, but however, the U-phase coils U1 to U4 or the W-phase coils W1 to W4 may alternatively be fabricated by moving the first nozzle 122 and the second nozzle 124 in the second circumferential direction R2 of the core 50. This also enables a continuous wire made up of the first wire 72 and the second wire 74 to be wound around the teeth 54 to form the winding 70, thereby improving the productivity of the rotating electrical machine 10.

Production Method of Rotating Electrical Machine in the Fifth Embodiment

The production method of the rotating electrical machine 10 in the fifth embodiment will be described below.

The production method of the rotating electrical machine 10 in the fifth embodiment is identical in the core setting process with the third embodiment, but different in the wire winding process from that in the third embodiment in the following way.

Wire Winding Process

The wire winding process in the fifth embodiment, like in the third embodiment, uses the single nozzle 120 (see FIG. 4) to wind a single continuous wire around the teeth 54 in a single-nozzle system to complete the winding 70. FIG. 23 is a diagram which represents the wire winding process in the fifth embodiment. Table 5 shows an operation schedule showing a sequence of wire-winding steps in the wire winding process in the fifth embodiment.

In the wire winding process in the fifth embodiment, the wire of the winding 70 is wound in a sequence of first to twelfth steps discussed below. In the drawings, numbers 1 to 12 within circles denote the order of formation of the coils 78.

First Step

In the first step, the wire of the winding 70 is wound from the first axial side Z2 of the core 50 around the first tooth 54U1 in a counterclockwise direction, as viewed in the axial direction of the first tooth 54U1, to form the first coil 78U1 with an integral number of turns.

Afterwards, the wire of the winding 70 is extended toward the fourth coil 78U2 in the first circumferential direction R1 on the first axial side Z2 to form the first coil-to-coil connecting wire 84U1-U2.

Second Step

In the second step, the wire of the winding 70 is wound from the first axial side Z2 of the core 50 around the fourth tooth 54U2 in the counterclockwise direction, as viewed in the axial direction of the fourth tooth 54U2, to form the fourth coil 78U2 with an integral number of turns. After completion of the fourth coil 78U2, the wire is directed or led to the first axial side Z2 of the core 50.

Afterwards, the wire of the winding 70 is extended from the second axial side Z1 to the first axial side Z2 and then returned back to an interval between the fourth coil 78U2 and the fifth coil 78V2 to complete the second power input wire 82U2-V2. The second power input wire 82U2-V2 is, therefore, made of wire continuing from the fourth coil 78U2.

Third Step

In the third step, the wire of the winding 70 is wound from the first axial side Z2 of the core 50 around the fifth tooth 54V2 in the counterclockwise direction, as viewed in the axial direction of the fifth tooth 54V2, to form the fifth coil 78V2 with an integral number of turns.

Afterwards, the wire of the winding 70 is extended toward the second coil 78V1 in the second circumferential direction R2 on the first axial side Z2 to form the second coil-to-coil connecting wire 84V2-V1.

Fourth Step

In the fourth step, the wire of the winding 70 is wound from the first axial side Z2 of the core 50 around the second tooth 54V1 in the counterclockwise direction, as viewed in the axial direction of the second tooth 54V1, to form the second coil 78V1 with an integral number of turns. After completion of the second coil 78V1, the wire is directed or led to the first axial side Z2 of the core 50.

Afterwards, the wire of the winding 70 is extended from the second axial side Z1 to the first axial side Z2 and then returned back to an interval between the second tooth 54V1 and the third tooth 54W1 to complete the first power input wire 82V1-W1. The first power input wire 82V1-W1 is, therefore, made of wire continuing from the second coil 78V1.

Fifth Step

In the fifth step, the wire of the winding 70 is wound from the first axial side Z2 of the core 50 around the third tooth

54W1 in the counterclockwise direction, as viewed in the axial direction of the third tooth 54W1, to form the third coil 78W1 with an integral number of turns.

Afterwards, the wire of the winding 70 is extended toward the sixth coil 78W2 in the first circumferential direction R1 on the first axial side Z2 to form the third coil-to-coil connecting wire 84W1-W2.

Sixth Step

In the sixth step, the wire of the winding 70 is wound from the first axial side Z2 of the core 50 around the sixth tooth 54W2 in the counterclockwise direction, as viewed in the axial direction of the sixth tooth 54W2, to form the sixth coil 78W2 with an integral number of turns. After completion of the sixth coil 78W2, the wire is directed or led to the first axial side Z2 of the core 50.

Afterwards, the wire of the winding 70 is extended from the second axial side Z1 to the first axial side Z2 and then returned back to an interval between the sixth coil 78W2 and the seventh coil 78U3 to complete the third power input wire 82W2-U3. The third power input wire 82W2-U3 is, therefore, made of wire continuing from the sixth coil 78W2.

Seventh Step

In the seventh step, the wire of the winding 70 is wound from the first axial side Z2 of the core 50 around the seventh tooth 54U3 in the counterclockwise direction, as viewed in the axial direction of the seventh tooth 54U3, to form the seventh coil 78U3 with an integral number of turns.

Afterwards, the wire of the winding 70 is extended toward the tenth coil 78U4 in the first circumferential direction R1 on the first axial side Z2 to form the fourth coil-to-coil connecting wire 84U3-U4.

Eighth Step

In the eighth step, the wire of the winding 70 is wound from the first axial side Z2 of the core 50 around the tenth tooth 54U4 in the counterclockwise direction, as viewed in the axial direction of the tenth tooth 54U4, to form the tenth coil 78U4 with an integral number of turns. After completion of the tenth coil 78U4, the wire is directed or led to the first axial side Z2 of the core 50.

Afterwards, the wire of the winding 70 is return from the first axial side Z2 back to an interval between the tenth tooth 54U4 and the eleventh tooth 54V4 to complete the fifth power input wire 82U4-V4. The fifth power input wire 82U4-V4 is, therefore, made of wire continuing from the tenth coil 78U4.

Ninth Step

In the ninth step, the wire of the winding 70 is wound from the first axial side Z2 of the core 50 around the eleventh tooth 54V4 in the counterclockwise direction, as viewed in the axial direction of the eleventh tooth 54V4, to form the eleventh coil 78V4 with an integral number of turns.

Afterwards, the wire of the winding 70 is extended toward the eighth coil 78V3 in the second circumferential direction R2 on the first axial side Z2 to create the fifth coil-to-coil connecting wire 84V4-V3.

Tenth Step

In the tenth step, the wire of the winding 70 is wound from the first axial side Z2 of the core 50 around the eighth tooth 54V3 in the counterclockwise direction, as viewed in the axial direction of the eighth tooth 54V3, to create the eighth coil 78V3 with an integral number of turns. After completion of the eighth coil 78V3, the wire is directed or led to the first axial side Z2 of the core 50.

Afterwards, the wire of the winding 70 is extended from the second axial side Z1 to the first axial side Z2 and then returned back to an interval between the eighth coil 78V3 and the ninth coil 78W3 to complete the fourth power input wire 82V3-W3. The fourth power input wire 82V3-W3 is, therefore, made of wire continuing from the eighth coil 78V3.

Eleventh Step

In the eleventh step, the wire of the winding 70 is wound from the first axial side Z2 of the core 50 around the ninth tooth 54W3 in the counterclockwise direction, as viewed in the axial direction of the ninth tooth 54W3, to create the ninth coil 78W3 with an integral number of turns.

Afterwards, the wire of the winding 70 is extended toward the twelfth coil 78W4 in the first circumferential direction R1 on the first axial side Z2 to create the sixth coil-to-coil connecting wire 84W3-W4.

Twelfth Step

In the twelfth step, the wire of the winding 70 is wound from the first axial side Z2 of the core 50 around the twelfth tooth 54W4 in the counterclockwise direction, as viewed in the axial direction of the twelfth tooth 54W4, to create the twelfth coil 78W4 with an integral number of turns. After completion of the twelfth coil 78W4, the wire is directed or led to the first axial side Z2 of the core 50.

Afterwards, the wire is extended toward the leading end 82A of the winding 70 on the first axial side Z2 of the core 50 to form the sixth power input wire 82W4-U1 in the wire connection process.

TABLE 5

| STEP | CONTENTS | Wire extracting direction (axial direction) | Wiring direction (circumferential direction) |
|---|---|---|---|
| 1 | Form $1^{st}$ coil U1 Create $1^{st}$ coil-to-coil connecting wire U1-U2 | $1^{st}$ direction | $1^{st}$ direction |
| 2 | Form $4^{th}$ coil U2 Create $2^{nd}$ power input wire U2-V2 | $1^{st}$ direction | $1^{st}$ direction |
| 3 | Form $5^{th}$ coil V2 Create $2^{nd}$ coil-to-coil connecting wire V2-V1 | $1^{st}$ direction | $2^{nd}$ direction |
| 4 | Form $2^{nd}$ coil V1 Create $1^{st}$ power input wire V1-W1 | $1^{st}$ direction | $1^{st}$ direction |
| 5 | Form $3^{rd}$ coil W1 Create $3^{rd}$ coil-to-coil connecting wire W1-W2 | $1^{st}$ direction | $1^{st}$ direction |
| 6 | Form $6^{th}$ coil W2 Create $3^{rd}$ power input wire W2-U3 | $1^{st}$ direction | $1^{st}$ direction |
| 7 | Form $7^{th}$ coil U3 Create $4^{th}$ coil-to-coil connecting wire U3-U4 | $1^{st}$ direction | $1^{st}$ direction |
| 8 | Form $10^{th}$ coil U4 Create $5^{th}$ power input wire U4-V4 | $1^{st}$ direction | $1^{st}$ direction |
| 9 | Form $11^{th}$ coil V4 Create $5^{th}$ coil-to-coil connecting wire V4-V3 | $1^{st}$ direction | $2^{nd}$ direction |
| 10 | Form $8^{th}$ coil V3 Create $4^{th}$ power input wire V3-W3 | $1^{st}$ direction | $1^{st}$ direction |
| 11 | Form $9^{th}$ coil W3 Create $6^{th}$ coil-to-coil connecting wire W3-W4 | $1^{st}$ direction | $1^{st}$ direction |
| 12 | Form $12^{th}$ coil W4 Create $6^{th}$ power input wire W4-U1 Joining ends of leading and trailing ends of wire to complete $6^{th}$ power input wire W4-U1 | $1^{st}$ direction | $1^{st}$ direction |

In the wire winding process in the fifth embodiment, of the coils 78, the U-phase coils U1 to U4 and the W-phase coils W1 to W4 are, as can be seen from the above discussion, completed by moving the nozzle 120 in the first circumferential direction R1 of the core 50, while the V-phase coils V1 to V4 are completed by moving the nozzle 120 in the second circumferential direction R2 of the core 50.

After completion of the wire winding process, the core segments 56 are cut from the temporary joining runners 106 and then connected together in an annular shape with the teeth 54 facing radially inward.

Winding Shaping Process, Wire Connection Process, and Fabrication Process

The winding shaping process, the wire connection process, and the fabrication process in the fifth embodiment are identical with those in the third embodiment. The rotating electrical machine 10 (see FIG. 1) is fabricated in the manner described above in the fifth embodiment.

Each of the power input wires 82 is extended from a clearance between an adjacent two of the teeth 54. Each of the first direction-oriented connecting wires, as described above, extends over an interval in which there are an adjacent two of the teeth 54. Each of the second direction-oriented connecting wires extends over an interval in which there are 2×2 of the teeth 54 disposed therebetween.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The sixth power input wire 82W4-U1 is equipped with the joint 90 which achieves joint between the leading end 82A and the trailing end 82B of the winding 70.

The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the first axial side Z2 of the core 50.

Portions of the structure and the production method in the fifth embodiment which are identical with those in the third embodiment offer substantially the same beneficial advantages as those in the third embodiment.

The stator 20 in the fifth embodiment is designed, as an example, to have the coils 78 which are in the m-series-connected-coil and n-parallel-connected-coil delta configuration where m is a natural number of two or more, and n is a natural number, specifically, in a two-series-connected-coil and two-parallel-connected-coil delta configuration, but however, the production method of the stator 20 in the fifth embodiment may be used with all types of three-phase brushless motor in which each of the number of the slots formed in the core 50, the number of the teeth 54 and the number of the coils 78 is twelve or more that is a multiple of six. For instance, the number of the slots, the number of the teeth 54, and the number of the coils 78 may be selected to be 12 (i.e., m=2 and n=2), 18 (i.e., m=2 and n=3 or m=3 and n=2), 24 (i.e., m=4 and n=2 or m=2 and n=4), 30 (i.e., m=2 and n=5 or m=5 and n=2), 36 (i.e., m=2 and n=6, m=3 and n=4, m=4 and n=3, or m=6 and n=2) . . . .

In the wire winding process in the fifth embodiment, the nozzle 120 is, as can be seen in FIG. 23, moved in the first circumferential direction R1 to wind the wire around the teeth 54 for two of the U-phase, the V-phase, and the W-phase, while the nozzle 120 is moved in the second circumferential direction R2 to wind the wire around the teeth 54 for a remaining one of the U-phase, the V-phase, and the W-phase. This completes all the coils 78. This winding way enables the winding 70 to be made by winding a single continuous wire around the teeth 54, thereby improving the productivity of the winding 70.

The power input wires 82 are arranged on the first axial side Z2 of the core 50. The coil-to-coil connecting wires 84 are also arranged on the first axial side Z2 of the core 50. This enables the volume of space in the rotating electrical machine 10 on the second axial side Z1 to be reduced.

Particularly, the rotating electrical machine 10 is designed in the form of an inner-rotor brushless motor in which the teeth 54 extend radially inward. The structure in the fifth embodiment is capable of reducing the size of the inner-rotor brushless motor, enhancing output power therefrom, producing it at low cost.

Each of the power input wires 82 is, as described above, extended from a clearance between an adjacent two of the teeth 54. This results in an increased interval between the ends of an adjacent two of the coil-to-coil connecting wires 84 and also results in a decreased interval between the ends of each of the power input wires 82, thereby minimizing a risk of intricate tangling of the coil-to-coil connecting wires 84 or the power input wires 82.

Each of the coil-to-coil connecting wires 84 extends outside the core segments 56 over an adjacent two or 2×2 of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Modifications

Portions of the structure and method in the fifth embodiment which are identical with those in the third embodiment may be modified in the same manner as in the third embodiment.

In the wire winding process in the fifth embodiment, the nozzle 120 is, as described above, moved in the second circumferential direction R2 to wind the wire around the teeth 54 to create the V-phase coils V1 to V4, but however, the U-phase coils U1 to U4 or the W-phase coils W1 to W4 may alternatively be created by moving the nozzle 120 in the second circumferential direction R2 of the core 50. This winding way enables the winding 70 to be made by winding a single continuous wire around the teeth 54, thereby improving the productivity of the winding 70.

Production Method of Rotating Electrical Machine in the Sixth Embodiment

The production method of the rotating electrical machine 10 in the sixth embodiment will be described below.

The production method of the rotating electrical machine 10 in the sixth embodiment is different in the core setting process and the wire winding process from that in the third embodiment in the following ways.

Core Setting Process

FIG. 24 is a view which illustrates the core setting process in the sixth embodiment. In the core setting process in the sixth embodiment, the core segments 56 are, as can be seen in FIG. 24, retained by the temporary joining runners 106 formed integrally with the insulators 62. Each of the temporary joining runners 106 includes bars which extend from the surfaces of the core segments 56 which face away from the teeth 54 and are joined together in line using a long linear bar with the teeth 54 of the core segments 56 having outer ends arranged linearly.

The sixth embodiment uses two nozzles 120: the first nozzle 122 and the second nozzle 124. The first nozzle 122 is arranged to face one of the core segments 56 which is disposed on the end of one of the temporary joining runners 106. The winding of wire around the teeth 54 is, as described later in detail, achieved by moving the first nozzle 122 to sequentially face the teeth 54 secured to the temporary joining runners 106.

The second nozzle 124 is arranged to face one of the core segments 56 which is located at an interval equivalent to half the total number of the core segments 56 away from one of the core segments 56 which is arranged on the end of the one of the temporary joining runners 106. Similar to the first nozzle 122, the winding of wire around the teeth 54 is, as described later in detail, achieved by moving the second nozzle 124 to sequentially face the teeth 54 secured to the temporary joining runners 106.

Wire Winding Process

The wire winding process in the sixth embodiment, as can be seen in FIG. 24, uses the first nozzle 122 and the second nozzle 124 to wind two continuous wires: the first wire 72 and the second wire 74 sequentially around the teeth 54 in a double nozzle manner. FIG. 25 is a diagram which demonstrates the wire winding process in the sixth embodiment. Table 6 shows an operation schedule showing a sequence of wire-winding steps in the wire winding process in the sixth embodiment.

In the wire winding process in the sixth embodiment, the first wire 72 and the second wire 74 are wound around the teeth 54 in a sequence of first to sixth steps. In the drawings, numbers 1 to 6 with circles denote the order of formation of the coils 78.

First Step-1

In the first step, the first nozzle 122 (see FIG. 24) is used to wind the first wire 72 from the first axial side Z2 of the core 50 around the first tooth 54U1 in the counterclockwise direction, as viewed in the axial direction of the first tooth 54U1, to form the first coil 78U1 with an integral number of turns.

Afterwards, the first wire 72 is extended toward the fourth coil 78U2 in the first circumferential direction R1 on the first axial side Z2 to form the first coil-to-coil connecting wire 84U1-U2.

First Step-2

Similarly, in the first step, the second nozzle 124 (see FIG. 24) is used to wind the second wire 74 from the first axial side Z2 of the core 50 around the seventh tooth 54U3 in the counterclockwise direction, as viewed in the axial direction of the seventh tooth 54U3, to form the seventh coil 78U3 with an integral number of turns.

Afterwards, the second wire 74 is extended toward the tenth coil 78U4 in the first circumferential direction R1 on the first axial side Z2 to complete the fourth coil-to-coil connecting wire 84U3-U4.

Second Step-1

In the second step, the first nozzle 122 (see FIG. 24) is used to wind the first wire 72 from the first axial side Z2 of the core 50 around the fourth tooth 54U2 in the counterclockwise direction, as viewed in the axial direction of the fourth tooth 54U2, to form the fourth coil 78U2 with an integral number of turns. After completion of the fourth coil 78U2, the first wire 72 is directed or led to the first axial side Z2 of the core 50.

Afterwards, the first wire 72 is extended from the second axial side Z1 to the first axial side Z2 and then returned back to an interval between the fourth coil 78U2 and the fifth coil 78V2 to complete the second power input wire 82U2-V2.

The second power input wire 82U2-V2 is, therefore, made of wire continuing from the fourth coil 78U2.

Second Step-2

Similarly, in the second step, the second nozzle 124 (see FIG. 24) is used to wind the second wire 74 from the first axial side Z2 of the core 50 around the tenth tooth 54U4 in the counterclockwise direction, as viewed in the axial direction of the tenth tooth 54U4, to form the tenth coil 78U4 with an integral number of turns. After completion of the tenth coil 78U4, the second wire 74 is directed or led to the first axial side Z2 of the core 50.

Afterwards, the second wire 74 is extended from the second axial side Z1 to the first axial side Z2 and then returned back to an interval between the tenth tooth 54U4 and the eleventh tooth 54V4 to complete the fifth power input wire 82U4-V4. The fifth power input wire 82U4-V4 is, therefore, made of wire continuing from the tenth coil 78U4.

Third Step-1

In the third step, the first nozzle 122 (see FIG. 24) is used to wind the first wire 72 from the first axial side Z2 of the core 50 around the fifth tooth 54V2 in the counterclockwise direction, as viewed in the axial direction of the fifth tooth 54V2, to form the fifth coil 78V2 with an integral number of turns.

Afterwards, the first wire 72 is extended toward the second coil 78V1 in the second circumferential direction R2 on the first axial side Z2 to complete the second coil-to-coil connecting wire 84V2-V1.

Third Step-2

Similarly, in the third step, the second nozzle 124 (see FIG. 24) is used to wind the second wire 74 from the first axial side Z2 of the core 50 around the eleventh tooth 54V4 in the counterclockwise direction, as viewed in the axial direction of the eleventh tooth 54V4, to form the eleventh coil 78V4 with an integral number of turns.

Afterwards, the second wire 74 is extended toward the eighth coil 78V3 in the second circumferential direction R2 on the first axial side Z2 to create the fifth coil-to-coil connecting wire 84V4-V3.

Fourth Step-1

In the fourth step, the first nozzle 122 (see FIG. 24) is used to wind the first wire 72 from the first axial side Z2 of the core 50 around the second tooth 54V1 in the counterclockwise direction, as viewed in the axial direction of the second tooth 54V1, to form the second coil 78V1 with an integral number of turns. After completion of the second coil 78V1, the first wire 72 is directed or led to the first axial side Z2 of the core 50.

Afterwards, the first wire 72 is extended from the second axial side Z1 to the first axial side Z2 and then returned back to an interval between the second coil 78V1 and the third coil 78W1 to complete the first power input wire 82V1-W1. The first power input wire 82V1-W1 is, therefore, made of wire continuing from the second coil 78V1.

Fourth Step-2

Similarly, in the fourth step, the second nozzle 124 (see FIG. 24) is used to wind the second wire 74 from the first axial side Z2 of the core 50 around the eighth tooth 54V3 in the counterclockwise direction, as viewed in the axial direction of the eighth tooth 54V3, to form the eighth coil 78V3 with an integral number of turns. After completion of the eighth coil 78V3, the second wire 74 is directed or led to the first axial side Z2 of the core 50.

Afterwards, the second wire 74 is extended from the second axial side Z1 to the first axial side Z2 and then returned back to an interval between the eighth tooth 54V3 and the ninth tooth 54W3 to complete the fourth power input wire 82V3-W3. The fourth power input wire 82V3-W3 is, therefore, made of wire continuing from the eighth coil 78V3.

Fifth Step-1

In the fifth step, the first nozzle 122 (see FIG. 24) is used to wind the first wire 72 from the first axial side Z2 of the core 50 around the third tooth 54W1 in the counterclockwise direction, as viewed in the axial direction of the third tooth 54W1, to form the third coil 78W1 with an integral number of turns.

Afterwards, the first wire 72 is extended toward the sixth coil 78W2 in the first circumferential direction R1 on the first axial side Z2 to form the third coil-to-coil connecting wire 84W1-W2.

Fifth Step-2

Similarly, in the fifth step, the second nozzle 124 (see FIG. 24) is used to wind the second wire 74 from the first axial side Z2 of the core 50 around the ninth tooth 54W3 in the counterclockwise direction, as viewed in the axial direction of the ninth tooth 54W3, to form the ninth coil 78W3 with an integral number of turns.

Afterwards, the second wire 74 is extended toward the twelfth coil 78W4 in the first circumferential direction R1 on the first axial side Z2 to create the sixth coil-to-coil connecting wire 84W3-W4.

Sixth Step-1

In the sixth step, the first nozzle 122 (see FIG. 24) is used to wind the first wire 72 from the first axial side Z2 of the core 50 around the sixth tooth 54W2 in the counterclockwise direction, as viewed in the axial direction of the sixth tooth 54W2, to form the sixth coil 78W2 with an integral number of turns. After completion of the sixth coil 78W2, the first wire 72 is directed or led to the first axial side Z2 of the core 50.

Afterwards, the first wire 72 which is led to the first axial side Z2 is joined at the trailing end 82D to the leading end 83E of the second wire 74 on the first axial side Z2 of the core 50, thereby creating the first joint 92 in the wire connection process, as will be described later in detail, to complete the third power input wire 82W2-U3.

Sixth Step-2

Similarly, in the sixth step, the second nozzle 124 (see FIG. 24) is used to wind the second wire 72 from the first axial side Z2 of the core 50 around the twelfth tooth 54W4 in the counterclockwise direction, as viewed in the axial direction of the twelfth tooth 54W4, to form the twelfth coil 78W4 with an integral number of turns. After completion of the twelfth coil 78W4, the second wire 72 is directed or led to the first axial side Z2 of the core 50.

Afterwards, the second wire 74 which is led to the first axial side Z2 is joined at the trailing end 82F with the leading end 82C of the first wire 72, thereby creating the sixth power input wire 82W4-U1 in the wire connection process.

In the above way, the first joint 92 and the second joint 94 are created, thereby completing the winding 70 formed by a single continuous wire made up of the first wire 72 and the second wire 74.

TABLE 6

| STEP | CONTENTS | | Wire extracting direction (axial direction) | Wiring direction (circumferential direction) |
|---|---|---|---|---|
| 1 | Form 1$^{st}$ coil U1 Create 1$^{st}$ coil-to-coil connecting wire U1-U2 | Form 7$^{th}$ coil U3 Create 4$^{th}$ coil-to-coil connecting wire U3-U4 | 1$^{st}$ direction | 1$^{st}$ direction |
| 2 | Form 4$^{th}$ coil U2 Create 2$^{nd}$ power input wire U2-V2 | Form 10$^{th}$ coil U4 Create 5$^{th}$ power input wire U4-V4 | 1$^{st}$ direction | 1$^{st}$ direction |
| 3 | Form 5$^{th}$ coil V2 Create 2$^{nd}$ coil-to-coil connecting wire V2-V1 | Form 11$^{th}$ coil V4 Create 5$^{th}$ coil-to-coil connecting wire V4-V3 | 1$^{st}$ direction | 2$^{nd}$ direction |
| 4 | Form 2$^{nd}$ coil V1 Create 1$^{st}$ power input wire V1-W1 | Form 8$^{th}$ coil V3 Create 4$^{th}$ power input wire V3-W3 | 1$^{st}$ direction | 1$^{st}$ direction |
| 5 | Form 3$^{rd}$ coil W1 Create 3$^{rd}$ coil-to-coil connecting wire W1-W2 | Form 9$^{th}$ coil W3 Create 6$^{th}$ coil-to-coil connecting wire W3-W4 | 1$^{st}$ direction | 1$^{st}$ direction |
| 6 | Form 6$^{th}$ coil W2 Create 3$^{rd}$ power input wire W2-U3 Joining leading end of 2$^{nd}$ wire and trailing end of 1$^{st}$ wire to complete 3$^{rd}$ power input wire W2-U3 | Form 12$^{th}$ coil W4 Create 6$^{th}$ power input wire W4-U1 Joining leading end of 1$^{st}$ wire and trailing end of 2$^{nd}$ wire to complete 6$^{th}$ power input wire W4-U1 | 1$^{st}$ direction | 1$^{st}$ direction |

In the sixth embodiment, the winding 70 is produced in the two-series-connected-coil and two-parallel-connected-coil delta configuration in the way described above.

Each of the power input wires 82 is extended from a clearance between an adjacent two of the teeth 54. Each of the first direction-oriented connecting wires, as described above, extends with an interval in which there are an adjacent two of the teeth 54, in other words, with an interval equivalent to an adjacent two of the teeth 54. Each of the second direction-oriented connecting wires extends with an interval in which there are 2×2 of the teeth 54 disposed therebetween.

Each of the first wire 72 and the second wire 74 is made of a single continuous wire. One of the power input wires 82, as described above, has a joint of the trailing end 82F of the second wire 74 and the leading end 82C of the first wire 72. One of the power input wires 82 has a joint of the trailing end 82D of the first wire 72 and the leading end 82E of the second wire 74. The power input wires 82 are connected one with each of the wire-connecting terminals 98.

The first power input wire 82V1-W1 connects between the trailing end of the second coil 78V1 and the leading end of the third coil 78W1. The second power input wire 82U2-V2 connects between the trailing end of the fourth coil 78U2 and the leading end of the fifth coil 78V2. The third power input wire 82W2-U3 connects between the trailing end of the sixth coil 78W2 and the leading end of the seventh coil 78U3 in the wire connection process which will be described later in detail. The fourth power input wire 82V3-W3 connects between the trailing end of the eighth coil 78V3 and the leading end of the ninth coil 78W3. The fifth power input wire 82U4-V4 connects between the trailing end of the tenth coil 78U4 and the leading end of the eleventh coil 78V4. The sixth power input wire 82W4-U1 connects between the trailing end of the twelfth coil 78W4 and the leading end of the first coil 78U1 in the wire connection process which will be described later in detail.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are extended continuously. The first power input wire 82V1-

W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The third power input wire 82W2-U3 has a joint of the leading end 83E of the second wire 74 and the trailing end 82D of the first wire 72 which is achieved in the wire connection process described later in detail. The sixth power input wire 82W4-U1 has a joint of the leading end 82C of the first wire 72 and the trailing end 82F of the second wire 74 which is achieved in the wire connection process described later in detail.

The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the first axial side Z2 of the core 50.

Each of the first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 is extended from a clearance between an adjacent two of the teeth 54. The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The third power input wire 82W2-U3 has the first joint 92 of the trailing end 82D of the first wire 72 and the leading end 82E of the second wire 74. The sixth power input wire 82W4-U1 has the second joint 94 of the trailing end 82F of the second wire 74 and the leading end 82C of the first wire 72.

In the wire winding process in the sixth embodiment, of the coils 78, the U-phase coils U1 to U4 and the W-phase coils W1 to W4 are fabricated by moving the first nozzle 122 and the second nozzle 124 in the first circumferential direction R1 of the core 50, while the V-phase coils V1 to V4 are fabricated by moving the first nozzle 122 and the second nozzle 124 in the second circumferential direction R2 of the core 50.

After completion of the wire winding process, the core segments 56 are cut from the temporary joining runners 106 and arranged in an annular shape with the teeth 54 facing radially inward.

Winding Shaping Process, Wire Connection Process, and Fabrication Process

The winding shaping process, the wire connection process, and the fabrication process in the sixth embodiment are identical with those in the fifth embodiment. The rotating electrical machine 10 is fabricated in the manner described above. The structure of the rotating electrical machine 10 in the sixth embodiment is substantially identical with that in the fifth embodiment except for the first joint 92 and the second joint 94 instead of the single joint 90 shown in FIG. 17.

Operation and Beneficial Advantages

Portions of the structure and the production method in the sixth embodiment which are identical with those in the fifth embodiment offer substantially the same beneficial advantages as those in the fifth embodiment.

In the wire winding process in the sixth embodiment, the first nozzle 122 and the second nozzle 124 are, as can be seen in FIG. 25, moved in the first circumferential direction R1 to wind the wire around the teeth 54 for two of the U-phase, the V-phase, and the W-phase, while the first nozzle 122 and the second nozzle 124 are moved in the second circumferential direction R2 to wind the wire around the teeth 54 for a remaining one of the U-phase, the V-phase, and the W-phase. This completes all the coils 78. This winding way enables the winding 70 to be made by winding a continuous wire made up of the first wire 72 and the second wire 74 around the teeth 54, thereby improving the productivity of the winding 70.

Particularly, the rotating electrical machine 10 is designed in the form of an inner-rotor brushless motor in which the teeth 54 extend radially inward. The structure in the sixth embodiment is capable of reducing the size of the inner-rotor brushless motor, enhancing output power therefrom, producing it at low cost.

The power input wires 82 are arranged on the first axial side Z2 of the core 50. The coil-to-coil connecting wires 84 are also arranged on the first axial side Z2 of the core 50. This enables the volume of space in the rotating electrical machine 10 on the second axial side Z1 to be minimized.

Each of the power input wires 82 is extended from a clearance between an adjacent two of the teeth 54, thereby resulting in a sufficient interval between the ends of each of the coil-to-coil connecting wires 84, while each of the power input wires 82 has the ends located at a decreased interval away from each other, thereby decreasing a risk of intricate tangling of the coil-to-coil connecting wires 84 or the power input wires 82.

Each of the coil-to-coil connecting wires 84 extends outside the core segments 56 over an adjacent two of 2×2 of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

The sixth embodiment is, as described above, designed to use two nozzles: the first nozzle 122 and the second nozzle 124 to wind two continuous wires: the first wire 72 and the second wire 74 around the teeth 54 in the double-nozzle manner. This results in a decreased degree of workload on the wire winding process that is half that required to wind a single continuous wire around the teeth 54 using the single nozzle 120 (see FIG. 4) in the fifth embodiment. This reduces a total production cost of the rotating electrical machine 10.

Modifications

Modifications of the sixth embodiment will be described below.

The stator 20 in the sixth embodiment is designed, as an example, to have the coils 78 which are in the m-series-connected-coil and n-parallel-connected-coil delta configuration where m is a natural number of two or more, and n is a natural number, specifically, in a two-series-connected-coil and two-parallel-connected-coil delta configuration, but however, the production method of the stator 20 in the sixth embodiment may be used with all types of three-phase brushless motor in which n is a multiple of two, and each of the number of the slots formed in the core 50, the number of the teeth 54, and the number of the coils 78 is twelve or more that is a multiple of six. For instance, the number of the slots, the number of the teeth 54, and the number of the coils 78 may be selected to be 12 (i.e., m=2 and n=2), 18 (i.e., m=3 and n=2), 24 (i.e., m=4 and n=2 or m=2 and n=4), 30 (i.e., m=5 and n=2), 36 (i.e., m=2 and n=6, m=3 and n=4, or m=6 and n=2), . . . .

The winding device in this embodiment may alternatively designed as a double-flyer system instead of the double-nozzle system.

The temporary joining runners 108 illustrated in FIG. 26 may be used. The temporary joining runners 108 include bars which extend from the surfaces of the core segments 56 which face away from the teeth 54 and are joined together using an annular bar. The core segments 56 are, therefore, arranged in an annular shape to have outer ends of the teeth 54 which face the outer periphery of the core 50. The winding of the first wire 72 around the core segments 56 in the wire winding process is achieved by sequentially moving the first nozzle 122 from a first one of the core segments 56 to a second one of the core segments 56 which is arranged away from the first one in the first circumferential direction R1 of the annular assembly of the temporary joining runners 108. The winding of the second wire 74 around the core segments 56 in the wire winding process is achieved by sequentially moving the second nozzle 124 from a third one of the core segments 56 which is arranged at an interval of 180° away from the first core segment 56 to a fourth one of the core segments 56 which is located away from the third core segment 56 in the first circumferential direction R1 of the annular assembly of the temporary joining runners 108.

After the wire of the winding 70 is wound in the core 50, the teeth 54 are, like in the modification of the first embodiment, turned inside out to orient the outer ends radially inside the core 50.

The jig 104 which is, as shown in FIG. 22, of a substantially oval shape may be used, like in the modification of the fourth embodiment, instead of the temporary joining runners 106. A double-flyer system may also be used which is equipped with the first flyer 112 and the second flyer 114 instead of the first nozzle 122 and the second nozzle 124. The winding shaping process, the wire connection process, and the fabrication process are identical with those in the modification of the fourth embodiment.

After the core 50 is turned in the above away, the rotating electrical machine 10 (see FIG. 1) is fabricated in the above-described processes following the winding shaping process.

Portions of the structure and production method in the sixth embodiment which are identical with those in the fourth embodiment may be modified in the same manners as in the modifications of the fourth embodiment.

In the wire winding process in the sixth embodiment, of the U-phase coils U1 to U4, the V-phase coils V1 to V4, and the W-phase coils W1 to W4, only the V-phase coils V1 to V4 are fabricated by moving the first nozzle 122 and the second nozzle 124 in the second circumferential direction R2 of the core 50, but however, the U-phase coils U1 to U4 or the W-phase coils W1 to W4 may alternatively be fabricated by moving the first nozzle 122 and the second nozzle 124 in the second circumferential direction R2 of the core 50. This enables a continuous wire made up of the first wire 72 and the second wire 74 to be wound around the teeth 54 to form the winding 70, thereby improving the productivity of the rotating electrical machine 10.

Production Method of Rotating Electrical Machine in the Seventh Embodiment

Next, the production method of the rotating electrical machine 10 according to the seventh embodiment will be described below.

The production method of the rotating electrical machine 10 in the seventh embodiment is identical in the core setting process with that in the fourth embodiment, but different from the that in the fourth embodiment as described below.

Layout of Wire Connections of Winding

FIG. 27 is a view which illustrates the core setting process in the seventh embodiment. In the core setting process in this embodiment, the core segments 56 are retained by temporary joining runners 106 formed integrally with the insulators 62. Each of the temporary joining runners 106 includes bars which extend from the surfaces of the core segments 56 which face away from the teeth 54 and are joined together in a linear shape using a long strip or bar. The core segments 56 are, therefore, arranged to have outer ends of the teeth 54 arrayed linearly.

The seventh embodiment uses three nozzles: the nozzle 120, the first nozzle 122, the second nozzle 124, and the third nozzle 126. The first nozzle 122 is arranged to face a first one of the core segments 54 which is located on an end of a first one of the temporary joining runners 106. The sequential winding of wire around the teeth 54 to form the winding 70 is, as will be described later in detail, achieved by moving the first nozzle 122 to sequentially face the teeth 54 retained by the first temporary joining runner 106.

The second nozzle 124 is arranged to face a second one of the core segments 56 retained by a second one of the temporary joining runners 106. The second core segment 56 is located at an interval of one-third (⅓) of the total number of the core segments 56 away from the first core segment 56. The sequential winding of wire around the teeth 54 to form the winding 70 is, as will be described later in detail, achieved by moving the second nozzle 124, like the first nozzle 122, to sequentially face the teeth 54 retained by the second temporary joining runner 106.

The third nozzle 126 is arranged to face a third one of the core segments 56 retained by a third one of the temporary joining runners 106. The third core segment 56 is located at an interval of two-third (⅔) of the total number of the core segments 56 away from the first core segment 56. The sequential winding of wire around the teeth 54 to form the winding 70 is, as will be described later in detail, achieved by moving the third nozzle 126, like the first nozzle 122, to sequentially face the teeth 54 retained by the third temporary joining runner 106.

The production method of the rotating electrical machine 10 in the seventh embodiment works to produce the winding 70 equipped with the coils 78 which are delta-connected together in the m-series-connected-coil and n-parallel-connected-coil delta configuration where m is a natural number of two or more, and n is a natural number, specifically, in a two-series-connected-coil and three-parallel connected-coil delta configuration. In other words, in the rotating electrical machine 10 fabricated by the production method in the seventh embodiment, m is two, n is three, and each of the number of slots formed in the core 50, the number of the teeth 54, and the number of coils 78 is eighteen.

The layout of the connections of the coils 78 in a two-series-connected-coil and three-parallel-connected-coil delta configuration will be described below in detail. The six coils 78 for each phase are broken down into three coil arrays 78A, i.e., two (n=3) series-connected-coil assemblies each of which includes series-connected two (m=2) of the coils 78 and which are connected in parallel to each other. The three coil groups 80 each of which includes the three coil arrays 78A are connected in a delta (i.e., triangular) configuration.

Wire Winding Process

The wire winding process in the seventh embodiment, as can be seen in FIG. 27, winds three continuous wires: the first wire 72, the second wire 74, and the third wire 76 around the teeth 54 using a triple-nozzle system. FIG. 28 is a diagram which demonstrates the wire winding process in the seventh embodiment. Table 7 shows an operation schedule showing a sequence of wire-winding steps in the wire winding process in the seventh embodiment.

In the following discussion about each process of the production method, the eighteen teeth 54 will be referred to as below, respectively, in the first circumferential direction R1 of the core 50 in connection with symbols U1 to W6.

1) the first tooth 54U1
2) the second tooth 54V1
3) the third tooth 54W1
4) the fourth tooth 54U2
5) the fifth tooth 54V2
6) the sixth tooth 54W2
7) the seventh tooth 54U3
8) the eighth tooth 54V3
9) the ninth tooth 54W3
10) the tenth tooth 54U4
11) the eleventh tooth 54V4
12) the twelfth tooth 54W4
13) the thirteenth tooth 54U5
14) the fourteenth tooth 54V5
15) the fifteenth tooth 54W5
16) the sixteenth tooth 54U6
17) the seventeenth tooth 54V6
18) the eighteenth tooth 54W6

The eighteen coils 78 wound around the first tooth 54U1 to the eighteenth tooth 54W6 will also be referred to as below.

1) the first coil 78U1
2) the second coil 78V1
3) the third coil 78W1
4) the fourth coil 78U2
5) the fifth coil 78V2
6) the sixth coil 78W2
7) the seventh coil 78U3
8) the eighth coil 78V3

9) the ninth coil 78W3

10) the tenth coil 78U4

11) the eleventh coil 78V4

12) the twelfth coil 78W4

13) the thirteenth coil 78U5

14) the fourteenth coil 78V5

15) the fifteenth coil 78W5

16) the sixteenth coil 78U6

17) the seventeenth coil 78V6

18) the eighteenth coil 78W6

The winding 70 includes the nine power input wires 82 each of which connects between the coils 78 for different phases. The nine power input wires 82 include the first connecting section C1 to the third connecting section A1 which are completed or joined together in the wire connection process, as will be described later in detail. In the following discussion about each process of the production method, the power input wires 82 which are arranged away from each other in the first circumferential direction R1 of the core 50 will be referred to as below in relation to symbols U1 to W6 used in the drawings.

1) the first power input wire 82V1-W1

2) the second power input wire 82U2-V2

3) the third power input wire 82W2-U3

4) the fourth power input wire 82V3-W3

5) the fifth power input wire 82U4-V4

6) the sixth power input wire 82W4-U5

7) the seventh power input wire 82V5-W5

8) the eighth power input wire 82U6-V6

9) the ninth power input wire 82W6-U1

The winding 70 includes the nine coil-to-coil connecting wires 84 each of which connects between a respective adjacent two of the coils 78 for the same phase. In the following discussion on each process of the production method, the coil-to-coil connecting wires 84 which are arranged away from each other in the first circumferential direction R1 of the core 50 will be referred to as below in relation to symbols U1 to W6 used in the drawings.

1) the first coil-to-coil connecting wire 84U1-U2

2) the second coil-to-coil connecting wire 84V2-V1

3) the third coil-to-coil connecting wire 84W1-W2

4) the fourth coil-to-coil connecting wire 84U3-U4

5) the fifth coil-to-coil connecting wire 84V4-V3

6) the sixth coil-to-coil connecting wire 84W3-W4

7) the seventh coil-to-coil connecting wire 84U5-U6

8) the eighth coil-to-coil connecting wire 84V6-V5

9) the ninth coil-to-coil connecting wire 84W5-W6

Of the coil-to-coil connecting wires 84, the first coil-to-coil connecting wire 84U1-U2, the third coil-to-coil connecting wire 84W1-W2, the fourth coil-to-coil connecting wire 84U3-U4, the sixth coil-to-coil connecting wire 84W3-W4, the seventh coil-to-coil connecting wire 84U5-U6, and the ninth coil-to-coil connecting wire 84W5-W6 will also be generally referred to as first direction-oriented connecting wires in this disclosure. The second coil-to-coil connecting wire 84V2-V1, the fifth coil-to-coil connecting wire 84V4-V3, and the eighth coil-to-coil connecting wire 84V6-V5 will also be generally referred to as second direction-oriented connecting wires in this disclosure.

Structure of Winding

In the wire winding process in the seventh embodiment, wire of the winding 70 is wound in a sequence of first to fourth steps which will be described below. In the drawings, numbers 1 to 4 with circles denote the order of formation of the coils 78.

First Step-1 In the first step, the first nozzle 122 is used to wind the first wire 72 from the first axial side Z2 of the core

50 around the first tooth 54U1 in the clockwise direction, as viewed in the axial direction of the first tooth 54U1, to form the first coil 78U1 with an integral number of turns.

Afterwards, the first wire 72 is extended toward the fourth coil 78U2 in the first circumferential direction R1 on the first axial side Z2 to form the first coil-to-coil connecting wire 84U1-U2.

First Step-2 Similarly, in the first step, the second nozzle 124 is used to wind the second wire 74 from the first axial side Z2 of the core 50 around the seventh tooth 54U3 in the clockwise direction, as viewed in the axial direction of the seventh tooth 54U3, to form the seventh coil 78U3 with an integral number of turns.

Afterwards, the second wire 74 is extended toward the tenth coil 78U4 in the first circumferential direction R1 on the first axial side Z2 to complete the fourth coil-to-coil connecting wire 84U3-U4.

First Step-3

Similarly, in the first step, the third nozzle 126 is used to wind the third wire 76 from the first axial side Z2 of the cored 50 around the thirteenth tooth 54U5 in the clockwise direction, as viewed in the axial direction of the thirteenth tooth 54U5, to form the thirteenth coil 78U5 with an integral number of turns. After completion of the thirteenth coil 78U5, the third wire 76 is directed or led to the first axial side Z2 of the core 50.

Afterwards, the third wire 76 is extended toward the sixteenth coil 78U6 in the first circumferential direction R1 on the first axial side Z2 to complete the seventh coil-to-coil connecting wire 84U5-U6.

Second Step-1

In the second step, the first nozzle 122 is used to wind the first wire 72 from the first axial side Z2 of the core 50 around the fourth tooth 54U2 in the clockwise direction, as viewed in the axial direction of the fourth tooth 54U2, to form the fourth coil 78U2 with an integral number of turns. After completion of the fourth coil 78U2, the first wire 72 is directed or led to the first axial side Z2 of the core 50.

Afterwards, the first wire 72 is extended toward the fifth coil 78V2 in the first circumferential direction R1 on the first axial side Z2 to form the second power input wire 82U2-V2.

Second Step-2

Similarly, in the second step, the second nozzle 124 is used to wind the second wire 74 from the first axial side Z2 of the core 50 around the tenth tooth 54U4 in the clockwise direction, as viewed in the axial direction of the tenth tooth 54U4, to form the tenth coil 78U4 with an integral number of turns. After completion of the tenth coil 78U4, the second wire 74 is directed or led to the first axial side Z2 of the core 50.

Afterwards, the second wire 74 is extended toward the eleventh coil 78V4 in the first circumferential direction R1 on the first axial side Z2 to form the fifth power input wire 82U4-V4. The fifth power input wire 82U4-V4 is, therefore, made of the second wire 74 continuing from the tenth coil 78U4.

Second Step-3

Similarly, in the second step, the third nozzle 126 is used to wind the third wire 76 from the first axial side Z2 of the core 50 around the sixteenth tooth 54U6 in the clockwise direction, as viewed in the axial direction of the sixteenth tooth 54U6, to form the sixteenth coil 78U6 with an integral number of turns. After completion of the sixteenth coil 78U6, the second wire 74 is directed or led to the first axial side Z2 of the core 50.

Afterwards, the third wire 76 is extended toward the seventeenth coil 78V6 in the first circumferential direction R1 on the first axial side Z2 to form the eighth power input wire 82U6-V6. The eighth power input wire 82U6-V6 is, therefore, made of the third wire 76 continuing from the sixteenth coil 78U6.

Third Step-1 In the third step, the first nozzle 122 is used to wind the first wire 72 from the first axial side Z2 of the core 50 around the fifth tooth 54V2 in the clockwise direction, as viewed in the axial direction of the fifth tooth 54V2, to form the fifth coil 78V2 with an integral number of turns.

Afterwards, the first wire 72 is extended toward the second coil 78V1 in the first circumferential direction R1 on the first axial side Z2 to form the second coil-to-coil connecting wire 84V2-V1.

Third Step-2

Similarly, in the third step, the second nozzle 124 is used to wind the second wire 74 from the first axial side Z2 of the core 50 around the eleventh tooth 54V4 in the clockwise direction, as viewed in the axial direction of the eleventh tooth 54V4, to form the eleventh coil 78V4 with an integral number of turns.

Afterwards, the second wire 74 is extended toward the eighth coil 78V3 in the first circumferential direction R1 on the first axial side Z2 to form the fifth coil-to-coil connecting wire 84V4-V3.

Third Step-3

Similarly, in the third step, the third nozzle 126 is used to wind the third wire 76 from the first axial side Z2 of the core 50 around the seventeenth tooth 54V6 in the clockwise direction, as viewed in the axial direction of the seventeenth tooth 54V6, to form the seventeenth coil 78V6 with an integral number of turns.

Afterwards, the third wire 76 is extended toward the fourteenth coil 78V5 in the first circumferential direction R1 on the first axial side Z2 to form the eighth coil-to-coil connecting wire 84V6-V5.

Fourth Step-1

In the fourth step, the first nozzle 122 is used to wind the first wire 72 from the first axial side Z2 of the core 50 around the second tooth 54V1 in the clockwise direction, as viewed in the axial direction of the second tooth 54V1, to form the second coil 78V1 with an integral number of turns. After completion of the second coil 78V1, the first wire 72 is directed or led to the first axial side Z2 of the core 50.

Afterwards, the first wire 72 is extended toward the third coil 78W1 in the first circumferential direction R1 on the first axial side Z2 to form the first power input wire 82V1-W1. The first power input wire 82V1-W1 is, therefore, made of the first wire 72 continuing from the second coil 78V1.

Fourth Step-2

Similarly, in the fourth step, the second nozzle 124 is used to wind the second wire 74 from the first axial side Z2 of the core 50 around the eighth tooth 54V3 in the clockwise direction, as viewed in the axial direction of the eighth tooth 54V3, to form the eighth coil 78V3 with an integral number of turns. After completion of the eighth coil 78V3, the second wire 74 is directed or led to the first axial side Z2 of the core 50.

Afterwards, the second wire 74 is extended toward the ninth coil 78W3 in the first circumferential direction R1 on the first axial side Z2 to form the fourth power input wire 82V3-W3. The fourth power input wire 82V3-W3 is, therefore, made of the second wire 74 continuing from the eighth coil 78V3.

Fourth Step-3

Similarly, in the fourth step, the third nozzle 126 is used to wind the third wire 76 from the first axial side Z2 of the core 50 around the fourteenth tooth 54V5 in the clockwise direction, as viewed in the axial direction of the fourteenth tooth 54V5, to form the fourteenth coil 78V5 with an integral number of turns. After completion of the fourteenth coil 78V5, the third wire 76 is directed or led to the first axial side Z2 of the core 50.

Afterwards, the third wire 76 is extended toward the fifteenth coil 78W5 in the first circumferential direction R1 on the first axial side Z2 to form the seventh power input wire 82V5-W5. The seventh power input wire 82V5-W5 is, therefore, made of the third wire 76 continuing from the fourteenth coil 78V5.

Fifth Step-1

In the fifth step, the first nozzle 122 is used to wind the first wire 72 from the first axial side Z2 of the core 50 around the third tooth 54W1 in the clockwise direction, as viewed in the axial direction of the third tooth 54W1, to form the third coil 78W1 with an integral number of turns.

Afterwards, the first wire 72 is extended toward the sixth coil 78W2 in the first circumferential direction R1 on the first axial side Z2 to form the third coil-to-coil connecting wire 84W1-W2.

Fifth Step-2

Similarly, in the fifth step, the second nozzle 124 is used to wind the second wire 74 from the first axial side Z2 of the core 50 around the ninth tooth 54W3 in the clockwise direction, as viewed in the axial direction of the ninth tooth 54W3, to form the ninth coil 78W3 with an integral number of turns.

Afterwards, the second wire 74 is extended toward the twelfth coil 78W4 in the first circumferential direction R1 on the first axial side Z2 to form the sixth coil-to-coil connecting wire 84W3-W4.

Fifth Step-3

Similarly, in the fifth step, the third nozzle 126 is used to wind the third wire 76 from the first axial side Z2 of the core 50 around the fifteenth tooth 54W5 in the clockwise direction, as viewed in the axial direction of the fifteenth tooth 54W5, to form the fifteenth coil 78W5 with an integral number of turns.

Afterwards, the third wire 76 is extended toward the eighteenth coil 78W6 in the first circumferential direction R1 on the first axial side Z2 to form the ninth coil-to-coil connecting wire 84W5-W6.

Sixth Step-1

In the sixth step, the first nozzle 122 is used to wind the first wire 72 from the first axial side Z2 of the core 50 around the sixth tooth 54W2 in the clockwise direction, as viewed in the axial direction of the sixth tooth 54W2, to form the sixth coil 78W2 with an integral number of turns. After completion of the sixth coil 78W2, the first wire 72 is directed or led to the first axial side Z2 of the core 50.

Afterwards, the first wire 72 is extended in the first circumferential direction R1 on the first axial side Z2 of the core 50 toward the leading end 82E of the second wire 74. The first joint 92 is then created in the wire connection process which will be described later in detail to complete the third power input wire 82W2-U3.

Sixth Step-2

Similarly, in the sixth step, the second nozzle 124 is used to wind the second wire 74 from the first axial side Z2 of the core 50 around the twelfth tooth 54W4 in the clockwise direction, as viewed in the axial direction of the twelfth tooth 54W4, to form the twelfth coil 78W4 with an integral number of turns. After completion of the twelfth coil 78W4, the second wire 74 is directed or led to the first axial side Z2 of the core 50.

Afterwards, the second wire 74 is extended in the first circumferential direction R1 on the first axial side Z2 of the core 50 toward the leading end 82G of the third wire 76. The second joint 94 is then created in the wire connection process which will be described later in detail to complete the sixth power input wire 82W4-U5.

Sixth Step-3

Similarly, in the sixth step, the third nozzle 126 is used to wind the third wire 76 from the first axial side Z2 of the core 50 around the eighteenth tooth 54W6 in the clockwise direction, as viewed in the axial direction of the eighteenth tooth 54W6, to form the eighteenth coil 78W6 with an integral number of turns. After completion of the eighteenth coil 78W6, the third wire 76 is directed or led to the first axial side Z2 of the core 50.

Afterwards, the third wire 76 is extended in the first circumferential direction R1 on the first axial side Z2 of the core 50 toward the leading end 82C of the first wire 72. The third joint 96 is then created in the wire connection process which will be described later in detail to complete the ninth power input wire 82W6-U1.

The first joint 92, the second joint 94, and the third joint 96 complete the winding 70 made of a single continuous wire made up of the first wire 72, the second wire 74, and the third wire 76.

Each of the power input wires 82 extends with an interval occupied by an adjacent two of the teeth 54 disposed therebetween. Each of the first direction-oriented connecting wires, as described above, extends with an interval occupied by 2×2 of the teeth 54 disposed therebetween. Each of the second direction-oriented connecting wires extends with an interval occupied by an adjacent two of the teeth 54 disposed therebetween.

Each of the first wire 72, the second wire 74, and the third wire 76 is made of a single continuous wire. One of the power input wires 82 is designed to have a joint of the trailing end 82D of the first wire 72 and the leading end 82E of the second wire 74. One of the power input wires 82 is designed to have a joint of the trailing end 82F of the second wire 74 and the leading end 82G of the third wire 76. One of the power input wires 82 is designed to have a joint of the trailing end 82H of the third wire 76 and the leading end 82C of the first wire 72. Each of the power input wires 82 connects with a respective one of the wire-connecting terminals 98.

The first power input wire 82V1-W1, as illustrated in FIGS. 28 and 29, connects the trailing end of the second coil 78V1 and the leading end of the third coil 78W1 together. The second power input wire 82U2-V2 connects the trailing end of the fourth coil 78U2 and the leading end of the fifth

TABLE 7

| STEP | CONTENTS | | | Wire extracting direction (axial direction) | Wiring direction (circumferential direction) |
|---|---|---|---|---|---|
| 1 | Form 1$^{st}$ coil U1 Create 1$^{st}$ coil-to-coil connecting wire U1-U2 | Form 7$^{th}$ coil U3 Create 4$^{th}$ coil-to-coil connecting wire U3-U4 | Form 13$^{th}$ coil U5 Create 7$^{th}$ coil-to-coil connecting wire U5-U6 | 1$^{st}$ direction | 1$^{st}$ direction |
| 2 | Form 4$^{th}$ coil U2 Create 2$^{nd}$ power input wire U2-V2 | Form 10$^{th}$ coil U4 Create 5$^{th}$ power input wire U4-V4 | Form 16$^{th}$ coil U6 Create 8$^{th}$ power input wire U6-V6 | 1$^{st}$ direction | 1$^{st}$ direction |
| 3 | Form 5$^{th}$ coil V2 Create 2$^{nd}$ coil-to-coil connecting wire V2-V1 | Form 11$^{th}$ coil V4 Create 5$^{th}$ coil-to-coil connecting wire V4-V3 | Form 17$^{th}$ coil V6 Create 8$^{th}$ coil-to-coil connecting wire V6-V5 | 1$^{st}$ direction | 2$^{nd}$ direction |
| 4 | Form 2$^{nd}$ coil V1 Create 1$^{st}$ power input wire V1-W1 | Form 8$^{th}$ coil V3 Create 4$^{th}$ power input wire V3-W3 | Form 14$^{th}$ coil V5 Create 7$^{th}$ power input wire V5-W5 | 1$^{st}$ direction | 1$^{st}$ direction |
| 5 | Form 3$^{rd}$ coil W1 Create 3$^{rd}$ coil-to-coil connecting wire W1-W2 | Form 9$^{th}$ coil W3 Create 6$^{th}$ coil-to-coil connecting wire W3-W4 | Form 15$^{th}$ coil W5 Create 9$^{th}$ coil-to-coil connecting wire W5-W6 | 1$^{st}$ direction | 1$^{st}$ direction |
| 6 | Form 6$^{th}$ coil W2 Create 3$^{rd}$ power input wire W2-U3 Joining leading end of 2$^{nd}$ wire and trailing end of 1$^{st}$ wire to complete 3$^{rd}$ power input wire W2-U3 | Form 12$^{th}$ coil W4 Create 6$^{th}$ power input wire W4-U1 Joining leading end of 1$^{st}$ wire and trailing end of 2$^{nd}$ wire to complete 6$^{th}$ power input wire W4-U1 | Form 18$^{th}$ coil W6 Create 9$^{th}$ power input wire W6-U1 Joining leading end of 1$^{st}$ wire and trailing end of 3$^{rd}$ wire to complete 9$^{th}$ power input wire W4-U1 | 1$^{st}$ direction | 1$^{st}$ direction |

In the seventh embodiment, the winding 70 is produced in the two-series-connected-coil and three-parallel-connected-coil delta configuration in the way described above. FIG. 29 illustrates the layout of connections of the coils 78 achieved in the wire winding process in the seventh embodiment. The wire winding process in the seventh embodiment completes the winding 70 wound in the core 50 illustrated in FIG. 27.

coil 78V2 together. The third power input wire 82W2-U3 connects the trailing end of the sixth coil 78W2 and the leading end of the seventh coil 78U3 together. The fourth power input wire 82V3-W3 connects the trailing end of the eighth coil 78V3 and the leading end of the ninth coil 78W3 together. The fifth power input wire 82U4-V4 connects the trailing end of the tenth coil 78U4 and the leading end of the eleventh coil 78V4 together. The sixth power input wire 82W4-U5 connects the trailing end of the twelfth coil 78W4 and the leading end of the thirteenth coil 78U5 together. The seventh power input wire 82V5-W5 connects the trailing end of the fourteenth coil 78V5 and the leading end of the fifteenth coil 78W5 together. The eighth power input wire 82U6-V6 connects the trailing end of the sixteenth coil 78U6 and the leading end of the seventeenth coil 78V6 together. The ninth power input wire 82W6-U1 connects the trailing end of the eighteenth coil 78W6 and the leading end of the first coil 78U1 together.

The first power input wire 82V1-W1, the second power input wire 82U2-V2, the third power input wire 82W2-U3, the fourth power input wire 82V3-W3, the fifth power input wire 82U4-V4, the sixth power input wire 82W4-U5, the seventh power input wire 82V5-W5, the eighth power input wire 82U6-V6, and the ninth power input wire 82W6-U1 extend continuously. The first power input wire 82V1-W1, the second power input wire 82U2-V2, the third power input wire 82W2-U3, the fourth power input wire 82V3-W3, the fifth power input wire 82U4-V4, the sixth power input wire 82W4-U5, the seventh power input wire 82V5-W5, the eighth power input wire 82U6-V6, and the ninth power input wire 82W6-U1 are arranged on the first axial side Z2 of the core 50. The third power input wire 82W2-U3, the sixth power input wire 82W4-U5, and the ninth power input wire 82W6-U1, as described above, have joints of ends of the wires of the winding 70. Specifically, the third power input wire 82W2-U3 has the first joint 92 of the trailing end 82D of the first wire 72 and the leading end 82E of the second wire 74. The sixth power input wire 82W4-U5 has the second joint 94 of the trailing end 82F of the second wire 74 and the leading end 82G of the third wire 76. The ninth power input wire 82W6-U1 has the third joint 96 of the trailing end 82H of the third wire 76 and the leading end 82C of the first wire 72.

The first coil-to-coil connecting wire 84U1-U2 connects the trailing end of the first coil 78U1 the leading end of the fourth coil 78U2 together. The second coil-to-coil connecting wire 84V2-V1 connects the trailing end of the fifth coil 78V2 and the leading end of the second coil 78V1 together. The third coil-to-coil connecting wire 84W1-W2 connects the trailing end of the third coil 78W1 and the leading end of the sixth coil 78W2 together. The fourth coil-to-coil connecting wire 84U3-U4 connects the trailing end of the seventh coil 78U3 and the leading end of the tenth coil 78U4 together. The fifth coil-to-coil connecting wire 84V4-V3 connects the trailing end of the eleventh coil 78V4 and the leading end of the eighth coil 78V3 together. The sixth coil-to-coil connecting wire 84W3-W4 connects the trailing end of the ninth coil 78W3 and the leading end of the twelfth coil 78W4 together. The seventh coil-to-coil connecting wire 84U5-U6 connects the trailing end of the thirteenth coil 78U5 and the leading end of the sixteenth coil 78U6 together. The eighth coil-to-coil connecting wire 84V6-V5 connects the trailing end of the seventeenth coil 78V6 and the leading end of the fourteenth coil 78V5 together. The ninth coil-to-coil connecting wire 84W5-W6 connects the trailing end of the fifteenth coil 78W5 and the leading end of the eighteenth coil 78W6 together.

The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, the sixth coil-to-coil connecting wire 84W3-W4, the seventh coil-to-coil connecting wire 84U5-U6, the eighth coil-to-coil connecting wire 84V6-V5, and the ninth coil-to-coil connecting wire 84W5-W6 are arranged on the first axial side Z2 of the core 50.

In wire winding process in the seventh embodiment, of the coils 78, the U-phase coils U1 to U6 and the W-phase coils W1 to W6 are produced by moving the first nozzle 122, the second nozzle 124 and the third nozzle 126 in the first circumferential direction R1 of the core 50, while the V-phase coils V1 to V6 are produced by moving the first nozzle 122, the second nozzle 124, and the third nozzle 126 in the second circumferential direction R2 of the core 50.

After completion of the wire winding process, the core segments 56 are cut from the temporary joining runners 106 and then connected together in an annular shape with the teeth 54 facing radially inward.

Winding Shaping Process

The wire-connecting terminals 98 in the seventh embodiment, unlike the first embodiment, include the first wire-connecting terminal 98C, the second wire-connecting terminal 98B, the third wire-connecting terminal 98A, the fourth wire-connecting terminal 98C2, the fifth wire-connecting terminal 98B2, the sixth wire-connecting terminal 98A2, the seventh wire-connecting terminal 98C3, the eighth wire-connecting terminal 98B3, and the ninth wire-connecting terminal 98A3. The first wire-connecting terminal 98C is disposed between the second coil 78V1 and the third coil 78W1. The second wire-connecting terminal 98B is disposed between the fourth coil 78U2 and the fifth coil 78V2. The third wire-connecting terminal 98A is disposed between the sixth coil 78W2 and the seventh coil 78U3. The fourth wire-connecting terminal 98C2 is disposed between the eighth coil 78V3 and the ninth coil 78W3. The fifth wire-connecting terminal 98B2 is disposed between the tenth coil 78U4 and the eleventh coil 78V4. The sixth wire-connecting terminal 98A2 is disposed between the twelfth coil 78W4 and the thirteenth coil 78U5. The seventh wire-connecting terminal 98C3 is disposed between the fourteenth coil 78V5 and the fifteenth coil 78W5. The eighth wire-connecting terminal 98B3 is disposed between the sixteenth coil 78U6 and the seventeenth coil 78V6. The ninth wire-connecting terminal 98A3 is disposed between the first coil 78U1 and the eighteenth coil 78W6.

The winding shaping process, like in the first embodiment, works to move the first connecting section C1 of the first power input wire 82V1-W1 toward the first wire-connecting terminal 98C to complete the configuration of the first power input wire 82V1-W1. The first wire-connecting terminal 98C is, for example, in the shape of a hook. The first connecting section C1 engages the first wire-connecting terminal 98C.

Similarly, the winding shaping process works to move the second connecting section B1 of the second power input wire 82U2-V2 toward the second wire-connecting terminal 98B to complete the configuration of the second power input wire 82U2-V2. The second wire-connecting terminal 98B is, for example, in the shape of a hook. The second connecting section B1 engages the second wire-connecting terminal 98B.

Similarly, the winding shaping process works to move the third connecting section A2 of the third power input wire 82W2-U3 toward the third wire-connecting terminal 98A to complete the configuration of the third power input wire 82W2-U3. The third wire-connecting terminal 98A is, for example, in the shape of a hook. The third connecting section A1 engages the third wire-connecting terminal 98A.

Similarly, the winding shaping process works to move the fourth connecting section C2 of the fourth power input wire 82V3-W3 toward the fourth wire-connecting terminal 98C2 to complete the configuration of the fourth power input wire 82V3-W3. The fourth wire-connecting terminal 98C2 is, for example, in the shape of a hook. The fourth connecting section C2 engages the fourth wire-connecting terminal 98C2.

Similarly, the winding shaping process works to move the fifth connecting section B2 of the fifth power input wire 82U4-V4 toward the fifth wire-connecting terminal 98B2 to complete the configuration of the fifth power input wire 82U4-V4. The fifth wire-connecting terminal 98B2 is, for example, in the shape of a hook. The fifth connecting section B2 engages the fifth wire-connecting terminal 98B2.

Similarly, the winding shaping process works to move the sixth connecting section A2 of the sixth power input wire 82W4-U5 toward the sixth wire-connecting terminal 98A2 to complete the configuration of the sixth power input wire 82W4-U5. The sixth wire-connecting terminal 98A2 is, for example, in the shape of a hook. The sixth connecting section A2 engages the sixth wire-connecting terminal 98A2.

Similarly, the winding shaping process works to move the seventh connecting section C3 of the seventh power input wire 82V5-W5 toward the seventh wire-connecting terminal 98C3 to complete the configuration of the seventh power input wire 82V5-W5. The seventh wire-connecting terminal 98C3 is, for example, in the shape of a hook. The seventh connecting section C3 engages the seventh wire-connecting terminal 98C3.

Similarly, the winding shaping process works to move the eighth connecting section B3 of the eighth power input wire 82U6-V6 toward the eighth wire-connecting terminal 98B3 to complete the configuration of the eighth power input wire 82U6-V6. The eighth wire-connecting terminal 98B3 is, for example, in the shape of a hook. The eighth connecting section B3 engages the eighth wire-connecting terminal 98B3.

Similarly, the winding shaping process works to move the ninth connecting section A3 of the ninth power input wire 82W6-U1 toward the ninth wire-connecting terminal 98A3 to complete the configuration of the ninth power input wire 82W6-U1. The ninth wire-connecting terminal 98A3 is, for example, in the shape of a hook. The ninth connecting section A3 engages the ninth wire-connecting terminal 98A3.

Wire Connection Process

In the wire connection process, the first wire-connecting terminal 98C and the first connecting section C1 are joined together using fusing techniques. Similarly, the second wire-connecting terminal 98B and the second connecting section B1 are joined together using fusing techniques. The third wire-connecting terminal 98A and the third connecting section A1 are joined together using fusing techniques. The fourth wire-connecting terminal 98C2 and the fourth connecting section C2 are joined together using fusing techniques. The fifth wire-connecting terminal 98B2 and the fifth connecting section B2 are joined together using fusing techniques. The sixth wire-connecting terminal 98A2 and the sixth connecting section A2 are joined together using fusing techniques. The seventh wire-connecting terminal 98C3 and the seventh connecting section C3 are joined together using fusing techniques. The eighth wire-connecting terminal 98B3 and the eighth connecting section B3 are joined together using fusing techniques. The ninth wire-connecting terminal 98A3 and the ninth connecting section A3 are joined together using fusing techniques. In this way, the wire connection process works to join the first power input wire 82V1-W1, the second power input wire 82U2-

V2, the fourth power input wire 82V3-W3, the fifth power input wire 82U4-V4, the seventh power input wire 82V5-W5, and the ninth power input wire 82W6-U1 to the first wire-connecting terminal 98C, the second wire-connecting terminal 98B, the fourth wire-connecting terminal 98C2, the fifth wire-connecting terminal 98B2, the seventh wire-connecting terminal 98C3, and the eighth wire-connecting terminal 98B3, respectively. The leading end 82E of the second wire 74 and the trailing end 82D of the first wire 72 are joined to the third wire-connecting terminal 98A. The leading end 82G of the third wire 76 and the trailing end 82F of the second wire 74 are joined to the sixth wire-connecting terminal 98A2. The leading end 82C of the first wire 72 and the trailing end 82H of the third wire 76 are joined to the ninth wire-connecting terminal 98A3.

Like in the first embodiment, the first connecting section C1 of the first power input wire 82V1-W1 engages the first wire-connecting terminal 98C. The first power input wire 82V1-W1 is joined to the first wire connecting terminal 98C using fusing techniques. Similarly, the second power input wire 82U2-V2, the fourth power input wire 82V3-W3, the fifth power input wire 82U4-V4, the seventh power input wire 82V5-W5, and the eighth power input wire 82U6-V6 are joined to the above-described corresponding terminals using fusing techniques.

Like in the first embodiment, the leading end 82E of the second wire 74 and the trailing end 82D of the first wire 72 engage and then are joined to the third wire-connecting terminal 98A using fusing techniques, thereby creating the third power input wire 82W2-U3. Similarly, the leading end 82G of the third wire 76 and the trailing end 82F of the second wire 74 engage and then are joined to the sixth wire-connecting terminal 98A2 using fusing techniques, thereby creating the sixth power input wire 82W4-U5. Similarly, the leading end 82C of the first wire 72 and the trailing end 82H of the third wire 76 engage and then are joined to the ninth wire-connecting terminal 98A3 using fusing techniques, thereby creating the ninth power input wire 82W6-U1.

Fabrication Process

The fabrication process in the seventh embodiment is identical with that in the fourth embodiment. The rotating electrical machine 10 (see FIG. 1) is fabricated in the way described above.

Operation and Beneficial Advantages

Portions of the structure and the production method in the seventh embodiment which are identical with those in the fourth embodiment offer substantially the same beneficial advantages as those in the fourth embodiment.

In the wire winding process in the seventh embodiment, the wire is wound around the teeth 54 to form the coils 79 for two of the U-phase, V-phase, and W-phase by moving the first nozzle 122, the second nozzle 124, and the third nozzle 126 in the first circumferential direction R1 of the core 50, while the wire is wound around the teeth 54 to form the coils 79 for a remaining one of the U-phase, V-phase, and W-phase by moving the first nozzle 122, the second nozzle 124, and the third nozzle 126 in the second circumferential direction R2 of the core 50. This enables the first wire 72, the second wire 74, and the third wire 76 to be wound around the teeth 54 in the shape of a continuous wire, thereby improving the productivity of the coils 79.

The power input wires 82 are disposed on the first axial side Z2 of the core 50. The coil-to-coil connecting wires 84 are also disposed on the first axial side Z2 of the core 50.

This enables the volume of space in the rotating electrical machine 10 on the second axial side Z1 to be reduced.

Particularly, the rotating electrical machine 10 is designed in the form of an inner-rotor brushless motor in which the teeth 54 extend radially inward. The structure in the seventh embodiment is capable of reducing the size of the inner-rotor brushless motor, enhancing output power therefrom, producing it at low cost.

Each of the power input wires 82 extends outside the core segments 56 over an adjacent two of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Each of the coil-to-coil connecting wires 84 extends outside the core segments 56 over an adjacent two or 2×2 of the teeth 54 disposed therebetween. This provides a sufficient interval between the ends of each of the coil-to-coil connecting wires 84 in addition to that between the ends of each of the power input wires 82, thereby decreasing a risk of intricate tangling of the coil-to-coil connecting wires 84 or the power input wires 82.

The seventh embodiment is, as described above, designed to use three nozzles: the first nozzle 122, the second nozzle 124, and the third nozzle 126 wind three continuous wires: the first wire 72, the second wire 74, and the third wire 76 around the teeth 54 in the triple-nozzle manner. This results in a decreased degree of workload on the wire winding process that is one-third of that required to wind a single continuous wire around the teeth 54 using the single nozzle 120 (see FIG. 4) in the third embodiment. This reduces a total production cost of the rotating electrical machine 10.

Modifications

Modifications of the seventh embodiment will be described below.

The stator 20 in the seventh embodiment is designed, as an example, to have the coils 78 which are in the m-series-connected-coil and n-parallel-connected-coil delta configuration where m is a natural number of two or more, specifically, in a two-series-connected-coil and three-parallel-connected-coil delta configuration, but however, the production method of the stator 20 in the seventh embodiment may be used with all types of three-phase brushless motor in which n is a multiple of three, and each of the number of the slots formed in the core 50, the number of the teeth 54, and the number of the coils 78 is eighteen or more that is a multiple of nine. For instance, the number of the slots, the number of the teeth 54, and the number of the coils 78 may be selected to be 18 (i.e., m=2 and n=3), 27 (i.e., m=3 and n=3), 36 (i.e., m=2 and n=6 or m=4 and n=3), 45 (i.e., m=5 and n=3), . . . .

The temporary joining runners 108 illustrated in FIG. 30 may be used instead of the temporary joining runners 106. The temporary joining runners 108 include bars which extend from the surfaces of the core segments 56 which face away from the teeth 54 and are joined together using an annular bar. The core segments 56 are, therefore, arranged in an annular shape to have outer ends of the teeth 54 which face the outer periphery of the core 50.

The winding of the first wire 72 around the core segments 56 in the wire winding process is achieved by sequentially moving the first nozzle 122 from a first one of the core segments 56 to a second one of the core segments 56 which is arranged away from the first one in the first circumferential direction R1 of the annular assembly of the temporary joining runners 108. The winding of the second wire 74 around the core segments 56 in the wire winding process is achieved by sequentially moving the second nozzle 124 from a third one of the core segments 56 which is arranged at an interval of 180° away from the first core segment 56 to a fourth one of the core segments 56 which is located away from the third core segment 56 in the first circumferential direction R1 of the annular assembly of the temporary joining runners 108. The winding of the third wire 74 around the core segments 56 in the wire winding process is achieved by sequentially moving the third nozzle 126 from a fifth one of the core segments 56 which is arranged at an interval of 240° away from the first core segment 56 to a sixth one of the core segments 56 which is located away from the fifth core segment 56 in the first circumferential direction R1 of the annular assembly of the temporary joining runners 108.

After the wire of the winding 70 is wound in the core 50, the teeth 54 are, like in the modification of the first embodiment, turned inside out to orient the outer ends radially inside the core 50.

A triple-flyer system may also be used which is equipped with the first flyer 112, the second flyer 114, and the third flyer 116 instead of the first nozzle 122, the second nozzle 124, and the third nozzle 126. The winding 70 may be produced in the core 50 by moving the first flyer 112, the second flyer 114, and the third flyer 116.

For instance, a triple-flyer system illustrated in FIG. 31 may be used which includes the triangular-shaped jig 100 instead of the temporary joining runners 106 and the first flyer 112, the second flyer 114, and the third flyer 116 instead of the first nozzle 122, the second nozzle 124, and the third nozzle 126. The core segments 56 are arranged to have the teeth 54 whose outer ends are arranged in an annular shape and oriented to occupy the outer periphery of the core 50. The winding of the first wire 72 around the core segments 56 of the core 50 in the wire winding process is achieved by moving the first flyer 112 sequentially from one of the core segments 56 which is located on one of the corners 102 of the jig 100 in the circumferential direction of the jig 100. Similarly, the winding of each of the second wire 74 and the third wire 76 around the core segments 56 in the wire winding process is achieved by moving a corresponding one of the second flyer 114 and the third flyer 116 sequentially from one of the core segments 56 which is located on a corresponding one of the corners 102 of the jig 100 in the circumferential direction of the jig 100.

In the above case, like in the modification of the first embodiment, after completion of the wire winding process, the core 50 is, as can be seen in FIG. 12, turned inside out to change the orientation of the teeth 54 by 180°. Specifically, the core 50 is turned to extend the teeth 54 in the shape of a train and then curve them to change the state in FIG. 12 where the teeth 54 joined together in an annular shape have the outer ends facing outwardly of the core 50 to the state in FIG. 13 where the teeth 54 have the outer ends facing inwardly of the core 50, thereby completing the core 50 in state illustrated in FIG. 7.

After the core 50 is turned in the above way, the rotating electrical machine 10 is fabricated in the above-described steps following the winding shaping process.

The plurality of wire-connecting terminals 98 in the seventh embodiment are, unlike the first embodiment, designed to include the first wire-connecting terminal 98C to the ninth wire-connecting terminal 98A3, but however, may alternatively, like in the first embodiment, include the first wire-connecting terminal 98C to the third wire-connecting terminal 98A. In this case, the fourth connecting section C2 to the ninth connecting section A3 are joined to the first wire-connecting terminal 98C to the third wire-connecting terminal 98A along with the first connecting section C1 to the third connecting section A1, respectively.

The structure or production method in the seventh embodiment may be modified in the same manner as that in the fourth embodiment.

In the wire winding process in the seventh embodiment, of the U-phase coils U1 to U4, the V-phase coils V1 to V4, and the W-phase coils W1 to W4, only the V-phase coils V1 to V4 are fabricated by moving the first nozzle 122, the second nozzle 124, and the third nozzle 126 in the second circumferential direction R2 of the core 50, but however, the U-phase coils U1 to U4 or the W-phase coils W1 to W4 may alternatively be fabricated by moving the first nozzle 122, the second nozzle 124, and the third nozzle 126 in the second circumferential direction R2 of the core 50. This also enables a continuous wire made up of the first wire 72, the second wire 74, and the third wire 76 to be wound around the teeth 54 to form the winding 70, thereby improving the productivity of the rotating electrical machine 10.

Production Method of Rotating Electrical Machine in the Eighth Embodiment

The production method of the rotating electrical machine 10 in the eighth embodiment will be described below.

The production method of the rotating electrical machine 10 in the eighth embodiment is identical in the core setting process with that in the first embodiment, but different from the that in the first embodiment as described below.

Layout of Wire Connections of Winding

The production method of the rotating electrical machine 10 in the eighth embodiment works to produce the winding 70 equipped with the coils 78 which are delta-connected together in the k-series-connected-coil and n-parallel-connected-coil delta configuration where k is an even number, and n is a natural number, specifically, in a four-series-connected-coil delta configuration. In other words, in the rotating electrical machine 10 fabricated by the production method in the eighth embodiment, k is four, n is one, and each of the number of slots formed in the core 50, the number of the teeth 54, and the number of coils 78 is twelve.

The layout of the connections of the coils 78 in the four-series-connected-coil delta configuration will be described. The four (k=4) coils 78 for each phase are connected in series with each other in the form of the coil array 78A. The three coil arrays 78A for three-phases constitute three coil groups 80 which are connected together in a delta (i.e., triangular) configuration.

Wire Winding Process

The wire winding process in the eighth embodiment, like in the first embodiment, uses the single nozzle 120 (see FIG. 4) to wind a single continuous wire around the teeth 54 in a single-nozzle system to produce the winding 70. FIG. 32 is a diagram which represents the wire winding process in the eighth embodiment. Table 8 shows an operation schedule showing a sequence of wire-winding steps in the wire winding process in the eighth embodiment.

In the wire winding process in the eighth embodiment, the wire of the winding 70 is wound in a sequence of first to twelfth steps discussed below. In the drawings, numbers 1 to 12 within circles denote the order of formation of the coils 78.

First Step

In the first step, the wire of the winding 70 is wound from the first axial side Z2 of the core 50 around the first tooth 54U1 in a counterclockwise direction, as viewed in the axial direction of the first tooth 54U1, to form the first coil 78U1 with an integral number plus 0.5 of turns.

Afterwards, the wire of the winding 70 is extended toward the fourth coil 78U2 in the first circumferential direction R1 on the second axial side Z1 to form the first coil-to-coil connecting wire 84U1-U2.

Second Step

In the second step, the wire of the winding 70 is wound from the second axial side Z1 of the core 50 around the fourth tooth 54U2 in the counterclockwise direction, as viewed in the axial direction of the fourth tooth 54U2, to form the fourth coil 78U2 with an integral number plus 0.5 of turns. After completion of the fourth coil 78U2, the wire is directed or led to the first axial side Z2 of the core 50.

Afterwards, the wire of the winding 70 is extended toward the seventh coil 78U3 in the first circumferential direction R1 on the first axial side Z2 to form the fourth coil-to-coil connecting wire 84U2-U3.

Third Step

In the third step, the wire of the winding 70 is wound from the first axial side Z2 of the core 50 around the seventh tooth 54U3 in the counterclockwise direction, as viewed in the axial direction of the seventh tooth 54U3, to form the seventh coil 78U3 with an integral number plus 0.5 of turns.

Afterwards, the wire of the winding 70 is extended toward the tenth coil 78U4 in the second circumferential direction R2 on the second axial side Z1 to form the seventh coil-to-coil connecting wire 84U3-U4.

Fourth Step

In the fourth step, the wire of the winding 70 is wound from the second axial side Z1 of the core 50 around the tenth tooth 54U4 in the counterclockwise direction, as viewed in the axial direction of the tenth tooth 54U4, to form the tenth coil 78U4 with an integral number plus 0.5 of turns. After completion of the tenth coil 78U4, the wire is directed or led to the first axial side Z2 of the core 50.

Afterwards, the wire of the winding 70 is extended from the second axial side Z1 to the first axial side Z2 and then returned back to an interval between the tenth tooth 54U4 and the eleventh tooth 54V4 to form the second power input wire 82U4-V4. The second power input wire 82U4-V4 is, therefore, made of the wire continuing from the tenth coil 78U4.

Fifth Step

In the fifth step, the wire of the winding 70 is wound from the first axial side Z2 of the core 50 around the eleventh tooth 54V4 in the counterclockwise direction, as viewed in the axial direction of the eleventh tooth 54V4, to form the eleventh coil 78V4 with an integral number plus 0.5 of turns.

Afterwards, the wire of the winding 70 is extended toward the eighth coil 78V3 in the second circumferential direction R2 on the second axial side Z1 to form the eighth coil-to-coil connecting wire 84V4-V3.

Sixth Step

In the sixth step, the wire of the winding 70 is wound from the second axial side Z1 of the core 50 around the eighth tooth 54V3 in the counterclockwise direction, as viewed in the axial direction of the eighth tooth 54V3, to form the eighth coil 78V3 with an integral number plus 0.5 of turns. After completion of the eighth coil 78V3, the wire is directed or led to the first axial side Z2 of the core 50.

Afterwards, the wire of the winding 70 is extended toward the fifth coil 78V2 in the second circumferential direction R2 on the first axial side Z2 to form the fifth coil-to-coil connecting wire 84V3-V2.

Seventh Step

In the seventh step, the wire of the winding 70 is wound from the first axial side Z2 of the core 50 around the fifth tooth 54V2 in the counterclockwise direction, as viewed in the axial direction of the fifth tooth 54V2, to form the fifth coil 78V2 with an integral number plus 0.5 of turns.

Afterwards, the wire of the winding 70 is extended toward the second coil 78V1 in the second circumferential direction R2 on the second axial side Z1 to form the second coil-to-coil connecting wire 84V2-V1.

Eighth Step

In the eighth step, the wire of the winding 70 is wound from the second axial side Z1 of the core 50 around the second tooth 54V1 in the counterclockwise direction, as viewed in the axial direction of the second tooth 54V1, to form the second coil 78V1 with an integral number plus 0.5 of turns. After completion of the second coil 78V1, the wire is directed or led to the first axial side Z2 of the core 50.

Afterwards, the wire of the winding 70 is return from the first axial side Z2 back to an interval between the second tooth 54V1 and the third tooth 54W1 to complete the first power input wire 82V1-W1. The first power input wire 82V1-W1 is, therefore, made of wire continuing from the second coil 78V1.

Ninth Step

In the ninth step, the wire of the winding 70 is wound from the first axial side Z2 of the core 50 around the third tooth 54W1 in the counterclockwise direction, as viewed in the axial direction of the third tooth 54W1, to form the third coil 78W1 with an integral number plus 0.5 of turns.

Afterwards, the wire of the winding 70 is extended toward the sixth coil 78W2 in the first circumferential direction R1 on the second axial side Z1 to create the third coil-to-coil connecting wire 84W1-W2.

Tenth Step

In the tenth step, the wire of the winding 70 is wound from the second axial side Z1 of the core 50 around the sixth tooth 54W2 in the counterclockwise direction, as viewed in the axial direction of the sixth tooth 54W2, to create the sixth coil 78W2 with an integral number plus 0.5 of turns. After completion of the sixth coil 78W2, the wire is directed or led to the first axial side Z2 of the core 50.

Afterwards, the wire of the winding 70 is extended toward the ninth coil 78W3 in the first circumferential direction R1 on the first axial side Z2 to create the sixth coil-to-coil connecting wire 84W2-W3.

Eleventh Step

In the eleventh step, the wire of the winding 70 is wound from the first axial side Z2 of the core 50 around the ninth tooth 54W3 in the counterclockwise direction, as viewed in the axial direction of the ninth tooth 54W3, to create the ninth coil 78W3 with an integral number plus 0.5 of turns.

Afterwards, the wire of the winding 70 is extended toward the twelfth coil 78W4 in the first circumferential direction R1 on the second axial side Z1 to create the ninth coil-to-coil connecting wire 84W3-W4.

Twelfth Step

In the twelfth step, the wire of the winding 70 is wound from the second axial side Z1 of the core 50 around the twelfth tooth 54W4 in the counterclockwise direction, as viewed in the axial direction of the twelfth tooth 54W4, to create the twelfth coil 78W4 with an integral number plus 0.5 of turns. After completion of the twelfth coil 78W4, the wire is directed or led to the first axial side Z2 of the core 50.

Afterwards, the wire is extended toward the leading end 82A of the winding 70 on the first axial side Z2 of the core 50 to form the third power input wire 82W4-U1 in the wire connection process.

TABLE 8

| STEP | CONTENTS | Wire extracting direction (axial direction) | Wiring direction (circumferential direction) |
|---|---|---|---|
| 1 | Form $1^{st}$ coil U1 Create $1^{st}$ coil-to-coil connecting wire U1-U2 | $2^{nd}$ direction | $1^{st}$ direction |
| 2 | Form $4^{th}$ coil U2 Create $4^{th}$ coil-to-coil connecting wire U2-U3 | $1^{st}$ direction | $1^{st}$ direction |
| 3 | Form $7^{th}$ coil U3 Create $7^{th}$ coil-to-coil connecting wire U3-U4 | $2^{nd}$ direction | $1^{st}$ direction |
| 4 | Form $10^{th}$ coil U4 Create $2^{nd}$ power input wire U4-V4 | $1^{st}$ direction | $1^{st}$ direction |
| 5 | Form $11^{th}$ coil V4 Create $8^{th}$ coil-to-coil connecting wire V4-V3 | $2^{nd}$ direction | $2^{nd}$ direction |
| 6 | Form $8^{th}$ coil V3 Create $5^{th}$ coil-to-coil connecting wire V3-V2 | $1^{st}$ direction | $2^{nd}$ direction |
| 7 | Form $5^{th}$ coil V2 Create $2^{nd}$ coil-to-coil connecting wire V2-V1 | $2^{nd}$ direction | $2^{nd}$ direction |
| 8 | Form $2^{nd}$ coil V1 Create $1^{st}$ power input wire V1-W1 | $1^{st}$ direction | $1^{st}$ direction |
| 9 | Form $3^{rd}$ coil W1 Create $3^{rd}$ coil-to-coil connecting wire W1-W2 | $2^{nd}$ direction | $1^{st}$ direction |
| 10 | Form $6^{th}$ coil W2 Create $6^{th}$ coil-to-coil connecting wire W2-W3 | $1^{st}$ direction | $1^{st}$ direction |
| 11 | Form $9^{th}$ coil W3 Create $9^{th}$ coil-to-coil connecting wire W3-W4 | $2^{nd}$ direction | $1^{st}$ direction |
| 12 | Form $12^{th}$ coil W4 Create $3^{rd}$ power input wire W4-U1 Joining ends of leading and trailing ends of wire to complete $3^{rd}$ power input wire W4-U1 | $1^{st}$ direction | $1^{st}$ direction |

In the eighth embodiment, the winding 70 is produced in the four-series-connected-coil delta configuration in the way described above.

The first coil-to-coil connecting wire 84U1-U2, the second coil-to-coil connecting wire 84V2-V1, the third coil-to-coil connecting wire 84W1-W2, the seventh coil-to-coil connecting wire 84U3-U4, the eighth coil-to-coil connecting wire 84V4-V3, and the ninth coil-to-coil connecting wire 84W3-W4 will also be referred to as first coil-to-coil connecting wires in this disclosure, while the fourth coil-to-coil connecting wire 84U2-U3, the fifth coil-to-coil connecting wire 84V3-V2, and the sixth coil-to-coil connecting wire 84W2-W3 will also be referred to as second coil-to-coil connecting wires in this disclosure.

Each of the power input wires 82 is extended from a clearance between an adjacent two of the teeth 54. Each of the first direction-oriented connecting wires extends outside the core segments 56 over an adjacent two of the teeth 54 disposed therebetween. Each of the second direction-oriented connecting wires extends outside the core segments 56 over 2×2 of the teeth 54 disposed therebetween.

The first power input wire 82V1-W1, the second power input wire 82U4-V4, and the third power input wire 82W4-

U1 are, as clearly illustrated in FIG. 32, arranged on the first axial side Z2 of the core 50, while the first coil-to-coil connecting wire 84U1-U2, the second coil-to-coil connecting wire 84V2-V1, the third coil-to-coil connecting wire 84W1-W2, the seventh coil-to-coil connecting wire 84U3-U4, the eighth coil-to-coil connecting wire 84V4-V3, and the ninth coil-to-coil connecting wire 84W3-W4 are arranged on the second axial side Z1 of the core 50.

In wire winding process in the eighth embodiment, of the coils 78, the U-phase coils U1 to U4 and the W-phase coils W1 to W4 are produced by moving the nozzle 120 in the first circumferential direction R1 of the core 50, while the V-phase coils V1 to V4 are produced by moving the nozzle 120 in the second circumferential direction R2 of the core 50.

After completion of the wire winding process, the core segments 56 are cut from the temporary joining runners 106 and then connected together in an annular shape with the teeth 54 facing radially inward.

Winding Shaping Process, Wire Connection Process, and Fabrication Process

The winding shaping process, the wire connection process, and the fabrication process in the eighth embodiment are identical with those in the first embodiment. The rotating electrical machine 10 (see FIG. 1) is fabricated in the manner described above.

Operation and Beneficial Advantages

Portions of the structure and the production method in the eighth embodiment which are identical with those in the first embodiment offer substantially the same beneficial advantages as those in the first embodiment.

In the wire winding process in the eighth embodiment, the nozzle 120 is, as can be seen in FIG. 32, moved in the first circumferential direction R1 to wind the wire around the teeth 54 for two of the U-phase, the V-phase, and the W-phase, while the nozzle 120 is moved in the second circumferential direction R2 to wind the wire around the teeth 54 for a remaining one of the U-phase, the V-phase, and the W-phase. This winding way enables the winding 70 to be made by winding a continuous wire around the teeth 54, thereby improving the productivity of the winding 70.

Particularly, the rotating electrical machine 10 is designed in the form of an inner-rotor brushless motor in which the teeth 54 extend radially inward. The structure in the eighth embodiment is capable of reducing the size of the inner-rotor brushless motor, enhancing output power therefrom, producing it at low cost.

The power input wires 82 are arranged on the first axial side Z2 of the cord 50. Of the coil-to-coil connecting wires 84, the first coil-to-coil connecting wire 84U1-U2, the second coil-to-coil connecting wire 84V2-V1, the third coil-to-coil connecting wire 84W1-W2, the seventh coil-to-coil connecting wire 84U3-U4, the eighth coil-to-coil connecting wire 84V4-V3, and the ninth coil-to-coil connecting wire 84W3-W4 are arranged on the second axial side Z1 of the core 50. The fourth coil-to-coil connecting wire 84U2-U3, the fifth coil-to-coil connecting wire 84V3-V2, and the sixth coil-to-coil connecting wire 84W2-W3 are arranged on the first axial side Z2 of the core 50 without intersecting with the power input wires 82. This eliminates a risk that the power input wires 82 and the coil-to-coil connecting wires 84 may intricately tangle together.

No intersection between the power input wires 82 and the coil-to-coil connecting wires 84 also enables the power input wires 82 and the coil-to-coil connecting wires 84 to be arranged methodically on the first axial side Z2 and the second axial side Z1 in the fabrication process.

Each of the power input wires 82 is extended from a clearance between an adjacent two of the teeth 54, thereby resulting in a sufficient interval between the ends of each of the coil-to-coil connecting wires 84, while each of the power input wires 82 has the ends located at a decreased interval away from each other, thereby decreasing a risk of tangling of the coil-to-coil connecting wires 84 or the power input wires 82.

Each of the coil-to-coil connecting wires 84 extends outside the core segments 56 over an adjacent two or 2×2 of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Modifications

Modifications of the eighth embodiment will be described below.

The stator 20 in the eighth embodiment is designed, as an example, to have the coils 78 which are in the k-series-connected-coil and n-parallel-connected-coil delta configuration where k is an even number, and n is a natura number, specifically, where k is four, and n is one, but however, the production method of the stator 20 in the eighth embodiment may be used with all types of three-phase brushless motor in which each of the number of the slots formed in the core 50, the number of the teeth 54, and the number of the coils 78 is six or more that is a multiple of six. For instance, the number of the slots, the number of the teeth 54, and the number of the coils 78 may be selected to be 6 (i.e., k=2 and n=1), 12 (i.e., k=4 and n=1), 18 (i.e., k=6 and n=1), 24 (i.e., k=8 and n=1), 30 (i.e., k=10 and n=1), 36 (i.e., k=12 and n=1), . . . .

The structure or production method in the eighth embodiment may be modified in the same manner as that in the first embodiment.

In the wire winding process in the eighth embodiment, of the U-phase coils U1 to U4, the V-phase coils V1 to V4, and the W-phase coils W1 to W4, only the V-phase coils V1 to V4 are fabricated by moving the nozzle 120 in the second circumferential direction R2 of the core 50, but however, the U-phase coils U1 to U4 or the W-phase coils W1 to W4 may alternatively be fabricated by moving the nozzle 120 in the second circumferential direction R2 of the core 50. This also enables a continuous wire to be wound around the teeth 54 to form the winding 70, thereby improving the productivity of the rotating electrical machine 10.

Production Method of Rotating Electrical Machine in the Ninth Embodiment

The production method of the rotating electrical machine 10 in the ninth embodiment will be described below.

The production method of the rotating electrical machine 10 in the ninth embodiment is identical in the core setting process with that in the eighth embodiment, but different in wire winding process from that in the eighth embodiment as described below.

Wire Winding Process

The wire winding process in the ninth embodiment, like in the first embodiment, uses the single nozzle 120 (see FIG. 4) to wind a single continuous wire around the teeth 54 in a single-nozzle system to produce the winding 70. FIG. 33 is a diagram which represents the wire winding process in the ninth embodiment. Table 9 shows an operation schedule showing a sequence of wire-winding steps in the wire winding process in the ninth embodiment.

In the wire winding process in the ninth embodiment, the wire of the winding 70 is wound in a sequence of first to twelfth steps discussed below. In the drawings, numbers 1 to 12 within circles denote the order of formation of the coils 78.

First Step

In the first step, the wire of the winding 70 is wound from the first axial side Z2 of the core 50 around the first tooth 54U1 in a clockwise direction, as viewed in the axial direction of the first tooth 54U1, to form the first coil 78U1 with an integral number plus 0.5 of turns.

Afterwards, the wire of the winding 70 is extended toward the fourth coil 78U2 in the first circumferential direction R1 on the second axial side Z1 to form the first coil-to-coil connecting wire 84U1-U2.

Second Step

In the second step, the wire of the winding 70 is wound from the second axial side Z1 of the core 50 around the fourth tooth 54U2 in the clockwise direction, as viewed in the axial direction of the fourth tooth 54U2, to form the fourth coil 78U2 with an integral number plus 0.5 of turns. After completion of the fourth coil 78U2, the wire is directed or led to the first axial side Z2 of the core 50.

Afterwards, the wire of the winding 70 is extended toward the seventh coil 78U3 in the first circumferential direction R1 on the first axial side Z2 to form the fourth coil-to-coil connecting wire 84U2-U3.

Third Step

In the third step, the wire of the winding 70 is wound from the first axial side Z2 of the core 50 around the seventh tooth 54U3 in the clockwise direction, as viewed in the axial direction of the seventh tooth 54U3, to form the seventh coil 78U3 with an integral number plus 0.5 of turns.

Afterwards, the wire of the winding 70 is extended toward the tenth coil 78U4 in the first circumferential direction R1 on the second axial side Z1 to form the seventh coil-to-coil connecting wire 84U3-U4.

Fourth Step

In the fourth step, the wire of the winding 70 is wound from the second axial side Z1 of the core 50 around the tenth tooth 54U4 in the clockwise direction, as viewed in the axial direction of the tenth tooth 54U4, to form the tenth coil 78U4 with an integral number plus 0.5 of turns. After completion of the tenth coil 78U4, the wire is directed or led to the first axial side Z2 of the core 50.

Afterwards, the wire of the winding 70 is extended toward the eleventh coil 78V4 in the first circumferential direction R1 on the first axial side Z2 to form the second power input wire 82U4-V4. The second power input wire 82U4-V4 is, therefore, made of the wire continuing from the tenth coil 78U4.

Fifth Step

In the fifth step, the wire of the winding 70 is wound from the first axial side Z2 of the core 50 around the eleventh tooth 54V4 in the clockwise direction, as viewed in the axial direction of the eleventh tooth 54V4, to form the eleventh coil 78V4 with an integral number plus 0.5 of turns.

Afterwards, the wire of the winding 70 is extended toward the eighth coil 78V3 in the second circumferential direction R2 on the second axial side Z1 to form the eighth coil-to-coil connecting wire 84V4-V3.

Sixth Step

In the sixth step, the wire of the winding 70 is wound from the second axial side Z1 of the core 50 around the eighth tooth 54V3 in the clockwise direction, as viewed in the axial direction of the eighth tooth 54V3, to form the eighth coil 78V3 with an integral number plus 0.5 of turns. After completion of the eighth coil 78V3, the wire is directed or led to the first axial side Z2 of the core 50.

Afterwards, the wire of the winding 70 is extended toward the fifth coil 78V2 in the second circumferential direction R2 on the first axial side Z2 to form the fifth coil-to-coil connecting wire 84V3-V2.

Seventh Step

In the seventh step, the wire of the winding 70 is wound from the first axial side Z2 of the core 50 around the fifth tooth 54V2 in the clockwise direction, as viewed in the axial direction of the fifth tooth 54V2, to form the fifth coil 78V2 with an integral number plus 0.5 of turns.

Afterwards, the wire of the winding 70 is extended toward the second coil 78V1 in the second circumferential direction R2 on the second axial side Z1 to form the second coil-to-coil connecting wire 84V2-V1.

Eighth Step

In the eighth step, the wire of the winding 70 is wound from the second axial side Z1 of the core 50 around the second tooth 54V1 in the clockwise direction, as viewed in the axial direction of the second tooth 54V1, to form the second coil 78V1 with an integral number plus 0.5 of turns. After completion of the second coil 78V1, the wire is directed or led to the first axial side Z2 of the core 50.

Afterwards, the wire of the winding 70 is extended toward the third coil 78W1 in the first circumferential direction R1 on the first axial side Z2 to form the first power input wire 82V1-W1. The first power input wire 82V1-W1 is, therefore, made of wire continuing from the second coil 78V1.

Ninth Step

In the ninth step, the wire of the winding 70 is wound from the first axial side Z2 of the core 50 around the third tooth 54W1 in the clockwise direction, as viewed in the axial direction of the third tooth 54W1, to form the third coil 78W1 with an integral number plus 0.5 of turns.

Afterwards, the wire of the winding 70 is extended toward the sixth coil 78W2 in the first circumferential direction R1 on the second axial side Z1 to create the third coil-to-coil connecting wire 84W1-W2.

Tenth Step

In the tenth step, the wire of the winding 70 is wound from the second axial side Z1 of the core 50 around the sixth tooth 54W2 in the clockwise direction, as viewed in the axial direction of the sixth tooth 54W2, to create the sixth coil 78W2 with an integral number plus 0.5 of turns. After completion of the sixth coil 78W2, the wire is directed or led to the first axial side Z2 of the core 50.

Afterwards, the wire of the winding 70 is extended toward the ninth coil 78W3 in the first circumferential direction R1 on the first axial side Z2 to create the sixth coil-to-coil connecting wire 84W2-W3.

Eleventh Step

In the eleventh step, the wire of the winding 70 is wound from the first axial side Z2 of the core 50 around the ninth tooth 54W3 in the clockwise direction, as viewed in the axial direction of the ninth tooth 54W3, to create the ninth coil 78W3 with an integral number plus 0.5 of turns.

Afterwards, the wire of the winding 70 is extended toward the twelfth coil 78W4 in the first circumferential direction R1 on the second axial side Z1 to create the ninth coil-to-coil connecting wire 84W3-W4.

Twelfth Step

In the twelfth step, the wire of the winding 70 is wound from the second axial side Z1 of the core 50 around the twelfth tooth 54W4 in the clockwise direction, as viewed in the axial direction of the twelfth tooth 54W4, to create the twelfth coil 78W4 with an integral number plus 0.5 of turns. After completion of the twelfth coil 78W4, the wire is directed or led to the first axial side Z2 of the core 50.

Afterwards, the wire is extended on the second axial side Z1 of the core 50 toward the leading end 82A of the winding 70. The joint 90 is then formed in the wire connection process which will be described later, thereby creating the third power input wire 82W4-U1.

TABLE 9

| STEP | CONTENTS | Wire extracting direction (axial direction) | Wiring direction (circumferential direction) |
|---|---|---|---|
| 1 | Form 1$^{st}$ coil U1 Create 1$^{st}$ coil-to-coil connecting wire U1-U2 | 2$^{nd}$ direction | 1$^{st}$ direction |
| 2 | Form 4$^{th}$ coil U2 Create 4$^{th}$ coil-to-coil connecting wire U2-U3 | 1$^{st}$ direction | 1$^{st}$ direction |
| 3 | Form 7$^{th}$ coil U3 Create 7$^{th}$ coil-to-coil connecting wire U3-U4 | 2$^{nd}$ direction | 1$^{st}$ direction |
| 4 | Form 10$^{th}$ coil U4 Create 2$^{nd}$ power input wire U4-V4 | 1$^{st}$ direction | 1$^{st}$ direction |
| 5 | Form 11$^{th}$ coil V4 Create 8$^{th}$ coil-to-coil connecting wire V4-V3 | 2$^{nd}$ direction | 2$^{nd}$ direction |
| 6 | Form 8$^{th}$ coil V3 Create 5$^{th}$ coil-to-coil connecting wire V3-V2 | 1$^{st}$ direction | 2$^{nd}$ direction |
| 7 | Form 5$^{th}$ coil V2 Create 2$^{nd}$ coil-to-coil connecting wire V2-V1 | 2$^{nd}$ direction | 2$^{nd}$ direction |
| 8 | Form 2$^{nd}$ coil V1 Create 1$^{st}$ power input wire V1-W1 | 1$^{st}$ direction | 1$^{st}$ direction |
| 9 | Form 3$^{rd}$ coil W1 Create 3$^{rd}$ coil-to-coil connecting wire W1-W2 | 2$^{nd}$ direction | 1$^{st}$ direction |
| 10 | Form 6$^{th}$ coil W2 Create 6$^{th}$ coil-to-coil connecting wire W2-W3 | 1$^{st}$ direction | 1$^{st}$ direction |
| 11 | Form 9$^{th}$ coil W3 Create 9$^{th}$ coil-to-coil connecting wire W3-W4 | 2$^{nd}$ direction | 1$^{st}$ direction |
| 12 | Form 12$^{th}$ coil W4 Create 3$^{rd}$ power input wire W4-U1 Joining ends of leading and trailing ends of wire to complete 3$^{rd}$ power input wire W4-U1 | 1$^{st}$ direction | 1$^{st}$ direction |

In the ninth embodiment, the winding 70 is produced in the four-series-connected-coil delta configuration in the way described above.

The first coil-to-coil connecting wire 84U1-U2, the second coil-to-coil connecting wire 84V2-V1, the third coil-to-coil connecting wire 84W1-W2, the seventh coil-to-coil connecting wire 84U3-U4, the eighth coil-to-coil connecting wire 84V4-V3, and the ninth coil-to-coil connecting wire 84W3-W4 will also be referred to as first coil-to-coil connecting wires in this disclosure. The fourth coil-to-coil connecting wire 84U2-U3, the fifth coil-to-coil connecting wire 84V3-V2, and the sixth coil-to-coil connecting wire 84W2-W3 will also be referred to as second coil-to-coil connecting wires in this disclosure.

Each of the power input wires 82 extends outside the core segments 56 over an adjacent two of the teeth 54 disposed therebetween. Each of the first direction-oriented connecting wires extends outside the core segments 56 over 2×2 of the teeth 54 disposed therebetween. Each of the second direction-oriented connecting wires extends outside the core segments 56 over an adjacent two of the teeth 54 disposed therebetween.

The first power input wire 82V1-W1, the second power input wire 82U4-V4, and the third power input wire 82W4-U1 are, as clearly illustrated in FIG. 33, arranged on the first axial side Z2 of the core 50. The first coil-to-coil connecting wire 84U1-U2, the second coil-to-coil connecting wire 84V2-V1, the third coil-to-coil connecting wire 84W1-W2, the seventh coil-to-coil connecting wire 84U3-U4, the eighth coil-to-coil connecting wire 84V4-V3, and the ninth coil-to-coil connecting wire 84W3-W4 are arranged on the second axial side Z1 of the core 50. The fourth coil-to-coil connecting wire 84U2-U3, the fifth coil-to-coil connecting wire 84V3-V2, and the sixth coil-to-coil connecting wire 84W2-W3 are arranged on the first axial side Z1 of the core 50.

In the wire winding process in the ninth embodiment, of the coils 78, the U-phase coils U1 to U4 and the W-phase coils W1 to W4 are fabricated by moving the nozzle 120 in the first circumferential direction of the core 50, while the V-phase coils V1 to V4 are fabricated by moving the nozzle 120 in the second circumferential direction R2 of the core 50.

After completion of the wire winding process, the core segments 56 are cut from the temporary joining runners 106 and then arranged in connection with each other in an annular form with the teeth 54 facing radially inward.

Winding Shaping Process, Wire Connection Process, and Fabrication Process

The winding shaping process, the wire connection process, and the fabrication process in the ninth embodiment are identical with those in the first embodiment. The rotating electrical machine 10 (see FIG. 1) is fabricated in the manner described above.

Operation and Beneficial Advantages

Portions of the structure and the production method in the ninth embodiment which are identical with those in the first embodiment offer substantially the same beneficial advantages as those in the first embodiment.

In the wire winding process in the ninth embodiment, the nozzle 120 is, as can be seen in FIG. 33, moved in the first circumferential direction R1 to wind the wire around the teeth 54 for two of the U-phase, the V-phase, and the W-phase, while the nozzle 120 is moved in the second circumferential direction R2 to wind the wire around the teeth 54 for a remaining one of the U-phase, the V-phase, and the W-phase. This winding way enables the winding 70 to be made by winding a continuous wire around the teeth 54, thereby improving the productivity of the winding 70.

Particularly, the rotating electrical machine 10 is designed in the form of an inner-rotor brushless motor in which the teeth 54 extend radially inward. The structure in the ninth embodiment is capable of reducing the size of the inner-rotor brushless motor, enhancing output power therefrom, producing it at low cost.

The power input wires 82 are arranged on the first axial side Z2 of the core 50. Of the coil-to-coil connecting wires 84, the first coil-to-coil connecting wire 84U1-U2, the second coil-to-coil connecting wire 84V2-V1, the third coil-to-coil connecting wire 84W1-W2, the seventh coil-to-coil connecting wire 84U3-U4, the eighth coil-to-coil connecting wire 84V4-V3, and the ninth coil-to-coil connecting wire 84W3-W4 are arranged on the second axial side Z1 of the core 50, while the fourth coil-to-coil connecting wire 84U2-U3, the fifth coil-to-coil connecting wire 84V3-V2, and the sixth coil-to-coil connecting wire 84W2-W3 are arranged on the first axial side Z2 of the core 50 without intersecting with the power input wires 82. This eliminates a risk that the power input wires 82 and the coil-to-coil connecting wires 84 may become tangled together in the winding shaping process.

No intersection between the power input wires 82 and the coil-to-coil connecting wires 84 also enables the power input wires 82 and the coil-to-coil connecting wires 84 to be arranged methodically on the first axial side Z2 and the second axial side Z1 in the fabrication process.

Each of the power input wires 82 extends over an adjacent two of the teeth 54, thereby resulting in a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Modifications

Modifications of the ninth embodiment will be described below.

The stator 20 in the ninth embodiment is designed, as an example, to have the coils 78 which are in the k-series-connected-coil and n-parallel-connected-coil delta configuration where k is an even number, and n is a natura number, specifically, where k is four, and n is one, but however, the production method of the stator 20 in the ninth embodiment may be used with all types of three-phase brushless motor in which each of the number of the slots formed in the core 50, the number of the teeth 54, and the number of the coils 78 is six or more and is a multiple of six. For instance, the number of the slots, the number of the teeth 54, and the number of the coils 78 may be selected to be 6 (i.e., k=2 and n=1), 12 (i.e., k=4 and n=1), 18 (i.e., k=6 and n=1), 24 (i.e., k=8 and n=1), 30 (i.e., k=10 and n=1), 36 (i.e., k=12 and n=1), . . . .

The structure or production method in the ninth embodiment may be modified in the same manner as that in the eighth embodiment.

In the wire winding process in the ninth embodiment, of the U-phase coils U1 to U4, the V-phase coils V1 to V4, and the W-phase coils W1 to W4, only the V-phase coils V1 to V4 are fabricated by moving the nozzle 120 in the second circumferential direction R2 of the core 50, but however, the U-phase coils U1 to U4 or the W-phase coils W1 to W4 may alternatively be fabricated by moving the nozzle 120 in the second circumferential direction R2 of the core 50. This also enables a continuous wire to be wound around the teeth 54 to form the winding 70, thereby improving the productivity of the rotating electrical machine 10.

Production Method of Rotating Electrical Machine in the Tenth Embodiment

The production method of the rotating electrical machine 10 in the tenth embodiment will be described below.

The production method of the rotating electrical machine 10 in the tenth embodiment is identical in the core setting process with that in the third embodiment, but different in wire winding process from that in the third embodiment as described below.

Layout of Wire Connections of Winding

The production method of the rotating electrical machine 10 in the tenth embodiment works to produce the winding 70 equipped with the coils 78 which are delta-connected together in the k-series-connected-coil and n-parallel-connected-coil delta configuration where k is an even number, and n is a natural number, specifically, in a two-series-connected-coil and a two-parallel-connected-coil delta configuration. In other words, in the rotating electrical machine 10 fabricated by the production method in the tenth embodiment, k is two, n is two, and each of the number of slots formed in the core 50, the number of the teeth 54, and the number of coils 78 is twelve.

The layout of the connections of the coils 78 in the two-series-connected-coil and two-parallel-connected coil delta configuration will be described. The two (k=2) coils 78 for each phase are connected in series with each other in the form of the coil array 78A. The two coil arrays 78A for each phase constitute the coil group 80. The three coil groups 80 each of which includes the four coils 78 are connected together in a delta (i.e., triangular) configuration.

Wire Winding Process

The wire winding process in the tenth embodiment, like in the first embodiment, uses the single nozzle 120 (see FIG. 4) to wind a single continuous wire around the teeth 54 in a single-nozzle system to produce the winding 70. FIG. 34 is a diagram which represents the wire winding process in the tenth embodiment. Table 10 shows an operation schedule showing a sequence of wire-winding steps in the wire winding process in the tenth embodiment.

In the wire winding process in the tenth embodiment, the wire of the winding 70 is wound in a sequence of first to twelfth steps discussed below. In the drawings, numbers 1 to 12 within circles denote the order of formation of the coils 78.

First Step

In the first step, the wire of the winding 70 is wound from the first axial side Z2 of the core 50 around the first tooth 54U1 in the counterclockwise direction, as viewed in the axial direction of the first tooth 54U1, to form the first coil 78U1 with an integral number plus 0.5 of turns.

Afterwards, the wire of the winding 70 is extended toward the fourth coil 78U2 in the first circumferential direction R1 on the second axial side Z1 to form the first coil-to-coil connecting wire 84U1-U2.

Second Step

In the second step, the wire of the winding 70 is wound from the second axial side Z1 of the core 50 around the fourth tooth 54U2 in the counterclockwise direction, as viewed in the axial direction of the fourth tooth 54U2, to form the fourth coil 78U2 with an integral number plus 0.5 of turns. After completion of the fourth coil 78U2, the wire is directed or led to the first axial side Z2 of the core 50.

Afterwards, the wire of the winding 70 is returned from the first axial side Z2 back to an interval between the fourth tooth 54U2 and the fifth tooth 54V2 to create the second power input wire 82U2-V2. The second power input wire 82U2-V2 is, therefore made of the wire continuing from the fourth coil 78U2.

Third Step

In the third step, the wire of the winding 70 is wound from the first axial side Z2 of the core 50 around the fifth tooth 54V2 in the counterclockwise direction, as viewed in the axial direction of the fifth tooth 54V2, to form the fifth coil 78V2 with an integral number plus 0.5 of turns.

Afterwards, the wire of the winding 70 is extended toward the second coil 78V2 in the second circumferential direction R2 on the second axial side Z1 to form the second coil-to-coil connecting wire 84V2-V1.

Fourth Step

In the fourth step, the wire of the winding 70 is wound from the second axial side Z1 of the core 50 around the second tooth 54V1 in the counterclockwise direction, as viewed in the axial direction of the second tooth 54V1, to form the second coil 78V1 with an integral number plus 0.5 of turns. After completion of the second coil 78V1, the wire is directed or led to the first axial side Z2 of the core 50.

Afterwards, the wire of the winding 70 is returned from the first axial side Z2 back to an interval between the second tooth 54V1 and the third tooth 54W1 to create the first power input wire 82V1-W1. The first power input wire 82V1-W1 is, therefore made of the wire continuing from the second coil 78V1.

Fifth Step

In the fifth step, the wire of the winding 70 is wound from the first axial side Z2 of the core 50 around the third tooth 54W1 in the counterclockwise direction, as viewed in the axial direction of the third tooth 54W1, to form the third coil 78W1 with an integral number plus 0.5 of turns.

Afterwards, the wire of the winding 70 is extended toward the sixth coil 78W2 in the first circumferential direction R1 on the second axial side Z1 to form the third coil-to-coil connecting wire 84W1-W2.

Sixth Step

In the sixth step, the wire of the winding 70 is wound from the second axial side Z1 of the core 50 around the sixth tooth 54W2 in the counterclockwise direction, as viewed in the axial direction of the sixth tooth 54W2, to form the sixth coil 78W2 with an integral number plus 0.5 of turns. After completion of the sixth coil 78W2, the wire is directed or led to the first axial side Z2 of the core 50.

Afterwards, the wire of the winding 70 is returned from the first axial side Z2 back to an interval between the sixth tooth 54W2 and the seventh tooth 54U3 to create the third power input wire 82W2-U3.

Seventh Step

In the seventh step, the wire of the winding 70 is wound from the first axial side Z2 of the core 50 around the seventh tooth 54U3 in the counterclockwise direction, as viewed in the axial direction of the seventh tooth 54U3, to form the seventh coil 78U3 with an integral number plus 0.5 of turns.

Afterwards, the wire of the winding 70 is extended toward the tenth coil 78U4 in the first circumferential direction R1 on the second axial side Z1 to form the fourth coil-to-coil connecting wire 84U3-U4.

Eighth Step

In the eighth step, the wire of the winding 70 is wound from the second axial side Z1 of the core 50 around the tenth tooth 54U4 in the counterclockwise direction, as viewed in the axial direction of the tenth tooth 54U4, to form the tenth coil 78U4 with an integral number plus 0.5 of turns. After completion of the tenth coil 78U4, the wire is directed or led to the first axial side Z2 of the core 50.

Afterwards, the wire of the winding 70 is returned from the first axial side Z2 back to an interval between the tenth tooth 54U4 and the eleventh tooth 54V4 to create the fifth power input wire 82U4-V4. The fifth power input wire 82U4-V4 is, therefore made of the wire continuing from the tenth coil 78U4.

Ninth Step

In the ninth step, the wire of the winding 70 is wound from the first axial side Z2 of the core 50 around the eleventh tooth 54V4 in the counterclockwise direction, as viewed in the axial direction of the eleventh tooth 54V4, to form the eleventh coil 78V4 with an integral number plus 0.5 of turns.

Afterwards, the wire of the winding 70 is extended toward the eighth coil 78V3 in the second circumferential direction R2 on the second axial side Z1 to form the fifth coil-to-coil connecting wire 84V4-V3.

Tenth Step

In the tenth step, the wire of the winding 70 is wound from the second axial side Z1 of the core 50 around the eighth tooth 54V3 in the counterclockwise direction, as viewed in the axial direction of the eighth tooth 54V3, to form the eighth coil 78V3 with an integral number plus 0.5 of turns. After completion of the eighth coil 78V3, the wire is directed or led to the first axial side Z2 of the core 50.

Afterwards, the wire of the winding 70 is returned from the first axial side Z2 back to an interval between the eighth tooth 54V3 and the ninth tooth 54W3 to create the fourth power input wire 82V3-W3. The fourth power input wire 82V3-W3 is, therefore made of the wire continuing from the eighth coil 78V3.

Eleventh Step

In the eleventh step, the wire of the winding 70 is wound from the first axial side Z2 of the core 50 around the ninth tooth 54W3 in the counterclockwise direction, as viewed in the axial direction of the ninth tooth 54W3, to form the ninth coil 78W3 with an integral number plus 0.5 of turns.

Afterwards, the wire of the winding 70 is extended toward the twelfth coil 78W4 in the first circumferential direction R1 on the second axial side Z1 to the sixth coil-to-coil connecting wire 84W3-W4.

Twelfth Step

In the twelfth step, the wire of the winding 70 is wound from the second axial side Z1 of the core 50 around the twelfth tooth 54W4 in the counterclockwise direction, as viewed in the axial direction of the twelfth tooth 54W4, to form the twelfth coil 78W4 with an integral number plus 0.5 of turns. After completion of the twelfth coil 78W4, the wire is directed or led to the first axial side Z2 of the core 50.

Afterwards, the wire of the winding 70 is extended to the leading end 82A of the winding 70 on the first axial side Z2 of the core 50 to create the sixth power input wire 82W4-U1 in the wire connection process.

TABLE 10

| | | extracting | |
| --- | --- | --- | --- |
| STEP | CONTENTS | Wire extracting direction (axial direction) | Wiring direction (circumferential direction) |
| 1 | Form $1^{st}$ coil U1 Create $1^{st}$ coil-to-coil connecting wire U1-U2 | $2^{nd}$ direction | $1^{st}$ direction |
| 2 | Form $4^{th}$ coil U2 Create $2^{nd}$ power input wire U2-V2 | $1^{st}$ direction | $1^{st}$ direction |
| 3 | Form $5^{th}$ coil V2 Create $2^{nd}$ coil-to-coil connecting wire V2-V1 | $2^{nd}$ direction | $2^{nd}$ direction |
| 4 | Form $2^{nd}$ coil V1 Create $1^{st}$ power input wire V1-W1 | $1^{st}$ direction | $1^{st}$ direction |
| 5 | Form $3^{rd}$ coil W1 Create $3^{rd}$ coil-to-coil connecting wire W1-W2 | $2^{nd}$ direction | $1^{st}$ direction |
| 6 | Form $6^{th}$ coil W2 Create $3^{rd}$ power input wire W2-U3 | $1^{st}$ direction | $1^{st}$ direction |

TABLE 10-continued

| | | extracting | |
|---|---|---|---|
| STEP | CONTENTS | Wire extracting direction (axial direction) | Wiring direction (circumferential direction) |
| 7 | Form $7^{th}$ coil U3 Create $4^{th}$ coil-to-coil connecting wire U3-U4 | $2^{nd}$ direction | $1^{st}$ direction |
| 8 | Form $10^{th}$ coil U4 Create $5^{th}$ power input wire U4-V4 | $1^{st}$ direction | $1^{st}$ direction |
| 9 | Form $11^{th}$ coil V4 Create $5^{th}$ coil-to-coil connecting wire V4-V3 | $2^{nd}$ direction | $2^{nd}$ direction |
| 10 | Form $8^{th}$ coil V3 Create $4^{th}$ power input wire V3-W3 | $1^{st}$ direction | $1^{st}$ direction |
| 11 | Form $9^{th}$ coil W3 Create $6^{th}$ coil-to-coil connecting wire W3-W4 | $2^{nd}$ direction | $1^{st}$ direction |
| 12 | Form $12^{th}$ coil W4 Create $6^{th}$ power input wire W4-U1 Joining ends of leading and trailing ends of wire to complete $6^{th}$ power input wire W4-U1 | $1^{st}$ direction | $1^{st}$ direction |

In the tenth embodiment, the winding 70 is produced in the two-series-connected-coil and two-parallel-connected coil delta configuration in the way described above.

Each of the power input wires 82 is extended from an interval between an adjacent two of the teeth 54. Each of the first direction-oriented connecting wires extends outside the core segments 56 over 2×2 of the teeth 54. Each of the second direction-oriented connecting wires extends outside the core segments 56 over an adjacent two of the teeth 54.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the second axial side Z1 of the core 50.

In wire winding process in the tenth embodiment, of the coils 78, the U-phase coils U1 to U4 and the W-phase coils W1 to W4 are produced by moving the nozzle 120 in the first circumferential direction R1 of the core 50, while the V-phase coils V1 to V4 are produced by moving the nozzle 120 in the second circumferential direction R2 of the core 50.

After completion of the wire winding process, the core segments 56 are cut from the temporary joining runners 106 and then connected together in an annular shape with the teeth 54 facing radially inward.

Winding Shaping Process, Wire Connection Process, and Fabrication Process

The winding shaping process, the wire connection process, and the fabrication process in the tenth embodiment are identical with those in the third embodiment. The rotating electrical machine 10 (see FIG. 1) is fabricated in the manner described above.

Operation and Beneficial Advantages

Portions of the structure and the production method in the tenth embodiment which are identical with those in the third embodiment offer substantially the same beneficial advantages as those in the third embodiment.

In the wire winding process in the tenth embodiment, the nozzle 120 is, as can be seen in FIG. 34, moved in the first circumferential direction R1 to wind the wire around the teeth 54 for two of the U-phase, the V-phase, and the W-phase, while the nozzle 120 is moved in the second circumferential direction R2 to wind the wire around the teeth 54 for a remaining one of the U-phase, the V-phase, and the W-phase. This winding way enables the winding 70 to be made by winding a continuous wire around all the teeth 54, thereby improving the productivity of the winding 70.

Particularly, the rotating electrical machine 10 is designed in the form of an inner-rotor brushless motor in which the teeth 54 extend radially inward. The structure in the tenth embodiment is capable of reducing the size of the inner-rotor brushless motor, enhancing output power therefrom, producing it at low cost.

The power input wires 82 are arranged on the first axial side Z2 of the cord 50. The coil-to-coil connecting wires 84 are arranged on the second axial side Z1 of the core 50. This causes the power input wires 82 and the coil-to-coil connecting wires 84 to extend without intersecting with each other. This eliminates a risk that the power input wires 82 and the coil-to-coil connecting wires 84 may intricately tangle together.

No intersection between the power input wires 82 and the coil-to-coil connecting wires 84 also enables the power input wires 82 and the coil-to-coil connecting wires 84 to be arranged methodically on the first axial side Z2 and the second axial side Z1 in the fabrication process.

Each of the power input wires 82 is extended from a clearance between an adjacent two of the teeth 54, thereby resulting in a sufficient interval between the ends of each of the coil-to-coil connecting wires 84, while each of the power input wires 82 has the ends located at a decreased interval away from each other, thereby decreasing a risk of intricate tangling of the coil-to-coil connecting wires 84 or the power input wires 82.

Each of the coil-to-coil connecting wires 84 extends outside the core segments 56 over an adjacent two or 2×2 of the teeth 54 disposed therebetween. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Modifications

Modifications of the tenth embodiment will be described below.

The stator 20 in the ninth embodiment is designed, as an example, to have the coils 78 which are in the k-series-connected-coil and n-parallel-connected-coil delta configuration where k is an even number, and n is a natura number, specifically, where k is two, and n is two, but however, the production method of the stator 20 in the tenth embodiment may be used with all types of three-phase brushless motor in which each of the number of the slots formed in the core 50, the number of the teeth 54, and the number of the coils 78 is twelve or more that is a multiple of six. For instance, the number of the slots, the number of the teeth 54, and the number of the coils 78 may be selected to be 12 (i.e., k=2 and n=2), 18 (i.e., k=3 and n=2 or k=2 and n=3), 24 (i.e., k=4 and n=2 or k=2 and n=4), 30 (i.e., k=5 and n=2 or k=2 and n=5), 36 (i.e., k=6 and n=2, k=3 and n=4, k=4 and n=3, or k=2 and n=6), . . . .

The structure or production method in the tenth embodiment may be modified in the same manner as that in the third embodiment.

In the wire winding process in the tenth embodiment, of the U-phase coils U1 to U4, the V-phase coils V1 to V4, and the W-phase coils W1 to W4, only the V-phase coils V1 to V4 are fabricated by moving the nozzle 120 in the second circumferential direction R2 of the core 50, but however, the U-phase coils U1 to U4 or the W-phase coils W1 to W4 may alternatively be fabricated by moving the nozzle 120 in the second circumferential direction R2 of the core 50. This also enables a continuous wire to be wound around the teeth 54 to form the winding 70, thereby improving the productivity of the rotating electrical machine 10.

Production Method of Rotating Electrical Machine in the Eleventh Embodiment

The production method of the rotating electrical machine 10 in the eleventh embodiment will be described below.

The production method of the rotating electrical machine 10 in the eleventh embodiment is identical in the core setting process with that in the tenth embodiment, but different in wire winding process from that in the tenth embodiment as described below.

Wire Winding Process

The wire winding process in the eleventh embodiment uses the first nozzle 122 and the second nozzle 124 to wind the first wire 72 and the second wire 74 around the teeth 54 in a double-nozzle system to produce the winding 70. FIG. 35 is a diagram which represents the wire winding process in the eleventh embodiment. Table 11 shows an operation schedule showing a sequence of wire-winding steps in the wire winding process in the eleventh embodiment.

In the wire winding process in the eleventh embodiment, the first wire 72 and the second wire 74 are wound around the teeth 54 in a sequence of first to sixth steps discussed below. In the drawings, numbers 1 to 6 within circles denote the order of formation of the coils 78.

First Step-1

In the first step, the first nozzle 122 (see FIG. 24) is used to wind the first wire 72 from the first axial side Z2 of the core 50 around the first tooth 54U1 in the counterclockwise direction, as viewed in the axial direction of the first tooth 54U1, to form the first coil 78U1 with an integral number plus 0.5 of turns.

Afterwards, the first wire 72 is extended toward the fourth coil 78U2 in the first circumferential direction R1 on the first axial side Z2 to form the first coil-to-coil connecting wire 84U1-U2.

First Step-2

Similarly, in the first step, the second nozzle 124 (see FIG. 24) is used to wind the second wire 74 from the first axial side Z2 of the core 50 around the seventh tooth 54U3 in the counterclockwise direction, as viewed in the axial direction of the seventh tooth 54U3, to form the seventh coil 78U3 with an integral number plus 0.5 of turns.

Afterwards, the second wire 74 is extended toward the tenth coil 78U4 in the first circumferential direction R1 on the second axial side Z1 to complete the fourth coil-to-coil connecting wire 84U3-U4.

Second Step-1

In the second step, the first nozzle 122 (see FIG. 24) is used to wind the first wire 72 from the second axial side Z1 of the core 50 around the fourth tooth 54U2 in the counterclockwise direction, as viewed in the axial direction of the fourth tooth 54U2, to form the fourth coil 78U2 with an integral number plus 0.5 of turns. After completion of the fourth coil 78U2, the first wire 72 is directed or led to the first axial side Z2 of the core 50.

Afterwards, the first wire 72 which is extended from the second axial side Z1 to the first axial side Z2 is returned back to an interval between the fourth coil 78U2 and the fifth coil 78V2 to complete the second power input wire 82U2-V2. The second power input wire 82U2-V2 is, therefore, made of wire continuing from the fourth coil 78U2.

Second Step-2

Similarly, in the second step, the second nozzle 124 (see FIG. 24) is used to wind the second wire 74 from the second axial side Z1 of the core 50 around the tenth tooth 54U4 in the counterclockwise direction, as viewed in the axial direction of the tenth tooth 54U4, to form the tenth coil 78U4 with an integral number plus 0.5 of turns. After completion of the tenth coil 78U4, the second wire 74 is directed or led to the first axial side Z2 of the core 50.

Afterwards, the second wire 74 is returned from the first axial side Z2 back into an interval between the tenth tooth 54U4 and the eleventh tooth 54V4 to complete the fifth power input wire 82U4-V4. The fifth power input wire 82U4-V4 is, therefore, made of wire continuing from the tenth coil 78U4.

Third Step-1

In the third step, the first nozzle 122 (see FIG. 24) is used to wind the first wire 72 from the first axial side Z2 of the core 50 around the fifth tooth 54V2 in the counterclockwise direction, as viewed in the axial direction of the fifth tooth 54V2, to form the fifth coil 78V2 with an integral number plus 0.5 of turns.

Afterwards, the first wire 72 is extended toward the second coil 78V1 in the second circumferential direction R2 on the second axial side Z1 to complete the second coil-to-coil connecting wire 84V2-V1.

Third Step-2

Similarly, in the third step, the second nozzle 124 (see FIG. 24) is used to wind the second wire 74 from the first axial side Z2 of the core 50 around the eleventh tooth 54V4 in the counterclockwise direction, as viewed in the axial direction of the eleventh tooth 54V4, to form the eleventh coil 78V4 with an integral number plus 0.5 of turns.

Afterwards, the second wire 74 is extended toward the eighth coil 78V3 in the second circumferential direction R2 on the second axial side Z1 to create the fifth coil-to-coil connecting wire 84V4-V3.

Fourth Step-1

In the fourth step, the first nozzle 122 (see FIG. 24) is used to wind the first wire 72 from the second axial side Z1 of the core 50 around the second tooth 54V1 in the counterclockwise direction, as viewed in the axial direction of the second tooth 54V1, to form the second coil 78V1 with an integral number plus 0.5 of turns. After completion of the second coil 78V1, the first wire 72 is directed or led to the first axial side Z2 of the core 50.

Afterwards, the first wire 72 which is extended from the second axial side Z1 to the first axial side Z2 is returned back to an interval between the second tooth 54V1 and the third tooth 54W1 to complete the first power input wire 82V1-W1. The first power input wire 82V1-W1 is, therefore, made of wire continuing from the second coil 78V1.

Fourth Step-2

Similarly, in the fourth step, the second nozzle 124 (see FIG. 24) is used to wind the second wire 74 from the second axial side Z1 of the core 50 around the eighth tooth 54V3 in the counterclockwise direction, as viewed in the axial direction of the eighth tooth 54V3, to form the eighth coil 78V3 with an integral number plus 0.5 of turns. After completion of the eighth coil 78V3, the second wire 74 is directed or led to the first axial side Z2 of the core 50.

Afterwards, the second wire 74 is extended from the first axial side Z2 and returned back to an interval between the eighth tooth 54V3 and the ninth tooth 54W3 to complete the fourth power input wire 82V3-W3. The fourth power input wire 82V3-W3 is, therefore, made of wire continuing from the eighth coil 78V3.

Fifth Step-1

In the fifth step, the first nozzle 122 (see FIG. 24) is used to wind the first wire 72 from the first axial side Z2 of the core 50 around the third tooth 54W1 in the counterclockwise direction, as viewed in the axial direction of the third tooth 54W1, to form the third coil 78W1 with an integral number plus 0.5 of turns.

Afterwards, the first wire 72 is extended toward the sixth coil 78W2 in the first circumferential direction R1 on the second axial side Z1 to form the third coil-to-coil connecting wire 84W1-W2.

Fifth Step-2

Similarly, in the fifth step, the second nozzle 124 (see FIG. 24) is used to wind the second wire 74 from the first axial side Z2 of the core 50 around the ninth tooth 54W3 in the counterclockwise direction, as viewed in the axial direcplus 0.5 of turns. After completion of the sixth coil 78W2, the first wire 72 is directed or led to the first axial side Z2 of the core 50.

Afterwards, the first wire 72 which is led to the first axial side Z2 is joined at the trailing end 82D to the leading end 83E of the second wire 74 on the first axial side Z2 of the core 50, thereby creating the third power input wire 82W2-U3 in the wire connection process.

Sixth Step-2

Similarly, in the sixth step, the second nozzle 124 (see FIG. 24) is used to wind the second wire 72 from the second axial side Z1 of the core 50 around the twelfth tooth 54W4 in the counterclockwise direction, as viewed in the axial direction of the twelfth tooth 54W4, to form the twelfth coil 78W4 with an integral number plus 0.5 of turns. After completion of the twelfth coil 78W4, the second wire 72 is directed or led to the first axial side Z2 of the core 50.

Afterwards, the second wire 74 which is led to the first axial side Z2 is joined at the trailing end 82F with the leading end 82C of the first wire 72, thereby creating the sixth power input wire 82W4-U1 in the wire connection process.

The first joint 92 and the second joint 94 are then produced, thereby resulting in the winding 70 formed by a single continuous wire made up of the first wire 72 and the second wire 74.

TABLE 11

| | | | Wire extracting direction (axial direction) | Wiring direction (circumferential direction) |
|---|---|---|---|---|
| STEP | | CONTENTS | | |
| 1 | Form $1^{st}$ coil U1 | Form $7^{th}$ coil U3 | | |
| | Create $1^{st}$ coil-to-coil connecting wire U1-U2 | Create $4^{th}$ coil-to-coil connecting wire U3-U4 | $2^{nd}$ direction | $1^{st}$ direction |
| 2 | Form $4^{th}$ coil U2 | Form $10^{th}$ coil U4 | | |
| | Create $2^{nd}$ power input wire U2-V2 | Create $5^{th}$ power input wire U4-V4 | $1^{st}$ direction | $1^{st}$ direction |
| 3 | Form $5^{th}$ coil V2 | Form $11^{th}$ coil V4 | | |
| | Create $2^{nd}$ coil-to-coil connecting wire V2-V1 | Create $5^{th}$ coil-to-coil connecting wire V4-V3 | $2^{nd}$ direction | $2^{nd}$ direction |
| 4 | Form $2^{nd}$ coil V1 | Form $8^{th}$ coil V3 | | |
| | Create $1^{st}$ power input wire V1-W1 | Create $4^{th}$ power input wire V3-W3 | $1^{st}$ direction | $1^{st}$ direction |
| 5 | Form $3^{rd}$ coil W1 | Form $9^{th}$ coil W3 | | |
| | Create $3^{rd}$ coil-to-coil connecting wire W1-W2 | Create $6^{th}$ coil-to-coil connecting wire W3-W4 | $2^{nd}$ direction | $1^{st}$ direction |
| | Form $6^{th}$ coil W2 | Form $12^{th}$ coil W4 | | |
| | Create $3^{rd}$ power input wire W2-U3 | Create $6^{th}$ power input wire W4-U1 | $1^{st}$ direction | $1^{st}$ direction |
| 6 | Joining leading end of $2^{nd}$ wire and trailing end of $1^{st}$ wire to complete $3^{rd}$ power input wire W2-U3 | Joining leading end of $1^{st}$ wire and trailing end of $2^{nd}$ wire to complete $6^{th}$ power input wire W4-U1 | | | tion of the ninth tooth 54W3, to form the ninth coil 78W3 with an integral number plus 0.5 of turns.

Afterwards, the second wire 74 is extended toward the twelfth coil 78W4 in the first circumferential direction R1 on the second axial side Z1 to create the sixth coil-to-coil connecting wire 84W3-W4.

Sixth Step-1

In the sixth step, the first nozzle 122 (see FIG. 24) is used to wind the first wire 72 from the second axial side Z1 of the core 50 around the sixth tooth 54W2 in the counterclockwise direction, as viewed in the axial direction of the sixth tooth 54W2, to form the sixth coil 78W2 with an integral number In the eleventh embodiment, the winding 70 is produced in the two-series-connected-coil and two-parallel-connected coil delta configuration in the way described above. The wire winding process in the eleventh embodiment achieves substantially the same layout of connections of the coils 78 as in the tenth embodiment except for the first joint 92 and the second joint 94 instead of the single joint 90 (see FIG. 17).

Each of the power input wires 82 is extended from an interval between an adjacent two of the teeth 54. Each of the first direction-oriented connecting wires extends outside the core segments 56 over 2×2 of the teeth 54. Each of the second direction-oriented connecting wires extends outside the core segments 56 over an adjacent two of the teeth 54.

Each of the first wire 72 and the second wire 74 is made of a single continuous wire. One of the power input wires 82 is designed to have a joint of the trailing end 82F of the second wire 74 and the leading end 82C of the first wire 72, while one of the power input wires 82 has a joint of the trailing end 82D of the first wire 72 and the leading end 82E of the second wire 74. Each of the power input wires 82 connects with a respective one of the wire-connecting terminals 98.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the second axial side Z1 of the core 50.

Each of the first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 extends outward from an interval between an adjacent two of the teeth 54. Each of the first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The third power input wire 82W2-U3 is equipped with the first joint 92 of the trailing end 82D of the first wire 72 and the leading end 82E of the second wire 74. The sixth power input wire 82W4-U1 is equipped with the second joint 94 of the trailing end 82F of the second wire 74 and the leading end 82C of the first wire 72.

In wire winding process in the eleventh embodiment, of the coils 78, the U-phase coils U1 to U4 and the W-phase coils W1 to W4 are produced by moving the first nozzle 122 and the second nozzle 124 in the first circumferential direction R1 of the core 50, while the V-phase coils V1 to V4 are produced by moving the first nozzle 122 and the second nozzle 124 in the second circumferential direction R2 of the core 50.

After completion of the wire winding process, the core segments 56 are cut from the temporary joining runners 106 and then connected together in an annular shape with the teeth 54 facing radially inward.

Winding Shaping Process, Wire Connection Process, and Fabrication Process

The winding shaping process, the wire connection process, and the fabrication process in the eleventh embodiment are identical with those in the tenth embodiment. The rotating electrical machine 10 (see FIG. 1) in the eleventh embodiment is fabricated in the manner described above. The structure of the rotating electrical machine 10 is substantially the same as that in the tenth embodiment except for the first joint 92 and the second joint 94 instead of the single joint 90 (see FIG. 17).

Operation and Beneficial Advantages

Portions of the structure and the production method in the eleventh embodiment which are identical with those in the tenth embodiment offer substantially the same beneficial advantages as those in the tenth embodiment.

In the wire winding process in the eleventh embodiment, the first nozzle 122 and the second nozzle 124 are, as can be seen in FIG. 35, moved in the first circumferential direction R1 to wind the wire around the teeth 54 for two of the U-phase, the V-phase, and the W-phase, while the first nozzle 122 and the second nozzle 124 are moved in the second circumferential direction R2 to wind the wire around the teeth 54 for a remaining one of the U-phase, the V-phase, and the W-phase. This winding way enables the winding 70 to be made by winding a continuous wire made up of the first wire 72 and the second wire 74 around the teeth 54, thereby improving the productivity of the winding 70.

Particularly, the rotating electrical machine 10 is designed in the form of an inner-rotor brushless motor in which the teeth 54 extend radially inward. The structure in the eleventh embodiment is capable of reducing the size of the inner-rotor brushless motor, enhancing output power therefrom, producing it at low cost.

The power input wires 82 are all arranged on the first axial side Z2 of the core 50, while the coil-to-coil connecting wires 84 are all arranged on the second axial side Z1 of the core 50. This results in no intersection between the power input wires 82 and the coil-to-coil connecting wires 84, thereby eliminating a risk that the power input wires 82 and the coil-to-coil connecting wires 84 may intricately tangle together.

No intersection between the power input wires 82 and the coil-to-coil connecting wires 84 also enables the power input wires 82 and the coil-to-coil connecting wires 84 to be arranged methodically on the first axial side Z2 and the second axial side Z1 in the fabrication process.

Each of the power input wires 82 is extended from a clearance between an adjacent two of the teeth 54, thereby resulting in a sufficient interval between the ends of each of the coil-to-coil connecting wires 84, while each of the power input wires 82 has the ends located at a decreased interval away from each other, thereby decreasing a risk of intricate tangling of the coil-to-coil connecting wires 84 or the power input wires 82.

Each of the coil-to-coil connecting wires 84 extends outside the core segments 56 over an adjacent two or 2×2 of the teeth 54 disposed therebetween. This provides a sufficient interval between the ends of each of the coil-to-coil connecting wires 84 in addition to that between the ends of each of the power input wires 82, thereby decreasing a risk of intricate tangling of the coil-to-coil connecting wires 84 or the power input wires 82.

The eleventh embodiment is, as described above, designed to use two nozzles: the first nozzle 122 and the second nozzle 124 to wind two continuous wires: the first wire 72 and the second wire 74 around the teeth 54 in the double-nozzle manner. This results in a decreased degree of workload on the wire winding process that is half that required to wind a single continuous wire around the teeth 54 using the single nozzle 120 (see FIG. 4) in the tenth embodiment. This reduces a total production cost of the rotating electrical machine 10.

Modifications

Modifications of the eleventh embodiment will be described below.

The stator 20 in the eleventh embodiment is designed, as an example, to have the coils 78 which are in the k-series-connected-coil and n-parallel-connected-coil delta configuration where k is an even number, and n is a natural number, specifically, in a two-series-connected-coil and two-parallelconnected-coil delta configuration, but however, the production method of the stator 20 in the eleventh embodiment may be used with all types of three-phase brushless motor in which n is a multiple of two, and each of the number of the slots formed in the core 50, the number of the teeth 54, and the number of the coils 78 is twelve or more that is a multiple of twelve. For instance, the number of the slots, the number of the teeth 54, and the number of the coils 78 may be selected to be 12 (i.e., k=2 and n=2), 24 (i.e., k=4 and n=2 or k=2 and n=4), 36 (i.e., k=6 and n=2, k=3 and n=4, or k=2 and n=6), 48 (i.e., k=8 and n=2, k=4 and n=4, or k=2 and n=8), . . . .

Portions of the structure and the production method in the eleventh embodiment which are identical with those in the tenth embodiment offer substantially the same beneficial advantages as those in the tenth embodiment.

The temporary joining runners 108 illustrated in FIG. 21 may be used like in the modification of the sixth embodiment. The temporary joining runners 108 include bars which extend from the surfaces of the core segments 56 which face away from the teeth 54 and are joined together using an annular bar. The winding shaping process, the wire connection process, and the fabrication process are identical with those in the modification of the sixth embodiment.

The jig 104 which is, as shown in FIG. 22, of a substantially oval shape may be used, like in the modification of the sixth embodiment, instead of the temporary joining runners 106. A double-flyer system may also be used which is equipped with the first flyer 112 and the second flyer 114 instead of the first nozzle 122 and the second nozzle 124. The winding shaping process, the wire connection process, and the fabrication process are identical with those in the modification of the sixth embodiment.

In the wire winding process in the eleventh embodiment, of the U-phase coils U1 to U4, the V-phase coils V1 to V4, and the W-phase coils W1 to W4, only the V-phase coils V1 to V4 are fabricated by moving the first nozzle 122 and the second nozzle 124 in the second circumferential direction R2 of the core 50, but however, the U-phase coils U1 to U4 or the W-phase coils W1 to W4 may alternatively be fabricated by moving the first nozzle 122 and the second nozzle 124 in the second circumferential direction R2 of the core 50. This enables a continuous wire made up of the first wire 72 and the second wire 74 to be wound around the teeth 54 to form the winding 70, thereby improving the productivity of the rotating electrical machine 10.

Production Method of Rotating Electrical Machine in the Twelfth Embodiment

Next, the production method of the rotating electrical machine 10 according to the twelfth embodiment will be described below.

The production method of the rotating electrical machine 10 in the twelfth embodiment is identical in the core setting process with that in the third embodiment, but different in the wire winding process from the third embodiment as described below.

Wire Winding Process

The wire winding process in the twelfth embodiment uses, as an example, the single nozzle 120 (see FIG. 4) to wind a single continuous wire around the teeth 54 to form the winding 70. FIG. 36 is a diagram which represents the wire winding process in the twelfth embodiment. Table 12 shows an operation schedule showing a sequence of wire-winding steps in the wire winding process in the twelfth embodiment.

In the wire winding process in the twelfth embodiment, the wire of the winding 70 is wound in a sequence of first to twelfth steps discussed below. In the drawing, numbers 1 to 12 within circles denote the order of formation of the coils 78.

First Step

In the first step, the wire of the winding 70 is wound from the first axial side Z2 of the core 50 around the first tooth 54U1 in the clockwise direction, as viewed in the axial direction of the first tooth 54U1, to form the first coil 78U1 with an integral number plus 0.5 of turns.

Afterwards, the wire of the winding 70 is extended toward the fourth coil 78U2 in the first circumferential direction R1 on the second axial side Z1 to form the first coil-to-coil connecting wire 84U1-U2.

Second Step

In the second step, the wire of the winding 70 is wound from the second axial side Z1 of the core 50 around the fourth tooth 54U2 in the clockwise direction, as viewed in the axial direction of the fourth tooth 54U2, to form the fourth coil 78U2 with an integral number plus 0.5 of turns. After completion of the fourth coil 78U2, the wire is directed or led to the first axial side Z2 of the core 50.

Afterwards, the wire of the winding 70 is extended toward the fifth coil 78V2 in the first circumferential direction R1 on the first axial side Z2 to form the second power input wire 82U2-V2. The second power input wire 82U2-V2 is, therefore, made of the wire continuing from the fourth coil 78U2.

Third Step

In the third step, the wire of the winding 70 is wound from the first axial side Z2 of the core 50 around the fifth tooth 54V2 in the clockwise direction, as viewed in the axial direction of the fifth tooth 54V2, to form the fifth coil 78V2 with an integral number plus 0.5 of turns.

Afterwards, the wire of the winding 70 is extended toward the second coil 78V1 in the second circumferential direction R2 on the second axial side Z1 to form the second coil-to-coil connecting wire 84V2-V1.

Fourth Step

In the fourth step, the wire of the winding 70 is wound from the second axial side Z1 of the core 50 around the second tooth 54V1 in the clockwise direction, as viewed in the axial direction of the second tooth 54V1, to form the second coil 78V1 with an integral number plus 0.5 of turns. After completion of the second coil 78V1, the wire is directed or led to the first axial side Z2 of the core 50.

Afterwards, the wire of the winding 70 is extended toward the third coil 78W1 in the first circumferential direction R1 on the first axial side Z2 to form the first power input wire 82V1-W1. The first power input wire 82V1-W1 is, therefore, made of the wire continuing from the second coil 78V1.

Fifth Step

In the fifth step, the wire of the winding 70 is wound from the first axial side Z2 of the core 50 around the third tooth 54W1 in the clockwise direction, as viewed in the axial direction of the third tooth 54W1, to form the third coil 78W1 with an integral number plus 0.5 of turns.

Afterwards, the wire of the winding 70 is extended toward the sixth coil 78W2 in the first circumferential direction R1 on the second axial side Z1 to form the third coil-to-coil connecting wire 84W1-W2.

Sixth Step

In the sixth step, the wire of the winding 70 is wound from the second axial side Z1 of the core 50 around the sixth tooth 54W2 in the clockwise direction, as viewed in the axial direction of the sixth tooth 54W2, to form the sixth coil 78W2 with an integral number plus 0.5 of turns. After completion of the sixth coil 78W2, the wire is lead to the first axial side Z2 of the core 50.

Afterwards, the wire of the winding 70 is extended toward the seventh coil 78U3 in the first circumferential direction R1 on the first axial side Z2 to form the third power input wire 83W2-U3. The third power input wire 83W2-U3 is, therefore, made of the wire continuing from the sixth coil 78W2.

Seventh Step

In the seventh step, the wire of the winding 70 is wound from the first axial side Z2 of the core 50 around the seventh tooth 54U3 in the clockwise direction, as viewed in the axial direction of the seventh tooth 54U3, to form the seventh coil 78U3 with an integral number plus 0.5 of turns.

Afterwards, the wire of the winding 70 is extended toward the tenth coil 78U4 in the first circumferential direction R1 on the second axial side Z1 to form the fourth coil-to-coil connecting wire 84U3-U4.

Eighth Step

In the eighth step, the wire of the winding 70 is wound from the second axial side Z1 of the core 50 around the tenth tooth 54U4 in the clockwise direction, as viewed in the axial direction of the tenth tooth 54U4, to form the tenth coil 78U4 with an integral number plus 0.5 of turns. After completion of the tenth coil 78U4, the wire is lead to the first axial side Z2 of the core 50.

Afterwards, the wire of the winding 70 is extended toward the eleventh coil 78V4 in the first circumferential direction R1 on the first axial side Z2 to form the fifth power input wire 82U4-V4. The fifth power input wire 82U4-V4 is, therefore, made of wire continuing from the tenth coil 78U4.

Ninth Step

In the ninth step, the wire of the winding 70 is wound from the first axial side Z2 of the core 50 around the eleventh tooth 54V4 in the clockwise direction, as viewed in the axial direction of the eleventh tooth 54V4, to form the eleventh coil 78V4 with an integral number plus 0.5 of turns.

Afterwards, the wire of the winding 70 is extended toward the eighth coil 78V3 in the second circumferential direction R2 on the second axial side Z1 to form the fifth coil-to-coil connecting wire 84V4-V3.

Tenth Step

In the tenth step, the wire of the winding 70 is wound from the second axial side Z1 of the core 50 around the eighth tooth 54V3 in the clockwise direction, as viewed in the axial direction of the eighth tooth 54V3, to form the eighth coil 78V3 with an integral number plus 0.5 of turns. After completion of the eighth coil 78V3, the wire is led to the first axial side Z2 of the core 50.

Afterwards, the wire of the winding 70 is extended toward the ninth coil 78W3 in the first circumferential direction R1 on the first axial side Z2 to form the fourth power input wire 82V3-W3. The fourth power input wire 82V3-W3 is, therefore, made of the wire continuing from the eighth coil 78V3.

Eleventh Step

In the eleventh step, the wire of the winding 70 is wound from the first axial side Z2 of the core 50 around the ninth tooth 54W3 in the clockwise direction, as viewed in the axial direction of the ninth tooth 54W3, to form the ninth coil 78W3 with an integral number plus 0.5 of turns.

Afterwards, the wire of the winding 70 is extended toward the twelfth coil 78W4 in the first circumferential direction R1 on the second axial side Z1 to form the sixth coil-to-coil connecting wire 84W3-W4.

Twelfth Step

In the twelfth step, the wire of the winding 70 is wound from the second axial side Z1 of the core 50 around the twelfth tooth 54W4 in the clockwise direction, as viewed in the axial direction of the twelfth tooth 54W4, to form the twelfth coil 78W4 with an integral number plus 0.5 of turns. After completion of the twelfth coil 78W4, the wire is directed or led to the first axial side Z2 of the core 50.

Afterwards, the wire of the winding 70 is extended toward the leading end 82A of the winding 70 in the first circumferential direction R1 on the first axial side Z2 of the core 50 to form the joint 90 in the wire connection process, as will be described later in detail, thereby making the sixth power input wire 82W4-U1.

TABLE 12

| STEP | CONTENTS | Wire extracting direction (axial direction) | Wiring direction (circumferential direction) |
|---|---|---|---|
| 1 | Form $1^{st}$ coil U1 coil-to-coil connecting Create $1^{st}$ coil-to-coil connecting wire U1-U2 | $2^{nd}$ direction | $1^{st}$ direction |
| 2 | Form $4^{th}$ coil U2 Create $2^{nd}$ power input wire U2-V2 | $1^{st}$ direction | $1^{st}$ direction |
| 3 | Form $5^{th}$ coil V2 Create $2^{nd}$ coil-to-coil connecting wire V2-V1 | $2^{nd}$ direction | $2^{nd}$ direction |
| 4 | Form $2^{nd}$ coil V1 Create $1^{st}$ power input wire V1-W1 | $1^{st}$ direction | $1^{st}$ direction |
| 5 | Form $3^{rd}$ coil W1 Create $3^{rd}$ coil-to-coil connecting wire W1-W2 | $2^{nd}$ direction | $1^{st}$ direction |
| 6 | Form $6^{th}$ coil W2 Create $3^{rd}$ power input wire W2-U3 | $1^{st}$ direction | $1^{st}$ direction |
| 7 | Form $7^{th}$ coil U3 Create $4^{th}$ coil-to-coil connecting wire U3-U4 | $2^{nd}$ direction | $1^{st}$ direction |
| 8 | Form $10^{th}$ coil U4 Create $5^{th}$ power input wire U4-V4 | $1^{st}$ direction | $1^{st}$ direction |
| 9 | Form $11^{th}$ coil V4 Create $5^{th}$ coil-to-coil connecting wire V4-V3 | $2^{nd}$ direction | $2^{nd}$ direction |
| 10 | Form $8^{th}$ coil V3 Create $4^{th}$ power input wire V3-W3 | $1^{st}$ direction | $1^{st}$ direction |
| 11 | Form $9^{th}$ coil W3 Create $6^{th}$ coil-to-coil connecting wire W3-W4 | $2^{nd}$ direction | $1^{st}$ direction |
| 12 | Form $12^{th}$ coil W4 Create $6^{th}$ power input wire W4-U1 Joining ends of leading and trailing ends of wire to complete $6^{th}$ power input wire W4-U1 | $1^{st}$ direction | $1^{st}$ direction |

In the twelfth embodiment, the winding 70 is produced in the two-series-connected-coil and two-parallel-connected coil delta configuration in the way described above.

Each of the power input wires 82 extends outside the core segments 56 over an adjacent two of the teeth 54. Each of the first direction-oriented connecting wires extends outside the core segments 56 over an adjacent two of the teeth 54. Each of the second direction-oriented connecting wires extends outside the core segments 56 over 2×2 of the teeth 54.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the second axial side Z1 of the core 50.

In wire winding process in the twelfth embodiment, of the coils 78, the U-phase coils U1 to U4 and the W-phase coils W1 to W4 are produced by moving the nozzle 120 in the first circumferential direction R1 of the core 50, while the V-phase coils V1 to V4 are produced by moving the nozzle 120 in the second circumferential direction R2 of the core 50.

After completion of the wire winding process, the core segments 56 are cut from the temporary joining runners 106 and then connected together in an annular shape with the teeth 54 facing radially inward.
Winding Shaping Process, Wire Connection Process, and Fabrication Process The winding shaping process, the wire connection process, and the fabrication process in the twelfth embodiment are identical with those in the third embodiment. The rotating electrical machine 10 (see FIG. 10) is completed in the manner described above in the twelfth embodiment.

Operation and Beneficial Advantages

Portions of the structure and the production method in the twelfth embodiment which are identical with those in the third embodiment offer substantially the same beneficial advantages as those in the third embodiment.

In the wire winding process in the twelfth embodiment, the nozzle 120 is, as can be seen in FIG. 36, moved in the first circumferential direction R1 to wind the wire around the teeth 54 for two of the U-phase, the V-phase, and the W-phase, while the nozzle 120 is moved in the second circumferential direction R2 to wind the wire around the teeth 54 for a remaining one of the U-phase, the V-phase, and the W-phase. This winding way enables the winding 70 to be made completely by winding a continuous wire around the teeth 54, thereby improving the productivity of the winding 70.

Particularly, the rotating electrical machine 10 is designed in the form of an inner-rotor brushless motor in which the teeth 54 extend radially inward. The structure in the twelfth embodiment is capable of reducing the size of the inner-rotor brushless motor, enhancing output power therefrom, producing it at low cost.

In the twelfth embodiment, the power input wires 82 are all arranged on the first axial side Z2 of the core 50, while the coil-to-coil connecting wires 84 are all arranged on the second axial side Z1 of the core 50. This results in no intersection between the power input wires 82 and the coil-to-coil connecting wires 84, thereby eliminating a risk that the power input wires 82 and the coil-to-coil connecting wires 84 may intricately tangle together.

No intersection between the power input wires 82 and the coil-to-coil connecting wires 84 also enables the power input wires 82 and the coil-to-coil connecting wires 84 to be arranged methodically on the first axial side Z2 and the second axial side Z1 in the fabrication process.

Each of the power input wires 82 extends outside the core segments 56 over an adjacent two of the teeth 54. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Each of the coil-to-coil connecting wires 84 extends outside the core segments 56 over an adjacent two or 2×2 of the teeth 54. This results in a sufficient interval between the ends of each of the coil-to-coil connecting wires 84 in addition to that between the power input wires 82, thereby decreasing a risk of intricate tangling of the coil-to-coil connecting wires 84 or the power input wires 82.

Modifications

Modifications of the twelfth embodiment will be described below.

The stator 20 in the twelfth embodiment is designed, as an example, to have the coils 78 which are in the k-series-connected-coil and n-parallel-connected-coil delta configuration where k is an even number, and n is a natural number, specifically, in a two-series-connected-coil and two-parallel-connected-coil delta configuration, but however, the production method of the stator 20 in the twelfth embodiment may be used with all types of three-phase brushless motor in which each of the number of the slots formed in the core 50, the number of the teeth 54, and the number of the coils 78 is twelve or more that is a multiple of six. For instance, the number of the slots, the number of the teeth 54, and the number of the coils 78 may be selected to be 12 (i.e., k=2 and n=2), 18 (i.e., k=4 and n=2 or k=2 and n=3), 24 (i.e., k=4 and n=2 or k=2 and n=4, 30 (i.e., k=5 and n=2 or k=2 and n=5), or 36 (i.e., k=6 and n=2, k=3 and n=4, k=4 and n=3, or k=2 and n=6), . . . .

Portions of the structure and the production method in the twelfth embodiment which are identical with those in the third embodiment may be modified in the same way as that in the third embodiment.

In the wire winding process in the twelfth embodiment, of the U-phase coils U1 to U4, the V-phase coils V1 to V4, and the W-phase coils W1 to W4, only the V-phase coils V1 to V4 are fabricated by moving the nozzle 120 in the second circumferential direction R2 of the core 50, but however, the U-phase coils U1 to U4 or the W-phase coils W1 to W4 may alternatively be fabricated by moving the nozzle 120 in the second circumferential direction R2 of the core 50. This enables a continuous wire to be wound around all the teeth 54 to form the winding 70, thereby improving the productivity of the rotating electrical machine 10.
Production Method of Rotating Electrical Machine in the Thirteenth Embodiment Next, the production method of the rotating electrical machine 10 according to the thirteenth embodiment will be described below.

The production method of the rotating electrical machine 10 in the thirteenth embodiment is different in the wire winding process from the twelfth embodiment as described below.
Wire Winding Process The wire winding process in the thirteenth embodiment uses the first nozzle 122 and the second nozzle 124 to wind the first wire 72 and the second wire 74 around the teeth 54 in a double-nozzle system to produce the winding 70. FIG. 37 is a diagram which represents the wire winding process in the thirteenth embodiment. Table 13 shows an operation schedule showing a sequence of wire-winding steps in the wire winding process in the thirteenth embodiment.

In the wire winding process in the thirteenth embodiment, the first wire 72 and the second wire 74 are wound around the teeth 54 in a sequence of first to sixth steps discussed below. In the drawing, numbers 1 to 6 within circles denote the order of formation of the coils 78.

First Step-1

In the first step, the first nozzle 122 (see FIG. 18) is used to wind the first wire 72 from the first axial side Z2 of the core 50 around the first tooth 54U1 in the clockwise direction, as viewed in the axial direction of the first tooth 54U1, to form the first coil 78U1 with an integral number plus 0.5 of turns.

Afterwards, the first wire 72 is extended toward the fourth coil 78U2 in the first circumferential direction R1 on the second axial side Z1 to form the first coil-to-coil connecting wire 84U1-U2.

First Step-2

Similarly, in the first step, the second nozzle 124 (see FIG. 18) is used to wind the second wire 74 from the first axial side Z2 of the core 50 around the seventh tooth 54U3 in the clockwise direction, as viewed in the axial direction of the seventh tooth 54U3, to form the seventh coil 78U3 with an integral number plus 0.5 of turns.

Afterwards, the second wire 74 is extended toward the tenth coil 78U4 in the first circumferential direction R1 on the second axial side Z1 to complete the fourth coil-to-coil connecting wire 84U3-U4.

Second Step-1

In the second step, the first nozzle 122 (see FIG. 18) is used to wind the first wire 72 from the second axial side Z1 of the core 50 around the fourth tooth 54U2 in the clockwise direction, as viewed in the axial direction of the fourth tooth 54U2, to form the fourth coil 78U2 with an integral number plus 0.5 of turns. After completion of the fourth coil 78U2, the first wire 72 is directed or led to the first axial side Z2 of the core 50.

Afterwards, the first wire 72 is extended toward the fifth coil 78V2 in the first circumferential direction R1 on the first axial side Z2 to create the second power input wire 82U2-V2. The second power input wire 82U2-V2 is, therefore, made of the first wire 72 continuing from the fourth coil 78U2.

Second Step-2

Similarly, in the second step, the second nozzle 124 (see FIG. 18) is used to wind the second wire 74 from the second axial side Z1 of the core 50 around the tenth tooth 54U4 in the clockwise direction, as viewed in the axial direction of the tenth tooth 54U4, to form the tenth coil 78U4 with an integral number plus 0.5 of turns. After completion of the tenth coil 78U4, the second wire 74 is directed or led to the first axial side Z2 of the core 50.

Afterwards, the second wire 74 is extended toward the eleventh coil 78V4 in the first circumferential direction R1 on the first axial side Z2 to create the fifth power input wire 82U4-V4. The fifth power input wire 82U4-V4 is, therefore, made of the second wire 74 continuing from the tenth coil 78U4.

Third Step-1

In the third step, the first nozzle 122 (see FIG. 18) is used to wind the first wire 72 from the first axial side Z2 of the core 50 around the fifth tooth 54V2 in the clockwise direction, as viewed in the axial direction of the fifth tooth 54V2, to form the fifth coil 78V2 with an integral number plus 0.5 of turns.

Afterwards, the first wire 72 is extended toward the second coil 78V1 in the second circumferential direction R2 on the second axial side Z1 to complete the second coil-to-coil connecting wire 84V2-V1.

Third Step-2

Similarly, in the third step, the second nozzle 124 (see FIG. 18) is used to wind the second wire 74 from the first axial side Z2 of the core 50 around the eleventh tooth 54V4 in the clockwise direction, as viewed in the axial direction of the eleventh tooth 54V4, to form the eleventh coil 78V4 with an integral number plus 0.5 of turns.

Afterwards, the second wire 74 is extended toward the eighth coil 78V3 in the second circumferential direction R2 on the second axial side Z1 to create the fifth coil-to-coil connecting wire 84V4-V3.

Fourth Step-1

In the fourth step, the first nozzle 122 (see FIG. 18) is used to wind the first wire 72 from the second axial side Z1 of the core 50 around the second tooth 54V1 in the clockwise direction, as viewed in the axial direction of the second tooth 54V1, to form the second coil 78V1 with an integral number plus 0.5 of turns. After completion of the second coil 78V1, the first wire 72 is directed or led to the first axial side Z2 of the core 50.

Afterwards, the first wire 72 which is extended toward the third tooth 54W1 in the first circumferential direction R1 on the first axial side Z2 of the core 50 to create the first power input wire 82V1-W1. The first power input wire 82V1-W1 is, therefore, made of wire continuing from the second coil 78V1.

Fourth Step-2

Similarly, in the fourth step, the second nozzle 124 (see FIG. 18) is used to wind the second wire 74 from the second axial side Z1 of the core 50 around the eighth tooth 54V3 in the clockwise direction, as viewed in the axial direction of the eighth tooth 54V3, to form the eighth coil 78V3 with an integral number plus 0.5 of turns. After completion of the eighth coil 78V3, the second wire 74 is directed or led to the first axial side Z2 of the core 50.

Afterwards, the second wire 74 is extended toward the ninth coil 78W3 in the first circumferential direction R1 on the first axial side Z2 of the core 50 to create the fourth power input wire 82V3-W3. The fourth power input wire 82V3-W3 is, therefore, made of the second wire 74 continuing from the eighth coil 78V3.

In the fifth step, the first nozzle 122 (see FIG. 18) is used to wind the first wire 72 from the first axial side Z2 of the core 50 around the third tooth 54W1 in the clockwise direction, as viewed in the axial direction of the third tooth 54W1, to form the third coil 78W1 with an integral number plus 0.5 of turns.

Afterwards, the first wire 72 is extended toward the sixth coil 78W2 in the first circumferential direction R1 on the second axial side Z1 to form the third coil-to-coil connecting wire 84W1-W2.

Fifth Step-2

Similarly, in the fifth step, the second nozzle 124 (see FIG. 18) is used to wind the second wire 74 from the first axial side Z2 of the core 50 around the ninth tooth 54W3 in the clockwise direction, as viewed in the axial direction of the ninth tooth 54W3, to form the ninth coil 78W3 with an integral number plus 0.5 of turns.

Afterwards, the second wire 74 is extended toward the twelfth coil 78W4 in the first circumferential direction R1 on the second axial side Z1 to create the sixth coil-to-coil connecting wire 84W3-W4.

Sixth Step-1

In the sixth step, the first nozzle 122 (see FIG. 18) is used to wind the first wire 72 from the second axial side Z1 of the core 50 around the sixth tooth 54W2 in the clockwise direction, as viewed in the axial direction of the sixth tooth 54W2, to form the sixth coil 78W2 with an integral number plus 0.5 of turns. After completion of the sixth coil 78W2, the first wire 72 is directed or led to the first axial side Z2 of the core 50.

Afterwards, the first wire 72 which is led to the first axial side Z2 is extended in the first circumferential direction R1 of the core 50 toward the leading end 82E of the second wire 74. The first joint 92 is then created in the wire connection process which will be described later, thereby completing the third power input wire 82W2-U3.

Sixth Step-2

Similarly, in the sixth step, the second nozzle 124 (see FIG. 18) is used to wind the second wire 72 from the second axial side Z1 of the core 50 around the twelfth tooth 54W4 in the clockwise direction, as viewed in the axial direction of the twelfth tooth 54W4, to form the twelfth coil 78W4 with an integral number plus 0.5 of turns. After completion of the twelfth coil 78W4, the second wire 72 is directed or led to the first axial side Z2 of the core 50.

Afterwards, the second wire 74 which is led to the first axial side Z2 is extended in the third circumferential direction R toward the leading end 82C of the first wire 72. The second joint 94 is then created in the wire connection process which will be described later, thereby producing the sixth power input wire 82W4-U1.

The first joint 92 and the second joint 94 are produced in the above manner, thereby resulting in the winding 70 formed by a single continuous wire made up of the first wire 72 and the second wire 74.

Each of the power input wires 82 extends outside the core segments 56 over an adjacent two of the teeth 54. Each of the first direction-oriented connecting wires extends outside the core segments 56 over an adjacent two of the teeth 54. Each of the second direction-oriented connecting wires extends outside the core segments 56 over 2×2 of the teeth 54.

Each of the first wire 72 and the second wire 74 is made of a single continuous wire. One of the power input wires 82 is designed to have a joint of the trailing end 82F of the second wire 74 and the leading end 82C of the first wire 72, while one of the power input wires 82 has a joint of the trailing end 82D of the first wire 72 and the leading end 82E of the second wire 74. Each of the power input wires 82 connects with a respective one of the wire-connecting terminals 98.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50, while the first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the second axial side Z1 of the core 50.

The first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are

TABLE 13

| | | extracting | | |
| --- | --- | --- | --- | --- |
| STEP | CONTENTS | | Wire extracting direction (axial direction) | Wiring direction (circumferential direction) |
| 1 | Form 1$^{st}$ coil U1 | Form 7$^{th}$ coil U3 | 2$^{nd}$ direction | 1$^{st}$ direction |
| | Create 1$^{st}$ coil-to-coil connecting wire U1-U2 | Create 4$^{th}$ coil-to-coil connecting wire U3-U4 | | |
| 2 | Form 4$^{th}$ coil U2 | Form 10$^{th}$ coil U4 | 1$^{st}$ direction | 1$^{st}$ direction |
| | Create 2$^{nd}$ power input wire U2-V2 | Create 5$^{th}$ power input wire U4-V4 | | |
| 3 | Form 5$^{th}$ coil V2 | Form 11$^{th}$ coil V4 | 2$^{nd}$ direction | 2$^{nd}$ direction |
| | Create 2$^{nd}$ coil-to-coil connecting wire V2-V1 | Create 5$^{th}$ coil-to-coil connecting wire V4-V3 | | |
| 4 | Form 2$^{nd}$ coil V1 | Form 8$^{th}$ coil V3 | 1$^{st}$ direction | 1$^{st}$ direction |
| | Create 1$^{st}$ power input wire V1-W1 | Create 4$^{th}$ power input wire V3-W3 | | |
| 5 | Form 3$^{rd}$ coil W1 | Form 9$^{th}$ coil W3 | 2$^{nd}$ direction | 1$^{st}$ direction |
| | Create 3$^{rd}$ coil-to-coil connecting wire W1-W2 | Create 6$^{th}$ coil-to-coil connecting wire W3-W4 | | |
| 6 | Form 6$^{th}$ coil W2 | Form 12$^{th}$ coil W4 | 1$^{st}$ direction | 1$^{st}$ direction |
| | Create 3$^{rd}$ power input wire W2-U3 | Create 6$^{th}$ power input wire W4-U1 | | |
| | Joining leading and trailing ends of wire to complete 3$^{rd}$ power input wire W2-U3 | Joining leading and trailing ends of wire to complete 6$^{th}$ power input wire W4-U1 | | |

In the thirteenth embodiment, the winding 70 is produced in the two-series-connected-coil and two-parallel-connected coil delta configuration in the way described above. The wire winding process in the thirteenth embodiment achieves substantially the same layout of connections of the coils 78 as in the twelfth embodiment except for the first joint 92 and the second joint 94 instead of the single joint 90 (see FIG. 17).

arranged to extend continuously. The first coil-to-coil connecting wire 84U1-U2, the second coil-to-coil connecting wire 84V2-V1, the third coil-to-coil connecting wire 84W1-W2, the fourth coil-to-coil connecting wire 84U3-U4, the fifth coil-to-coil connecting wire 84V4-V3, and the sixth coil-to-coil connecting wire 84W3-W4 are arranged on the second axial side Z1 of the core 50, while the first power input wire 82V1-W1, the second power input wire 82U2-V2, the third power input wire 82W2-U3, the fourth power input wire 82V3-W3, the fifth power input wire 82U4-V4, and the sixth power input wire 82W4-U1 are arranged on the first axial side Z2 of the core 50. The third power input wire 82W2-U3 is, as described above, equipped with the first joint 92 which achieves a joint of the trailing end 82D of the first wire 72 and the leading end 82E of the second wire 74. The sixth power input wire 82W4-U1 is equipped with the second joint 94 which achieves a joint of the trailing end 82F of the second wire 74 and the leading end 82C of the first wire 72.

In wire winding process in the thirteenth embodiment, of the coils 78, the U-phase coils U1 to U4 and the W-phase coils W1 to W4 are produced by moving the first nozzle 122 and the second nozzle 124 in the first circumferential direction R1 of the core 50, while the V-phase coils V1 to V4 are produced by moving the first nozzle 122 and the second nozzle 124 in the second circumferential direction R2 of the core 50.

After completion of the wire winding process, the core segments 56 are cut from the temporary joining runners 106 and then connected together in an annular shape with the teeth 54 facing radially inward.

Winding Shaping Process, Wire Connection Process, and Fabrication Process

The winding shaping process, the wire connection process, and the fabrication process in the thirteenth embodiment are identical with those in the twelfth embodiment. The rotating electrical machine 10 (see FIG. 1) in the thirteenth embodiment is fabricated in the manner described above. The structure of the rotating electrical machine 10 is substantially the same as that in the twelfth embodiment except for the first joint 92 and the second joint 94 instead of the single joint 90 (see FIG. 17).

Operation and Beneficial Advantages

Portions of the structure and the production method in the thirteenth embodiment which are identical with those in the twelfth embodiment offer substantially the same beneficial advantages as those in the twelfth embodiment.

In the wire winding process in the thirteenth embodiment, the first nozzle 122 and the second nozzle 124 are, as can be seen in FIG. 37, moved in the first circumferential direction R1 to wind the wire around the teeth 54 for two of the U-phase, the V-phase, and the W-phase, while the first nozzle 122 and the second nozzle 124 are moved in the second circumferential direction R2 to wind the wire around the teeth 54 for a remaining one of the U-phase, the V-phase, and the W-phase. This winding way enables the winding 70 to be made by winding a continuous wire made up of the first wire 72 and the second wire 74 around all the teeth 54, thereby improving the productivity of the winding 70.

Particularly, the rotating electrical machine 10 is designed in the form of an inner-rotor brushless motor in which the teeth 54 extend radially inward. The structure in the thirteenth embodiment is capable of reducing the size of the inner-rotor brushless motor, enhancing output power therefrom, producing it at low cost.

The power input wires 82 are all arranged on the first axial side Z2 of the core 50, while the coil-to-coil connecting wires 84 are all arranged on the second axial side Z1 of the core 50. This results in no intersection between the power input wires 82 and the coil-to-coil connecting wires 84, thereby eliminating a risk that the power input wires 82 and the coil-to-coil connecting wires 84 may intricately tangle together.

No intersection between the power input wires 82 and the coil-to-coil connecting wires 84 also enables the power input wires 82 and the coil-to-coil connecting wires 84 to be arranged methodically on the first axial side Z2 and the second axial side Z1 in the fabrication process.

Each of the power input wires 82 extends outside the core segments 56 over an adjacent two of the teeth 54. This provides a sufficient interval between the ends of each of the power input wires 82 in addition to that between the ends of each of the coil-to-coil connecting wires 84, thereby decreasing a risk of intricate tangling of the coil-to-coil connecting wires 84 or the power input wires 82.

Each of the coil-to-coil connecting wires 84 extends outside the core segments 56 over an adjacent two or 2×2 of the teeth 54 disposed therebetween. This provides a sufficient interval between the ends of each of the coil-to-coil connecting wires 84 in addition to that between the ends of each of the power input wires 82, thereby decreasing a risk of intricate tangling of the coil-to-coil connecting wires 84 or the power input wires 82.

The thirteenth embodiment is, as described above, designed to use two nozzles: the first nozzle 122 and the second nozzle 124 to wind two continuous wires: the first wire 72 and the second wire 74 around the teeth 54 in the double-nozzle manner. This results in a decreased degree of workload on the wire winding process that is half that required to wind a single continuous wire around the teeth 54 using the single nozzle 120 (see FIG. 4) in the twelfth embodiment. This reduces a total production cost of the rotating electrical machine 10.

Modifications

Modifications of the thirteenth embodiment will be described below.

The stator 20 in the thirteenth embodiment is designed, as an example, to have the coils 78 which are in the k-series-connected-coil and n-parallel-connected-coil delta configuration where k is an even number, and n is a natural number, specifically, in a two-series-connected-coil and two-parallel-connected-coil delta configuration, but however, the production method of the stator 20 in the thirteenth embodiment may be used with all types of three-phase brushless motor in which n is a multiple of two, and each of the number of the slots formed in the core 50, the number of the teeth 54, and the number of the coils 78 is twelve or more that is a multiple of twelve. For instance, the number of the slots, the number of the teeth 54, and the number of the coils 78 may be selected to be 12 (i.e., k=2 and n=2), 24 (i.e., k=4 and n=2 or k=2 and n=4), 36 (i.e., k=6 and n=2, k=3 and n=4, or k=2 and n=6), 48 (i.e., k=8 and n=2, k=4 and n=4, or k=2 and n=8), . . . .

Portions of the structure and the production method in the thirteenth embodiment which are identical with those in the twelfth embodiment may be modified in the same manners as those in the fourth embodiment.

In the wire winding process in the thirteenth embodiment, of the U-phase coils U1 to U4, the V-phase coils V1 to V4, and the W-phase coils W1 to W4, only the V-phase coils V1 to V4 are fabricated by moving the first nozzle 122 and the second nozzle 124 in the second circumferential direction R2 of the core 50, but however, the U-phase coils U1 to U4 or the W-phase coils W1 to W4 may alternatively be fabricated by moving the first nozzle 122 and the second nozzle 124 in the second circumferential direction R2 of the core 50. This enables a continuous wire made up of the first wire 72 and the second wire 74 to be wound around the teeth

54 to form the winding 70, thereby improving the productivity of the rotating electrical machine 10.

The embodiments of this disclosure have been described above, but however, this disclosure is not limited to the above statements. The disclosure should be understood to include all possible embodiments and modifications to the shown embodiments which can be embodied without departing from the principle of the disclosure.

The present application claims the benefit of priority of Japanese Patent Application No. 2021-017755, the disclosure of which is incorporated in its entirety herein by reference.

All documents, patent applications, or technical standards, as referred to in this application, are all incorporated in its entirely herein by reference.

What is claimed is:

1. A stator comprising:

a core which includes a plurality of core segments each of which is equipped with a tooth; and a winding which includes a plurality of coils wound around the teeth of the core segments in a concentrated winding form, the coils being in a m-series-connected-coil and n-parallel-connected-coil delta configuration where m is a natural number more than or equal to two, and n is a natural number or in a k-series-connected-coil and n-parallel-connected-coil delta configuration where k is an even number, and n is a natural number, wherein the coils include U-phase coils working for a U-phase, W-phase coils working for a W-phase, and V-phase coils working for a V-phase, the U-phase coils, the W-phase coils, and the V-phase coils being arranged alternately in a first circumferential direction of the core, the winding also includes a plurality of power input wires and a plurality of coil-to-coil connecting wires, each of the power input wires connecting between a trailing end of one of the coils for a first phase that is one of the U-phase, the W-phase, and the V-phase and a leading end of one of the coils for a second phase that is one of the U-phase, the W-phase, and the V-phase and different from the first phase, the coil-to-coil connecting wires including first direction-oriented connecting wires and second direction-oriented connecting wires, each of the first direction-oriented connecting wires connecting between a trailing end of one of the coils for a third phase that is one of the U-phase, the W-phase, and the V-phase and a leading end of one of the coils for the third phase which is arranged away from the one of the coils in the first circumferential direction, each of the second directing connecting wires connecting between a trailing end of one of the coils for a fourth phase that is one of the U-phase, the W-phase, and the V-phase and a leading end of one of the coils for the fourth phase which is arranged away from a former one of the coils for the fourth phase in a second circumferential direction of the core which is opposite the first circumferential direction, and at least one of the power input wires has a joint between ends of the winding.

2. The stator as set forth in claim 1, wherein each of the power input wires connects between the trailing end of one of the coils for the first one of the U-phase, the W-phase, and the V-phase and the leading end of one of the coils for the second one of the U-phase, the W-phase, and the V-phase which is arranged away from the one of the coils for the first one of the U-phase, the W-phase, and the V-phase in the first circumferential direction of the core.

3. The stator as set forth in claim 2, wherein the teeth extend radially inward of the core.

4. The stator as set forth in claim 2, wherein the coils are in a four-series-connected-coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a third power input wire which are arranged sequentially in the first circumferential direction of the core, the coil-to-coil connecting wires are defined as a first coil-to-coil connecting wire to a ninth coil-to-coil connecting wire which are arranged sequentially in the first circumferential direction of the core, the first coil-to-coil connecting wire, the third coil-to-coil connecting wire, the fourth coil-to-coil connecting wire, the sixth coil-to-coil connecting wire, the seventh coil-to-coil connecting wire and the ninth coil-to-coil connecting wire serve as the first direction-oriented connecting wires, the second coil-to-coil connecting wire, the fifth coil-to-coil connecting wire, and the eighth coil-to-coil connecting wire serve as the second direction-oriented connecting wires, the winding is made of a single continuous wire and fabricated in a first step to a twelfth step, in the first step, the first coil is formed by winding wire of the winding around the first tooth in a clockwise direction, as viewed in an axial direction of the first tooth, afterwards, the wire is extended from the first tooth toward the fourth tooth on the first axial side of the core to form the first coil-to-coil connecting wire, in the second step, the fourth coil is formed by winding the wire around the fourth tooth in a clockwise direction, as viewed in an axial direction of the fourth tooth, afterwards, the wire is extended from the fourth tooth to the seventh tooth on the first axial side of the core to create the fourth coil-to-coil connecting wire, in the third step, the seventh coil is formed by winding the wire around the seventh tooth in a clockwise direction, as viewed in an axial direction of the seventh tooth, afterwards, the wire is extended from the seventh tooth to the tenth tooth on the first axial side of the core to create the seventh coil-to-coil connecting wire, in the fourth step, the tenth coil is formed by winding the wire around the tenth tooth in a clockwise direction, as viewed in an axial direction of the tenth tooth, afterwards, the wire is extended from the tenth tooth toward the eleventh tooth on the first axial side of the core to create the second power input wire, in the fifth step, the eleventh coil is formed by winding the wire around the eleventh tooth in a clockwise direction, as viewed in an axial direction of the eleventh tooth, afterwards, the wire is extended from the eleventh tooth toward the eighth tooth on the first axial side of the core to create the eighth coil-to-coil connecting wire, in the sixth step, the eighth coil is formed by winding the wire around the eighth tooth in a clockwise direction, as viewed in an axial direction of the eighth tooth, afterwards, the wire is extended from the eighth tooth toward the fifth tooth on the first axial side of the core to create the fifth coil-to-coil connecting wire, in the seventh step, the fifth coil is formed by winding the wire around the fifth tooth in a clockwise direction, as viewed in an axial direction of the fifth tooth, afterwards, the wire is extended from the fifth tooth toward the second tooth on the first axial side of the core to create the second coil-to-coil connecting wire, in the eighth step, the second coil is formed by winding the wire around the second tooth in a clockwise direction, as viewed in an axial direction of the second tooth, afterwards, the wire is extended from the second tooth toward the third tooth on the first axial side of the core to create the first power input wire, in the ninth step, the third coil is formed by winding the wire around the third tooth in a clockwise direction, as viewed in an axial direction of the third tooth, afterwards, the wire is extended from the third tooth toward the sixth tooth on the first axial side of the core to create the third coil-to-coil connecting wire, in the tenth step, the sixth coil is formed by winding the wire around the sixth tooth in a clockwise direction, as viewed in an axial direction of the sixth tooth, afterwards, the wire is extended from the sixth tooth toward the ninth tooth on the first axial side of the core to create the sixth coil-to-coil connecting wire, in eleventh step, the ninth coil is formed by winding the wire around the ninth tooth in a clockwise direction, as viewed in an axial direction of the ninth tooth, afterwards, the wire is extended from the ninth tooth toward the twelfth tooth on the first axial side of the core to create the ninth coil-to-coil connecting wire, and in twelfth step, the twelfth coil is formed by winding the wire around the twelfth tooth in a clockwise direction, as viewed in an axial direction of the twelfth tooth, afterwards, the joint of the ends of the wire is created on the first axial side of the core to complete the third power input wire.

5. The stator as set forth in claim 2, wherein the coils are in a four-series-connected-coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a third power input wire which are arranged sequentially in the first circumferential direction of the core, the coil-to-coil connecting wires are defined as a first coil-to-coil connecting wire to a ninth coil-to-coil connecting wire which are arranged sequentially in the first circumferential direction of the core, the first coil-to-coil connecting wire, the third coil-to-coil connecting wire, the fourth coil-to-coil connecting wire, the sixth coil-to-coil connecting wire, the seventh coil-to-coil connecting wire and the ninth coil-to-coil connecting wire serve as the first direction-oriented connecting wires, the second coil-to-coil connecting wire, the fifth coil-to-coil connecting wire, and the eighth coil-to-coil connecting wire serve as the second direction-oriented connecting wires, the winding is made of wire made up of a first wire and a second wire and fabricated in a first step to a twelfth step, in the first step, the first coil is formed by winding the wire of the winding around the first tooth in a counterclockwise direction, as viewed in an axial direction of the first tooth, afterwards, the wire is extended from the first tooth toward the fourth tooth on the first axial side of the core to form the first coil-to-coil connecting wire, in the second step, the fourth coil is formed by winding the wire around the fourth tooth in a counterclockwise direction, as viewed in an axial direction of the fourth tooth, afterwards, the wire is extended from the fourth tooth to the seventh tooth on the first axial side of the core to create the fourth coil-to-coil connecting wire, in the third step, the seventh coil is formed by winding the wire around the seventh tooth in a counterclockwise direction, as viewed in an axial direction of the seventh tooth, afterwards, the wire is extended from the seventh tooth to the tenth tooth on the first axial side of the core to create the seventh coil-to-coil connecting wire, in the fourth step, the tenth coil is formed by winding the wire around the tenth tooth in a counterclockwise direction, as viewed in an axial direction of the tenth tooth, afterwards, the wire is extended from the tenth tooth toward the eleventh tooth on the first axial side of the core to create the second power input wire, in the fifth step, the eleventh coil is formed by winding the wire around the eleventh tooth in a counterclockwise direction, as viewed in an axial direction of the eleventh tooth, afterwards, the wire is extended from the eleventh tooth toward the eighth tooth on the first axial side of the core to create the eighth coil-to-coil connecting wire, in the sixth step, the eighth coil is formed by winding the wire around the eighth tooth in a counterclockwise direction, as viewed in an axial direction of the eighth tooth, afterwards, the wire is extended from the eighth tooth toward the fifth tooth on the first axial side of the core to create the fifth coil-to-coil connecting wire, in the seventh step, the fifth coil is formed by winding the wire around the fifth tooth in a counterclockwise direction, as viewed in an axial direction of the fifth tooth, afterwards, the wire is extended from the fifth tooth toward the second tooth on the first axial side of the core to create the second coil-to-coil connecting wire, in the eighth step, the second coil is formed by winding the wire around the second tooth in a counterclockwise direction, as viewed in an axial direction of the second tooth, afterwards, the wire is extended from the second tooth toward the third tooth on the first axial side of the core to create the first power input wire, in the ninth step, the third coil is formed by winding the wire around the third tooth in a counterclockwise direction, as viewed in an axial direction of the third tooth, afterwards, the wire is extended from the third tooth toward the sixth tooth on the first axial side of the core to create the third coil-to-coil connecting wire, in the tenth step, the sixth coil is formed by winding the wire around the sixth tooth in a counterclockwise direction, as viewed in an axial direction of the sixth tooth, afterwards, the wire is extended from the sixth tooth toward the ninth tooth on the first axial side of the core to create the sixth coil-to-coil connecting wire, in the eleventh step, the ninth coil is formed by winding the wire around the ninth tooth in a counterclockwise direction, as viewed in an axial direction of the ninth tooth, afterwards, the wire is extended from the ninth tooth toward the twelfth tooth on the first axial side of the core to create the ninth coil-to-coil connecting wire, and in the twelfth step, the twelfth coil is formed by winding the wire around the twelfth tooth in a counterclockwise direction, as viewed in an axial direction of the twelfth tooth, afterwards, the joint of the ends of the wire is created on the first axial side of the core to complete the third power input wire.

6. The stator as set forth in claim 2, wherein the coils are in a two-series-connected-coil and two-parallel-connected coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a sixth power input wire which are arranged sequentially in the first circumferential direction of the core, the coil-to-coil connecting wires are defined as a first coil-to-coil connecting wire to a sixth coil-to-coil connecting wire which are arranged sequentially in the first circumferential direction of the core, the first coil-to-coil connecting wire, the third coil-to-coil connecting wire, the fourth coil-to-coil connecting wire, and the sixth coil-to-coil connecting wire serve as the first direction-oriented connecting wires, the second coil-to-coil connecting wire and the fifth coil-to-coil connecting wire serve as the second direction-oriented connecting wires, the winding is made of a single continuous wire and fabricated in a first step to a twelfth step, in the first step, the first coil is formed by winding the wire around the first tooth in a clockwise direction, as viewed in an axial direction of the first tooth, afterward, the wire is extended from the first tooth toward the fourth tooth on the first axial side of the core to create the first coil-to-coil connecting wire, in the second step, the fourth coil is formed by winding the wire around the fourth tooth in a clockwise direction, as viewed in an axial direction of the fourth tooth, afterward, the wire is extended from the fourth tooth toward the fifth tooth on the first axial side of the core to create the second power input wire, in the third step, the fifth coil is formed by winding the wire around the fifth tooth in a clockwise direction, as viewed in an axial direction of the fifth tooth, afterward, the wire is extended from the fifth tooth toward the second tooth on the first axial side of the core to create the second coil-to-coil connecting wire, in the fourth step, the second coil is formed by winding the wire around the second tooth in a clockwise direction, as viewed in an axial direction of the second tooth, afterward, the wire is extended from the second tooth toward the third tooth on the first axial side of the core to create the first power input wire, in the fifth step, the third coil is formed by winding the wire around the third tooth in a clockwise direction, as viewed in an axial direction of the third tooth, afterward, the wire is extended from the third tooth toward the sixth tooth on the first axial side of the core to create the third coil-to-coil connecting wire, in the sixth step, the sixth coil is formed by winding the wire around the sixth tooth in a clockwise direction, as viewed in an axial direction of the sixth tooth, afterward, the wire is extended from the sixth tooth toward the seventh tooth on the first axial side of the core to create the third power input wire, in the seventh step, the seventh coil is formed by winding the wire around the seventh tooth in a clockwise direction, as viewed in an axial direction of the seventh tooth, afterward, the wire is extended from the seventh tooth toward the tenth tooth on the first axial side of the core to create the fourth coil-to-coil connecting wire, in the eighth step, the tenth coil is formed by winding the wire around the tenth tooth in a clockwise direction as viewed in an axial direction of the tenth tooth, afterward, the wire is extended from the tenth tooth toward the eleventh tooth on the first axial side of the core to create the fifth power input wire, in the ninth step, the eleventh coil is formed by winding the wire around the eleventh tooth in a clockwise direction as viewed in an axial direction of the eleventh tooth, afterward, the wire is extended from the eleventh tooth toward the eighth tooth on the first axial side of the core to create the fifth coil-to-coil connecting wire, in the tenth step, the eighth coil is formed by winding the wire around the eighth tooth in a clockwise direction as viewed in an axial direction of the eighth tooth, afterward, the wire is extended from the eighth tooth toward the ninth tooth on the first axial side of the core to create the fourth power input wire, in the eleventh step, the ninth coil is formed by winding the wire around the ninth tooth in a clockwise direction as viewed in an axial direction of the ninth tooth, afterward, the wire is extended from the ninth tooth toward the twelfth tooth on the first axial side of the core to create the sixth coil-to-coil connecting wire, and in the twelfth step, the twelfth coil is formed by winding the wire around the twelfth tooth in a clockwise direction as viewed in an axial direction of the twelfth tooth, afterward, the joint of the ends of the winding is produced on the first axial side of the core to from the sixth power input wire.

7. The stator as set forth in claim 2, wherein the coils are in a two-series-connected-coil and two-parallel-connected coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a sixth power input wire which are arranged sequentially in the first circumferential direction of the core, the coil-to-coil connecting wires are defined as a first coil-to-coil connecting wire to a sixth coil-to-coil connecting wire which are arranged sequentially in the first circumferential direction of the core, the first coil-to-coil connecting wire, the third coil-to-coil connecting wire, the fourth coil-to-coil connecting wire, and the sixth coil-to-coil connecting wire serve as the first direction-oriented connecting wires, the second coil-to-coil connecting wire and the fifth coil-to-coil connecting wire serve as the second direction-oriented connecting wires, the winding is made of wire made up of a first wire and a second wire and fabricated in a first step to a sixth step, in the first step, the first wire is wound around the first tooth in a clockwise direction, as viewed in an axial direction of the first tooth, to form the first coil, the second wire is wound around the seventh tooth in a clockwise direction, as viewed in an axial direction of the seventh tooth, to form the seventh coil, afterward, the first wire is extended from the first tooth toward the fourth tooth on the first axial side of the core to create the first coil-to-coil connecting wire, and the second wire is extended from the seventh tooth toward the tenth tooth on the first axial side of the core to create the fourth coil-to-coil connecting wire, in the second step, the first wire is wound around the fourth tooth in a clockwise direction, as viewed in an axial direction of the fourth tooth, to form the fourth coil, the second wire is wound around the tenth tooth in a clockwise direction, as viewed in an axial direction of the tenth tooth, to form the tenth coil, afterward, the first wire is extended from the fourth tooth toward the fifth tooth on the first axial side of the core to create the second power input wire, and the second wire is extended from the tenth tooth toward the eleventh tooth on the first axial side of the core to create the fifth power input wire, in the third step, the first wire is wound around the fifth tooth in a clockwise direction, as viewed in an axial direction of the fifth tooth, to form the fifth coil, the second wire is wound around the eleventh tooth in a clockwise direction, as viewed in an axial direction of the eleventh tooth, to form the eleventh coil, afterward, the first wire is extended from the fifth tooth toward the second tooth on the first axial side of the core to create the second coil-to-coil connecting wire, and the second wire is extended from the eleventh tooth toward the eighth tooth on the first axial side of the core to create the fifth coil-to-coil connecting wire, in the fourth step, the first wire is wound around the second tooth in a clockwise direction, as viewed in an axial direction of the second tooth, to form the second coil, the second wire is wound around the eighth tooth in a clockwise direction, as viewed in an axial direction of the eighth tooth, to form the eighth coil, afterward, the first wire is extended from the second tooth toward the third tooth on the first axial side of the core to create the first power input wire, and the second wire is extended from the eighth tooth toward the ninth tooth on the first axial side of the core to create the fourth power input wire, in the fifth step, the first wire is wound around the third tooth in a clockwise direction, as viewed in an axial direction of the third tooth, to form the third coil, the second wire is wound around the ninth tooth in a clockwise direction, as viewed in an axial direction of the ninth tooth, to form the ninth coil, afterward, the first wire is extended from the third tooth toward the sixth tooth on the first axial side of the core to create the third coil-to-coil connecting wire, and the second wire is extended from the ninth tooth toward the twelfth tooth on the first axial side of the core to create the sixth coil-to-coil connecting wire, and in the sixth step, the first wire is wound around the sixth tooth in a clockwise direction, as viewed in an axial direction of the sixth tooth, to form the sixth coil, the second wire is wound around the twelfth tooth in a clockwise direction, as viewed in an axial direction of the twelfth tooth, to form the twelfth coil, afterward, a first joint of a leading end of the second wire and a trailing end of the first wire is created on the first axial side of the core to produce the third power input wire, and a second joint of a leading end of the first wire and a trailing end of the second wire is created on the first axial side of the core to complete the sixth power input wire.

8. The stator as set forth in claim 2, wherein, the coils are in a two-series-connected-coil and two-parallel-connected coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a sixth power input wire which are arranged sequentially in the first circumferential direction of the core, the coil-to-coil connecting wires are defined as a first coil-to-coil connecting wire to a sixth coil-to-coil connecting wire which are arranged sequentially in the first circumferential direction of the core, the first coil-to-coil connecting wire, the third coil-to-coil connecting wire, the fourth coil-to-coil connecting wire, and the sixth coil-to-coil connecting wire serve as the first direction-oriented connecting wires, the second coil-to-coil connecting wire and the fifth coil-to-coil connecting wire serve as the second direction-oriented connecting wires, the winding is made of a single continuous wire and fabricated in a first step to a twelfth step, in the first step, the wire is wound around the first tooth in a counterclockwise direction, as viewed in an axial direction of the first tooth, to form the first coil, afterward, the wire is extended from the first tooth toward the fourth tooth on the first axial side of the core to create the first coil-to-coil connecting wire, in the second step, the wire is wound around the fourth tooth in a counterclockwise direction, as viewed in an axial direction of the fourth tooth, to form the fourth coil, afterward, the wire is extended from the fourth tooth toward the fifth tooth on the first axial side of the core to create the second power input wire, in the third step, the wire is wound around the fifth tooth in a counterclockwise direction, as viewed in an axial direction of the fifth tooth, to form the fifth coil, afterward, the wire is extended from the fifth tooth toward the second tooth on the first axial side of the core to create the second coil-to-coil connecting wire, in the fourth step, the wire is wound around the second tooth in a counterclockwise direction, as viewed in an axial direction of the second tooth, to form the second coil, afterward, the wire is extended from the second tooth toward the third tooth on the first axial side of the core to create the first power input wire, in the fifth step, the wire is wound around the third tooth in a counterclockwise direction, as viewed in an axial direction of the third tooth, to form the third coil, afterward, the wire is extended from the third tooth toward the sixth tooth on the first axial side of the core to create the third coil-to-coil connecting wire, in the sixth step, the wire is wound around the sixth tooth in a counterclockwise direction, as viewed in an axial direction of the sixth tooth, to form the sixth coil, afterward, the wire is extended from the sixth tooth toward the seventh tooth on the first axial side of the core to create the third power input wire, in the seventh step, the wire is wound around the seventh tooth in a counterclockwise direction, as viewed in an axial direction of the seventh tooth, to form the seventh coil, afterward, the wire is extended from the seventh tooth toward the tenth tooth on the first axial side of the core to create the fourth coil-to-coil connecting wire, in the eighth step, the wire is wound around the tenth tooth in a counterclockwise direction, as viewed in an axial direction of the tenth tooth, to form the tenth coil, afterward, the wire is extended from the tenth tooth toward the eleventh tooth on the first axial side of the core to create the fifth power input wire, in the ninth step, the wire is wound around the eleventh tooth in a counterclockwise direction, as viewed in an axial direction of the eleventh tooth, to form the eleventh coil, afterward, the wire is extended from the eleventh tooth toward the eighth tooth on the first axial side of the core to create the fifth coil-to-coil connecting wire, in the tenth step, the wire is wound around the eighth tooth in a counterclockwise direction, as viewed in an axial direction of the eighth tooth, to form the eighth coil, afterward, the wire is extended from the eighth tooth toward the ninth tooth on the first axial side of the core to create the fourth power input wire, in the eleventh step, the wire is wound around the ninth tooth in a counterclockwise direction, as viewed in an axial direction of the ninth tooth, to form the ninth coil, afterward, the wire is extended form the ninth tooth toward the twelfth tooth on the first axial side of the core to create the sixth coil-to-coil connecting wire, and in the twelfth step, the wire is wound around the twelfth tooth in a counterclockwise direction, as viewed in an axial direction of the twelfth tooth, to form the twelfth coil, afterward, the joint of the ends of the wire is produced on the first axial side of the core to complete the sixth power input wire.

9. The stator as set forth in claim 2, wherein the coils are in a two-series-connected-coil and two-parallel-connected coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a sixth power input wire which are arranged sequentially in the first circumferential direction of the core, the coil-to-coil connecting wires are defined as a first coil-to-coil connecting wire to a sixth coil-to-coil connecting wire which are arranged sequentially in the first circumferential direction of the core, the first coil-to-coil connecting wire, the third coil-to-coil connecting wire, the fourth coil-to-coil connecting wire, and the sixth coil-to-coil connecting wire serve as the first direction-oriented connecting wires, the second coil-to-coil connecting wire and the fifth coil-to-coil connecting wire serve as the second direction-oriented connecting wires, the winding is made of wire made up of a first wire and a second wire and fabricated in a first step to a sixth step, in the first step, the first wire is wound around the first tooth in a counterclockwise direction, as viewed in an axial direction of the first tooth, to form the first coil, the second wire is wound around the seventh tooth in a counterclockwise direction, as viewed in an axial direction of the seventh tooth, to form the seventh coil, afterward, the first wire is extended from the first tooth toward the fourth tooth on the first axial side of the core to create the first coil-to-coil connecting wire, and the second wire is extended from the seventh tooth toward the tenth tooth on the first axial side of the core to create the fourth coil-to-coil connecting wire, in the second step, the first wire is wound around the fourth tooth in a counterclockwise direction, as viewed in an axial direction of the fourth tooth, to form the fourth coil, the second wire is wound around the tenth tooth in a counterclockwise direction, as viewed in an axial direction of the tenth tooth, to form the tenth coil, afterward, the wires wire is extended from the fourth tooth toward the fifth tooth on the first axial side of the core to create the second power input wire, the second wire is extended from the tenth tooth toward the eleventh tooth on the first axial side of the core to create the fifth power input wire, in the third step, the first wire is wound around the fifth tooth in a counterclockwise direction, as viewed in an axial direction of the fifth tooth, to form the fifth coil, the second wire is wound around the eleventh tooth in a counterclockwise direction, as viewed in an axial direction of the eleventh tooth, to form the eleventh coil, afterward, the first wire is extended from the fifth tooth toward the second tooth on the first axial side of the core to create the second coil-to-coil connecting wire, and the second wire is extended from the eleventh tooth toward the eighth tooth on the first axial side of the core to create the fifth coil-to-coil connecting wire, in the fourth step, the first wire is wound around the second tooth in a counterclockwise direction, as viewed in an axial direction of the second tooth, to form the second coil, the second wire is wound around the eighth tooth in a counterclockwise direction, as viewed in an axial direction of the eighth tooth, to form the eighth coil, afterward, the first wire is extended from the second tooth toward the third tooth on the first axial side of the core to create the first power input wire, the second wire is extended from the eighth tooth toward the ninth tooth on the first axial side of the core to create the fourth power input wire, in the fifth step, the first wire is wound around the third tooth in a counterclockwise direction, as viewed in an axial direction of the third tooth, to form the third coil, and the second wire is wound around the ninth tooth in a counterclockwise direction, as viewed in an axial direction of the ninth tooth, to form the ninth coil, afterward, the first wire is extended from the third tooth toward the sixth tooth on the first axial side of the core to create the third coil-to-coil connecting wire, and the second wire is extended from the ninth tooth toward the twelfth tooth on the first axial side of the core to create the sixth coil-to-coil connecting wire, and in the sixth step, the first wire is wound around the sixth tooth in a counterclockwise direction, as viewed in an axial direction of the sixth tooth, to form the sixth coil, the second wire is wound around the twelfth tooth in a counterclockwise direction, as viewed in an axial direction of the twelfth tooth, to form the twelfth coil, afterward, a first joint of a leading end of the second wire and a trailing end of the first wire is created on the first axial side of the core to produce the third power input wire, and a second joint of a leading end of the first wire and a trailing end of the second wire is created on the first axial side of the core to complete the sixth power input wire.

10. The stator as set forth in claim 2, wherein the coils are in a two-series-connected-coil and three-parallel-connected coil delta configuration, the number of the teeth is eighteen, the eighteen teeth are defined as a first tooth to an eighteenth tooth arranged sequentially in the first circumferential direction of the core, the coils disposed on the first to eighteenth teeth are defined as a first coil to an eighteenth coil, respectively, the power input wires are defined as a first power input wire to a ninth power input wire which are arranged sequentially in the first circumferential direction of the core, the coil-to-coil connecting wires are defined as a first coil-to-coil connecting wire to a ninth coil-to-coil connecting wire which are arranged sequentially in the first circumferential direction of the core, the first coil-to-coil connecting wire, the third coil-to-coil connecting wire, the fourth coil-to-coil connecting wire, the sixth coil-to-coil connecting wire, the seventh coil-to-coil connecting wire, and the ninth coil-to-coil connecting wire serve as the first direction-oriented connecting wires, the second coil-to-coil connecting wire, the fifth coil-to-coil connecting wire, and the eighth coil-to-coil connecting wire serve as the second direction-oriented connecting wires, the winding is made of wire made up of a first wire, a second wire, and a third wire and fabricated in a first step to a sixth step, in the first step, the first wire is wound around the first tooth in a clockwise direction, as viewed in an axial direction of the first tooth, to form the first coil, the second wire is wound around the seventh tooth in a clockwise direction, as viewed in an axial direction of the seventh tooth, to form the seventh coil, the third wire is wound around the thirteenth tooth in a clockwise direction, as viewed in an axial direction of the thirteenth tooth, to form the thirteenth coil, afterward, the first wire is extended from the first tooth toward the fourth tooth on the first axial side of the core to create the first coil-to-coil connecting wire, and the second wire is extended from the seventh tooth toward the tenth tooth on the first axial side of the core to create the fourth coil-to-coil connecting wire, the third wire is extended from the thirteenth tooth toward the sixteenth tooth on the first axial side of the core to create the seventh coil-to-coil connecting wire, in the second step, the first wire is wound around the fourth tooth in a clockwise direction, as viewed in an axial direction of the fourth tooth, to form the fourth coil, the second wire is wound around the tenth tooth in a clockwise direction, as viewed in an axial direction of the tenth tooth, to form the tenth coil, and the third wire is wound around the sixteenth tooth in a clockwise direction, as viewed in an axial direction of the sixteenth tooth, to form the sixteenth coil, afterward, the first wire is extended from the fourth tooth toward the fifth tooth on the first axial side of the core to create the second power input wire, the second wire is extended from the tenth tooth toward the eleventh tooth on the first axial side of the core to create the fifth power input wire, and the third wire is extended from the sixteenth tooth toward the seventeenth tooth on the first axial side of the core to create the eighth power input wire, in the third step, the first wire is wound around the fifth tooth in a clockwise direction, as viewed in an axial direction of the fifth tooth, to form the fifth coil, the second wire is wound around the eleventh tooth in a clockwise direction, as viewed in an axial direction of the eleventh tooth, to form the eleventh coil, and the third wire is wound around the seventeenth tooth in a clockwise direction, as viewed in an axial direction of the seventeenth tooth, to form the seventeenth coil, afterward, the first wire is extended from the fifth tooth toward the second tooth on the first axial side of the core to create the second coil-to-coil connecting wire, the second wire is extended from the eleventh tooth toward the eighth tooth on the first axial side of the core to create the fifth coil-to-coil connecting wire, and the third wire is extended from the seventeenth tooth toward the fourteenth tooth on the first axial side of the core to create the eighth coil-to-coil connecting wire, in the fourth step, the first wire is wound around the second tooth in a clockwise direction, as viewed in an axial direction of the second tooth, to form the second coil, the second wire is wound around the eighth tooth in a clockwise direction, as viewed in an axial direction of the eighth tooth, to form the eighth coil, and the third wire is wound around the fourteenth tooth in a clockwise direction, as viewed in an axial direction of the fourteenth tooth, to form the fourteenth coil, afterward, the first wire is extended from the second tooth toward the third tooth on the first axial side of the core to create the first power input wire, the second wire is extended from the eighth tooth toward the ninth tooth on the first axial side of the core to create the fourth power input wire, and the third wire is extended from the fourteenth tooth toward the fifteenth tooth on the first axial side of the core to create the seventeenth power input wire, in the fifth step, the first wire is wound around the third tooth in a clockwise direction, as viewed in an axial direction of the third tooth, to form the third coil, the second wire is wound around the ninth tooth in a clockwise direction, as viewed in an axial direction of the ninth tooth, to form the ninth coil, the third wire is wound around the fifteenth tooth in a clockwise direction, as viewed in an axial direction of the fifteenth tooth, to form the fifteenth coil, afterward, the first wire is extended from the third tooth toward the sixth tooth on the first axial side of the core to create the third coil-to-coil connecting wire, the second wire is extended from the ninth tooth toward the twelfth tooth on the first axial side of the core to create the sixth coil-to-coil connecting wire, and the third wire is extended from the fifteenth tooth toward the eighteenth tooth on the first axial side of the core to create the ninth coil-to-coil connecting wire, and in the sixth step, the first wire is wound around the sixth tooth in a clockwise direction, as viewed in an axial direction of the sixth tooth, to form the sixth coil, the second wire is wound around the twelfth tooth in a clockwise direction, as viewed in an axial direction of the twelfth tooth, to form the twelfth coil, and the third wire is wound around the eighteenth tooth in a clockwise direction, as viewed in an axial direction of the eighteenth tooth, to form the eighteenth coil, afterward, a first joint of a leading end of the second wire and a trailing end of the first wire is produced on the first axial side of the core to create the third power input wire, a second joint of a leading end of the third wire and a trailing end of the second wire is produced on the first axial side of the core to create the sixth power input wire, and a third joint of a leading end of the first wire and a trailing end of the third wire is produced on the first axial side of the core, thereby completing the ninth power input wire.

11. The stator as set forth in claim 2, wherein the coils are in a four-series-connected-coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a third power input wire which are arranged sequentially in the first circumferential direction of the core, the coil-to-coil connecting wires are defined as a first coil-to-coil connecting wire to a ninth coil-to-coil connecting wire which are arranged sequentially in the first circumferential direction of the core, the first coil-to-coil connecting wire, the third coil-to-coil connecting wire, the fourth coil-to-coil connecting wire, the sixth coil-to-coil connecting wire, the seventh coil-to-coil connecting wire, and the ninth coil-to-coil connecting wire serve as the first direction-oriented connecting wires, the second coil-to-coil connecting wire, the fifth coil-to-coil connecting wire, and the eighth coil-to-coil connecting wire serve as the second direction-oriented connecting wires, the winding is made of a single continuous wire and fabricated in a first step to a twelfth step, in the first step, the wire is wound around the first tooth in a counterclockwise direction, as viewed in an axial direction of the first tooth, to form the first coil, afterward, the wire is extended from the first tooth toward the fourth tooth on the second axial side of the core to create the first coil-to-coil connecting wire, in the second step, the wire is wound around the fourth tooth in a counterclockwise direction, as viewed in an axial direction of the fourth tooth, to form the fourth coil, afterward, the wire is extended from the fourth tooth toward the seventh tooth on the first axial side of the core to create the fourth coil-to-coil connecting wire, in the third step, the wire is wound around the seventh tooth in a counterclockwise direction, as viewed in an axial direction of the seventh tooth, to form the seventh coil, afterward, the wire is extended from the seventh tooth toward the tenth tooth on the second axial side of the core to create the seventh coil-to-coil connecting wire, in the fourth step, the wire is wound around the tenth tooth in a counterclockwise direction, as viewed in an axial direction of the tenth tooth to form the tenth coil, afterward, the wire is extended from the tenth tooth toward the eleventh tooth on the first axial side of the core to create the second power input wire, in the fifth step, the wire is wound around the eleventh tooth in a counterclockwise direction, as viewed in an axial direction of the eleventh tooth to form the eleventh coil, afterward, the wire is extended from the eleventh tooth toward the eighth tooth on the second axial side of the core to create the eighth coil-to-coil connecting wire, in the sixth step, the wire is wound around the eighth tooth in a counterclockwise direction, as viewed in an axial direction of the eighth tooth to form the eighth coil, afterward, the wire is extended from the eighth tooth toward the fifth tooth on the first axial side of the core to create the fifth coil-to-coil connecting wire, in the seventh step, the wire is wound around the fifth tooth in a counterclockwise direction, as viewed in an axial direction of the fifth tooth to form the fifth coil, afterward, the wire is extended from the fifth tooth toward the second tooth on the second axial side of the core to create the second coil-to-coil connecting wire, in the eighth step, the wire is wound around the second tooth in a counterclockwise direction, as viewed in an axial direction of the second tooth to form the second coil, afterward, the wire is extended from the second tooth toward the third tooth on the first axial side of the core to create the first power input wire, in the ninth step, the wire is wound around the third tooth in a counterclockwise direction, as viewed in an axial direction of the third tooth, to form the third coil, afterward, the wire is extended from the third tooth toward the sixth tooth on the second axial side of the core to create the third coil-to-coil connecting wire, in the tenth step, the wire is wound around the sixth tooth in a counterclockwise direction, as viewed in an axial direction of the sixth tooth, to form the sixth coil, afterward, the wire is extended from the sixth tooth toward the ninth tooth on the first axial side of the core to create the sixth coil-to-coil connecting wire, in the eleventh step, the wire is wound around the ninth tooth in a counterclockwise direction, as viewed in an axial direction of the ninth tooth, to form the ninth coil, afterward, the wire is extended from the ninth tooth toward the twelfth tooth on the second side of the core to create the ninth coil-to-coil connecting wire, and in the twelfth step, the wire is wound around the twelfth tooth in a counterclockwise direction, as viewed in an axial direction of the twelfth tooth, to form the twelfth coil, afterward, the joint of the ends of the wire is produced on the first axial side of the core to complete the third power input wire.

12. The stator as set forth in claim 2, wherein the coils are in a four-series-connected-coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a third power input wire which are arranged sequentially in the first circumferential direction of the core, the coil-to-coil connecting wires are defined as a first coil-to-coil connecting wire to a ninth coil-to-coil connecting wire which are arranged sequentially in the first circumferential direction of the core, the first coil-to-coil connecting wire, the third coil-to-coil connecting wire, the fourth coil-to-coil connecting wire, the sixth coil-to-coil connecting wire, the seventh coil-to-coil connecting wire, and the ninth coil-to-coil connecting wire serve as the first direction-oriented connecting wires, the second coil-to-coil connecting wire, the fifth coil-to-coil connecting wire, and the eighth coil-to-coil connecting wire serve as the second direction-oriented connecting wires, the winding is made of a single continuous wire and fabricated in a first step to a twelfth step, in the first step, the wire is wound around the first tooth in a clockwise direction, as viewed in an axial direction of the first tooth, to form the first coil, afterward, the wire is extended from the first tooth toward the fourth tooth on the second axial side of the core to create the first coil-to-coil connecting wire, in the second step, the wire is wound around the fourth tooth in a clockwise direction, as viewed in an axial direction of the fourth tooth, to form the fourth coil, afterward, the wire is extended from the fourth tooth toward the seventh tooth on the first axial side of the core to create the fourth coil-to-coil connecting wire, in the third step, the wire is wound around the seventh tooth in a clockwise direction, as viewed in an axial direction of the seventh tooth, to form the seventh coil, afterwards, the wire is extended from the seventh tooth toward the tenth tooth on the second axial side of the core to create the seventh coil-to-coil connecting wire, in the fourth step, the wire is wound around the tenth tooth in a clockwise direction, as viewed in an axial direction of the tenth tooth, to form the tenth coil, afterward, the wire is extended from the tenth tooth toward the eleventh tooth on the first axial side of the core to create the second power input wire, in the fifth step, the wire is wound around the eleventh tooth in a clockwise direction, as viewed in an axial direction of the eleventh tooth, to form the eleventh coil, afterward, the wire is extended from the eleventh tooth toward the eighth tooth on the second axial side of the core to create the eighth coil-to-coil connecting wire, in the sixth step, the wire is wound around the eighth tooth in a clockwise direction, as viewed in an axial direction of the eighth tooth, to form the eighth coil, afterward, the wire is extended from the eighth tooth toward the fifth tooth on the first axial side of the core to create the fifth coil-to-coil connecting wire, in the seventh step, the wire is wound around the fifth tooth in a clockwise direction, as viewed in an axial direction of the fifth tooth, to form the fifth coil, afterward, the wire is extended from the fifth tooth toward the second tooth on the second axial side of the core to create the second coil-to-coil connecting wire, in the eighth step, the wire is wound around the second tooth in a clockwise direction, as viewed in an axial direction of the second tooth, to form the second coil, afterward, the wire is extended from the second tooth toward the third tooth on the first axial side of the core to create the first power input wire, in the ninth step, the wire is wound around the third tooth in a clockwise direction, as viewed in an axial direction of the third tooth, to form the third coil, afterward, the wire is extended from the third tooth toward the sixth tooth on the second axial side of the core to create the third coil-to-coil connecting wire, in the tenth step, the wire is wound around the sixth tooth in a clockwise direction, as viewed in an axial direction of the sixth tooth, to form the sixth coil, afterward, the wire is extended from the sixth tooth toward the ninth tooth on the first axial side of the core to create the sixth coil-to-coil connecting wire, in the eleventh step, the wire is wound around the ninth tooth in a clockwise direction, as viewed in an axial direction of the ninth tooth, to form the ninth coil, afterward, the wire is extended from the ninth tooth toward the twelfth tooth on the second axial side of the core to create the ninth coil-to-coil connecting wire, and in the twelfth step, the wire is wound around the twelfth tooth in a clockwise direction, as viewed in an axial direction of the twelfth tooth, to form the twelfth coil, afterward, the joint of ends of the wire is produced on the first axial side of the core to complete the third power input wire.

13. The stator as set forth in claim 2, wherein the coils are in a two-series-connected-coil and two-parallel-connected coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a sixth power input wire which are arranged sequentially in the first circumferential direction of the core, the coil-to-coil connecting wires are defined as a first coil-to-coil connecting wire to a sixth coil-to-coil connecting wire which are arranged sequentially in the first circumferential direction of the core, the first coil-to-coil connecting wire, the third coil-to-coil connecting wire, the fourth coil-to-coil connecting wire, and the sixth coil-to-coil connecting wire serve as the first direction-oriented connecting wires, the second coil-to-coil connecting wire and the fifth coil-to-coil connecting wire serve as the second direction-oriented connecting wires, the winding is made of a single continuous wire and fabricated in a first step to a twelfth step, in the first step, the wire is wound around the first tooth in a counterclockwise direction, as viewed in an axial direction of the first tooth, to form the first coil, afterward, the wire is extended from the first tooth toward the fourth tooth on the second axial side of the core to create the first coil-to-coil connecting wire, in the second step, the wire is wound around the fourth tooth in a counterclockwise direction, as viewed in an axial direction of the fourth tooth, to form the fourth coil, afterward, the wire is extended from the fourth tooth toward the fifth tooth on the first axial side of the core to create the second power input wire, in the third step, the wire is wound around the fifth tooth in a counterclockwise direction, as viewed in an axial direction of the fifth tooth, to form the fifth coil, afterward, the wire is extended from the fifth tooth toward the second tooth on the second axial side of the core to create the second coil-to-coil connecting wire, in the fourth step, the wire is wound around the second tooth in a counterclockwise direction, as viewed in an axial direction of the second tooth, to form the second coil, afterward, the wire is extended from the second tooth toward the third tooth on the first axial side of the core to create the first power input wire, in the fifth step, the wire is wound around the third tooth in a counterclockwise direction, as viewed in an axial direction of the third tooth, to form the third coil, afterward, the wire is extended from the third tooth toward the sixth tooth on the second axial side of the core to create the third coil-to-coil connecting wire, in the sixth step, the wire is wound around the sixth tooth in a counterclockwise direction, as viewed in an axial direction of the sixth tooth, to form the sixth coil, afterward, the wire is extended from the sixth tooth toward the seventh tooth on the second axial side of the core to create the third power input wire, in the seventh step, the wire is wound around the seventh tooth in a counterclockwise direction, as viewed in an axial direction of the seventh tooth, to form the seventh coil, afterward, the wire is extended from the seventh tooth toward the tenth tooth on the second axial side of the core to create the fourth coil-to-coil connecting wire, in the eighth step, the wire is wound around the tenth tooth in a counterclockwise direction, as viewed in an axial direction of the tenth tooth, to form the tenth coil, afterward, the wire is extended from the tenth tooth toward the eleventh tooth on the first axial side of the core to create the fifth power input wire, in the ninth step, the wire is wound around the eleventh tooth in a counterclockwise direction, as viewed in an axial direction of the eleventh tooth, to form the eleventh coil, afterward, the wire is extended from the eleventh tooth toward the eighth tooth on the second axial side of the core to create the fifth coil-to-coil connecting wire, in the tenth step, the wire is wound around the eighth tooth in a counterclockwise direction, as viewed in an axial direction of the eighth tooth, to create the eighth coil, afterward, the wire is extended from the eighth tooth toward the ninth tooth on the first axial side of the core to create the fourth power input wire, in the eleventh step, the wire is wound around the ninth tooth in a counterclockwise direction, as viewed in an axial direction of the ninth tooth, to form the ninth coil, afterward, the wire is extended from the ninth tooth toward the twelfth tooth on the second axial side of the core to create the sixth coil-to-coil connecting wire, in the twelfth step, the wire is wound around the twelfth tooth in a counterclockwise direction, as viewed in an axial direction of the twelfth tooth, to form the twelfth coil, afterward, the joint of ends of the wire is produced on the first axial side of the core to complete the sixth power input wire.

14. The stator as set forth in claim 2, wherein the coils are in a two-series-connected-coil and two-parallel-connected coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a sixth power input wire which are arranged sequentially in the first circumferential direction of the core, the coil-to-coil connecting wires are defined as a first coil-to-coil connecting wire to a sixth coil-to-coil connecting wire which are arranged sequentially in the first circumferential direction of the core, the first coil-to-coil connecting wire, the third coil-to-coil connecting wire, the fourth coil-to-coil connecting wire, and the sixth coil-to-coil connecting wire serve as the first direction-oriented connecting wires, the second coil-to-coil connecting wire and the fifth coil-to-coil connecting wire serve as the second direction-oriented connecting wires, the winding is made of wire made up of a first wire and a second wire and fabricated in a first step to a sixth step, in the first step, the first wire is wound around the first tooth in a counterclockwise direction, as viewed in an axial direction of the first tooth, to form the first coil, the second wire is wound around the seventh tooth in a counterclockwise direction, as viewed in an axial direction of the seventh tooth, to form the seventh coil, afterward, the first wire is extended from the first tooth toward the fourth tooth on the second axial side of the core to create the first coil-to-coil connecting wire, and the second wire is extended from the seventh tooth toward the tenth tooth on the second axial side of the core to create the fourth coil-to-coil connecting wire, in the second step, the first wire is wound around the fourth tooth in a counterclockwise direction, as viewed in an axial direction of the fourth tooth, to form the fourth coil, the second wire is wound around the tenth tooth in a counterclockwise direction, as viewed in an axial direction of the tenth tooth, to form the tenth coil, afterward, the first wire is extended from the fourth tooth toward the fifth tooth on the first axial side of the core to create the second power input wire, and the second wire is extended from the tenth tooth from the eleventh tooth on the first axial side of the core to create the fifth power input wire, in the third step, the first wire is wound around the fifth tooth in a counterclockwise direction, as viewed in an axial direction of the fifth tooth, to form the fifth coil, the second wire is wound around the eleventh tooth in a counterclockwise direction, as viewed in an axial direction of the eleventh tooth, to form the eleventh coil, afterward, the first wire is extended from the fifth tooth toward the second tooth on the second axial side of the core to create the second coil-to-coil connecting wire, and the second wire is extended from the eleventh tooth toward the eighth tooth on the second axial side of the core to create the fifth coil-to-coil connecting wire, in the fourth step, the first wire is wound around the second tooth in a counterclockwise direction, as viewed in an axial direction of the second tooth, to form the second coil, the second wire is wound around the eighth tooth in a counterclockwise direction, as viewed in an axial direction of the eighth tooth, to form the eighth coil, afterward, the first wire is extended from the second tooth toward the third tooth on the first axial side of the core to create the first power input wire, and the second wire is extended from the eighth tooth toward the ninth tooth on the first axial side of the core to create the fourth power input wire, in the fifth step, the first wire is wound around the third tooth in a counterclockwise direction, as viewed in an axial direction of the third tooth, to form the third coil, the second wire is wound around the ninth tooth in a counterclockwise direction, as viewed in an axial direction of the ninth coil, afterward, the first wire is extended from the third tooth toward the sixth tooth on the second axial side of the core to create the third coil-to-coil connecting wire, and the second wire is extended from the ninth tooth toward the twelfth tooth on the second axial side of the core to create the sixth coil-to-coil connecting wire, in the sixth step, the first wire is wound around the sixth tooth in a counterclockwise direction, as viewed in an axial direction of the sixth tooth, to form the sixth coil, the second wire is wound around the twelfth tooth in a counterclockwise direction, as viewed in an axial direction of the twelfth tooth, to form the twelfth coil, afterward, a first joint which achieves a joint of a leading end of the second wire and a trailing end of the first wire is produced on the first axial side of the core to complete the third power input wire, and a second joint which achieves a joint of a leading end of the first wire and a trailing end of the second wire is produced on the first axial side of the core to complete the sixth power input wire.

15. The stator as set forth in claim 2, wherein the coils are in a two-series-connected-coil and two-parallel-connected coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a sixth power input wire which are arranged sequentially in the first circumferential direction of the core, the coil-to-coil connecting wires are defined as a first coil-to-coil connecting wire to a sixth coil-to-coil connecting wire which are arranged sequentially in the first circumferential direction of the core, the first coil-to-coil connecting wire, the third coil-to-coil connecting wire, the fourth coil-to-coil connecting wire, and the sixth coil-to-coil connecting wire serve as the first direction-oriented connecting wires, the second coil-to-coil connecting wire and the fifth coil-to-coil connecting wire serve as the second direction-oriented connecting wires, the winding is made of a single continuous wire and fabricated in a first step to a twelfth step, in the first step, the wire is wound around the first tooth in a clockwise direction, as viewed in an axial direction of the first tooth, to form the first coil, afterward, the wire is extended from the first tooth toward the fourth tooth on the second axial side of the core to create the first coil-to-coil connecting wire, in the second step, the wire is wound around the fourth tooth in a clockwise direction, as viewed in an axial direction of the fourth tooth, to form the fourth coil, afterward, the wire is extended from the fourth tooth toward the fifth tooth on the first axial side of the core to create the second power input wire, in the third step, the wire is wound around the fifth tooth in a clockwise direction, as viewed in an axial direction of the fifth tooth, to form the fifth coil, afterward, the wire is extended from the fifth tooth toward the second tooth on the second axial side of the core to create the second coil-to-coil connecting wire, in the fourth step, the wire is wound around the second tooth in a clockwise direction, as viewed in an axial direction of the second tooth, to form the second coil, afterward, the wire is extended from the second tooth toward the third tooth on the first axial side of the core to create the first power input wire, in the fifth step, the wire is wound around the third tooth in a clockwise direction, as viewed in an axial direction of the third tooth, to form the third coil, afterward, the wire is extended from the third tooth toward the sixth tooth on the second axial side of the core to create the third coil-to-coil connecting wire, in the sixth step, the wire is wound around the sixth tooth in a clockwise direction, as viewed in an axial direction of the sixth tooth, to form the sixth coil, afterward, the wire is extended from the sixth tooth toward the seventh tooth on the first axial side of the core to create the third power input wire, in the seventh step, the wire is wound around the seventh tooth in a clockwise direction, as viewed in an axial direction of the seventh tooth, to form the seventh coil, afterward, the wire is extended from the seventh tooth toward the tenth tooth on the second axial side of the core to create the fourth coil-to-coil connecting wire, in the eighth step, the wire is wound around the tenth tooth in a clockwise direction, as viewed in an axial direction of the tenth tooth, to form the tenth coil, afterward, the wire is extended from the tenth tooth toward the eleventh tooth on the first axial side of the core to create the fifth power input wire, in the ninth step, the wire is wound around the eleventh tooth in a clockwise direction, as viewed in an axial direction of the eleventh tooth, to form the eleventh coil, afterward, the wire is extended from the eleventh tooth toward the eighth tooth on the second axial side of the core to create the fifth coil-to-coil connecting wire, in the tenth step, the wire is wound around the eighth tooth in a clockwise direction, as viewed in an axial direction of the eighth tooth, to form the eighth coil, afterward, the wire is extended from the eighth tooth toward the ninth tooth on the first axial side of the core to create the fourth power input wire, in the eleventh step, the wire is wound around the ninth tooth in a clockwise direction, as viewed in an axial direction of the ninth tooth, to form the ninth coil, afterward, the wire is extended from the ninth tooth toward the twelfth tooth on the second axial side of the core to create the sixth coil-to-coil connecting wire, and in the twelfth step, the wire is wound around the twelfth tooth in a clockwise direction, as viewed in an axial direction of the twelfth tooth, to form the twelfth coil, afterward, the joint of the ends of the wire is produced on the first axial side to complete the sixth power input wire.

16. The stator as set forth in claim 2, wherein the coils are in a two-series-connected-coil and two-parallel-connected coil delta configuration, the number of the teeth is twelve, the twelve teeth are defined as a first tooth to a twelfth tooth arranged sequentially in the first circumferential direction of the core, the coils disposed on the first to twelfth teeth are defined as a first coil to a twelfth coil, respectively, the power input wires are defined as a first power input wire to a sixth power input wire which are arranged sequentially in the first circumferential direction of the core, the coil-to-coil connecting wires are defined as a first coil-to-coil connecting wire to a sixth coil-to-coil connecting wire which are arranged sequentially in the first circumferential direction of the core, the first coil-to-coil connecting wire, the third coil-to-coil connecting wire, the fourth coil-to-coil connecting wire, and the sixth coil-to-coil connecting wire serve as the first direction-oriented connecting wires, the second coil-to-coil connecting wire and the fifth coil-to-coil connecting wire serve as the second direction-oriented connecting wires, the winding is made of wire made up of a first wire and a second wire and fabricated in a first step to a sixth step, in the first step, the first wire is wound around the first tooth in a clockwise direction, as viewed in an axial direction of the first tooth, to form the first coil, the second wire is wound around the seventh tooth in a clockwise direction, as viewed in an axial direction of the seventh tooth, to form the seventh coil, afterward, the first wire is extended from the first tooth toward the fourth tooth on the second axial side of the core to create the first coil-to-coil connecting wire, the second wire is extended from the seventh tooth toward the tenth tooth on the second axial side of the core to create the fourth coil-to-coil connecting wire, in the second step, the first wire is wound around the fourth tooth in a clockwise direction, as viewed in an axial direction of the fourth tooth, to form the fourth coil, the second wire is wound around the tenth tooth in a clockwise direction, as viewed in an axial direction of the tenth tooth, to form the tenth coil, afterward, the first wire is extended from the fourth tooth toward the fifth tooth on the first axial side of the core to create the second power input wire, the second wire is extended from the tenth tooth toward the eleventh tooth on the first axial side of the core to create the fifth power input wire, in the third step, the first wire is wound around the fifth tooth in a clockwise direction, as viewed in an axial direction of the fifth tooth, to form the fifth coil, the second wire is wound around the eleventh tooth in a clockwise direction, as viewed in an axial direction of the eleventh tooth, to form the eleventh coil, afterward, the first wire is extended from the fifth tooth toward the second tooth on the second axial side of the core to create the second coil-to-coil connecting wire, the second wire is extended from the eleventh tooth toward the eighth tooth on the second axial side of the core to create the fifth coil-to-coil connecting wire, in the fourth step, the first wire is wound around the second tooth in a clockwise direction, as viewed in an axial direction of the second tooth, to form the second coil, the second wire is wound around the eighth tooth in a clockwise direction, as viewed in an axial direction of the eighth tooth, to form the eighth coil, afterward, the first wire is extended from the second tooth toward the third tooth on the first axial side of the core to create the first power input wire, the second wire is extended from the eighth tooth toward the ninth tooth on the first axial side of the core to create the fourth power input wire, in the fifth step, the first wire is wound around the third tooth in a clockwise direction, as viewed in an axial direction of the third tooth, to form the third coil, the second wire is wound around the ninth tooth in a clockwise direction, as viewed in an axial direction of the ninth tooth, to form the ninth coil, afterward, the first wire is extended from the third tooth toward the sixth tooth on the second axial side of the core to create the third coil-to-coil connecting wire, the second wire is extended from the ninth tooth toward the twelfth tooth on the second axial side of the core to create the sixth coil-to-coil connecting wire, and in the sixth step, the first wire is wound around the sixth tooth in a clockwise direction, as viewed in an axial direction of the sixth tooth, to form the sixth coil, the second wire is wound around the twelfth tooth in a clockwise direction, as viewed in an axial direction of the twelfth tooth, to form the twelfth coil, afterward, a first joint which achieves a joint of a leading end of the second wire and a trailing end of the first wire is produced on the first axial side to complete the third power input wire, and a second joint which achieves a joint of a leading end of the first wire and a trailing end of the second wire is produced on the first axial side to complete the sixth power input wire.

17. The stator as set forth in claim 1, wherein the power input wires are arranged on a first axial side of the core, and the coil-to-coil connecting wire are arranged on a second axial side of the core opposite the first axial side.

18. The stator as set forth in claim 1, wherein the power input wires area arranged on a first axial side of the core, the first coil-to-coil connecting wires of the coil-to-coil connecting wires are arranged on the first axial side of the core, and the second coil-to-coil connecting wires of the coil-to-coil connecting wires are arranged on a second axial side of the core which is opposite the first axial side.

19. The stator as set forth in claim 1, wherein the power input wires are arranged on a first axial side of the core, and the coil-to-coil connecting wires are arranged on a second axial side of the core which is opposite the first axial side.

20. The stator as set forth in claim 1, wherein each of the power input wires extends over two of the teeth.

21. The stator as set forth in claim 1, wherein each of the power input wires is extended from a clearance between an adjacent two of the teeth.

22. The stator as set forth in claim 1, wherein each of the first direction-oriented connecting wires extends over $2\times2$ of the teeth, and each of the second direction-oriented connecting wires extends over two of the teeth.

23. The stator as set forth in claim 1, wherein each of the first direction-oriented connecting wires extends over two of the teeth, and each of the second direction-oriented connecting wires extends over $2\times2$ of the teeth.

24. A rotating electrical machine comprising:

a stator as set forth in claim 1; and a plurality of wire-connecting terminals each of which connects with two or more of the power input wires.

25. A rotating electrical machine comprising:

a stator as set forth in claim 1; and a plurality of wire-connecting terminals each of which connects with a respective one of the power input wires.

26. A rotating electrical machine comprising:

a stator as set forth in claim 1;

a circuit substrate to which the power input wires connect directly.

27. A production method of a stator which includes a core and a winding, the core including a plurality of core segments each of which is equipped with a tooth, the winding including a plurality of coils wound around the teeth of the core segments in a concentrated winding form, the coils being in a m-series-connected-coil and n-parallel-connected-coil delta configuration where m is a natural number more than or equal to two, and n is a natural number or in a k-series-connected-coil and n-parallel-connected-coil delta configuration where k is an even number, and n is a natural number, wherein the coils include U-phase coils working for a U-phase, W-phase coils working for a W-phase, and V-phase coils working for a V-phase, the U-phase coils, the W-phase coils, and the V-phase coils being arranged alternately in a first circumferential direction of the core, the production method comprising: winding wire around the teeth to form the coil, in the winding of the wire, a plurality of power input wires are formed each of which connects between a leading end of one of the coils of a first one of the U-phase, the W-phase, and the V-phase and a trailing end of one of the coils of a second one of the U-phase, the W-phase, and the V-phase, a plurality of first direction-oriented connecting wires are formed each of which connects between a leading end of one of the coils of one of the U-phase, the W-phase, and the V-phase and a trailing end of one of the coils of the same phase which is arranged away from a first former one of the coils in the first circumferential direction of the core, at least one second direction-oriented wire is formed which connects between a trailing end of one of the coils of one of the U-phase, the W-phase, and the V-phase and a leading end of one of the coils of the same phase which is arranged away from a second former one of the coils in a second circumferential direction, and at least one of the power input wires joints ends of the winding together to complete said delta configuration.

28. The production method as set forth in claim 27, wherein each of the power input wires connects between the leading end of one of the coils of the first one of the U-phase, the W-phase, and the V-phase and the trailing end of one of the coils of the second one of the U-phase, the W-phase, and the V-phase, the second one being arranged away from the first one in the second circumferential direction of the core.

29. A production method of a rotating electrical machine wherein a stator is produced in the production method, as set forth in claim 27, and each of the power input wires is connected to two or more wire-connecting terminals.

30. A production method of a rotating electrical machine wherein a stator is produced in the production method, as set forth in claim 27, and each of the power input wires is connected to a respective one of wire-connecting terminals.

31. A production method of a rotating electrical machine wherein a stator is produced in the production method, as set forth in claim 27, and each of the power input wires is connected directly to a circuit substrate.

\* \* \* \* \*